US006973266B2

(12) United States Patent
Tochigi

(10) Patent No.: US 6,973,266 B2
(45) Date of Patent: Dec. 6, 2005

(54) FINDER OPTICAL SYSTEM

(75) Inventor: Akiyoshi Tochigi, Kokubunji (JP)

(73) Assignee: Olympus Corporation, Tokyo (JP)

( * ) Notice: Subject to any disclaimer, the term of this patent is extended or adjusted under 35 U.S.C. 154(b) by 18 days.

(21) Appl. No.: 11/009,084

(22) Filed: Dec. 13, 2004

(65) Prior Publication Data
US 2005/0163500 A1   Jul. 28, 2005

Related U.S. Application Data

(62) Division of application No. 10/687,911, filed on Oct. 20, 2003, now Pat. No. 6,862,411, which is a division of application No. 09/836,391, filed on Apr. 18, 2001, now Pat. No. 6,671,461.

(30) Foreign Application Priority Data

| Apr. 18, 2000 | (JP) | 2000-122413 |
| Apr. 24, 2000 | (JP) | 2000-127652 |
| May 25, 2000 | (JP) | 2000-159584 |
| May 31, 2000 | (JP) | 2000-166523 |
| Jun.  5, 2000 | (JP) | 2000-172018 |

(51) Int. Cl.$^7$ .................................. G03B 13/10
(52) U.S. Cl. ............... 396/379; 396/382; 396/384; 359/643; 359/678
(58) Field of Search ................. 396/379, 382, 396/384; 359/643, 644, 678

(56) References Cited

U.S. PATENT DOCUMENTS

| 6,041,193 | A  |    | 3/2000  | Aoki |
| 6,175,455 | B1 |    | 1/2001  | Kato et al. |
| 6,411,783 | B2 |    | 6/2002  | Takase et al. |
| 6,515,797 | B2 |    | 2/2003  | Koyama |
| 6,671,461 | B2 | *  | 12/2003 | Tochigi ..................... 396/379 |
| 6,862,411 | B2 | *  | 3/2005  | Tochigi ..................... 396/379 |
| 6,865,032 | B2 | *  | 3/2005  | Hankawa et al. .......... 359/754 |

FOREIGN PATENT DOCUMENTS

| JP | 06-051201 | 2/1994 |
| JP | 08-136806 | 5/1996 |
| JP | 09-211547 | 8/1997 |
| JP | 10-206933 | 8/1998 |
| JP | 11-242167 | 9/1999 |

* cited by examiner

*Primary Examiner*—David M. Gray
(74) *Attorney, Agent, or Firm*—Pillsbury Winthrop Shaw Pittman LLP

(57) ABSTRACT

A finder optical system includes an eyepiece optical system with a positive refracting power. The eyepiece optical system includes an optical unit with a positive refracting power and a lens unit with a positive refracting power, In the eyepiece optical system, a refracting surface that is located most distant from an eyepoint of the eyepiece optical system has a positive refracting power and is configured as an aspherical surface with a negative refracting power on a periphery thereof.

10 Claims, 73 Drawing Sheets

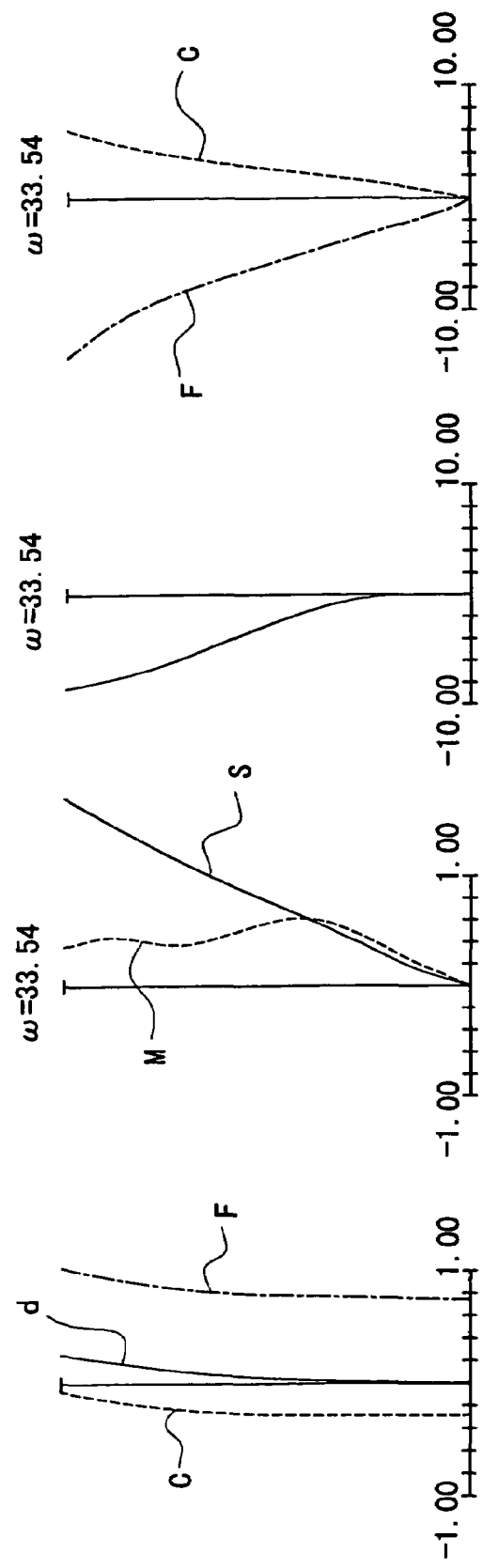

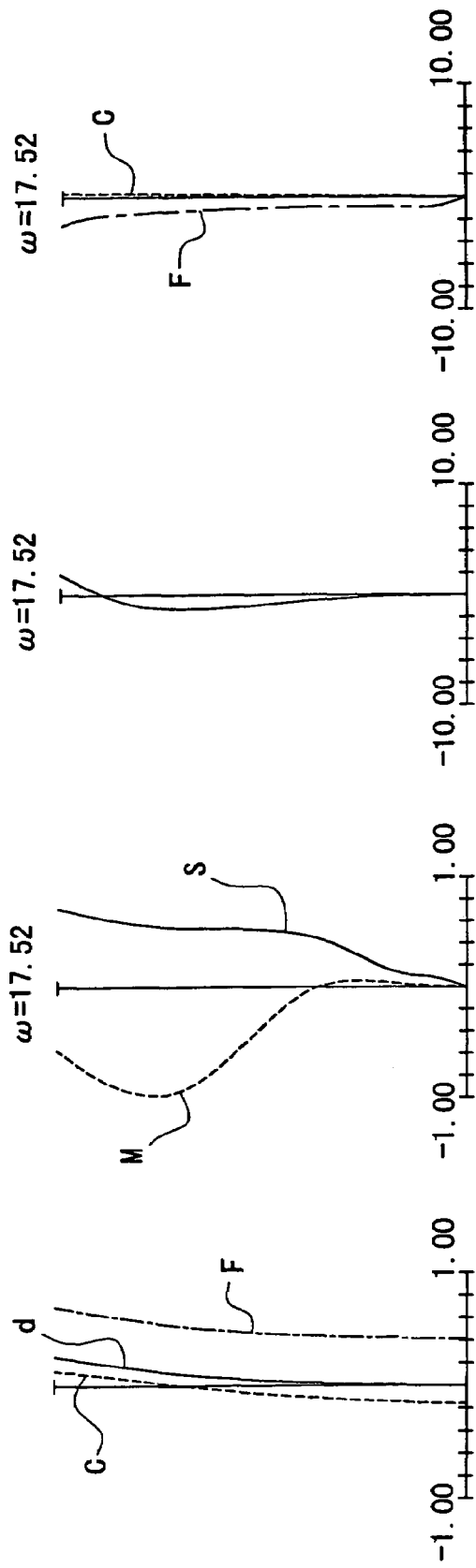

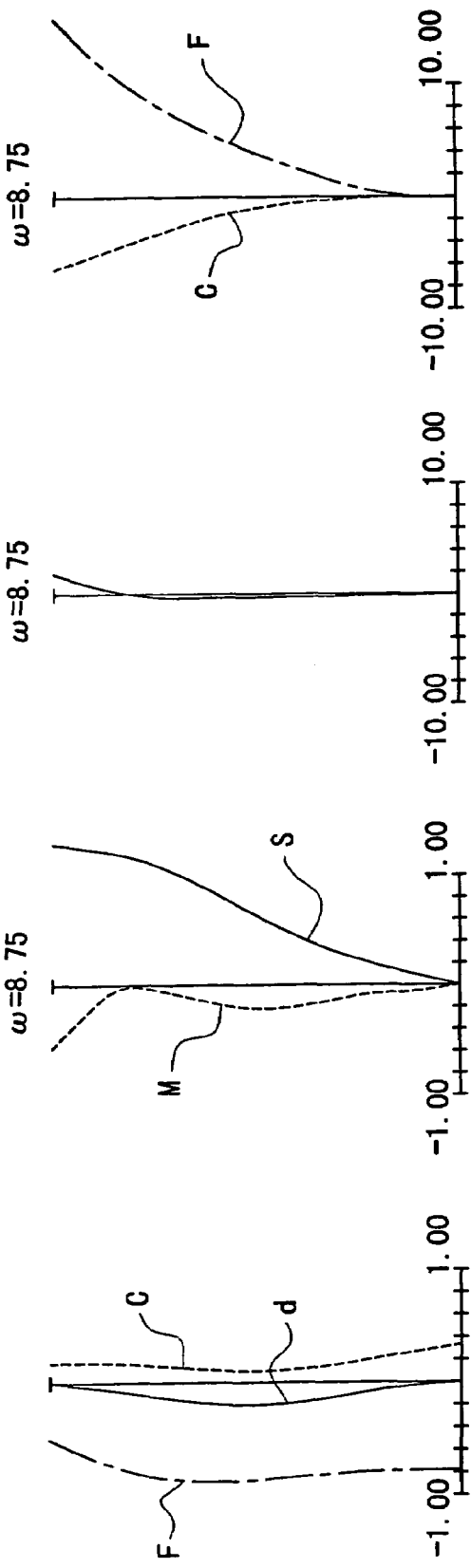

FIELD FRAME

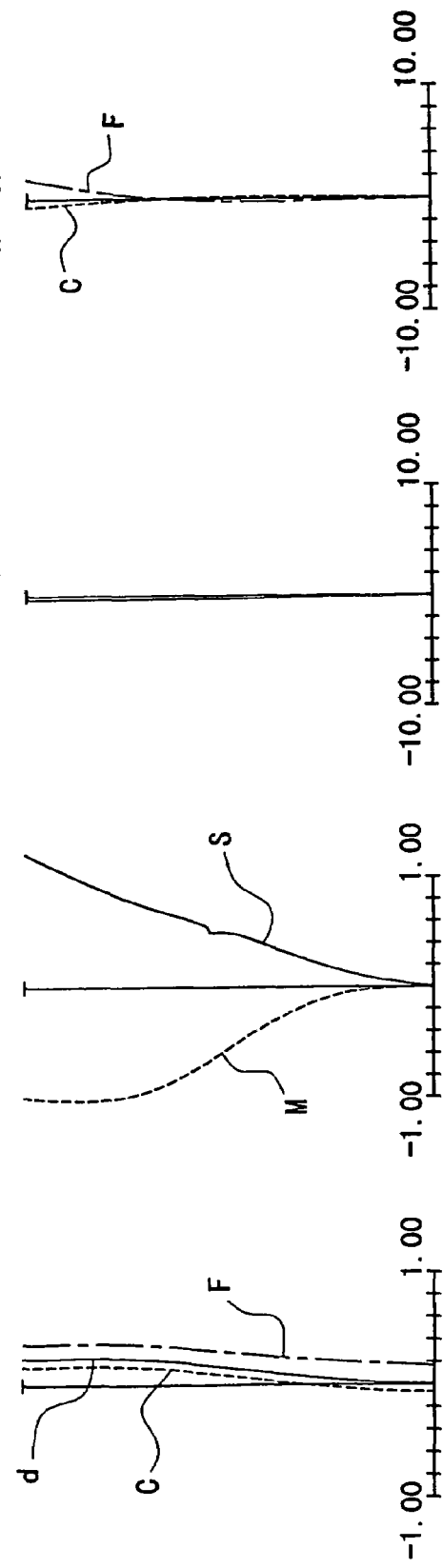

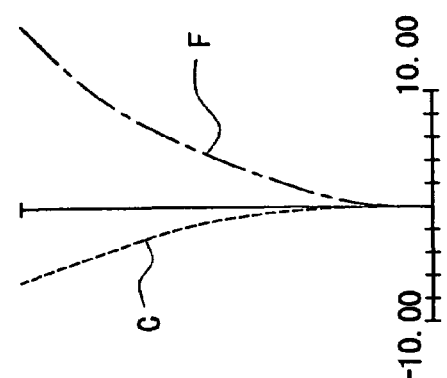
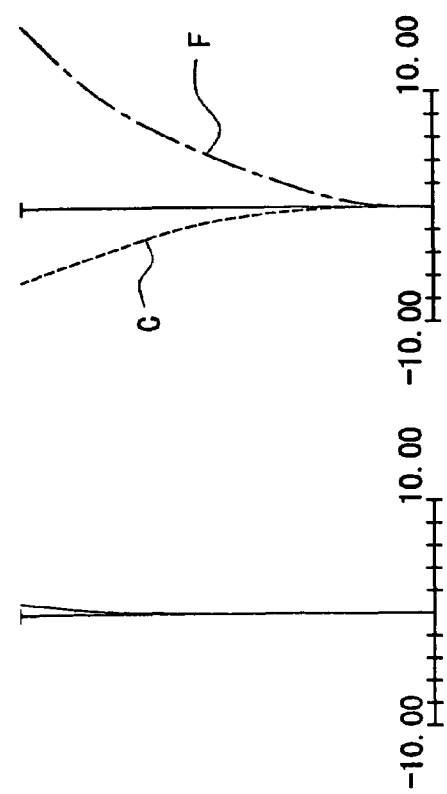
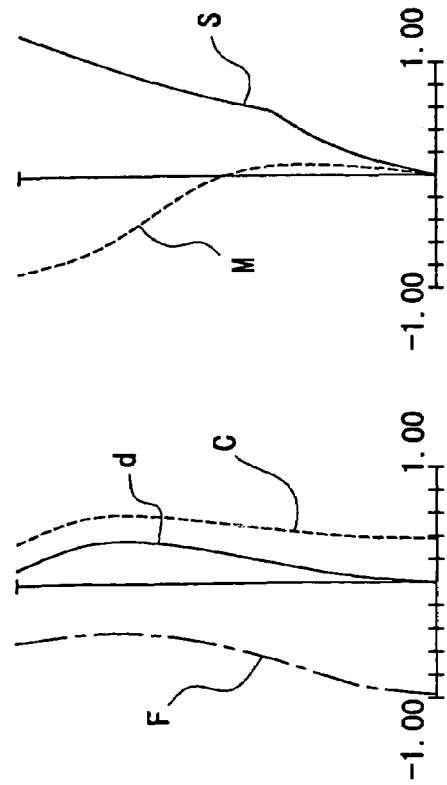

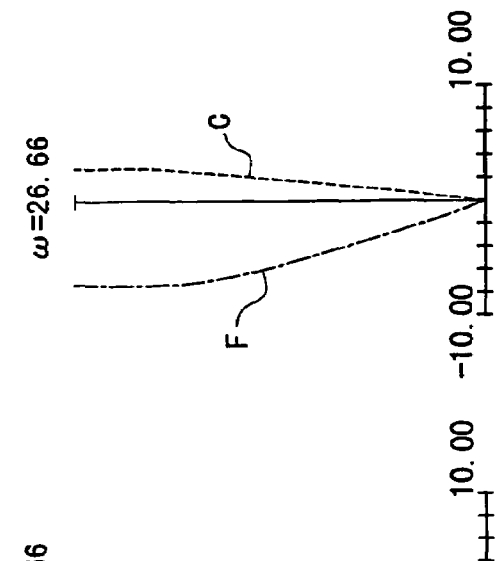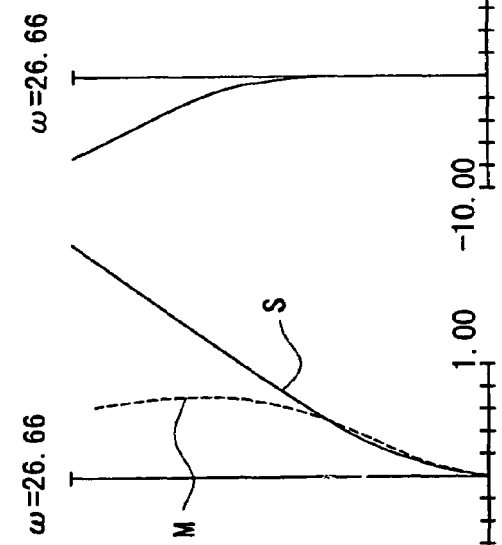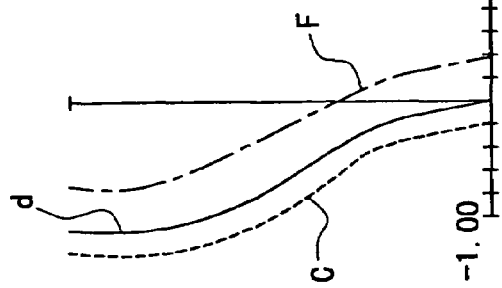

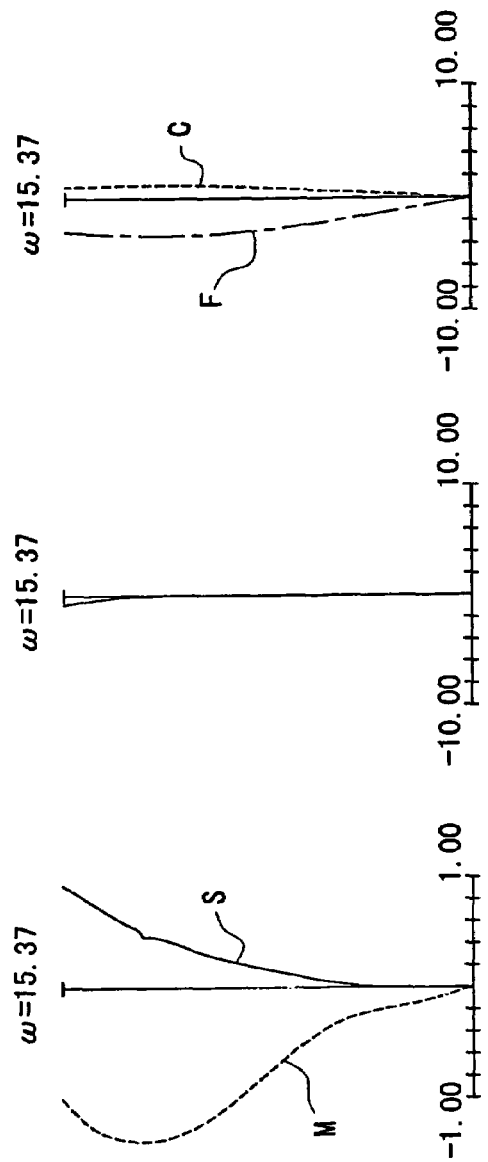

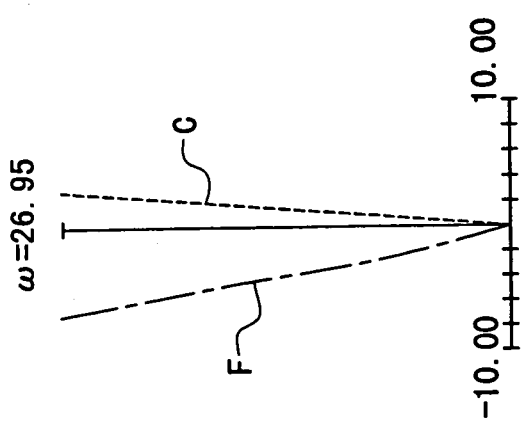
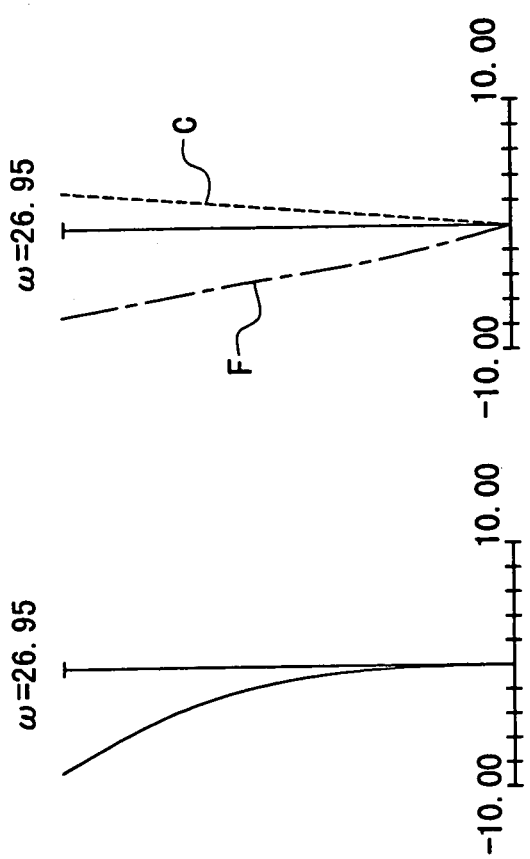
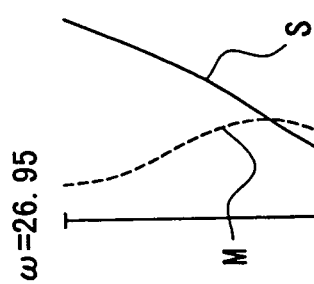
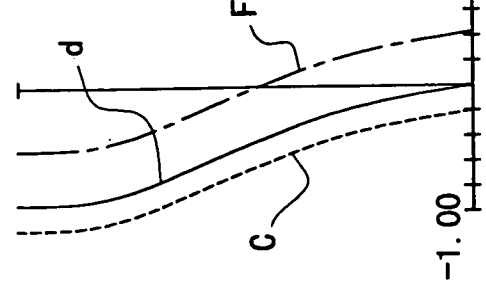

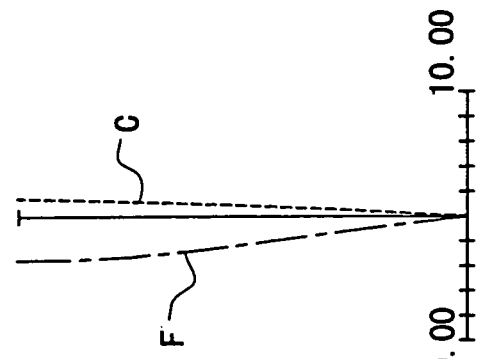
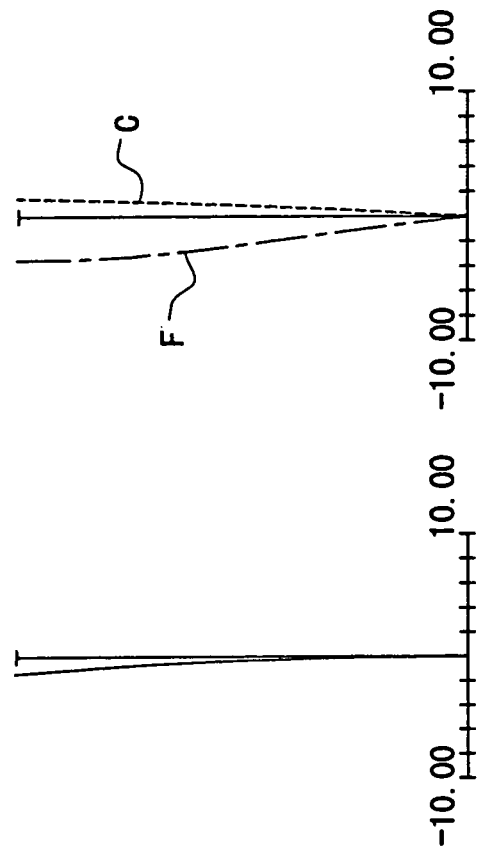
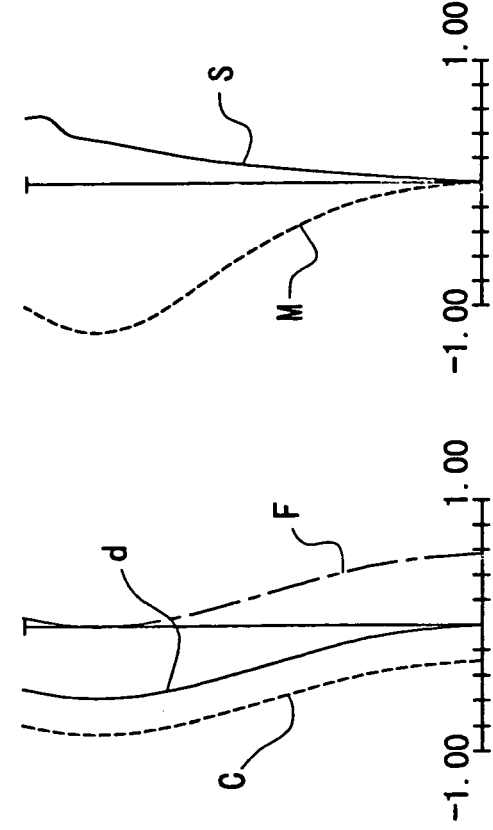

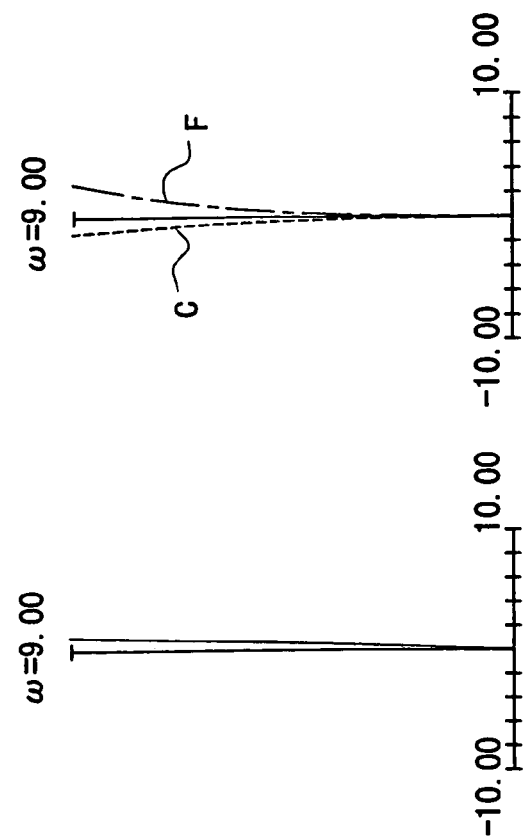
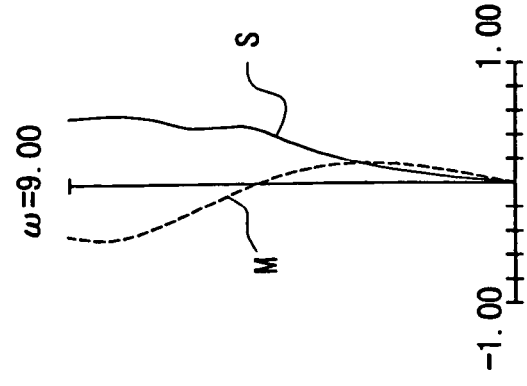
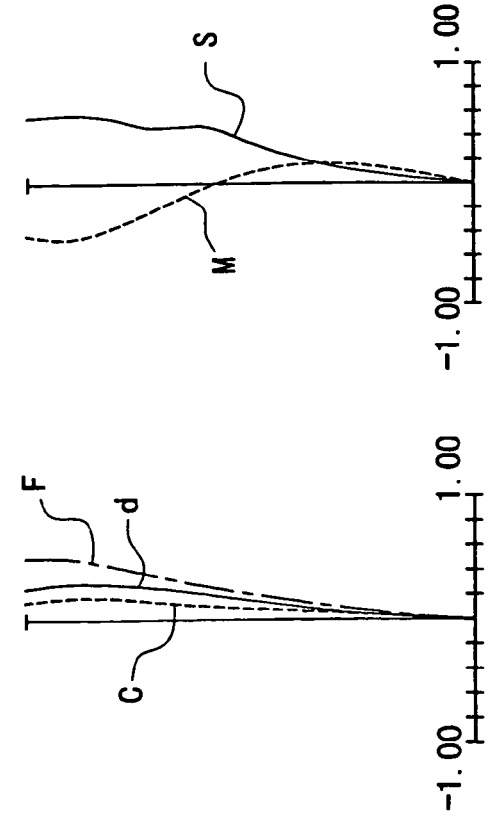

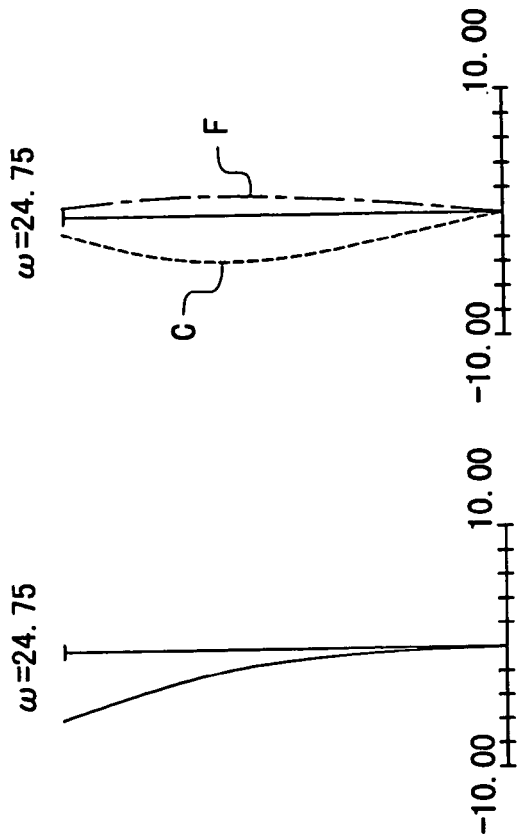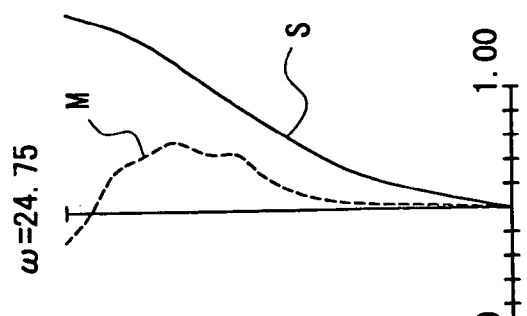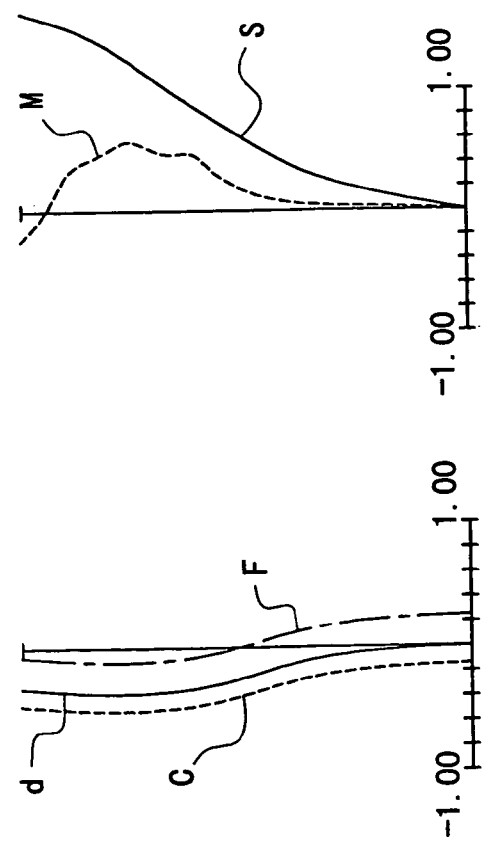

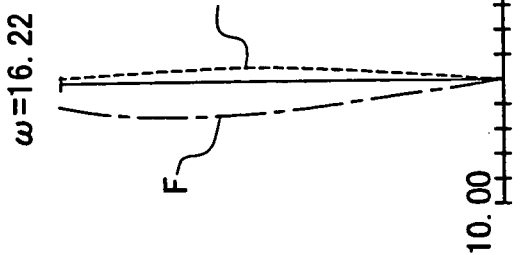
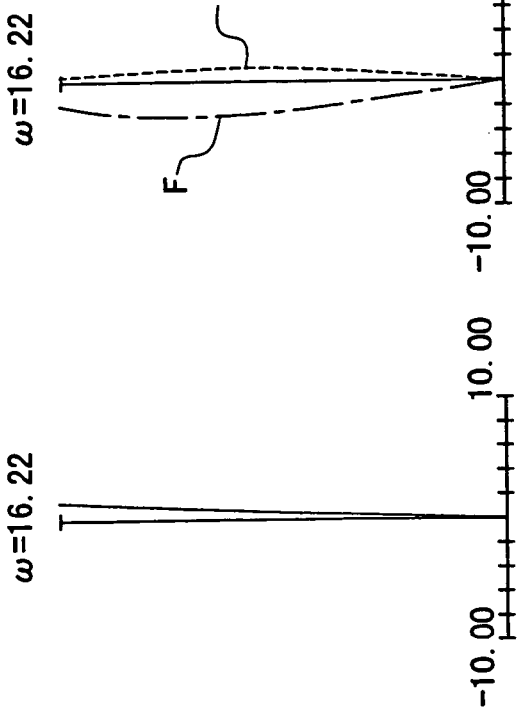
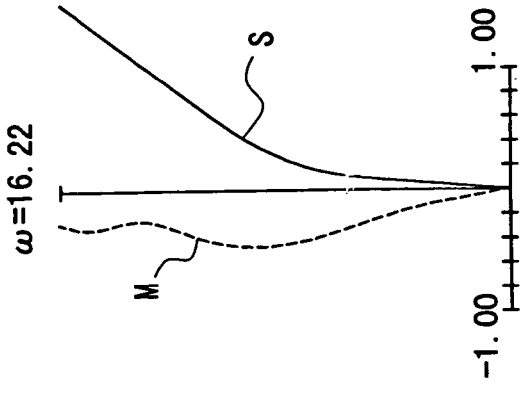
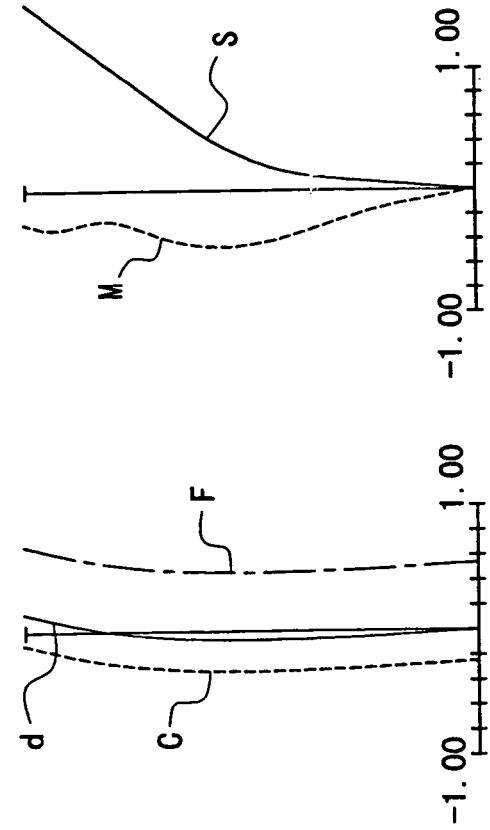

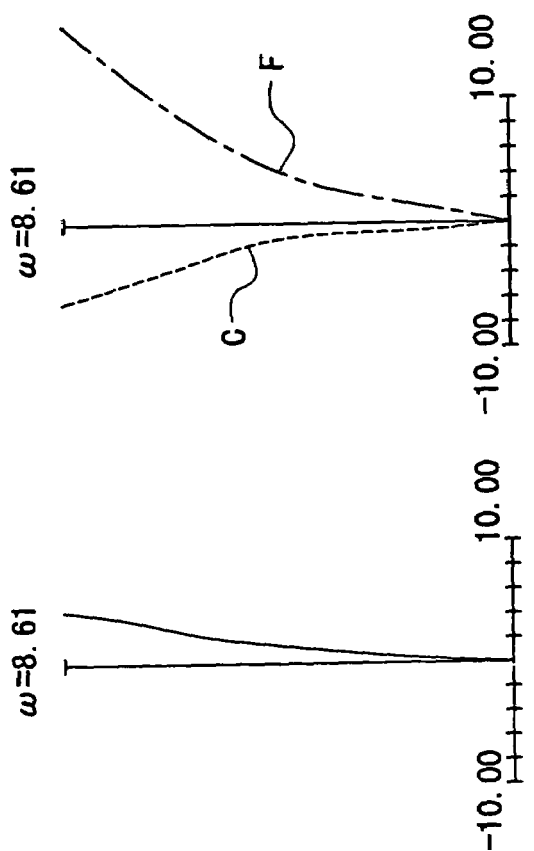
FIG.24A
SPHERICAL ABERRATION
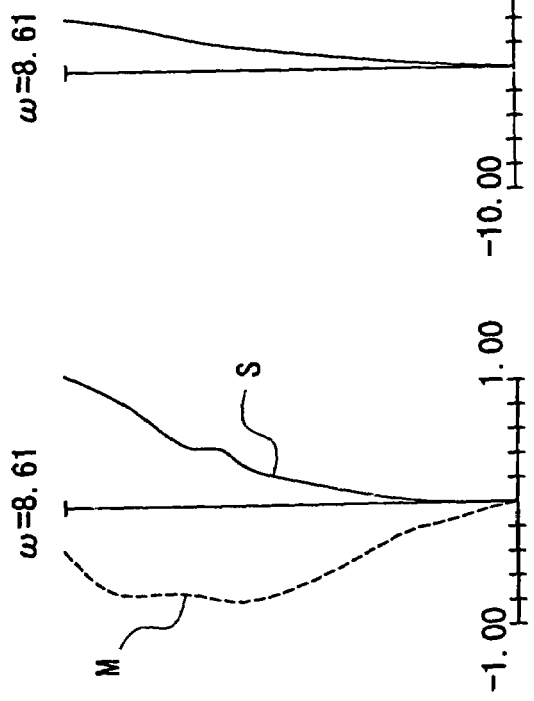
FIG.24B
ASTIGMATISM
FIG.24C
DISTORTION
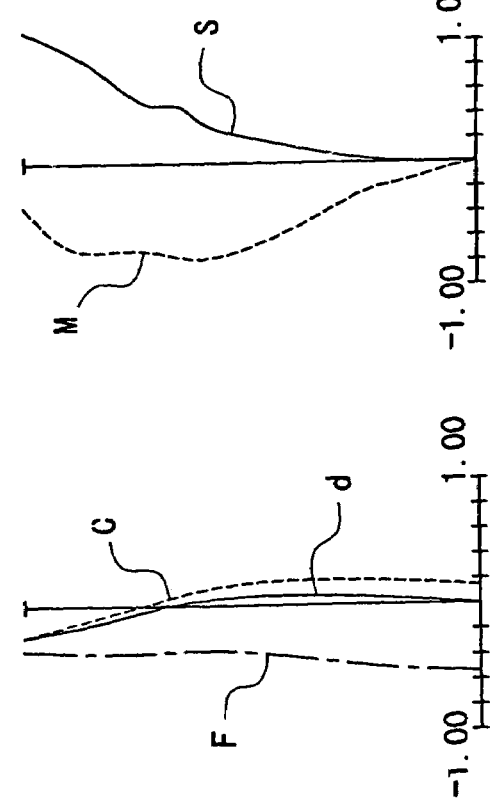
FIG.24D
CHROMATIC ABERRATION OF MAGNIFICATION

FIELD FRAME

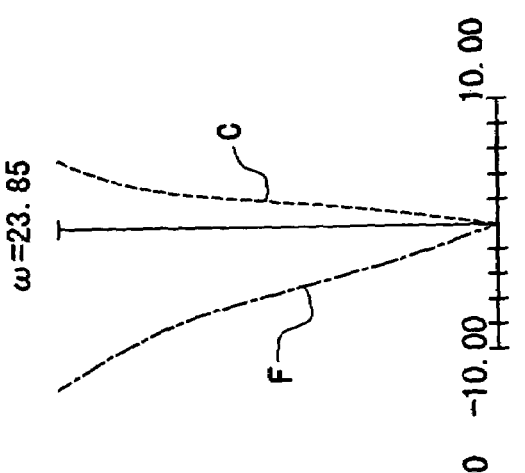
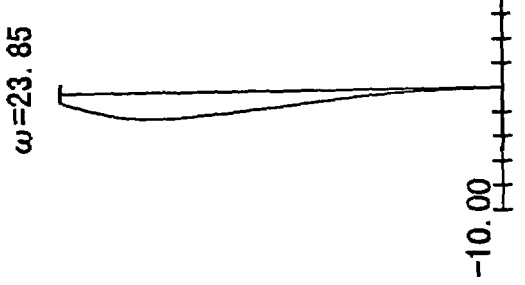
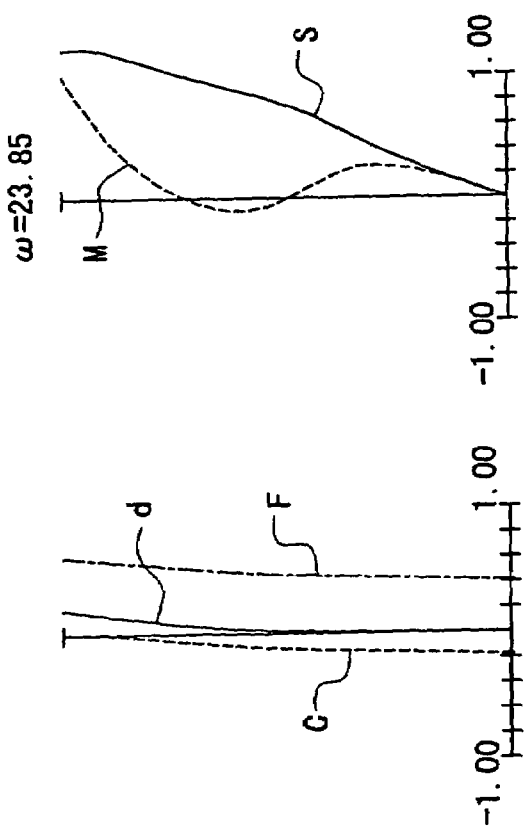

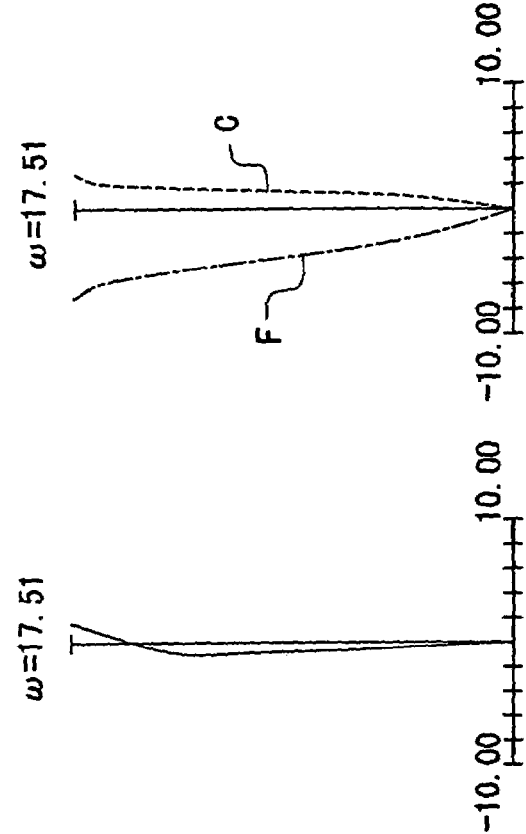
FIG.27A SPHERICAL ABERRATION
FIG.27B ASTIGMATISM
FIG.27C DISTORTION
FIG.27D CHROMATIC ABERRATION OF MAGNIFICATION

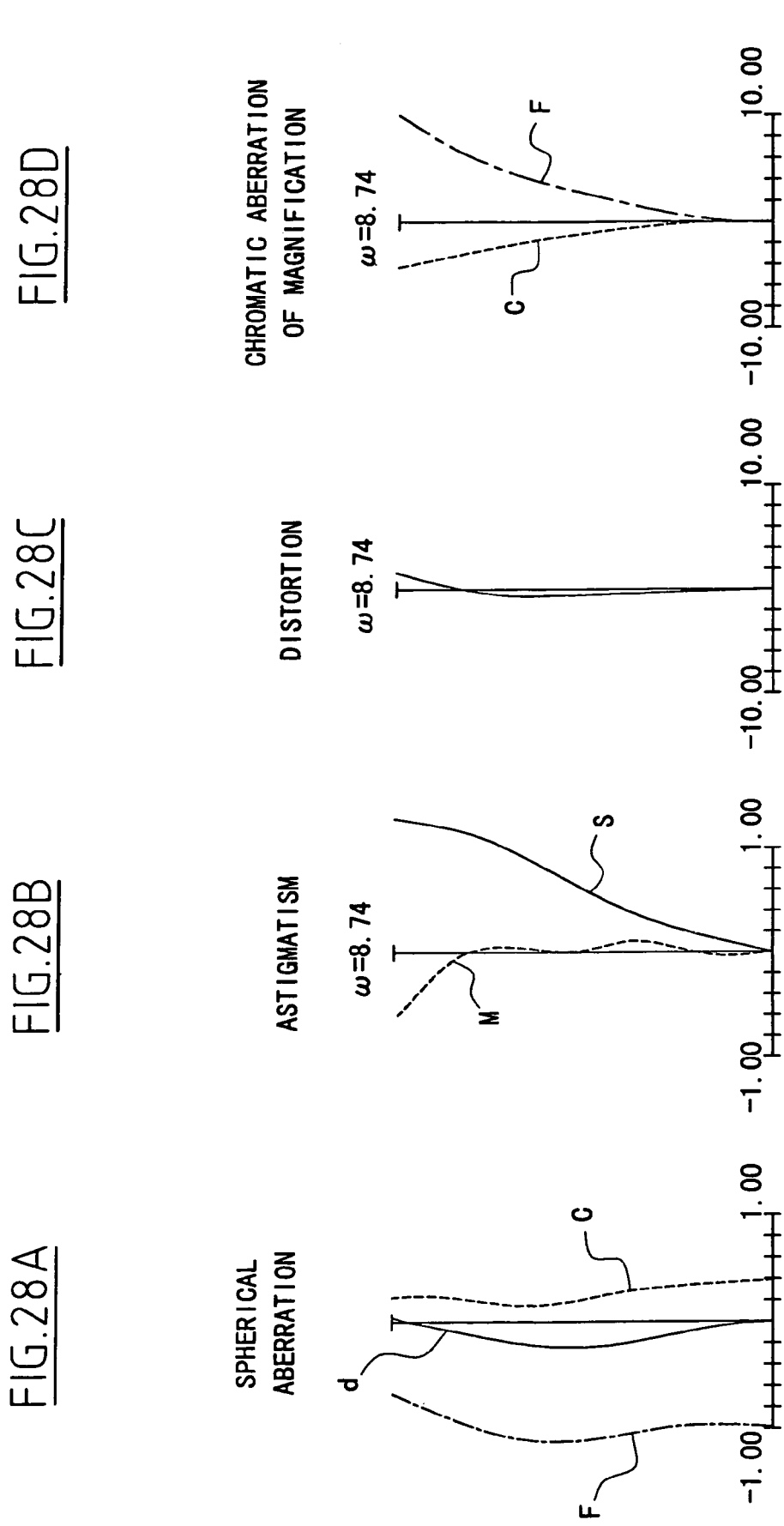

FIELD FRAME

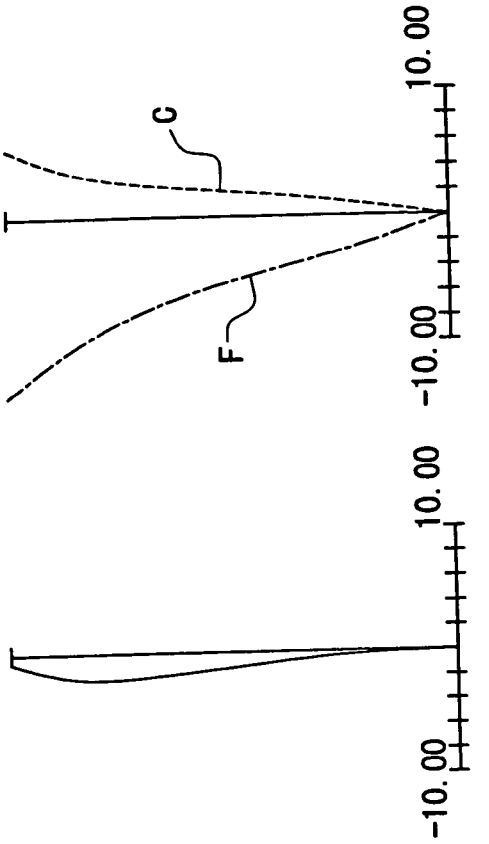
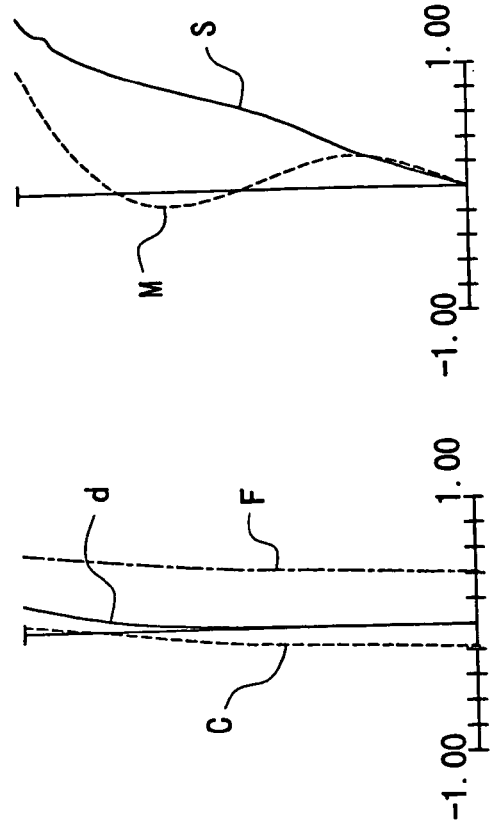

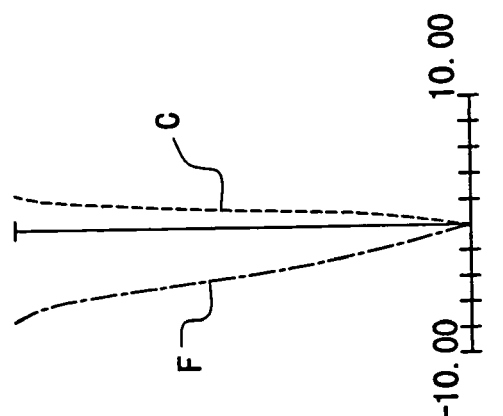
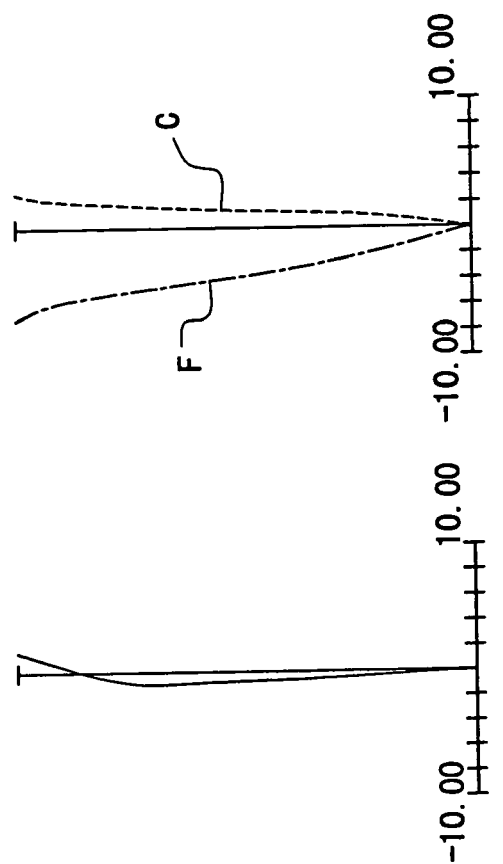
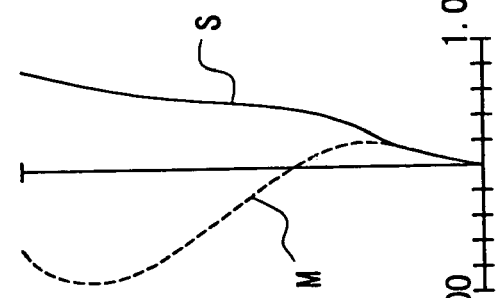
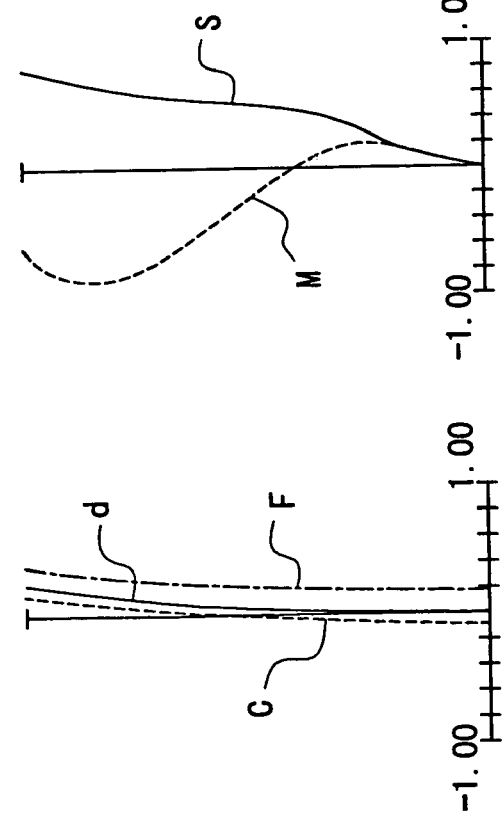

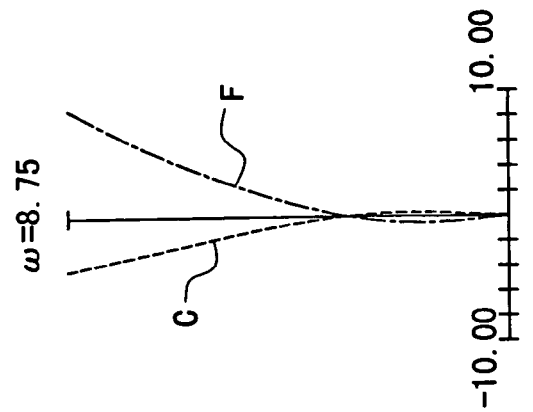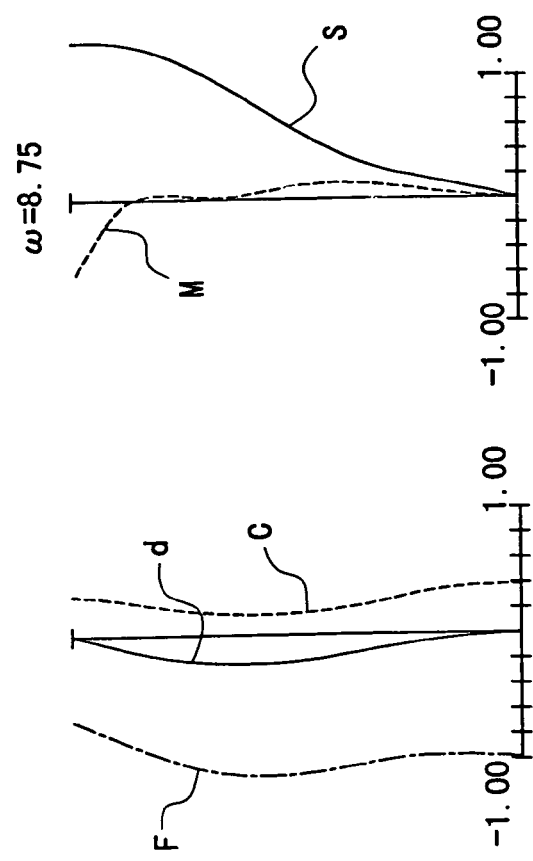

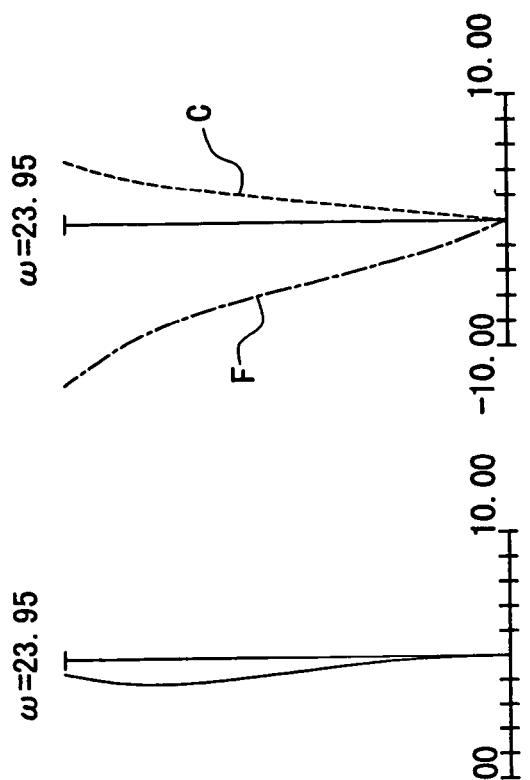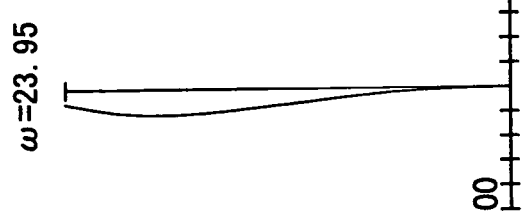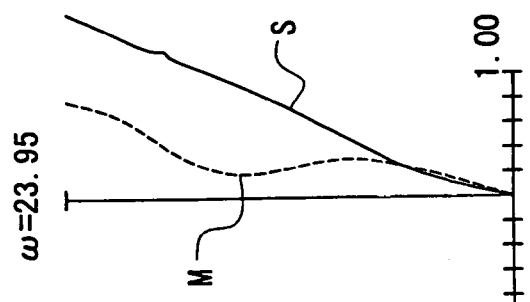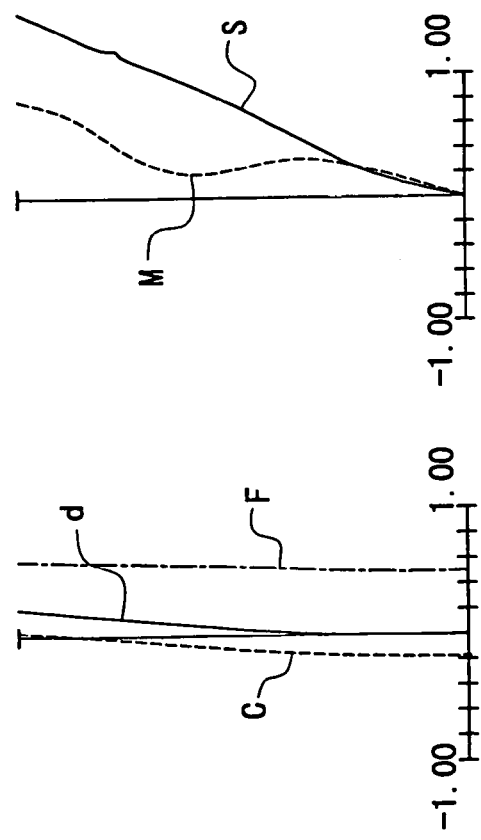

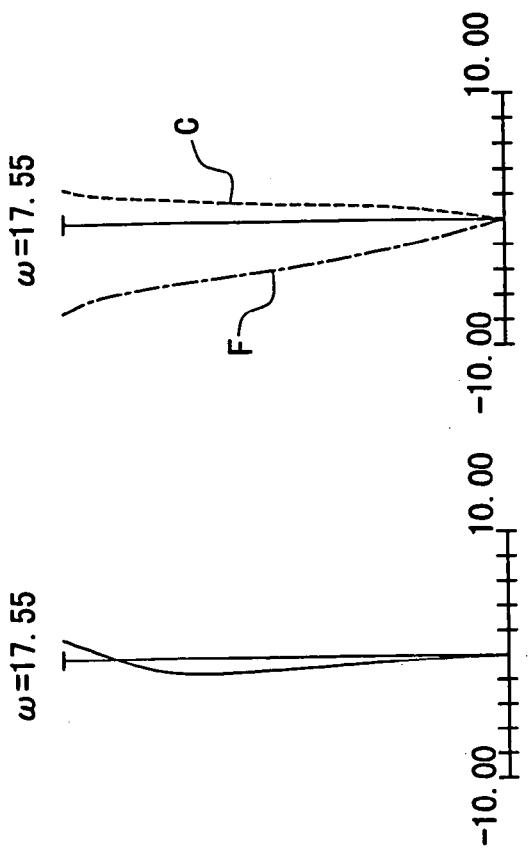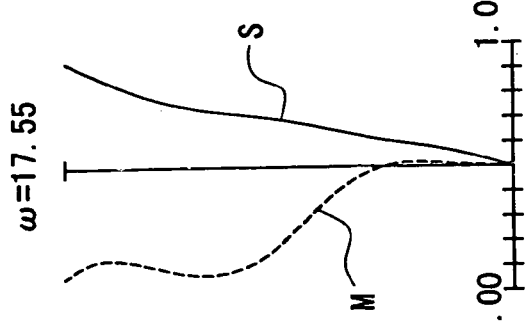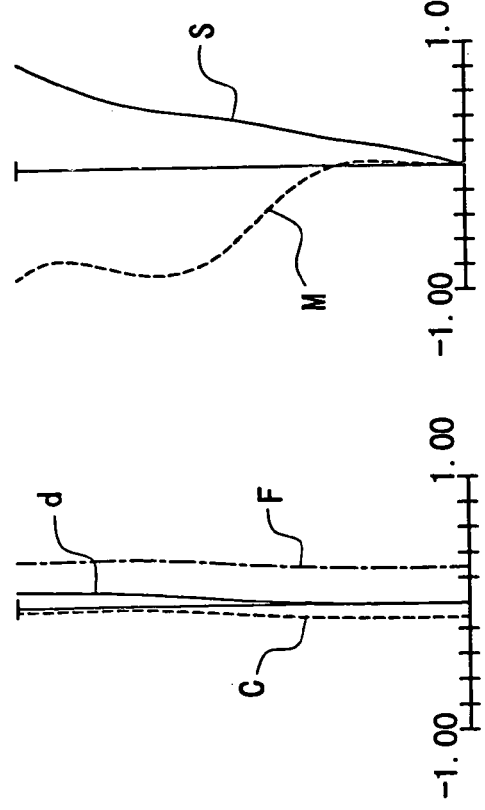

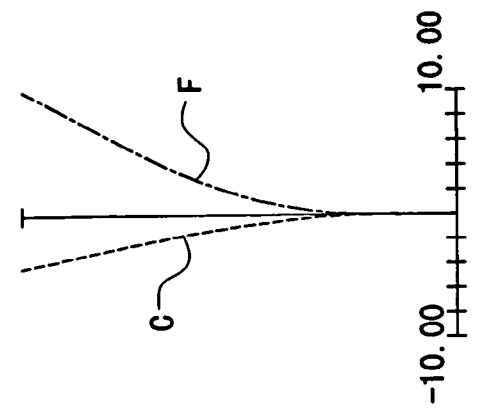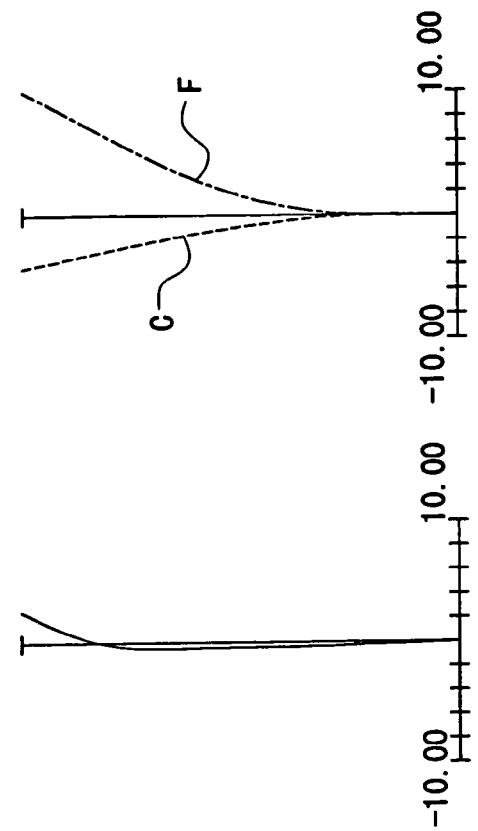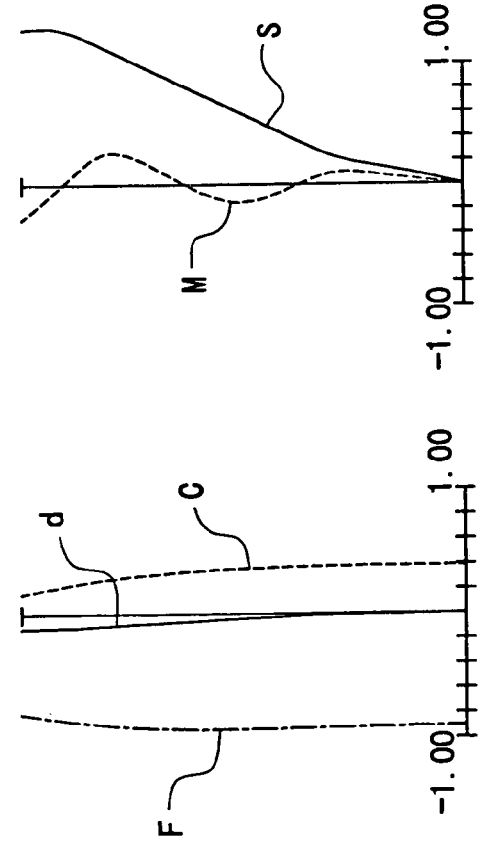

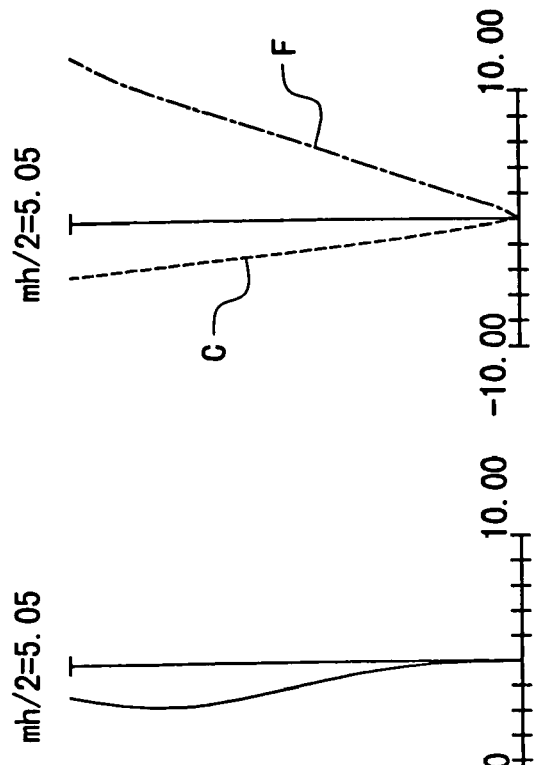
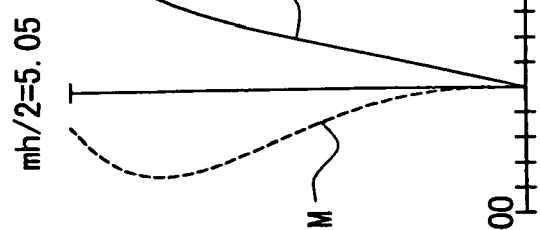
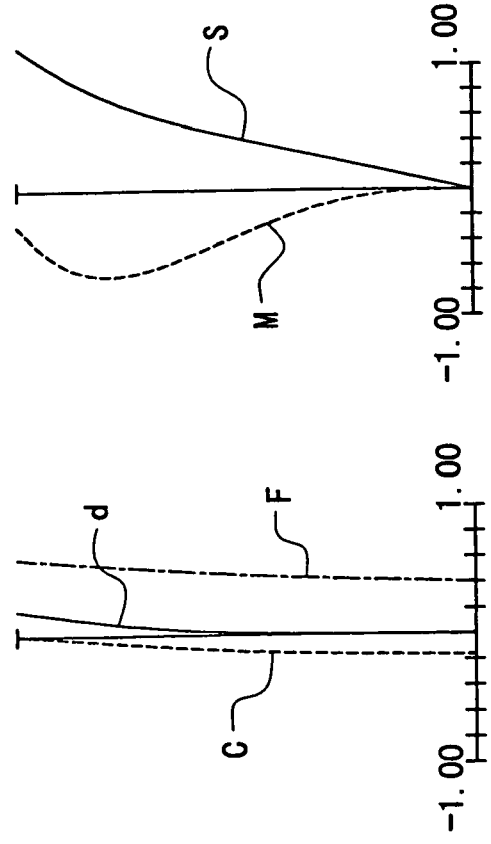
FIG.39A  FIG.39B  FIG.39C  FIG.39D

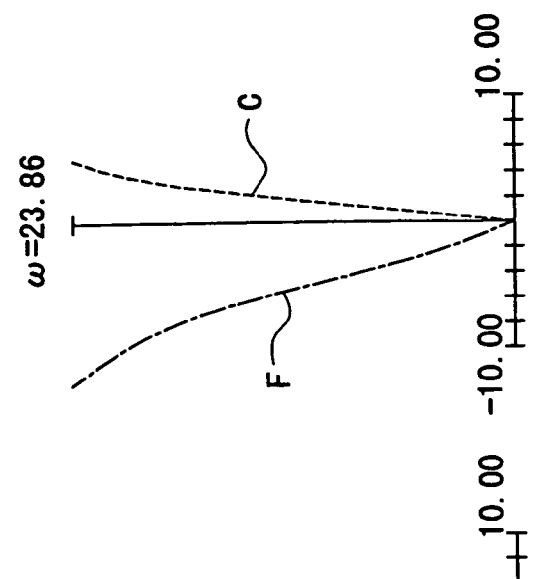
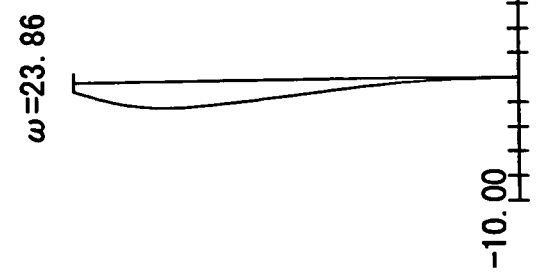
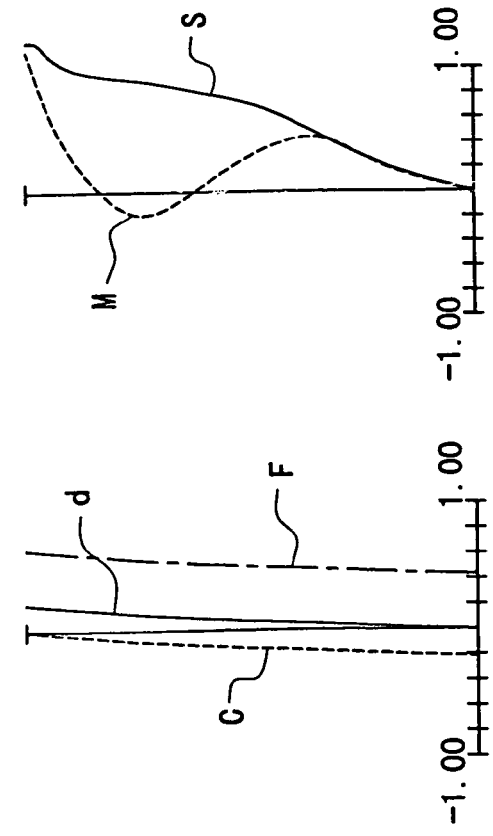
FIG.41A  FIG.41B  FIG.41C  FIG.41D

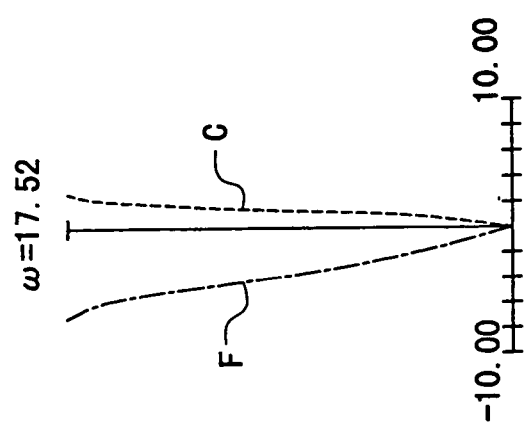
FIG.42D CHROMATIC ABERRATION OF MAGNIFICATION
FIG.42C DISTORTION
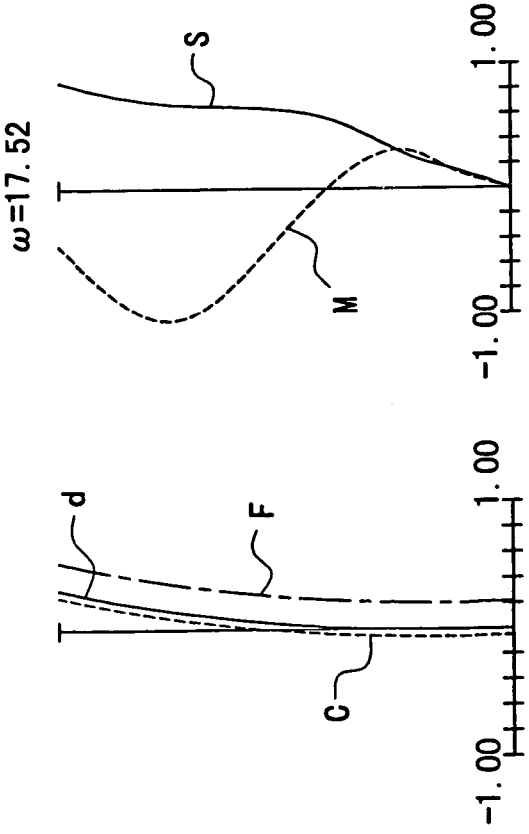
FIG.42B ASTIGMATISM
FIG.42A SPHERICAL ABERRATION

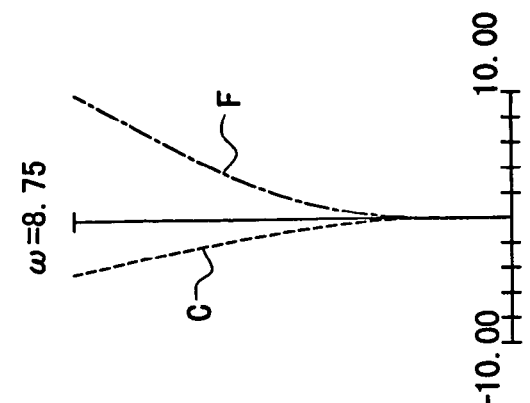
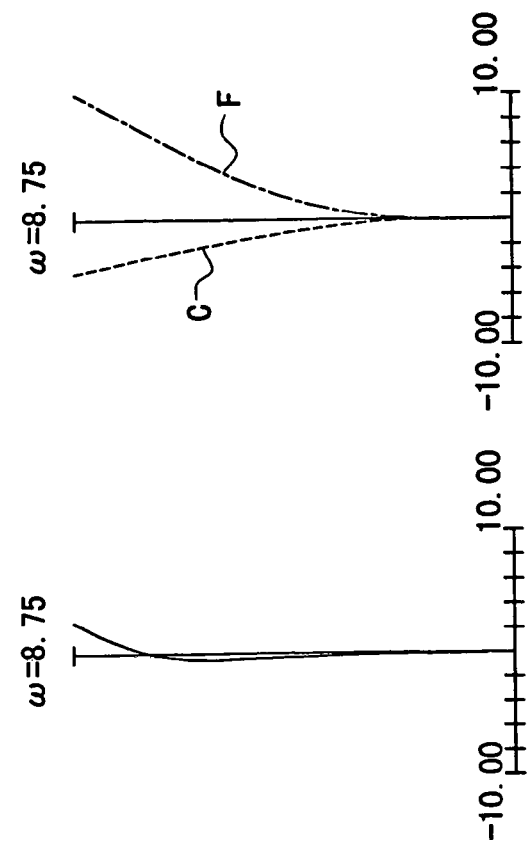
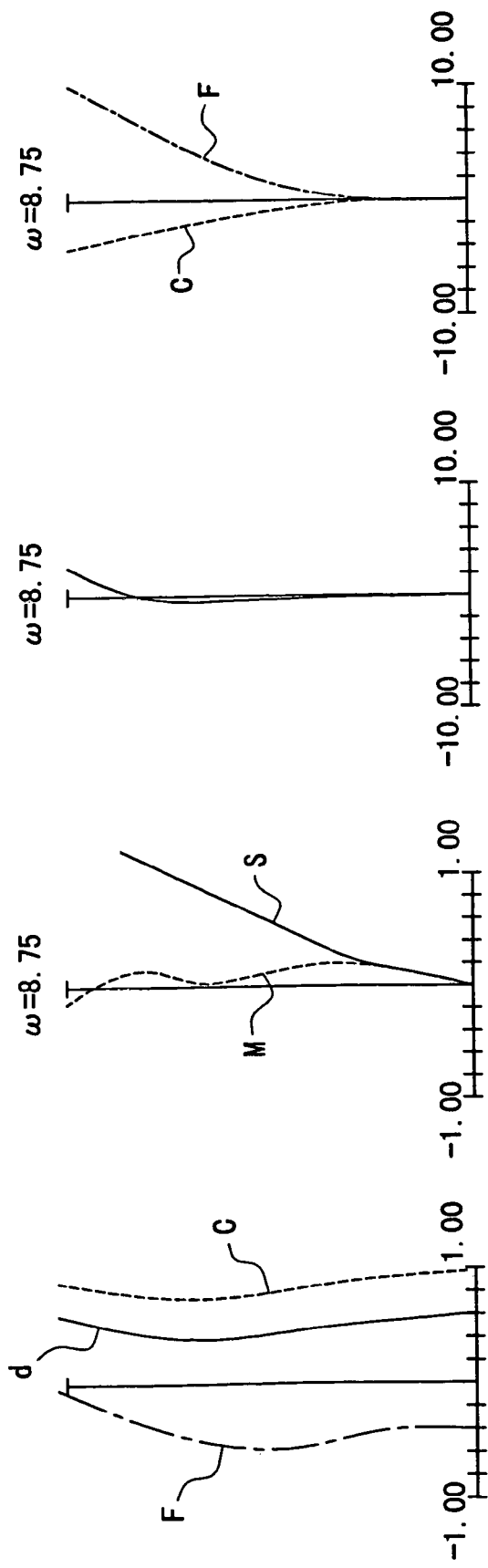

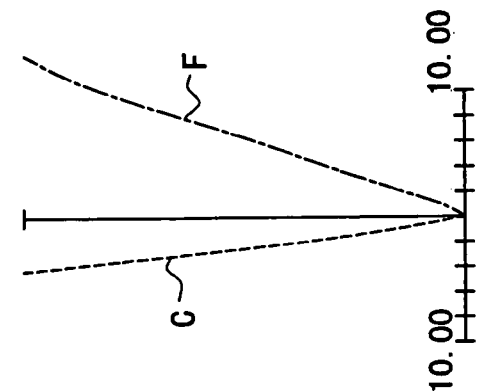
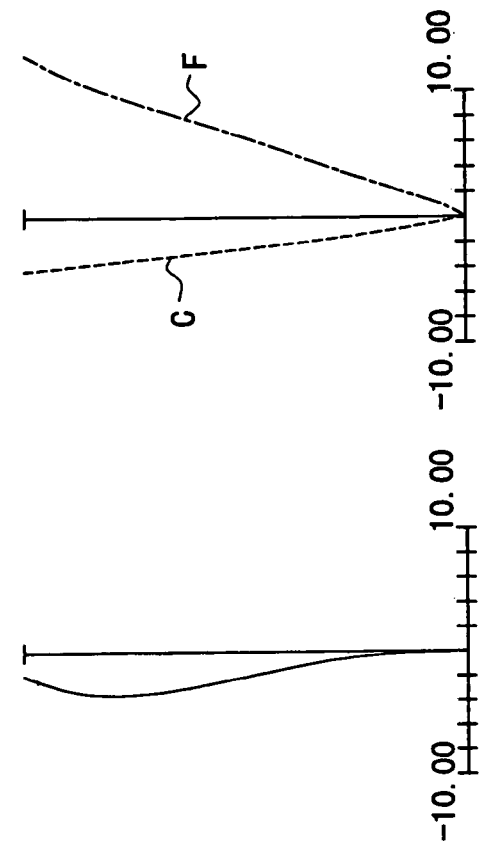
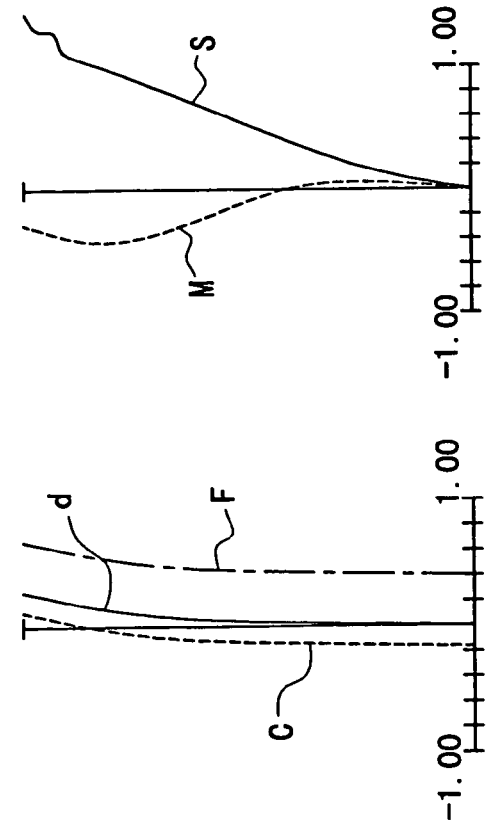

FIELD FRAME

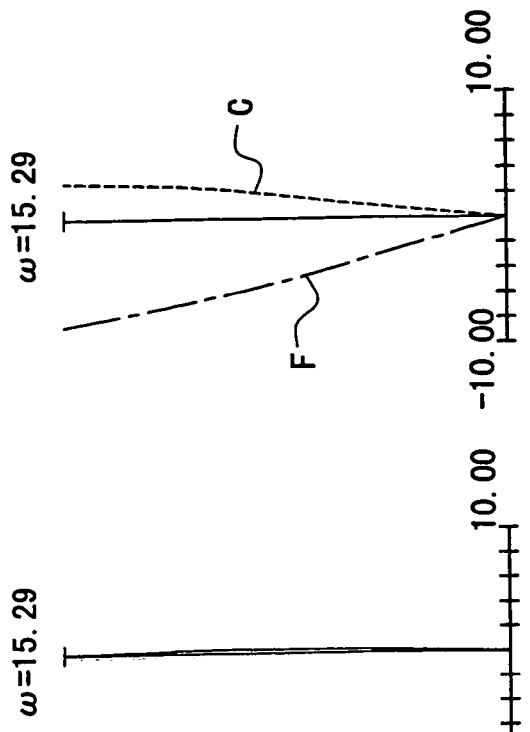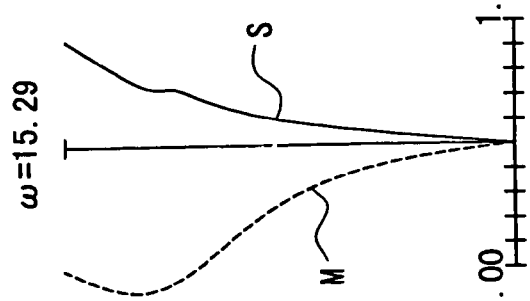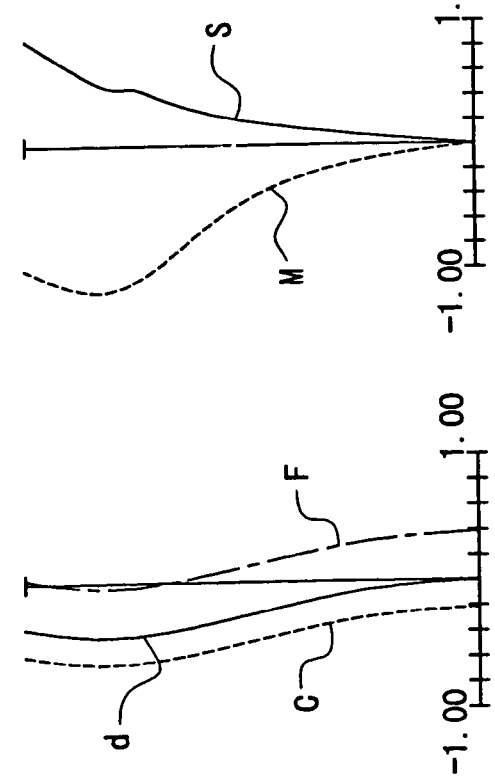

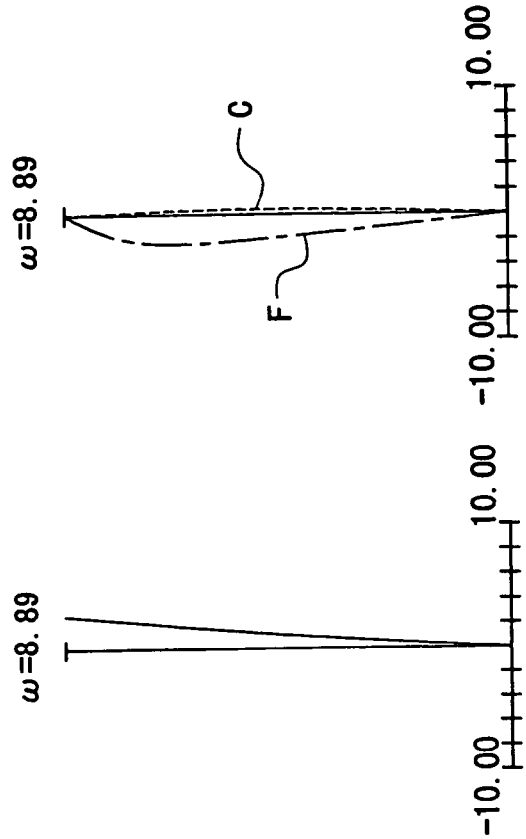
FIG.48D
FIG.48C
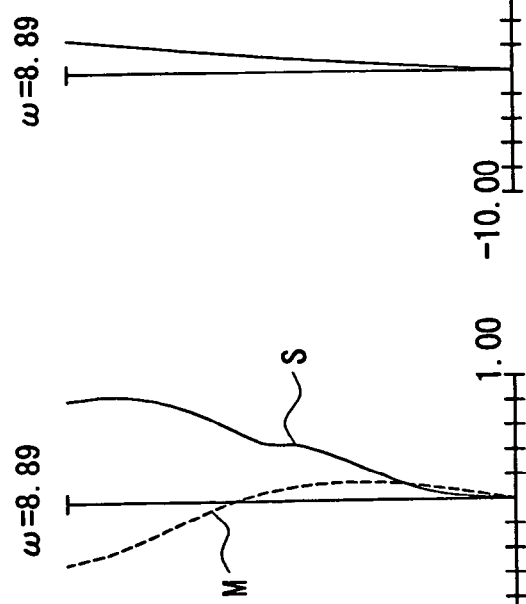
FIG.48B
FIG.48A
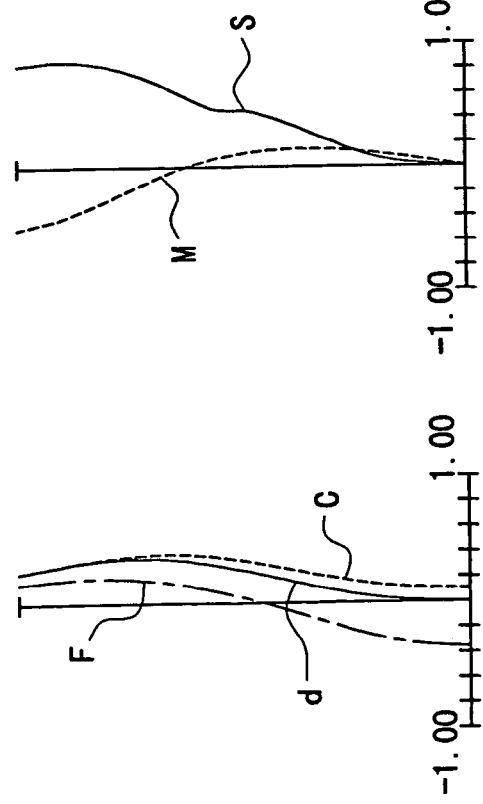

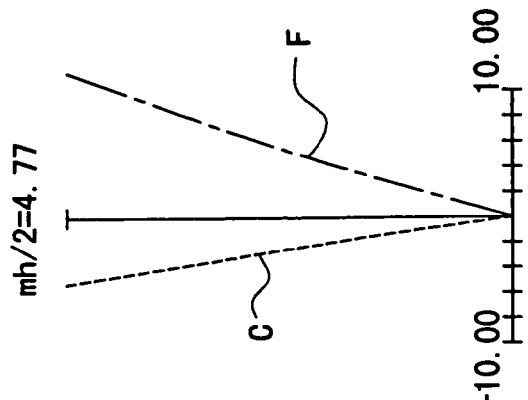
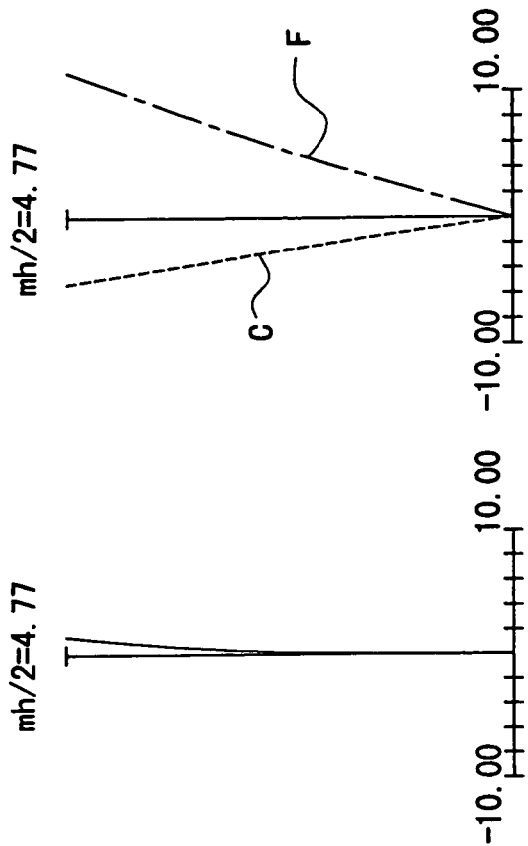
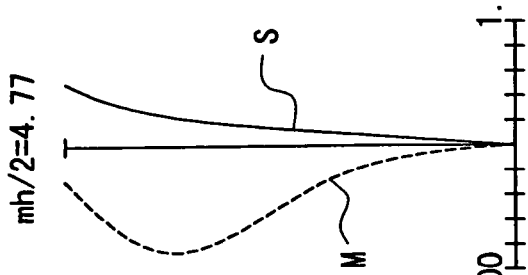
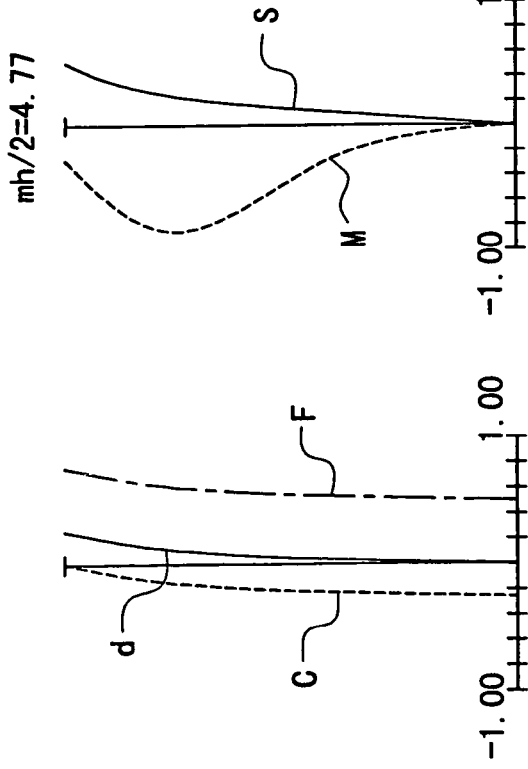

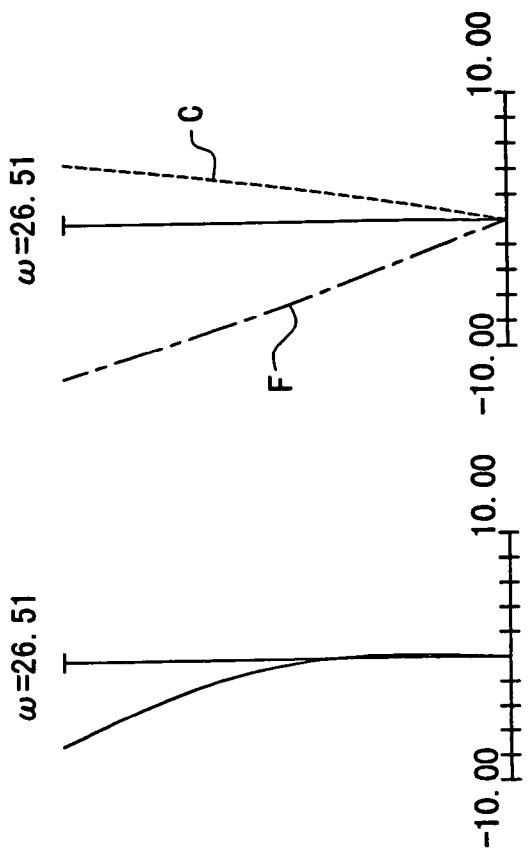

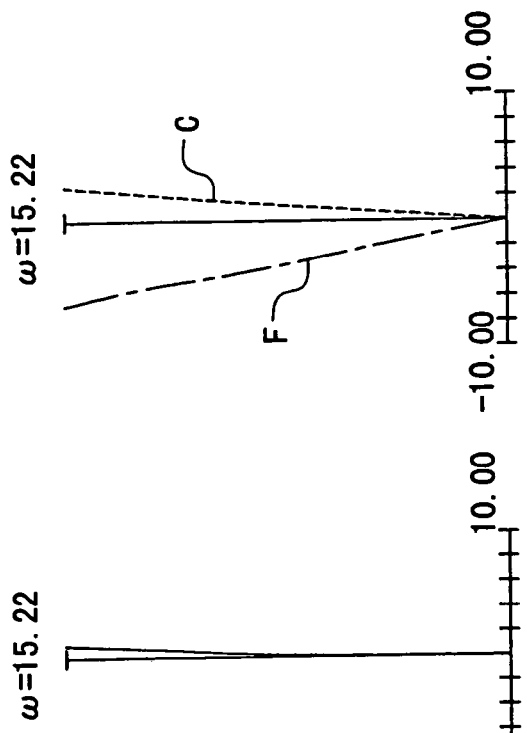
FIG.52D
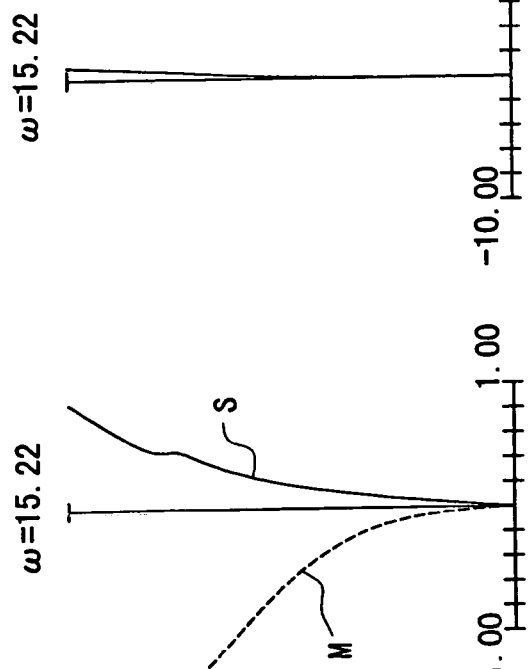
FIG.52C
FIG.52B
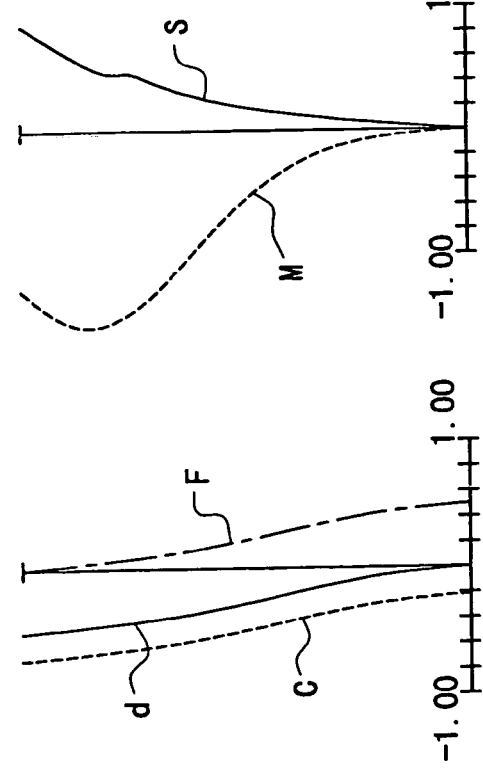
FIG.52A

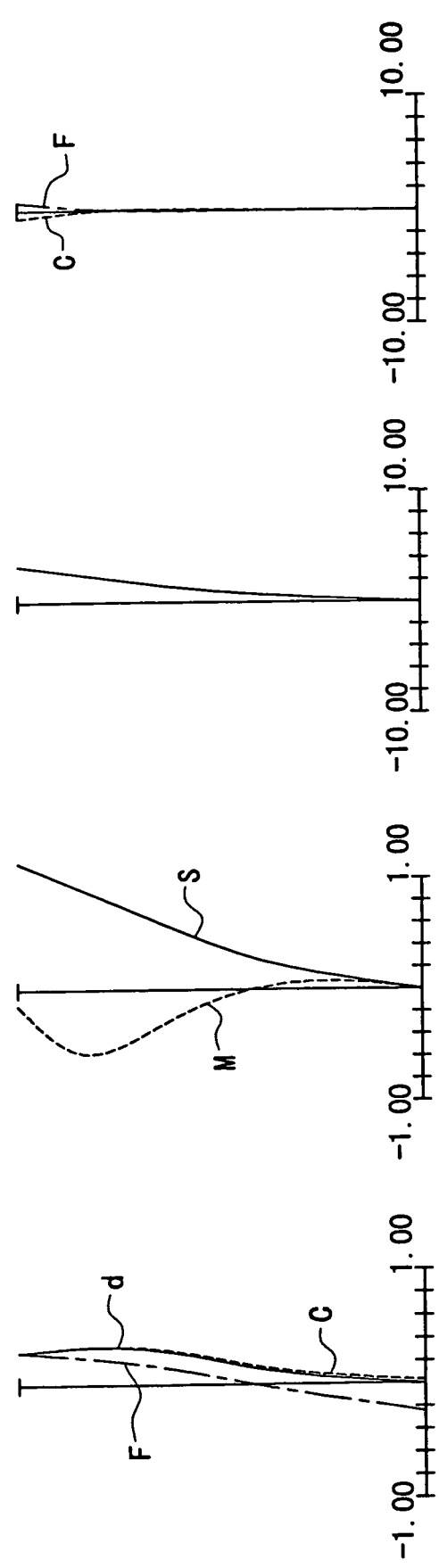
FIG.53D — CHROMATIC ABERRATION OF MAGNIFICATION
FIG.53C — DISTORTION
FIG.53B — ASTIGMATISM
FIG.53A — SPHERICAL ABERRATION

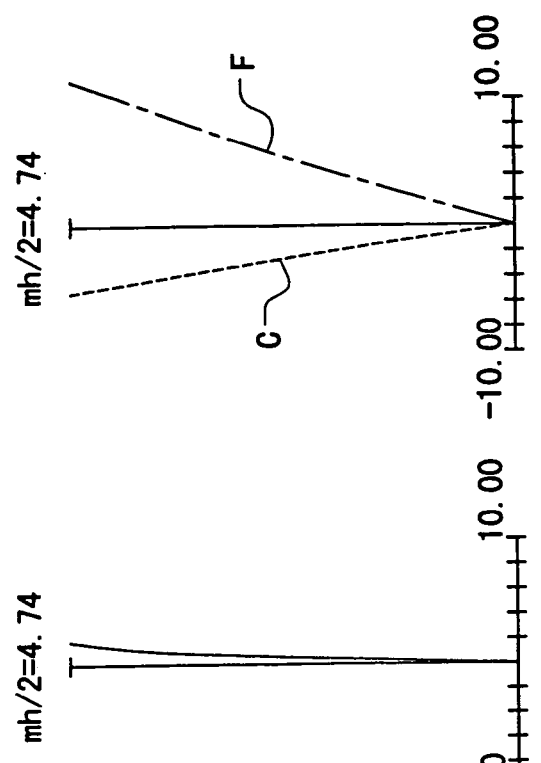
FIG.54D - CHROMATIC ABERRATION OF MAGNIFICATION
FIG.54C - DISTORTION
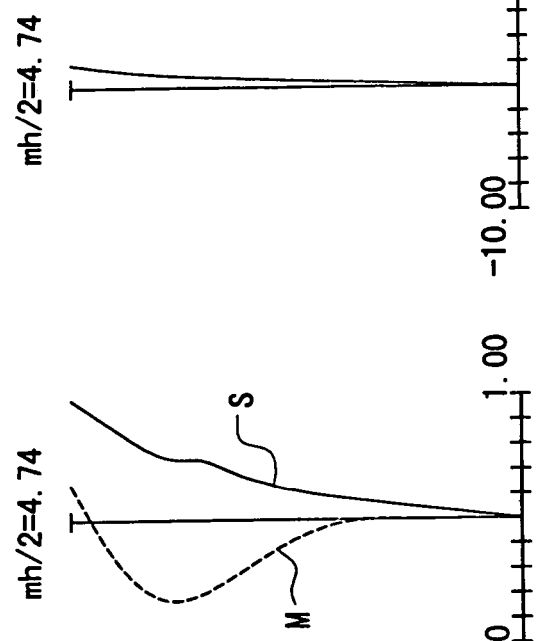
FIG.54B - ASTIGMATISM
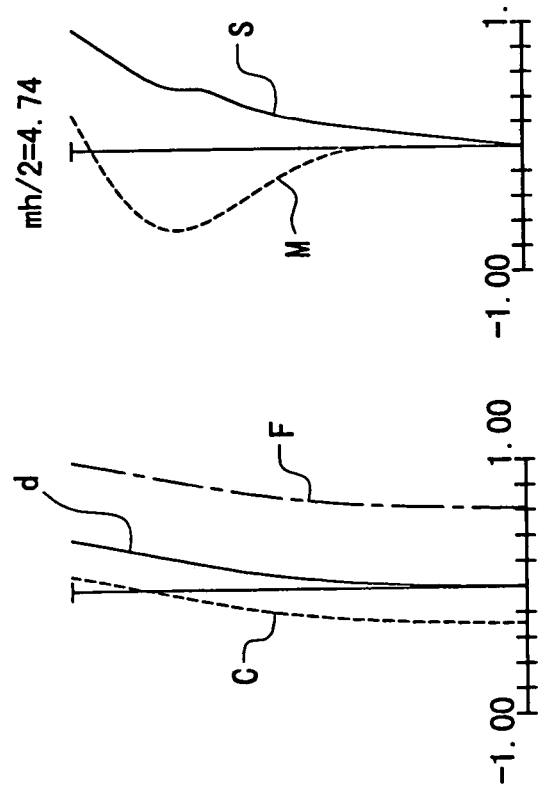
FIG.54A - SPHERICAL ABERRATION

FIELD FRAME

FIELD FRAME

FIELD FRAME

FIELD FRAME

FIELD FRAME

FIELD FRAME

FIELD FRAME

FIELD FRAME

FINDER OPTICAL SYSTEM

This is a divisional application of U.S. patent application Ser. No. 10/687,911, filed on Oct. 20, 2003, now U.S. Pat. No. 6,862,411 which is a divisional of U.S. patent application Ser. No. 09/836,391, which was filed on Apr. 18, 2001, now U.S. Pat. No. 6,671,461, the contents of both of which are incorporated herein in their entirety by reference. This divisional application also relies for priority on Japanese Patent Application Nos. JP 2000-122413, filed Apr. 18, 2000, JP 2000-127652, filed Apr. 24, 2000, JP 2000-159584, filed May 25, 2000, JP 2000-166523, filed May 31, 2000, and JP 2000-172018, filed Jun. 5, 2000, the contents of all of which are incorporated herein by reference.

BACKGROUND OF THE INVENTION

1. Field of the Invention

This invention relates to a real image mode finder optical system suitable for use in a lens shutter camera or an electronic still camera which is constructed so that a photographing optical system is independent of a finder optical system, and in particular, to a real image mode finder optical system which has a large angle of emergence and is best adapted for mounting to a compact camera.

2. Description of Related Art

In general, finders constructed to be independent of photographing optical systems, used in lens shutter cameras, are roughly divided into two classes: virtual image mode finders and real image mode finders.

The virtual image mode finder has the advantage that an image erecting optical system is not required, but has the disadvantage that since an entrance pupil is located at the same position as an observer's pupil, the diameter of a front lens must be increased or the area of a visual field is not defined. An Albada finder of this type allows the area of the visual field to be definitely set, but has the problem that a half mirror coating is applied to the surface of a lens and thus the transmittance of the lens is reduced or flare is increased.

In contrast to this, the real image mode finder is such that the position of the entrance pupil can be located on the object side, and hence the diameter of the front lens can be decreased. Moreover, by placing a field frame in the proximity of the imaging position of an objective lens, the area of the visual field can be defined without reducing the transmittance.

A conventional real image mode finder, however, dose not provide a sufficient angle of apparent visual field (hereinafter referred to as an angle of emergence). Specifically, an object to be observed can be viewed only in small size. Thus, when the object is a person, there is the problem that it is difficult to view the expression of the person. A finder with a relatively large angle of emergence is disclosed, for example, in each of Japanese Patent Preliminary Publication Nos. Hei 6-51201 and Hei 11-242167. However, even such a finder does not provide a sufficiently large angle of emergence.

A so-called telescope has a large angle of emergence. However, the telescope, which has a high magnification, namely a small angle of visual field, cannot be applied to a finder constructed to be independent of the photographing optical system, used in a common lens shutter camera which has a wide angle of view.

SUMMARY OF THE INVENTION

It is, therefore, an object of the present invention to provide a real image mode finder optical system in which the angle of emergence can be increased and compactness can be attained.

In order to achieve this object, the real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, and the focal length of the objective optical system can be made shorter than that of the eyepiece optical system. In this case, the real image mode finder optical system satisfies the following condition:

$$0.52 < mh/fe < 1 \quad (1)$$

where mh is the maximum width of the field frame and fe is the focal length of the eyepiece optical system.

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, the objective optical system includes three of reflecting surfaces of the image erecting means, and the eyepiece-optical system includes one of reflecting surfaces of the image erecting means so that an image is erected through four reflecting surfaces comprised of three reflecting surfaces of the objective optical system and one reflecting surface of the eyepiece optical system. The focal length of the objective optical system is variable, and when the magnification of the finder optical system is changed, at least two lens units are moved along different paths. The focal length of the objective optical system at the wide-angle position thereof is shorter than that of the eyepiece optical system. In this case, the real image mode finder optical system satisfies Condition (1).

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, the objective optical system includes three of reflecting surfaces of the image erecting means, and the eyepiece optical system includes one of reflecting surfaces of the image erecting means so that an image is erected through four reflecting surfaces comprised of three reflecting surfaces of the objective optical system and one reflecting surface of the eyepiece optical system. The focal length of the objective optical system is variable, and when the magnification of the finder optical system is changed, at least two lens units are moved along different paths. The focal length of the objective optical system at the wide-angle position thereof is shorter than that of the eyepiece optical system. The image erecting means including the three reflecting surfaces is constructed with two prisms so that each of the prisms has at least one reflecting surface and one of the entrance surface and the exit surface of each prism is configured as a curved surface with finite curvature.

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The objective optical system has an image erecting means including four reflecting surfaces. The focal length of the objective optical system is variable, and when the magnification of the finder optical system is changed, at least two lens units are moved along different paths. The focal length of the objective optical system at the wide-angle position thereof is shorter than that of the eyepiece optical system. In this case, the real image mode finder optical system satisfies Condition (1).

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The objective optical system has an image erecting means including four reflecting surfaces. The focal length of the objective optical system is variable, and when the magnification of the finder optical system is changed, at least two lens units are moved along different paths. The focal length of the objective optical system at the wide-angle position thereof is shorter than that of the eyepiece optical system.

This and other objects as well as the features and advantages of the present invention will become apparent from the following detailed description of the preferred embodiments when taken in conjunction with the accompanying drawings.

BRIEF DESCRIPTION OF THE DRAWINGS

FIGS. 6A, 6B, 6C, and 6D are diagrams showing aberration characteristics at the wide-angle position of the real image mode finder optical system in the first embodiment;

FIGS. 7A, 7B, 7C, and 7D are diagrams showing aberration characteristics at the middle position of the real image mode finder optical system in the first embodiment;

FIGS. 8A, 8B, 8C, and 8D are diagrams showing aberration characteristics at the telephoto position of the real image mode finder optical system in the first embodiment;

FIGS. 11A, 11B, 11C, and 11D are diagrams showing aberration characteristics at the middle position of the real image mode finder optical system in the second embodiment;

FIGS. 12A, 12B, 12C, and 12D are diagrams showing aberration characteristics at the telephoto position of the real image mode finder optical system in the second embodiment;

FIGS. 14A, 14B, 14C, and 14D are diagrams showing aberration characteristics at the wide-angle position of the real image mode finder optical system in the third embodiment;

FIGS. 15A, 15B, 15C, and 15D are diagrams showing aberration characteristics at the middle position of the real image mode finder optical system in the third embodiment;

FIGS. 18A, 18B, 18C, and 18D are diagrams showing aberration characteristics at the wide-angle position of the real image mode finder optical system in the fourth embodiment;

FIGS. 19A, 19B, 19C, and 19D are diagrams showing aberration characteristics at the middle position of the real image mode finder optical system in the fourth embodiment;

FIGS. 20A, 20B, 20C, and 20D are diagrams showing aberration characteristics at the telephoto position of the real image mode finder optical system in the fourth embodiment;

FIGS. 22A, 22B, 22C, and 22D are diagrams showing aberration characteristics at the wide-angle position of the real image mode finder optical system in the fifth embodiment;

FIGS. 23A, 23B, 23C, and 23D are diagrams showing aberration characteristics at the middle position of the real image mode finder optical system in the fifth embodiment;

FIGS. 24A, 24B, 24C, and 24D are diagrams showing aberration characteristics at the telephoto position of the real image mode finder optical system in the fifth embodiment;

FIGS. 26A, 26B, 26C, and 26D are diagrams showing aberration characteristics at the wide-angle position of the real image mode finder optical system in the sixth embodiment;

FIGS. 27A, 27B, 27C, and 27D are diagrams showing aberration characteristics at the middle position of the real image mode finder optical system in the sixth embodiment;

FIGS. 28A, 28B, 28C, and 28D are diagrams showing aberration characteristics at the telephoto position of the real image mode finder optical system in the sixth embodiment;

FIGS. 31A, 31B, 31C, and 31D are diagrams showing aberration characteristics at the wide-angle position of the real image mode finder optical system in the seventh embodiment;

FIGS. 32A, 32B, 32C, and 32D are diagrams showing aberration characteristics at the middle position of the real image mode finder optical system in the seventh embodiment;

FIGS. 33A, 33B, 33C, and 33D are diagrams showing aberration characteristics at the telephoto position of the real image mode finder optical system in the seventh embodiment;

FIGS. 36A, 36B, 36C, and 36D are diagrams showing aberration characteristics at the wide-angle position of the real image mode finder optical system in the eighth embodiment;

FIGS. 37A, 37B, 37C, and 37D are diagrams showing aberration characteristics at the middle position of the real image mode finder optical system in the eighth embodiment;

FIGS. 38A, 38B, 38C, and 38D are diagrams showing aberration characteristics at the telephoto position of the real image mode finder optical system in the eighth embodiment;

FIGS. 39A, 39B, 39C, and 39D are diagrams showing aberration characteristics of the eyepiece optical system of the real image mode finder optical system in the eighth embodiment;

FIGS. 41A, 41B, 41C, and 41D are diagrams showing aberration characteristics at the wide-angle position of the real image mode finder optical system in the ninth embodiment;

FIGS. 42A, 42B, 42C, and 42D are diagrams showing aberration characteristics at the middle position of the real image mode finder optical system in the ninth embodiment;

FIGS. 43A, 43B, 43C, and 43D are diagrams showing aberration characteristics at the telephoto position of the real image mode finder optical system in the sixth embodiment;

FIGS. 44A, 44B, 44C, and 44D are diagrams showing aberration characteristics of the eyepiece optical system of the real image mode finder optical system in the ninth embodiment;

FIGS. 47A, 47B, 47C, and 47D are diagrams showing aberration characteristics at the middle position of the real image mode finder optical system in the tenth embodiment;

FIGS. 48A, 48B, 48C, and 48D are diagrams showing aberration characteristics at the telephoto position of the real image mode finder optical system in the tenth embodiment;

FIGS. 49A, 49B, 49C, and 49D are diagrams showing aberration characteristics of the eyepiece optical system of the real image mode finder optical system in the tenth embodiment;

FIGS. 51A, 51B, 51C, and 51D are diagrams showing aberration characteristics at the wide-angle position of the real image mode finder optical system in the eleventh embodiment;

FIGS. 52A, 52B, 52C, and 52D are diagrams showing aberration characteristics at the middle position of the real image mode finder optical system in the eleventh embodiment;

FIGS. 53A, 53B, 53C, and 53D are diagrams showing aberration characteristics at the telephoto position of the real image-mode finder optical system in the eleventh embodiment;

FIGS. 54A, 54B, 54C, and 54D are diagrams showing aberration characteristics of the eyepiece optical system of the real image mode finder optical system in the eleventh embodiment;

DETAILED DESCRIPTION OF THE PREFERRED EMBODIMENTS

Figure 1:
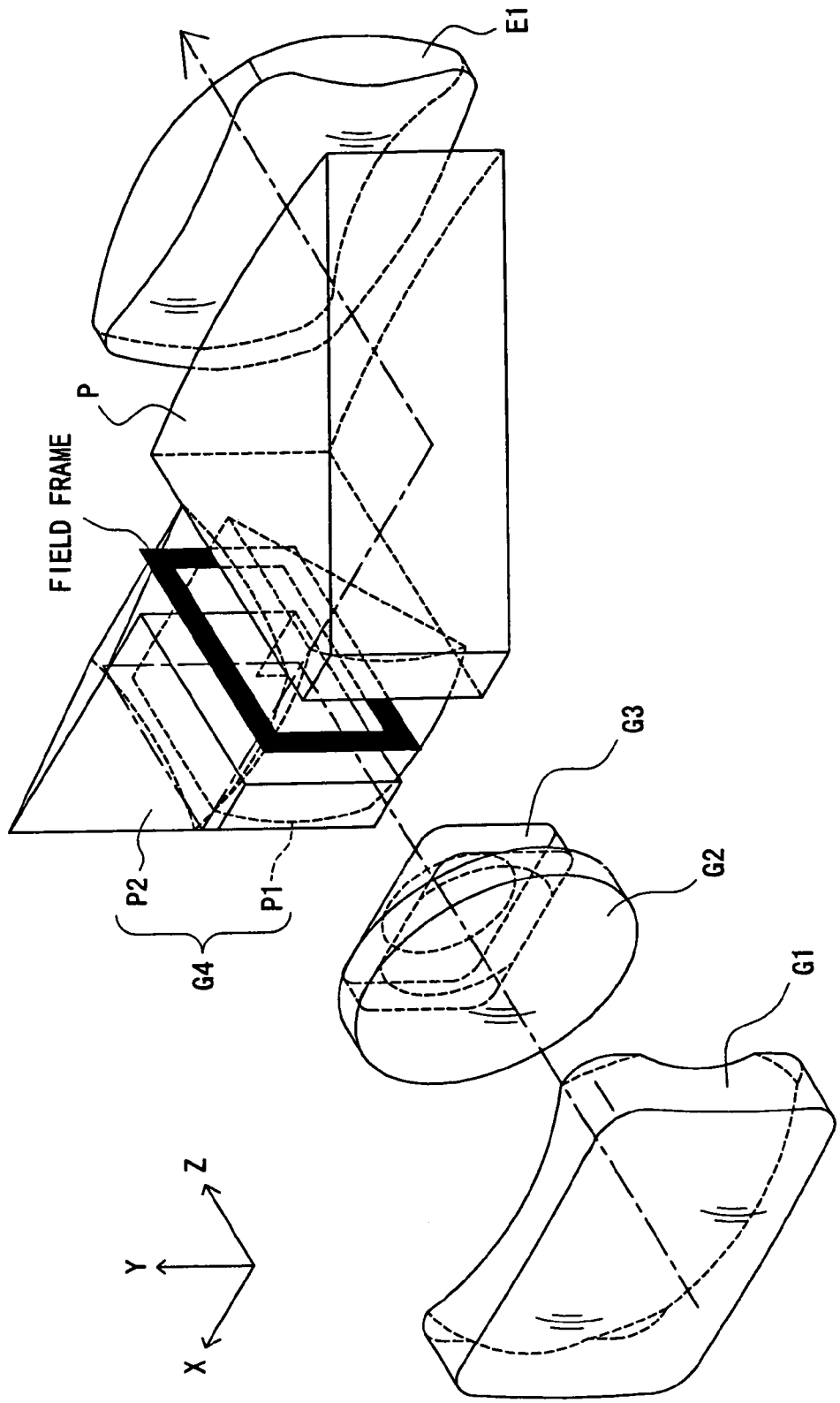
FIG. 1 is a perspective view showing of a first embodiment of the real image mode finder optical system according to the present invention.

According to the present invention, when the objective optical system is designed to have the focal length shorter than that of the eyepiece optical system, the magnification of the real image mode finer optical system can be reduced to 1× or less, and as a result, the angle of visual field can be increased.

Condition (1) in the present invention is related to the angle of emergence. In order to increase the angle of emergence, it is only necessary to increase the size of an image obtained by the objective optical system, that is, the size of the field frame, or to reduce the focal length of the eyepiece optical system.

Below the lower limit of Condition (1), the image can be seen only in small size. On the other hand, beyond the upper limit of Condition (1), it becomes difficult to grasp the entire area of the visual field, for example, to quickly determine a picture composition.

By constructing the finder optical system to be independent of the photographing optical system, the value of a maximum width mh of the field frame can be set, irrespective of the size of an imaging plane. This is particularly advantageous for compact design of the eyepiece optical system and for the placement of an image erecting means.

It is favorable that the real image mode finder optical system of the present invention is constructed so that the focal length of the objective optical system is variable, and when the magnification of the finder is changed, at least two lens units are moved along different paths.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

It is desirable that the real image mode finder optical system of the present invention satisfies the following condition:

$$12.0 \text{ mm} < fe < 18.0 \text{ mm} \tag{2}$$

Condition (2) is provided for the purpose of ensuring a space for placing the image erecting means and compactness of the whole of the real image mode finder optical system in a state where Condition (1) is satisfied.

If the lower limit of Condition (2) is passed, a distance on the optical axis between the front principal point of the eyepiece optical system and the field frame will be reduced and at the same time, the finder magnification will be as low as 1× or less. Therefore, a distance on the optical axis between the rear principal point of the objective optical system and the field frame is also reduced, and it becomes difficult to place the image erecting means, which is not favorable.

On the other hand, beyond the upper limit of Condition (2), the maximum width mh of the field frame must be enlarged to increase the angle of emergence. In this case, the objective optical system becomes bulky and the balance between the angle of emergence and the size of the real image mode finder ceases to be kept, which is unfavorable.

It is more desirable that the real image mode finder optical system satisfies the following condition:

$$13.5 \text{ mm} < fe < 16.5 \text{ mm} \quad (3)$$

It is favorable that the real image mode finder optical system is constructed so that the objective optical system includes three reflecting surfaces of the image erecting means and the eyepiece optical system includes one reflecting surface of the image erecting means to erect an image with four reflecting surfaces comprised of the three reflecting surfaces of the objective optical system and the one reflecting surface of the eyepiece optical system.

At least four reflecting surfaces are required for the image erecting means, and thus if the image erecting means is constructed with four reflecting surfaces, space efficiency can be improved. When three of four reflecting surfaces constituting the image erecting means are placed in the objective optical system, the burden of a space for placing the image erecting means to the eyepiece optical system is lessened, and the number of optical elements constituting the eyepiece optical system can be reduced.

Thus, according to the present invention, a real image mode finder optical system with a large angle of emergence can be constructed in a state where the arrangement of the eyepiece optical system is simplified.

It is favorable that the real image mode finder optical system of the present invention is constructed so that the objective optical system has the image erecting means including four reflecting surfaces to erect the image with the four reflecting surfaces of the objective optical system.

In this case, at least four reflecting surfaces are required for the image erecting means, and thus if the image erecting means is constructed with four reflecting surfaces, space efficiency can be improved. When the image erecting means is placed in the objective optical system, the burden of a space for placing the image erecting means to the eyepiece optical system is eliminated, and the eyepiece optical system can be constructed with a small number of lenses. Consequently, the focal length of the eyepiece optical system can be completely reduced, and aberration characteristics are easily improved. Thus, according to the present invention, a real image mode finder optical system with a large angle of emergence can be constructed in a state where the arrangement of the eyepiece optical system is simplified.

As mentioned above, when the objective optical system is designed to have the focal length shorter than that of the eyepiece optical system, the magnification of the real image mode finer optical system can be reduced to 1× or less, and as a result, the angle of visual field can be increased. Condition (1) in the present invention is related to the angle of emergence.

Below the lower limit of Condition (1), the image can be seen only in small size. On the other hand, beyond the upper limit of Condition (1), it becomes difficult to grasp the entire area of the visual field, for example, to quickly determine a picture composition.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

At least four reflecting surfaces are required for the image erecting means, and thus if the image erecting means is constructed with four reflecting surfaces, space efficiency can be improved. When three of four reflecting surfaces constituting the image erecting means are placed in the objective optical system, the burden of a space for placing the image erecting means to the eyepiece optical system is lessened, and the number of optical elements constituting the eyepiece optical system can be reduced. Thus, according to the present invention, the focal length of the eyepiece optical system can be completely reduced, and aberration characteristics are easily improved. Also, the objective optical system has a large number of lenses because of the magnification change, and hence can be designed to ensure a space for incorporating three reflecting surfaces in the objective optical system. Consequently, a real image mode finder optical system which has a large angle of emergence and is compact in design can be constructed in a state where the arrangement of the eyepiece optical system is simplified.

It is desirable that the real image mode finder optical system of the present invention is constructed so that the objective optical system comprises, in order from the object side, a first unit with a negative power, fixed or moved when the magnification is changed; a second unit with a positive power, moved when the magnification is changed; a third unit with a negative power, moved when the magnification is changed; and a fourth unit with a positive power, fixed when the magnification is change and including three reflecting surfaces.

According to the present invention, it becomes easy to achieve compactness of the whole of the real image mode finder optical system and to obtain favorable aberration and a large angle of emergence.

It is desirable that the real image mode finder optical system of the present invention is constructed so that the fourth unit includes at least one prism having at least one reflecting surface, and one of the entrance surface and the exit surface of the prism is configured as a curved surface with finite curvature.

According to the present invention, a lens function, such as a contribution to the focal length or correction for aberration, as the fourth unit of the objective optical system and an image erecting function can be exerted in the same space.

Furthermore, it is desirable that the real image mode finder optical: system of the present invention is constructed so that one of the reflecting-surfaces of the prism is configured as a totally reflecting surface.

If total reflection is utilized as far as possible with respect to the reflecting surfaces of the prism, the transmittance of the entire finder can be improved accordingly.

In the real image mode finder optical system, it is desirable that each of the first-unit, the second unit, and the third unit is constructed with a single lens.

According to the present invention, it becomes easy to achieve compactness of the whole of the real image mode finder optical system.

Moreover, it is desirable that the real image mode finder optical system of the present invention is constructed so that the eyepiece optical system includes optical elements having two lens functions, providing air spacing between them and has a positive refracting power as a whole.

In order to increase the angle of emergence, it is only necessary to increase the size of an image obtained by the objective optical system, that is, the size of the field frame, or to reduce the focal length of the eyepiece optical system. However, if the field frame is enlarged with respect to the focal length of the eyepiece optical system, the burden of correction for aberration to the eyepiece optical system will be increased, and it becomes difficult to hold good performance with a single lens. If three or more optical elements are used, it becomes difficult to obtain compactness of the whole of the real image mode finder optical system. Hence, in order to diminish the size of the entire system including the objective optical system, it is desirable to reduce the focal length of the eyepiece optical system. However, when the focal length of the eyepiece optical system is reduced, the distance on the optical axis between the front principal point of the eyepiece optical system and the field frame is diminished, and, for example, space for arranging the optical elements of the image erecting means is narrowed.

Thus, in view of good performance, space for placing the image erecting means, and compactness of the whole of the real image mode finder optical system, it is desirable that the eyepiece optical system, as mentioned above, is constructed with the optical elements having two lens functions, providing air spacing between them.

Furthermore, it is desirable that the real image mode finder optical system of the present invention is designed so that the eyepiece optical system includes, in order from the object side, a prism which has the lens function, at least, with respect to the exit surface and bears a part of an image erecting function and a single positive lens component.

As mentioned above, when an optical element on the field frame side of the eyepiece optical system is constructed with the prism which bears a part of the image erecting function, space can be effectively utilized. Moreover, when the lens function is imparted to the prism separated from the field frame, the degree of a contribution to the focal length of the eyepiece optical system is increased, and it becomes easy to reduce the focal length of the eyepiece optical system.

It is desirable that the real image mode finder optical system of the present invention is designed to impart the lens function to the entrance surface of the prism of the eyepiece optical system.

Since the entrance surface of the prism of the eyepiece optical system is located close to the field frame, the degree of a contribution to the focal length of the eyepiece optical system is low. However, correction for aberration, notably for distortion, and a pupil combination of the objective optical system and the eyepiece optical system are favorably compatible.

It is desirable that the real image mode finder optical system is designed so that the reflecting surface of the prism of the eyepiece optical system is configured as a totally reflecting surface.

As described above, when total reflection is utilized for the reflecting surface of the prism, the transmittance of the entire system of the finder can be improved accordingly.

It is desirable that the real image mode finder optical system of the present invention is constructed so that the positive lens of the eyepiece optical system is capable of making diopter adjustment in accordance with an observer's diopter.

According to the present invention, a change of the diopter required is obtained with a small amount of adjustment. Since the diopter can be adjusted by the positive lens, unlike an element in which the optical axis is bent as in the prism, the adjustment can be easily made.

In this case, it is favorable that the real image mode finder optical system of the present invention satisfies Condition (2).

Condition (2) is provided for the purpose of ensuring a space for placing the image erecting means and compactness of the whole of the real image mode finder optical system in a state where Condition (1) is satisfied.

If the lower limit of Condition (2) is passed, a distance on the optical axis between the front principal point of the eyepiece optical system and the field frame will be reduced and at the same time, the finder magnification will be as low as 1× or less. Therefore, a distance on the optical axis between the rear principal point of the objective optical system and the field frame is also reduced, and it becomes difficult to place the image erecting means, which is not favorable.

On the other hand, beyond the upper limit of Condition (2), the maximum width mh of the field frame must be enlarged to increase the angle of emergence. In this case, the objective optical system becomes bulky and the balance between the angle of emergence and the size of the real image mode finder ceases to be kept, which is unfavorable.

It is more desirable that the real image mode finder optical system satisfies Condition (3).

According to the present invention, when the objective optical system is designed to have the focal length shorter than that of the eyepiece optical system, the magnification of the real image mode finer optical system can be reduced to 1× or less, and as a result, the angle of visual field can be increased.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

At least four reflecting surfaces are required for the image erecting means, and thus if the image erecting means is constructed with four reflecting surfaces, space efficiency can be improved. When three of four reflecting surfaces constituting the image erecting means are placed in the objective optical system, the burden of a space for placing the image erecting means to the eyepiece optical system is lessened, and the number of optical elements constituting the eyepiece optical system can be reduced. Thus, according to the present invention, the focal length of the eyepiece optical system can be completely reduced, and aberration characteristics are easily improved. Also, the objective optical system has a large number of lenses because of the magnification change, and hence can be designed to ensure a space for incorporating three reflecting surfaces in the objective optical system. Consequently, a real image mode finder optical system which has a large angle of emergence and is compact in design can be constructed in a state where the arrangement of the eyepiece optical system is simplified.

The image erecting means including the three reflecting surfaces is constructed with two prisms so that each of the prisms has at least one reflecting surface and one of the entrance surface and the exit surface of each prism is configured as a curved surface with finite curvature.

When the image erecting means including the three reflecting surfaces of the objective optical system is constructed with two prisms so that one of the entrance surface and the exit surface of each prism has a curvature, a lens function, such as a contribution to the focal length or correction for aberration, and an image erecting function can be exerted in the same space.

As mentioned above, when the objective optical system is designed to have the focal length shorter than that of the eyepiece optical system, the magnification of the real image mode finer optical system can be reduced to 1× or less, and as a result, the angle of visual field can be increased. Condition (1) in the present invention is related to the angle of emergence.

Below the lower limit of Condition (1), the image can be seen only in small size. On the other hand, beyond the upper limit of Condition (1), it becomes difficult to grasp the entire area of the visual field, for example, to quickly determine a picture composition.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

At least four reflecting surfaces are required for the image erecting means, and thus if the image erecting means is constructed with four reflecting surfaces, space efficiency can be improved. When the image erecting means is placed in the objective optical system, the burden of a space for placing the image erecting means to the eyepiece optical system is eliminated, and the eyepiece optical system can be constructed with a small number of lenses. Consequently, the focal length of the eyepiece optical system can be completely reduced, and aberration characteristics are easily improved.

Also, the objective optical system has a large number of lenses because of the magnification change, and hence the image erecting means can be constructed with comparative ease.

It is desirable that the real image mode finder optical system of the present invention is constructed so that the objective optical system comprises, in order from the object side, s first unit with a negative refracting power, moved when the magnification is changed; a second unit with a positive refracting power, moved when the magnification is changed; a third unit with a negative refracting power, moved when the magnification is changed; and a fourth unit with a positive refracting power, fixed when the magnification is change and including four reflecting surfaces.

According to the present invention, it becomes easy to achieve compactness of the whole of the real image mode finder optical system and to obtain favorable aberration and a large angle of emergence. Also, the four reflecting surfaces of the fourth unit constitute the image erecting means.

In the real image mode finder optical system, it is desirable that the fourth unit includes two prisms so that each of the prisms has at least one reflecting surface and one of the entrance, surface and the exit surface of each prism is configured as a curved surface with finite curvature.

According to the present invention, a lens function, such as a contribution to the focal length or correction for aberration, as the fourth unit of the objective optical system and an image erecting function can be exerted in the same space.

Furthermore, it is desirable that the real image mode finder optical system of the present invention is constructed so that one of the two prisms has totally reflecting surfaces.

As mentioned above, when total reflection is utilized as far as possible with respect to the reflecting surfaces of the prism, the transmittance of the entire finder can be improved accordingly.

In the real image mode finder optical system, it is desirable that each of the first unit, the second unit, and the third unit is constructed with a single lens.

According to the present invention, it becomes easy to achieve compactness of the whole of the real image mode finder optical system.

It is desirable that the real image mode finder optical system of the present invention is constructed so that the eyepiece optical system has a lens which is capable of making diopter adjustment to an observer's diopter.

According to the present invention, a change of the diopter required is obtained with a small amount of adjustment, with little deterioration of performance. Since the diopter can be adjusted by the lens, unlike an element in which the optical axis is bent as in the prism, the adjustment can be easily made.

In this case, it is favorable that the real image mode finder optical system of the present invention satisfies Condition (2).

Condition (2) is provided for the purpose of ensuring a space for placing the image erecting means and compactness of the whole of the real image mode finder optical system in a state where Condition (1) is satisfied.

If the lower limit of Condition (2) is passed, a distance on the optical axis between the front principal point of the eyepiece optical system and the field frame will be reduced and at the same time, the finder magnification will be as low as 1× or less. Therefore, a distance on the optical axis between the rear principal point of the objective optical system and the field frame is also reduced, and it becomes difficult to place the image erecting means, which is not favorable.

On the other hand, beyond the upper limit of Condition (2), the maximum width mh of the field frame must be enlarged to increase the angle of emergence. In this case, the objective optical system becomes bulky and the balance between the angle of emergence and the size of the real image mode finder ceases to be kept, which is unfavorable.

In this case, it is more desirable that the real image mode finder optical system satisfies Condition (3).

According to the present invention, when the objective optical system is designed to have the focal length shorter than that of the eyepiece optical system, the magnification of the real image mode finer optical system can be reduced to 1× or less, and as a result, the angle of visual field can be increased.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

At least four reflecting surfaces are required for the image erecting means, and thus if the image erecting means is constructed with four reflecting surfaces, space efficiency can be improved. When the image erecting means is placed in the objective optical system, the burden of a space for placing the image erecting means to the eyepiece optical system is eliminated, and the eyepiece optical system can be constructed with a small number of lenses. According to the present invention, the focal length of the eyepiece optical system can be completely reduced, and aberration characteristics are easily improved. Also, the objective optical system has a large number of lenses because of the magnification change, and hence the image erecting means can be constructed with comparative ease.

It is favorable that the photographing apparatus according to the present invention has the photographing optical system and the real image mode finder optical system which has been described.

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, the objective optical system is capable of having the focal length shorter than that of the eyepiece optical system, and the eyepiece optical system has at least one lens. In this case, a most observer's pupil-side lens satisfies the following condition:

$$v > 70 \quad (4)$$

where v is the Abbe's number of the most observer's pupil-side lens.

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, the objective optical system is capable of having the focal length shorter than that of the eyepiece optical system, and the eyepiece optical system has at least one lens. In this case, the real image mode finder optical system satisfies Conditions (1) and (4).

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, the objective optical system is capable of having the focal length shorter than that of the eyepiece optical system, and the eyepiece optical system has a cemented lens component including a positive lens element and a negative lens element at the most observer's pupil-side position.

When the objective optical system is designed to have the focal length shorter than that of the eyepiece optical system, the magnification of the real image mode finer optical system can be reduced to 1× or less, and as a result, the angle of visual field can be increased.

When Condition (4) is satisfied, chromatic aberration of magnification produced in the eyepiece optical system can be suppressed.

By constructing the finder optical system to be independent of the photographing optical system, the value of a maximum width mh of the field frame can be set, irrespective of the size of an imaging plane. This is particularly advantageous for compact design of the eyepiece optical system and for the placement of an image erecting means.

When the objective optical system is designed to have the focal length shorter than that of the eyepiece optical system, the magnification of the real image mode finer optical system can be reduced to 1× or less, and as a result, the angle of visual field can be increased. Condition (1) in the present invention is related to the angle of emergence. In order to increase the angle of emergence, it is only necessary to increase the size of an image obtained by the objective optical system, that is, the size of the field frame, or to reduce the focal length of the eyepiece optical system.

Below the lower limit of Condition (1), the image can be seen only in small size. On the other hand, beyond the upper limit of Condition (1), it becomes difficult to grasp the entire area of the visual field, for example, to quickly determine a picture composition.

When Condition (4) is satisfied, chromatic aberration of magnification produced in the eyepiece optical system can be suppressed.

By constructing the finder optical system to be independent of the photographing optical system, the value of a maximum width mh of the field frame can be set, irrespective of the size of an imaging plane. This is particularly advantageous for compact design of the eyepiece optical system and for the placement of an image erecting means.

It is favorable that the real image mode finder optical system of the present invention is constructed so that the focal length of the objective optical system is variable, and when the magnification of the finder is changed, at least two lens units are moved along different paths.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly-constant.

It is desirable that the real image mode finder optical system of the present invention satisfies Condition (2).

Condition (2) is provided for the purpose of ensuring a space for placing the image erecting means and compactness of the whole of the real image mode finder optical system in a state where Condition (1) is satisfied.

If the lower limit of Condition (2) is passed, a distance on the optical axis between the front principal point of the eyepiece optical system and the field frame will be reduced and at the same time, the finder magnification will be as low as 1× or less. Therefore, a distance on the optical axis between the rear principal point of the objective optical system and the field frame is also reduced, and it becomes difficult to place the image erecting means, which is not favorable.

On the other hand, beyond the upper limit of Condition (2), the maximum width mh of the field frame must be enlarged to increase the angle of emergence. In this case, the objective optical system becomes bulky and the balance between the angle of emergence and the size of the real image mode finder ceases to be kept, which is unfavorable.

It is more desirable that the real image mode finder optical system satisfies Condition (3).

It is favorable that the real image mode finder optical system is constructed so that the objective optical system includes three reflecting surfaces of the image erecting means and the eyepiece optical system includes one reflecting surface of the image erecting means to erect an image with four reflecting surfaces comprised of the three reflecting surfaces of the objective optical system and the one reflecting surface of the eyepiece optical system.

At least four reflecting surfaces are required for the image erecting means, and thus if the image erecting means is constructed with four reflecting surfaces, space efficiency can be improved. When three of four reflecting surfaces constituting the image erecting means are placed in the objective optical system, the burden of a space for placing the image erecting means to the eyepiece optical system is lessened, and the number of optical elements constituting the eyepiece optical system can be reduced. Thus, according to the present invention, the focal length of the eyepiece optical system can be completely reduced, and aberration characteristics are easily improvised. In particular, where the focal length of the objective optical system is variable, the objective optical system, which has a large number of lenses, can be designed to ensure a space for incorporating three reflecting surfaces in the objective optical system. Consequently, a real image mode finder optical system which has a large angle of emergence and is compact in design can be constructed in a state where the arrangement of the eyepiece optical system is simplified.

It is favorable that the real image mode finder optical system of the present invention is constructed so that the objective optical system has the image erecting means including four reflecting surfaces to erect the image with the four reflecting surfaces of the objective optical system.

At least four reflecting surfaces are required for the image erecting means, and thus if the image erecting means is constructed with four reflecting surfaces, space efficiency can be improved. When the image erecting means is placed in the objective optical system, the burden of a space for placing the image erecting means to the eyepiece optical system is eliminated, and the eyepiece optical system can be constructed with a small number of lenses. According to the present invention, the focal length of the eyepiece optical system can be completely reduced, and aberration characteristics are easily improved. In particular, where the focal length of the objective optical system is variable, the number of lenses constituting the objective optical system is large and hence the image erecting means can be constructed with comparative ease.

According to the present invention, when the objective optical system is designed to have the focal length shorter than that of the eyepiece optical system, the magnification of the real image mode finer optical system can be reduced to 1× or less, and as a result, the angle of visual field can be increased.

When the cemented lens component including the positive lens element and the negative lens element is placed on the observer's pupil side of the eyepiece optical system, chromatic aberration of magnification produced in the eyepiece optical system can be suppressed.

Also, by constructing the finder optical system to be independent of the photographing optical system, the value of a maximum width mh of the field frame can be set, irrespective of the size of an imaging plane. This is particularly advantageous for compact design of the eyepiece optical system and for the placement of an image erecting means.

The real image mode finder optical system according to the present invention is constructed to be independent of the photographing optical system and has, in order from the object side, an objective optical system with a positive refracting power, a field frame located in the proximity of the imaging position of the objective optical system, and an eyepiece optical system with a positive refracting power. The real image mode finder optical system includes an image erecting means, the objective optical system is capable of having the focal length shorter than that of the eyepiece optical system, and the eyepiece optical system has a cemented lens component including a positive lens element and a negative lens element on the observer's pupil side. In this case, it is favorable to satisfy Condition (1).

When the objective optical system is designed to have the focal length shorter than that of the eyepiece optical system, the magnification of the real image mode: finer optical system can be reduced to 1× or less, and as a result, the angle of visual field can be increased. Condition (1) in the present invention is related to the angle of emergence. In order to increase the angle of emergence, it is only necessary to increase the size of an image obtained by the objective optical system, that is, the size of the field frame, or to reduce the focal length of the eyepiece optical system.

Below the lower limit of Condition (1), the image can be seen only in small size. On the other hand, beyond the upper limit of Condition (1), it becomes difficult to grasp the entire area of the visual field, for example, to quickly determine a picture composition.

When the cemented lens component including the positive lens element and the negative lens element is placed on the observer's pupil side of the eyepiece optical system, chromatic aberration of magnification produced in the eyepiece optical system can be suppressed.

Also, by constructing the finder optical system to be independent of the photographing optical system, the value of a maximum width mh of the field frame can be set, irrespective of the size of an imaging plane. This is particularly advantageous for compact design of the eyepiece optical system and for the placement of an image erecting means.

It is favorable that the real image mode finder optical system of the present invention is constructed so that the focal length of the objective optical system is variable, and when the magnification of the finder is changed, at least two lens units are moved along different paths.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

It is also favorable that the real image mode finder optical system of the present invention satisfies the following condition:

$$\nu p - \nu n > 10 \tag{5}$$

where $\nu p$ is the Abbe's number of the positive lens element constituting the cemented lens component on the observer's pupil side of the eyepiece optical system and $Vn$ is the Abbe's number of the negative lens element constituting the cemented lens component.

As mentioned above, when the finder optical system is designed to satisfy Condition (5), chromatic aberration of magnification produced in the eyepiece optical system can be suppressed.

It is more desirable that the real image mode finder optical system of the present invention satisfies the following condition:

$$vp-vn>20 \qquad (6)$$

It is favorable that that the photographing apparatus according to the present invention has the photographing optical system and the real image mode finder optical system which has been described.

Also, in the above description, where the reflecting surface is configured as a roof reflecting surface, it is assumed that the roof reflecting surface is constructed with two reflecting surfaces.

The real image mode finder optical system according to the present invention includes, in order from the object side, an objective optical system with a positive refracting power, a field frame located in the proximity of the imaging position of the objective optical system, and an eyepiece optical system with a positive refracting power. The real image mode finder optical system has an image erecting means, and the objective optical system includes, in order from the object side, a first unit with a negative refracting power, a second unit with a positive refracting power, a third unit with a negative refracting power, and a fourth unit with a positive refracting power so that the magnification of the finder is changed, ranging from the wide-angle position to the telephoto position, by simply moving the second unit toward the object side and the third unit toward the eyepiece optical system. In this case, the finder optical system satisfies Condition (2).

The real image mode finder optical system according to the present invention includes, in order from the object side, an objective optical system with a positive refracting power, a field frame located in the proximity of the imaging position of the objective optical system, and an eyepiece optical system with a positive refracting power. The real image mode finder optical system has an image erecting means, and the objective optical system includes, in order from the object side, a first unit with a negative refracting power, a second unit with a positive refracting power, a third unit with a negative refracting power, and a fourth unit with a positive refracting power so that the magnification of the finder is changed, ranging from the wide-angle position to the telephoto position, by simply moving the second unit toward the object side and the third unit toward the eyepiece optical system. In this case, the finder optical system satisfies Condition (1).

The real image mode finder optical system according to the present invention includes, in order from the object side, an objective optical system with a positive refracting power, a field frame located in the proximity of the imaging position of the objective optical system, and an eyepiece optical system with a positive refracting power. The real image mode finder optical system has an image erecting means and the objective optical system is capable of having the focal length shorter than that of the eyepiece optical system. The eyepiece optical system includes, in order from the object side, a prism unit with a positive refracting power and a lens unit with a positive refracting power so that a most field-frame-side surface of the prism unit with a positive refracting power has a positive refracting power and is configured as an aspherical surface with a negative refracting power on the periphery thereof.

In order to increase the angle of emergence, it is only necessary to increase the size of an image obtained by the objective optical system, that is, the size of the field frame, or to reduce the focal length of the eyepiece optical system. However, if the field frame is enlarged with respect to the focal length of the eyepiece optical system, the objective optical system must be also enlarged. Moreover, since the burden of correction for aberration to the eyepiece optical system will be increased, it becomes difficult that good performance of the eyepiece optical system and compactness due to a simple arrangement are compatible with each other. Thus, in order to keep the size of the finder compact and increase the angle of emergence, it is desirable to reduce the focal length of the eyepiece optical system.

However, when the focal length of the eyepiece optical system is reduced, the distance on the optical axis between the front principal point of the eyepiece optical system and the field frame is diminished, and, for example, space for arranging the optical elements of the image erecting means is narrowed. Consequently, it is necessary that the back focal distance of the objective optical system is increased to place the image erecting means there.

Thus, in the present invention, the objective optical system is designed to have, in order to the object side, the first unit with a negative refracting power, the second unit with a positive refracting power, the third unit with a negative refracting power, and the fourth unit with a positive refracting power. In this way, the back focal distance of the objective optical system is increased.

When the objective optical system is constructed as mentioned above, the focal length of the eyepiece optical system can be reduced, and a real image mode finder optical system which has a large angle of emergence and is compact in design can be obtained.

Condition (2) defines a condition for maintaining the balance of size between the angle of emergence and the finder. Below the lower limit of Condition (2), the distance on the optical axis between the front principal point of the eyepiece optical system and the field frame is reduced, and it becomes difficult to ensure the space for placing the image erecting means. In addition, a diopter shift due to the position shift of the field frame in the direction of the optical axis is increased.

On the other hand, beyond the upper limit of Condition (2), the objective optical system becomes bulky because the image formed by objective optical system must be enlarged to increase the angle of emergence. Consequently, the balance between the angle of emergence and the size of the finder ceases to be kept, which is unfavorable.

When the magnification of the finder is changed, it is necessary that a variable magnification function is chiefly imparted to one of at least two moving lens units and a diopter correcting function involved in the magnification change is chiefly imparted to the other. In this case, the amount of movement of the lens unit having the variable magnification function becomes larger than that of the lens unit having the diopter correcting function, and a mechanism for movement is liable to be complicated and oversized.

Thus, in the present invention, the finder optical system is constructed so that the magnification is changed, ranging from the wide-angle position to the telephoto position, by simply moving the second unit toward the object side and the third unit toward the eyepiece side.

By doing so, both the variable magnification function and the diopter correcting function can be shared between the second unit and the third unit. Hence, the amount of movement of each of the second and third units where the magnification is change can be kept to a minimum, and compactness of the mechanism for movement is obtained.

In this case, it is more desirable that the real image mode finder optical system satisfies Condition (3).

As mentioned above, in order to increase the angle of emergence, it is only necessary to increase the size of an image obtained by the objective optical system, that is, the size of the field frame, or to reduce the focal length of the eyepiece optical system. However, if the field frame is enlarged with respect to the focal length of the eyepiece optical system, the objective optical system must be also enlarged. Moreover, since the burden of correction for aberration to the eyepiece optical system will be increased, it becomes difficult that good performance of the eyepiece optical system and compactness due to a simple arrangement are compatible with each other. Thus, in order to keep the size of the finder compact and increase the angle of emergence, it is desirable to reduce the focal length of the eyepiece optical system.

However, when the focal length of the eyepiece optical system is reduced, the distance on the optical axis between the front principal point of the eyepiece optical system and the field frame is diminished, and, for example, space for arranging the optical elements of the image erecting means is narrowed. Consequently, it is necessary that the back focal distance of the objective optical system is increased to place the image erecting means there.

Thus, in the present invention, the objective optical system is designed to have, in order to the object side, the first unit with a negative refracting power, the second unit with a positive refracting power, the third unit with a negative refracting power, and the fourth unit with a positive refracting power. In this way, the back focal distance of the objective optical system is increased.

When the objective optical system is constructed as mentioned above, the focal length of the eyepiece optical system can be reduced, and a real image mode finder optical system which has a large angle of emergence and is compact in design can be obtained.

Condition (1) is related to the angle of emergence. Below the lower limit of Condition (1), the image can be seen only in small size. On the other hand, beyond the upper limit of Condition (1), it becomes difficult to grasp the entire area of the visual field, for example, to quickly determine a picture composition.

When the magnification of the finder is changed, it is necessary that the variable magnification function is chiefly imparted to one of at least two moving lens units and the diopter correcting function involved in the magnification change is chiefly imparted to the other. In this case, the amount of movement of the lens unit having the variable magnification function becomes larger than that of the lens unit having the diopter correcting function, and a mechanism for movement is liable to be complicated and oversized.

Thus, in the present invention, the finder optical system is constructed so that the magnification is changed, ranging from the wide-angle position to the telephoto position, by simply moving the second unit toward the object side and the third unit toward the eyepiece optical system.

By doing so, both the variable magnification function and the diopter correcting function can be shared between the second unit and the third unit. Hence, the amount of movement of each of the second and third units where the magnification is change can be kept to a minimum, and compactness of the mechanism for movement is obtained. In this case, it is more desirable that the present invention satisfies the following condition:

$$0.57 < mh/fe < 1 \tag{7}$$

As described above, when the objective optical system is designed to have the focal length shorter than that of the eyepiece optical system, the magnification of the real image mode finer optical system can be reduced to 1× or less, and as a result, the angle of visual field can be increased.

When the eyepiece optical system is designed to have the prism unit, a part of the image erecting means can be shared to the eyepiece optical system, and space can be effectively utilized. When the eyepiece optical system is constructed with the unit having a positive refracting power, the diopter can be adjusted in accordance with the observer's diopter.

In order to keep the size of the finder compact and increase the angle of emergence, it is desirable to reduce the focal length of the eyepiece optical system. Further, in order to reduce the focal length of the eyepiece optical system, it is desirable to increase the positive refracting power of the optical element constituting the eyepiece optical system.

However, if the most field-frame-side surface of the eyepiece optical system is configured so that the positive refracting power is increased, and a marginal beam in the proximity of the field frame is rendered nearly parallel to the optical axis, the size of the eyepiece optical system in its radial direction will be increased. On the other hand, if the most field-frame-side surface of the eyepiece optical system is configured so that the positive refracting power is increased, and at the same time, the size of the eyepiece optical system in its radial direction is diminished, the angle of inclination will be increased. Consequently, the marginal beam of the first unit at the wide-angle position is separated from the optical axis, and hence the diameter of the first unit must be enlarged.

Thus, when the most field-frame-side surface of the eyepiece optical system has a positive refracting power and is configured as an aspherical surface with a negative refracting power on its periphery, the diameter of the first-unit can be diminished. Moreover, correction for aberration, notably for distortion, is favorably compatible with a pupil combination of the objective optical system and the eyepiece optical system, notably in an off-axis.

In the real image mode finder optical system of the present invention, it is desirable that the eyepiece optical system includes, in order from the object side, a prism unit with a positive refracting power and a lens unit with a positive refracting power so that a most field-frame-side surface of the prism unit with a positive refracting power has a positive refracting power and is configured as an aspherical surface with a negative refracting power on its periphery.

As mentioned above, when the eyepiece optical system is designed to have the prism unit, a part of the image erecting means can be shared to the eyepiece optical system, and space can be effectively utilized. When the eyepiece optical system is constructed with the lens unit having a positive refracting power, the diopter can be adjusted in accordance with the observer's diopter.

In order to reduce the focal length of the eyepiece optical system, it is desirable to increase the positive refracting power of the optical element constituting the eyepiece optical system.

However, if the most field-frame-side surface of the eyepiece optical system is configured so that the positive refracting power is increased, and a marginal beam in the proximity of the field frame is rendered nearly-parallel to the optical axis, the size of the eyepiece optical system in its radial direction will be increased. On the other hand, if the most field-frame-side surface of the eyepiece optical system is configured so that the positive refracting power is increased, and at the same time, the size of the eyepiece optical system in its radial direction is diminished, the angle of inclination will be increased. Consequently, the marginal beam of the first unit at the wide-angle position is separated from the optical axis, and hence the diameter of the first unit must be enlarged.

Thus, when the most field-frame-side surface of the eyepiece optical system has a positive refracting power and is configured as an aspherical surface with a negative refracting power on its periphery, the diameter of the first unit can be diminished. Moreover, correction for aberration, notably for distortion, is favorably compatible with a pupil combination of the objective optical system and the eyepiece optical system, notably in an off-axis.

In the real image mode finder optical system of the present invention, it is favorable that the negative refracting power on the periphery of the most field-frame-side surface of the prism unit with a positive refracting power satisfies the following condition:

$$-0.7(1/mm) < \phi(mh/2) < 0(1/mm) \quad (8)$$

where $\phi(mh/2)$ is a refracting power at a height $mh/2$ in a direction normal to the optical axis of the aspherical surface.

As described above, when Condition (8) is satisfied, the negative refracting power on the periphery of the most field-frame-side surface of the positive prism unit can be optimized.

Also, a refracting power $\phi(y)$ at a height y of the aspherical surface is obtained as follows. When z is taken as the coordinate in the direction of the optical axis, y is taken as the coordinate normal to the optical axis, r denotes the radius of curvature, K denotes a conic constant, and $A_4, A_6, A_8,$ and $A_{10}$ denote aspherical coefficients, the configuration of the aspherical surface is expressed by the following equation:

$$z = (y^2/r)/[1+\sqrt{\{1-(1+K)(y/r)^2\}}] + A_4 y^4 + A_6 y^6 + A_8 y^8 + A_{10} y^{10}$$

Also, first-order differential $dz/dy$ and second-order differential $d^2z/dy^2$ are given from the following formulas:

$$dz/dy = (y/r)/[\sqrt{\{1-(1+K)(y/r)^2\}}] + 4A_4 y^3 + 6A_6 y^5 + 8A_8 y^7 + 10A_{10} y^9$$

$$d^2z/dy^2 = (1/r)/[\{1-(1+K)(y/r)^2\}^{3/2}] + 12A_4 y^2 + 30A_6 y^4 + 56A_8 y^6 + 90A_{10} y^8$$

In this case, the refracting power $\phi(y)$ at the height y of the aspherical surface is obtained from the following formula:

$$\phi(y) = (n_2 - n_1)/r_{asp}$$

where $n_1$ is the refractive index of the aspherical surface on the object side thereof and $n_2$ is the refractive index on the image side.

Also, $r_{asp}$ is defined as $$r_{asp} = [\{1+(dz/dy)^2\}^{3/2}]/(d^2z/dy^2)$$

It is favorable that the real image mode finder optical system of the present invention is constructed so that the objective optical system has at least two lens units, the focal length of the objective optical system is variable, and when the magnification is changed, the at least two lens units are moved along different paths.

When the objective optical system is constructed so that its focal length can be changed, a constant angle of emergence can be obtained, without changing the size of the field frame, even when the magnification is changed.

When the angle of emergence is increased, the phenomenon of a so-called diopter shift will occur if the back focal position is shifted. However, when at least two lens units are moved along different paths to change the magnification, the back focal position of the objective optical system can be kept to be nearly constant.

It is favorable that the photographing apparatus according to the present invention has the photographing optical system and the real image mode finder optical system which has been described.

Also, in the above description, where the reflecting surface is configured as a roof reflecting surface, it is assumed that the roof reflecting surface is constructed with two reflecting surfaces.

The real image mode finder optical system according to the present invention includes, in order from the object side, an objective optical system which has a positive refracting power and changes the magnification of the finder, a field frame located in the proximity of the imaging position of the objective optical system, and an eyepiece optical system with a positive refracting power. The real image mode finder optical system has an image erecting means, and the objective optical system includes, in order from the object side, a front unit with a negative refracting power and a rear unit with a positive refracting power. The front unit is constructed with a plurality of lens units so that the magnification is changed, ranging from the wide-angle position to the telephoto position, by moving at least two of the plurality of lens units. The rear unit is constructed with a plurality of prism units with positive refracting powers so that at least one of surfaces opposite to one another, of the plurality of prism units is configured to be convex.

The real image mode finder optical system according to the present invention includes, in order from the object side, an objective optical system which has a positive refracting power and changes the magnification of the finder, a field frame located in the proximity of the imaging position of the objective optical system, and an eyepiece optical system with a positive refracting power. The real image mode finder optical system has an image erecting means, and the objective optical system includes, in order from the object side, a first unit with a negative refracting power, a second unit with a positive refracting power, a third unit with a negative refracting power, and a fourth unit with a positive refracting power. The fourth unit is comprised of a fourth front sub-unit with a positive refracting power and a fourth rear sub-unit with a positive refracting power, and the magnification is changed, ranging from the wide-angle position to the telephoto position, by moving the second unit and the third unit. Each of the first, second, and third units is constructed with a lens, and each of the fourth front and rear sub-units is constructed with a prism so that at least one of surfaces opposite to each other, of the fourth front and rear sub-units is configured to be convex.

In the above construction, the real image mode finder optical system is such that the fourth front sub-unit is comprised of a single prism and has a single reflecting surface.

In order to increase the angle of emergence, it is only necessary to increase the size of an image obtained by the objective optical system, that is, the size of the field frame, or to reduce the focal length of the eyepiece optical system. However, if the field frame is enlarged with respect to the focal length of the eyepiece optical system, the objective optical system must be also enlarged. Moreover, since the burden of correction for aberration to the eyepiece optical system will be increased, it becomes difficult that good performance of the eyepiece optical system and compactness due to a simple arrangement are compatible with each other. Thus, in order to keep the size of the finder compact and increase the angle of emergence, it is desirable to reduce the focal length of the eyepiece optical system.

However, when the focal length of the eyepiece optical system is reduced, the distance on the optical axis between the front principal point of the eyepiece optical system and the field frame is diminished, and, for example, space for arranging the optical elements of the image erecting means is narrowed, so that the reflecting surface to be placed is limited to one. Consequently, it is necessary that the back focal distance of the objective optical system is increased to place the image erecting means there.

Thus, in the present invention, the objective optical system is designed to have, in order to the object side, a front unit with a negative refracting power, including a plurality of lens units and changing the magnification by moving at least two lens units thereof and a rear unit with a positive refracting power comprised of a plurality of prism units with positive refracting powers.

As mentioned above, when the objective optical system is designed to be of a retrofocus type, the back focal distance of the objective optical system can be increased. Moreover, when the rear unit with a positive refracting power is constructed with the prism units, the image erecting means can be shared. Thus, according to the present invention, the focal length of the eyepiece optical system can be reduced, and a real image mode finder optical system which has a large angle of emergence and is compact in design can be achieved.

In the case where the variable magnification ratio of the finder optical system is increased to particularly extend the variable magnification range to the wide-angle side, a high refracting power is required for the rear unit with a positive refracting power. The inclination of the marginal beam with respect to the optical axis where the magnification is changed at the wide-angle position is large immediately after the beam emerges from the front unit with a negative refracting power. Hence, in order to make this inclined beam parallel in the proximity of the field frame, a great positive refracting power is required on the rear side of the front unit with a negative refracting power. In this case, it is desirable that the great positive refracting power is shared among a plurality of surfaces because the performance of the objective optical system is improved.

The rear unit with a positive refracting power comprised of a plurality of prism units with positive refracting powers is placed on the eyepiece side of the front unit with a negative refracting power, and at least one of surfaces opposite to one another, of the plurality of prism units with positive refracting powers is configured to be convex. By doing so, the positive refracting power can be shared to the entrance or exit surface of each of the plurality of prism units with positive refracting powers, and thus the performance of the objective optical system can be improved.

When the magnification is changed by moving at least two lens units, the variable magnification function and the diopter correcting function involved in the magnification change can be exercised.

When the angle of emergence is increased, the diopter shift is liable to occur. However, by moving at least two lens units of the front unit, the diopter shift involved in the magnification change can be corrected.

As mentioned above, in order to increase the angle of emergence, it is only necessary to increase the size of an image obtained by the objective optical system, that is, the size of the field frame, or to reduce the focal length of the eyepiece optical system. However, if the field frame is enlarged with respect to the focal length of the eyepiece optical system, the objective optical system must be also enlarged. Moreover, since the burden of correction for aberration to the eyepiece optical system will be increased, it becomes difficult that good performance of the eyepiece optical system and compactness due to a simple arrangement are compatible with each other. Thus, in order to keep the size of the finder compact and increase the angle of emergence, it is desirable to reduce the focal length of the eyepiece optical system.

However, when the focal length of the eyepiece optical system is reduced, the distance on the optical axis between the front principal point of the eyepiece optical system and the field frame is diminished, and, for example, space for arranging the optical elements of the image erecting means is narrowed, so that the reflecting surface to be placed is limited to one. Consequently, it is necessary that the back focal distance of the objective optical system is increased to place the image erecting means there.

Thus, in the present invention, the objective optical system is designed to have, in order to the object side, the first unit with a negative refracting power, the second unit with a positive refracting power, the third unit with a negative refracting power, and the fourth unit with a positive refracting power so that the fourth unit includes the fourth front sub-unit with a positive refracting power and the fourth rear sub-unit with a positive refracting power.

As described above, when the positive refracting power is imparted to each of the fourth front sub-unit and the fourth rear sub-unit, the back focal distance of the objective optical system can be increased. Moreover, when the fourth front and rear subunits are constructed with prisms, the function of the image erecting means can be shared. Thus, according to the present invention, the focal length of the eyepiece optical system can be reduced, and a real image mode finder optical system which has a large angle of emergence and is compact in design can be obtained.

In the case where In the case where the variable magnification ratio of the finder optical system is increased to particularly extend the variable magnification range to the wide-angle side, high refracting powers are required for the units with positive refracting powers on the eyepiece side of the third unit. The inclination of the marginal beam with respect to the optical axis where the magnification is changed at the wide-angle position is large immediately after the beam emerges from the front unit with a negative refracting power. Hence, in order to make this inclined beam parallel in the proximity of the field frame, a great positive refracting power is required on the rear side of the front unit with a negative refracting power. In this case, it is desirable that the great positive refracting power is shared among a plurality of surfaces because the performance of the objective optical system is improved.

When the prism units of the fourth front and rear sub-units with two positive refracting powers are arranged on the eyepiece side of the third unit and at least one of opposite surfaces of the fourth front and rear sub-units is configured to be convex, the positive refracting power can be shared to at least one of opposite surfaces of the fourth front and rear sub-units, and hence the performance of the objective optical system can be improved.

When the magnification is changed by moving at least two units, the variable magnification function and the diopter correcting function involved in the magnification change can be exercised.

When the angle of emergence is increased, the diopter shift is liable to occur. However, by moving the second and third units, the diopter shift involved in the magnification change can be corrected.

In order that the thickness of a camera is reduced to provide a compact camera, it is desirable that a position where the most object-side optical axis of the image erecting means, that is, the position of a reflecting surface, is brought close to the object side. When the magnification is changed, the image erecting means remains fixed and thereby the arrangement of the finder is simplified. Thus, it is desirable that the fourth front sub-unit with a positive refracting power has a reflecting surface.

On the other hand, in order to increase the back focal distance of the objective optical system, it is desired that most of the reflecting surfaces having positive refracting powers shared between the fourth front and rear sub-units are arranged together at a distance away from the field frame.

When the objective optical system is constructed so that the fourth front sub-unit has a single reflecting surface as mentioned above, the opposite surfaces of the fourth front and rear sub-units can be arranged along the length of the fourth front sub-unit including one reflecting surface. Consequently, compactness of the camera and the back focal distance of the objective optical system can be ensured.

In the real image mode finder optical system of the present invention, it is favorable that the fourth rear sub-unit is constructed with a single prism and has two reflecting surfaces.

At least four reflecting surfaces are required for the image erecting means, and thus if the image erecting means is constructed with four reflecting surfaces, space efficiency can be improved. In this case, when three of four reflecting surfaces constituting the image erecting means are placed in the objective optical system, the burden of a space for placing the image erecting means to the eyepiece optical system is lessened, and the number of optical elements constituting the eyepiece optical system can be reduced.

It is favorable that the real image mode finder optical system of the present invention satisfies the following condition:

$$-1.0 < MG45 < -0.5 \quad (9)$$

where MG45 is a combined imaging magnification of the fourth front sub-unit and a fourth rear sub-unit at an object distance of 3 m.

When Condition (9) is satisfied, the balance between performance and size of the objective optical system can be held. Below the lower limit of Condition (9), a combined refracting power of the first, second, and third units must be increased, and thus the fluctuation of aberration becomes heavy by movement of the second and third units for changing the magnification. On the other hand, beyond the upper limit of Condition (9), a combined refracting power of the first, second, and third units must be reduced, and thus the diameter of the first unit will be particularly enlarged.

When the magnification is changed over the range from the wide-angle position to the telephoto position, it is favorable that the real image mode finder optical system satisfies the following condition:

$$-1.2 < \beta 3 < -0.8 \quad (10)$$

where $\beta 3$ is the imaging magnification of the third unit in a state where the imaging magnification of the second unit is $-1\times$ at an object distance of 3 m.

The second and third units bear the variable magnification function and the diopter correcting function, but if the diopter correction is not completely made, the diopter shift will be produced. In particular, when the angle of emergence is increased, the diopter shift is liable to occur.

When the finder optical system is designed to satisfy Condition (10), a state where the imaging magnification of the second unit is $-1\times$ at an object distance of 3 m practically coincides with a state where the imaging magnification of the third unit is $\times 1\times$ at an object distance of 3 m when the magnification is changed over the range from the wide-angle position to the telephoto position. As a result, diopter correction can be favorably made over the whole range in which the magnification is changed.

In the real image mode finder optical system of the present invention, it is favorable that the second unit is constructed with a single lens and satisfies the following condition:

$$-0.6 < SF2 < 0.6 \quad (11)$$

where SF2=(r3+r4)/(r3−r4), which is the shape factor of the second unit, r3 is the radius of curvature of the object-side surface of the second unit, and r4 is the radius of curvature of the eyepiece-side surface of the second unit.

When the finder optical system is designed to satisfy Condition (11), the fluctuation of performance where the magnification is changed can be suppressed. If the upper or lower limit of Condition (11) is passed, the fluctuation of aberration where the magnification is changed becomes heavy.

In the real image mode finder optical system of the present invention, it is desirable that each of the second and third units is constructed with a single lens and satisfies the following condition:

$$-1.9 < f2/f3 < -1.0 \quad (12)$$

where f2 is the focal length of the second unit and f3 is the focal length of the third unit.

Condition (12) defines a condition relative to the refracting powers of the second and third units for suppressing a change in performance where the magnification is changed. Below the lower limit of Condition (12), the refracting power of the third unit is increased, and the fluctuation of aberration where the magnification is changed becomes heavy. Beyond the upper limit of Condition (12), the refracting power of the second unit is increased, and the fluctuation of aberration where the magnification is changed becomes heavy.

It is favorable that the real image mode finder optical system of the present invention satisfies the following conditions at the same time:

$$-1.0 < fw/fFw < -0.4 \quad (13)$$

$$-1.0 < f/fFT < -0.4 \quad (14)$$

where fFw is a combined focal length of the front unit with a negative refracting power at the wide-angle position, fFT is a combined focal length of the front unit with a negative refracting power at the telephoto position, fw is the focal length of the objective optical system at the wide-angle position, and fT is the focal length of the objective optical system at the telephoto position.

When Conditions (13) and (14) are satisfied at the same time, the balance between the performance and the back focal distance of the objective optical system can be maintained. If the lower limit of Condition (13) or (14) is passed, a negative combined refracting power of the front unit will be strengthened, and thus the fluctuation of aberration caused by the movement of the second and third units for changing the magnification becomes heavy.

On the other hand, if the upper limit of Condition (13) or (14) is exceeded, the negative combined refracting power of the front unit will be diminished, and hence a long back focal distance caused by the retrofocus arrangement will cease to be completely obtainable.

It is desirable that the real image mode finder optical system of the present invention satisfies the following condition:

$$2.7 < mT/mW < 7.0 \tag{15}$$

where mW is the finder magnification of the entire system at the wide-angle position and mT is the finder magnification of the entire system at the telephoto position.

The present invention provides a preferred zoom ratio in the real image mode finder optical system described above.

Below the lower limit of Condition (15), the performance of the finder optical system cannot be completely exercised. On the other hand, beyond the upper limit of Condition (15), the refracting power of each unit becomes too strong and aberration is liable to occur.

It is favorable that that the photographing apparatus according to the present invention has the photographing optical system and the real image mode finder optical system which has been described.

Also, in the above description, where the reflecting surface is configured as a roof reflecting surface, it is assumed that the roof reflecting surface is constructed with two reflecting surfaces.

The real image mode finder optical system according to the present invention includes, in order from the object side, an objective optical system which has a positive refracting power and changes the magnification of the finder, a field frame located in the proximity of the imaging position of the objective optical system, and an eyepiece optical system with a positive refracting power. The real image mode finder optical system has an image erecting means, and the objective optical system includes, in order from the object side, a first unit with a negative refracting power, a second unit with a positive refracting power, a third unit with a negative refracting power, and a fourth unit with a positive refracting power. The magnification is changed, ranging from the wide-angle position to the telephoto position, by simply moving the second unit toward the object side and the third unit toward the eyepiece side. A combined focal length of the first, second, and third units is negative, and when the magnification is changed over the range from the wide-angle position to the telephoto position, a combined imaging magnification of the second and third units is 1×.

In this case, it is favorable that the real image mode finder optical system constructed as mentioned above satisfies Condition (10).

Furthermore, in the real image mode finder optical system of the present invention, it is favorable that the second unit is constructed with a single lens and satisfies Condition (11).

As described above, in order to increase the angle of emergence, it is only necessary to increase the size of an image obtained by the objective optical system, that is, the size of the field frame, or to reduce the focal length of the eyepiece optical system. However, if the field frame is enlarged with respect to the focal length of the eyepiece optical system, the objective optical system must be also enlarged. Moreover, since the burden of correction for aberration to the eyepiece optical system will be increased, it becomes difficult that good performance of the eyepiece optical system and compactness due to a simple arrangement are compatible with each other. Thus, in order to keep the size of the finder compact and increase the angle of emergence, it is desirable to reduce the focal length of the eyepiece optical system.

However, when the focal length of the eyepiece optical system is reduced, the distance on the optical axis between the front principal point of the eyepiece optical system and the field frame is diminished, and, for example, space for arranging the optical elements of the image-erecting means is narrowed. Consequently, it is necessary that the back focal distance; of the objective optical system is increased to place the image erecting means there.

Thus, in the present invention, the objective optical system is designed to have, in order to the object side, the first unit with a negative refracting power, the second unit with a positive refracting power, the third unit with a negative refracting power, and the fourth unit with a positive refracting power so that the combined focal length of the first, second, and third units is negative.

By doing so, the objective optical system is arranged to be of a retrofocus type, and therefore, the back focal distance of the objective optical system can be increased. Thus, according to the present invention, the focal length of the eyepiece optical system can be reduced, and a real image mode finder optical system which has a large angle of emergence and is compact in design can be achieved.

When the magnification of the finder is changed, it is necessary that a variable magnification function is chiefly imparted to one of at least two moving lens units and a diopter correcting function involved in the magnification change is chiefly imparted to the other. In this case, the amount of movement of the lens unit having the variable magnification function becomes larger than that of the lens unit having the diopter correcting function, and a mechanism for movement is liable to be complicated and oversized.

Thus, in the present invention, the finder optical system is constructed so that the magnification is changed, ranging from the wide-angle position to the telephoto position, by simply moving the second unit toward the object side and the third unit toward the eyepiece side.

By doing so, both the variable magnification function and the diopter correcting function can be shared between the second-unit and the third unit. Hence, the amount of movement of each of the second and third units where the magnification is change can be kept to a minimum, and compactness of the mechanism for movement is obtained.

In order to achieve compactness of the objective optical system, it is only necessary to increase the refracting power of each of the second and third units for changing the magnification. In this case, however, the fluctuation of aberration where the magnification is changed becomes heavy.

Here, in the whole range in which the magnification is changed, if an attempt is made so that the combined imaging magnification of the second and third units becomes lower than 1×, there is a tendency that the refracting power of the third unit is increased. In this case, since the refracting power of the first unit must be diminished, the diameter of the first unit must be increased.

On the other hand, if an attempt is made so that the combined imaging magnification of the second and third units becomes higher than 1×, there is a tendency that the refracting power of the second unit is increased. In this case, since the refracting power of the first unit must be increased, the diopter shift caused by a change of space between the first and second units becomes particularly considerable.

Thus, if the combined imaging magnification of the second and third units is changed so that it becomes 1×, the balance between the performance and the size of the objective optical system can be optimized.

The second and third units bear the variable magnification function and the diopter correcting function, but if the diopter correction is not completely made, the diopter shift will be produced. In particular, when the angle of emergence is increased, the diopter shift is liable to occur.

When the finder optical system is designed to satisfy Condition (10), a state where the imaging magnification of the second unit is −1× at an object distance of 3 m practically coincides with a state where the imaging magnification of the third unit is −1× at an object distance of 3 m when the magnification is changed over the range from the wide-angle position to the telephoto position. As a result, diopter correction can be favorably made over the whole range in which the magnification is changed. When the finder optical system is designed to satisfy Condition (11), the fluctuation of performance where the magnification is changed can be suppressed. If the upper or lower limit of Condition (11) is passed, the fluctuation of aberration where the magnification is changed becomes heavy.

In the real image mode finder optical system of the present invention, it is favorable that each of the second and third units is constructed with a single lens and satisfies Condition (12).

Condition (12) defines a condition relative to the refracting powers of the second and third units for suppressing a change in performance where the magnification is changed. Below the lower limit of Condition (12), the refracting power of the third unit is increased, and the fluctuation of aberration where the magnification is changed becomes heavy. Beyond the upper limit of Condition (12), the refracting power of the second unit is increased, and the fluctuation of aberration where the magnification is changed becomes heavy.

It is favorable that the real image mode finder optical system of the present invention satisfies the following conditions at the same time:

$$-1.0 < fw/fw123 < -0.4 \qquad (16)$$

$$-1.0 < fT/fT123 < -0.4 \qquad (17)$$

where fw123 is a combined focal length of the first, second, and third units at the wide-angle position and fT123 is a combined focal length of the first, second, and third units at the telephoto position.

When Conditions (16) and (17) are satisfied at the same time, the balance between the performance and the back focal distance of the objective optical system can be maintained. If the lower limit of Condition (16) or (17) is passed, a negative combined refracting power of each of the first, second, and third units will be strengthened, and thus the fluctuation of aberration caused by the movement of the second and third units for changing the magnification becomes heavy.

On the other hand, if the upper limit of Condition (16) or (17) is exceeded, the negative combined refracting power of each of the first, second, and third units will be diminished, and hence a long back focal distance caused by the retrofocus arrangement will cease to be completely obtainable.

It is favorable that the real image mode finder optical system is constructed so that when the magnification is changed over the range from the wide-angle position to the telephoto position, the fourth unit remains fixed.

By doing so, the number of units to be moved can be lessened, and cost can be reduced accordingly.

In the real image mode finder optical system of the present invention, it is favorable that the fourth unit is constructed with two optical units with positive refracting powers.

In the case where the variable magnification ratio of the finder optical system is increased to particularly extend the variable magnification range to the wide-angle side, a high refracting power is required for the unit with a positive refracting power on the eyepiece side of the third unit. The inclination of the marginal beam with respect to the optical axis where the magnification is changed at the wide-angle position is large immediately after the beam emerges from the third unit. Hence, in order to make this inclined beam parallel in the proximity of the field frame, a great positive refracting power is required on the rear side of the third unit. In this case, it is desirable that the great positive refracting power, is shared among a plurality of surfaces because the performance of the objective optical system is improved.

As explained above, when the two optical units with positive refracting powers are arranged on the eyepiece side of the third unit, the lens function can be shared between opposite surfaces of the two optical units with positive refracting powers, and hence the performance of the objective optical system can be improved.

In the real image mode finder optical system of the present invention, it is favorable that the fourth unit has a plurality of reflecting surfaces.

Thus, when at least half of the image erecting function is shared to the objective optical system, an increase in thickness along the optical axis of incidence of the objective optical system can be suppressed and at the same time, the distance between an intermediate image and an eyepiece is reduced. Consequently, a finder which has a large angle of emergence can be obtained.

In the real image mode finder optical system of the present invention, it is favorable that the two optical units are prisms having reflecting surfaces.

When at least half of the image erecting function is shared to the objective optical system, an increase in thickness along the optical axis of incidence of the objective optical system can be suppressed and at the same time, the distance between an intermediate image and an eyepiece is reduced. Consequently, a finder which has a large angle of emergence can be obtained.

It is favorable that the real image mode finder optical system is constructed so that the magnification is changed, ranging from the wide-angle position to the telephoto position, by moving the first unit as well.

The second and third units bear the variable magnification function and the diopter correcting function, but if the diopter correction is not completely made, the diopter shift will be produced.

Where the units for changing the magnification are obstructed with only the second and third units, diopter correction cannot be favorably made over the whole range in which the magnification is changed, unless a state where the imaging magnification of the second unit is −1× practically coincides with a state where the imaging magnification of the third unit is −1× when the magnification is changed over the range from the wide-angle position to the telephoto position.

However, when the first unit is also moved to change the magnification, restrictions on imaging magnifications of the second and third units are eliminated, and the performance of the objective optical system can be easily improved.

The real image mode finder optical system of the present invention may be constructed so that when the magnification is changed over the range from the wide-angle position to the telephoto position, the first unit remains fixed.

By doing so, the number of units to be moved can be lessened, and cost can be reduced accordingly.

In this case, it is favorable that the real image mode finder optical system of the present invention satisfies Condition (15).

The present invention provides a preferred zoom ratio in the real image mode finder optical system described above.

Below the lower limit of Condition (15), the performance of the finder optical system cannot be completely exercised. On the other hand, beyond the upper limit of Condition (15), the refracting power of each unit becomes too strong and aberration is liable to occur.

It is favorable that that the photographing apparatus according to the present invention has the photographing optical system and the real image mode finder optical system which has been described.

Also, in the above description, where the reflecting surface is configured as a roof reflecting surface, it is assumed that the roof reflecting surface is constructed with two reflecting surfaces.

In accordance with the drawings and numerical data, the embodiments of the real image mode finder optical system of the present invention will be explained below.

In any of the embodiments, the real image mode finder optical system includes, in order from the object side, an objective optical system with a positive refracting power, a field frame placed in the proximity of the imaging position of the objective optical system, and an eyepiece optical system with a positive refracting power, and has an image erecting means.

First Embodiment

In the real image mode finder optical system of this embodiment, as shown in FIGS. 1–3 and 5A–5C, the objective optical system includes, in order from the object side, a first unit G1 with a negative refracting power, a second unit G2 with a positive refracting power, a third unit G3 with a negative refracting power, and a fourth unit G4 with a positive refracting power, and has a positive refracting power as a whole.

The fourth unit G4 is constructed with two prisms P1 and P2. The eyepiece optical system is constructed with a prism P and a positive lens E1 and has a positive refracting power as a whole. Also, in FIG. 5A, symbol EP represents an eyepoint.

Figure 4:
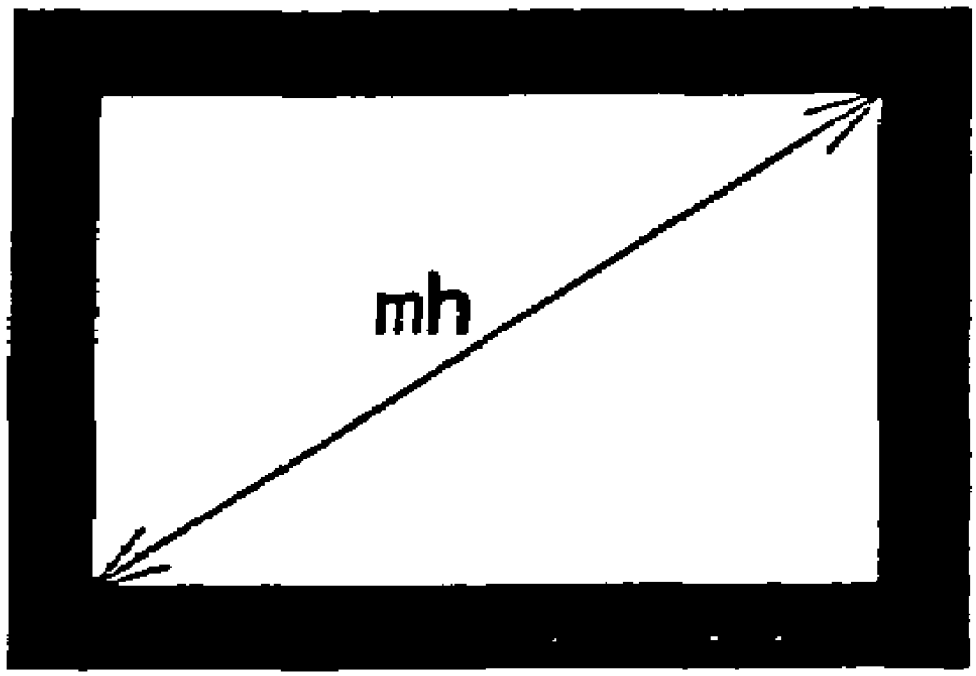
FIG. 4 is an explanatory view of a field frame used in the real image mode finder optical system of the first embodiment.
Figure 5A:
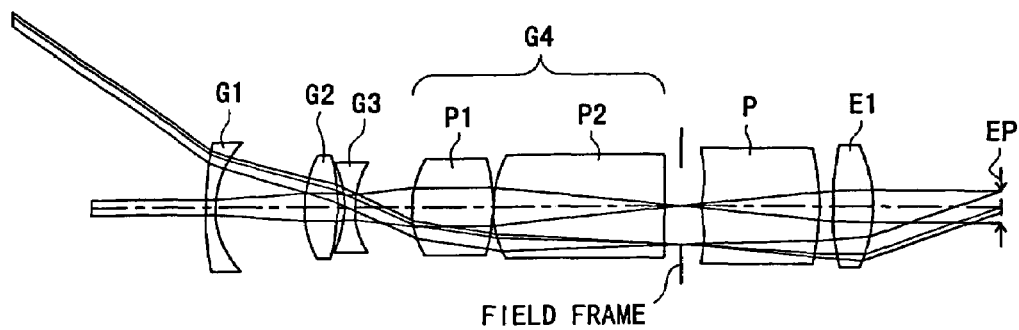
FIGS. 5A, 5B, and 5C are sectional views showing arrangements, developed along the optical axis, at wide-angle, middle, and telephoto positions, respectively, of the real image mode finder optical system in the first embodiment.
Figure 5B:
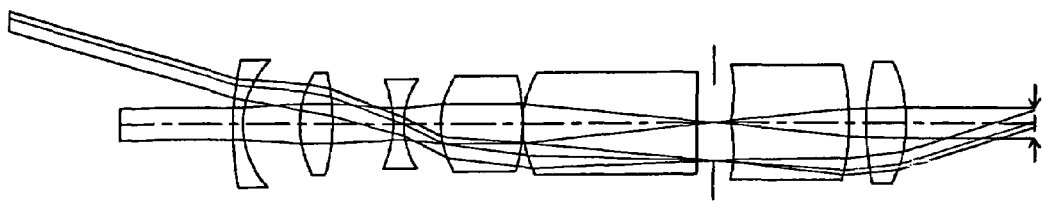
Figure 5C:
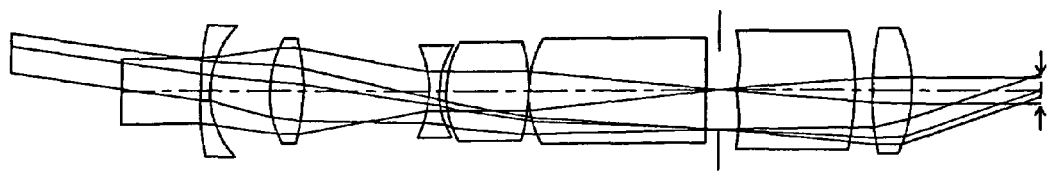

The image erecting means includes the prisms P1 and P2 and the prism P. In the real image mode finder optical system of the first embodiment, an intermediate image formed by the objective optical system is interposed between the prism P2 and the prism P, and the field frame, such as that shown in FIG. 4, is provided in the proximity of its imaging position.

The magnification of the finder is changed in the range from the wide-angle position to the telephoto position by fixing the first unit G1 and the fourth unit G4 and by moving the second unit G2 and the third-unit G3 along the optical axis.

Each of the first unit G1, the second unit G2, and the third unit G3 is constructed with a single lens. The entrance surface and the exit surface of the prism P1 and the entrance surface of the prism P2 have finite curvatures. The entrance surface and the exit surface of the prism P also have finite curvatures.

Figure 2:
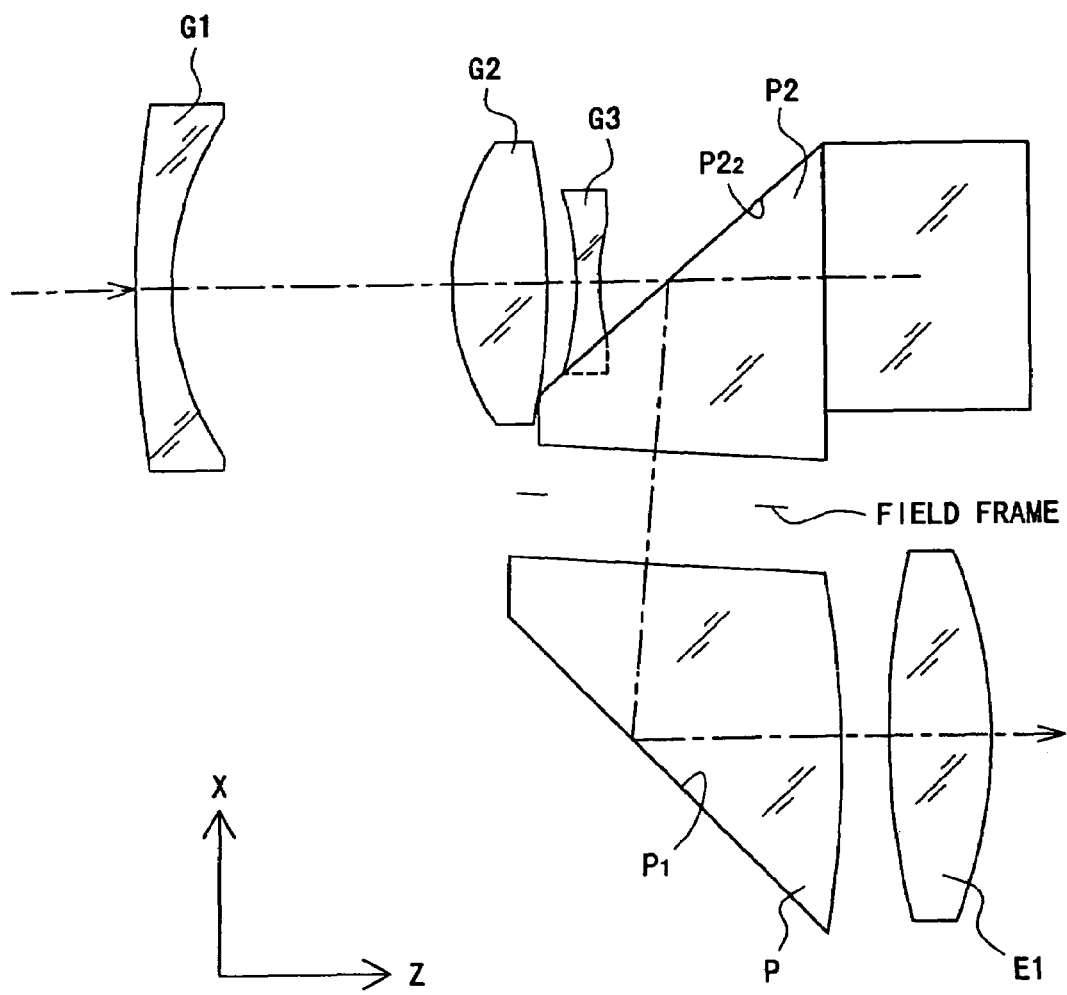
FIG. 2 is a plan view of the real image mode finder optical system of FIG. 1.
Figure 3:
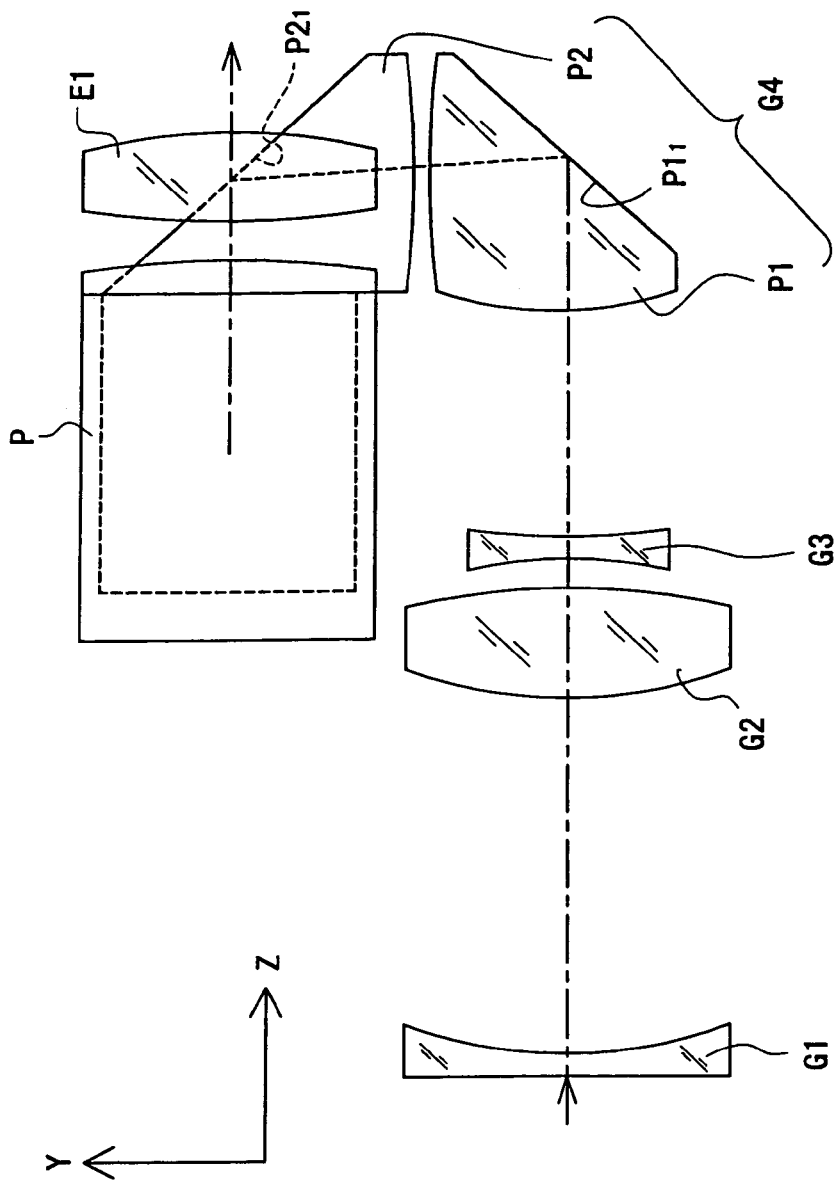
FIG. 3 is a side view of the real image mode finder optical system of FIG. 1.

The prisms P1 and P2 and the prism P, as shown in FIGS. 1–3, are provided with reflecting surfaces $P1_1$, $P2_1$, $P2_2$, and $P_1$ along the optical path so that the optical axis is bent to erect an image. Specifically, as shown in FIG. 3, the reflecting surface $P1_1$ provided in the prism P1 bends the optical axis in a Y-Z plane; as shown in FIGS. 2 and 3, the two reflecting surfaces $P2_1$ and $P2_2$ provided in the prism P2 bend the optical axis in the Y-Z plane and an X-Z plane in this order from the object side; and as shown in FIG. 2, the reflecting surface $P_1$ provided in the prism P bends the optical axis in the X-Z plane. In this way, an erect image is obtained. Also, the arrangement of the reflecting surfaces is based on that of a Porro prism. Angles made with the optical axis bent by the reflecting surfaces are such that, for example, the angles of the optical axis bent by the reflecting surfaces $P1_1$ and $P_1$ of the prism P1 and the prism P are smaller than 90 degrees and the angles of the optical axis bent by the reflecting surfaces $P2_1$ and $P2_2$ of the prism P2 are larger than 90 degrees. The reflecting surfaces $P1_1$ and $P_1$ of the prism P1 and the prism P are coated with metal films, such as silver and aluminum. The reflecting surfaces $P2_1$ and $P2_2$ of the prism P2 utilize total reflection.

However, the ways of bending the optical axis through the prisms and the angles of the optical axis bent by the reflecting surfaces are not limited to the above description. For example, the angle of the optical axis bent by the most field-frame-side reflecting surface $P2_2$ of the prism P2 may be made smaller than 90 degrees so that this reflecting surface is coated with a metal film. Moreover, the angle of the optical axis bent by, the reflecting surface, $P_1$ of the prism P2 may also be made larger than 90 degrees so that this reflecting surface utilizes total reflection.

The positive, lens E1 is constructed so that diopter adjustment can be made in accordance with an observer's diopter.

Also, aberration characteristics in the first embodiment are shown in FIGS. 6A–6D, 7A–7D, and 8A–8D.

Subsequently, numerical data of optical members constituting the real image mode finder optical system according to the first embodiment are shown below. In the numerical data of the first embodiment, m denotes a finder magnification; ω denotes a field angle; f denotes the focal length of the objective optical system; $r_1$, $r_2$, . . . represent radii of curvature of the surfaces of individual lenses or prisms; $d_1$, $d_2$, . . . represent thicknesses of individual lenses or prisms or spaces therebetween; $n_{d1}$, $n_{d2}$, . . . represent refractive indices of individual lenses or prisms; and $v_{d1}$, $v_{d2}$, . . . represent Abbe's numbers of individual lenses or prisms; mh represents the maximum width of the field frame; fe represents the focal length of the eyepiece optical system; f123 represents a combined focal length of the first to third units; m23 represents a combined imaging magnification of the second and third units where an object distance is 3 m; m2 represents an imaging magnification of the second unit at the middle position where the object distance is 3 m; and m3 represents an imaging magnification of the third unit at the middle position where the object distance is 3 m.

Also, the configuration of the aspherical surface, as already described, is expressed by the following equation:

$$z=(y^2/r)/[1+\sqrt{\{1-(1+K)(y/r)^2\}}]+A_4y^4+A_6y^6+A_8y^8+A_{10}y^{10}$$

These symbols are also applied to the embodiments to be described later.

Numerical data 1

|  | Wide-angle position | Middle position | Telephoto position |
|---|---|---|---|
| m | 0.536 | 1.016 | 2.075 |
| ω (°) | 33.541 | 17.525 | 8.746 |
| f (mm) | 8.047 | 15.253 | 31.147 |
| Pupil dia. (mm) | 4.000 | | |

$r_1 = 83.6172$
  $d_1 = 1.0000$   $n_{d1} = 1.58423$   $\nu_{d1} = 30.49$
$r_2 = 10.0913$ (aspherical)
  $d_2 = D2$ (variable)
$r_3 = 10.3392$ (aspherical)
  $d_3 = 4.3149$   $n_{d3} = 1.52542$   $\nu_{d3} = 55.78$
$r_4 = -21.0217$ (aspherical)
  $d_4 = D2$ (variable)
$r_5 = -10.0239$ (aspherical)
  $d_5 = 1.0000$   $n_{d5} = 1.58425$   $\nu_{d5} = 30.35$
$r_6 = 10.3239$ (aspherical)
  $d_6 = D6$ (variable)
$r_7 = 11.2869$
  $d_7 = 9.9000$   $n_{d7} = 1.52542$   $\nu_{d7} = 55.78$
$r_8 = -23.2085$ (aspherical)
  $d_8 = 0.5000$
$r_9 = 15.7633$ (aspherical)
  $d_9 = 22.5495$   $n_{d9} = 1.52542$   $\nu_{d9} = 55.78$
$r_{10} = \infty$
  $d_{10} = 2.2605$
$r_{11} = \infty$ (field frame)
  $d_{11} = 2.5500$
$r_{12} = 15.9503$ (aspherical)
  $d_{12} = 15.5600$   $n_{d12} = 1.52542$   $\nu_{d12} = 55.78$
$r_{13} = -38.8890$
  $d_{13} = 1.7500$
$r_{14} = 25.2612$
  $d_{14} = 5.3200$   $n_{d14} = 1.52542$   $\nu_{d14} = 55.78$
$r_{15} = -16.9795$ (aspherical)
  $d_{15} = 17.0491$
$r_{16} = \infty$ (eyepoint)

Aspherical coefficients
Second surface $K = -1.2950$
$A_4 = 2.10279 \times 10^{-6}$   $A_6 = -2.71836 \times 10^{-7}$   $A_8 = 1.45499 \times 10^{-9}$
Third surface $K = -0.2610$
$A_4 = -9.12395 \times 10^{-5}$   $A_6 = -3.93632 \times 10^{-7}$   $A_8 = -6.31136 \times 10^{-9}$
Fourth surface $K = -0.0224$
$A_4 = 8.97235 \times 10^{-5}$   $A_6 = -4.73271 \times 10^{-7}$   $A_8 = -1.37810 \times 10^{-9}$
Fifth surface $K = 0.2143$
$A_4 = 6.18253 \times 10^{-4}$   $A_6 = -3.45137 \times 10^{-5}$   $A_8 = 7.99836 \times 10^{-7}$
Sixth surface $K = -0.0423$
$A_4 = 1.66996 \times 10^{-6}$   $A_6 = -2.60860 \times 10^{-5}$   $A_8 = 6.01778 \times 10^{-7}$
Eighth surface $K = 0.1568$
$A_4 = 2.22420 \times 10^{-4}$   $A_6 = -1.28141 \times 10^{-6}$   $A_8 = 3.95727 \times 10^{-8}$
Ninth surface $K = 0.0140$
$A_4 = -1.11940 \times 10^{-5}$   $A_6 = -1.42736 \times 10^{-6}$ -continued Numerical data 1

Twelfth surface $K = 0.0000$
$A_4 = -1.19998 \times 10^{-3}$   $A_6 = 1.07234 \times 10^{-5}$
Fifteenth surface $K = 0.0000$
$A_4 = 4.29178 \times 10^{-5}$   $A_6 = 1.34232 \times 10^{-7}$
Zoom data

|  | Wide-angle position | Middle position | Telephoto position |
|---|---|---|---|
| D2 | 11.6242 | 7.1879 | 3.4246 |
| D4 | 1.2500 | 8.2976 | 16.2705 |
| D6 | 7.8209 | 5.2097 | 1.0000 |
| mh = 10.139 mm | | | |
| f123 | −10.436 | −19.857 | −41.578 |
| m23 | 0.529 | 1.000 | 2.044 |
| m2 | | −1.000 | |
| m3 | | | −1.000 |
| Condition (9) MG45 | −0.773 | −0.775 | −0.776 |

Conditions (1), (7) mh/fe = 0.676
Conditions (2), (3) fe = 15.009 mm
Condition (8) φ (mh/2) = −0.377955 (1/mm)
Condition (10) β3 = −1.000
Condition (11) SF2 = −0.341
Condition (12) f2/f3 = −1.619
Condition (13) fw/fFw = −0.771
Condition (14) fT/fFT = −0.749
Condition (15) mT/mW = 3.871
Condition (16) fw/fw123 = −0.771
Condition (17) fT/fT123 = −0.749

Second Embodiment

Figure 9A:
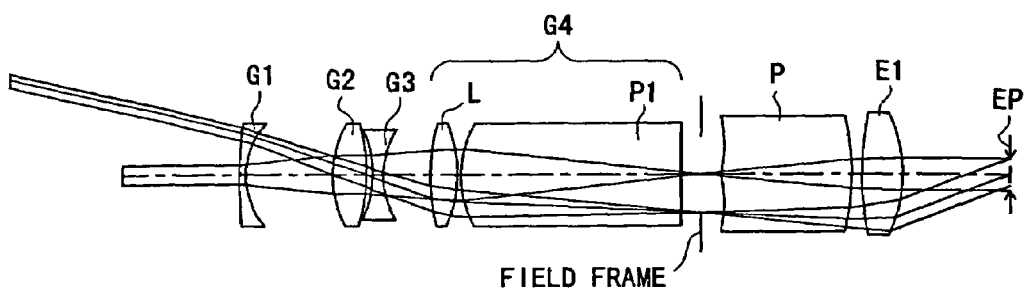
FIGS. 9A, 9B, and 9C are sectional views showing arrangements, developed along the optical axis, at wide-angle, middle, and telephoto positions, respectively, of the real image mode finder optical system in a second embodiment.
Figure 9B:
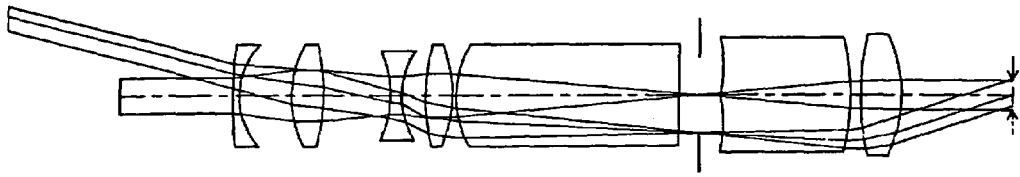
Figure 9C:
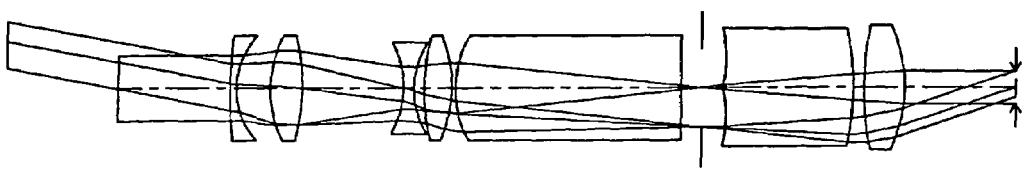
Figure 10D:
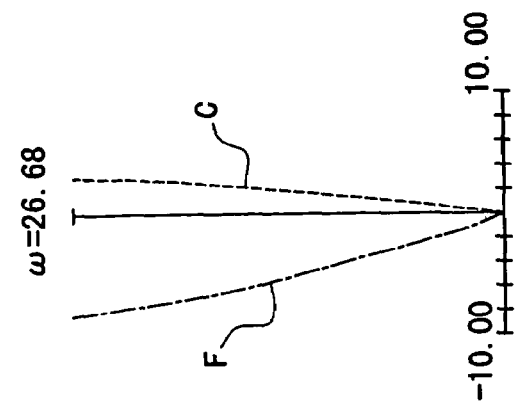
FIGS. 10A, 10B, 10C, and 10D are diagrams showing aberration characteristics at the wide-angle position of the real image mode finder optical system in the second embodiment.
Figure 10C:
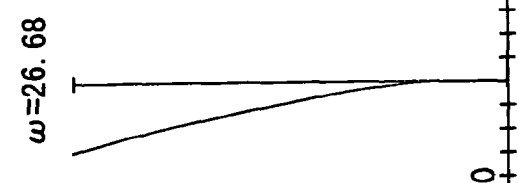
Figure 10B:
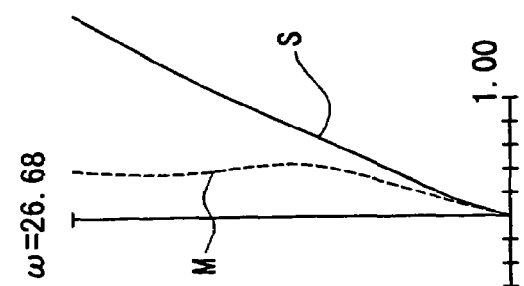
Figure 10A:
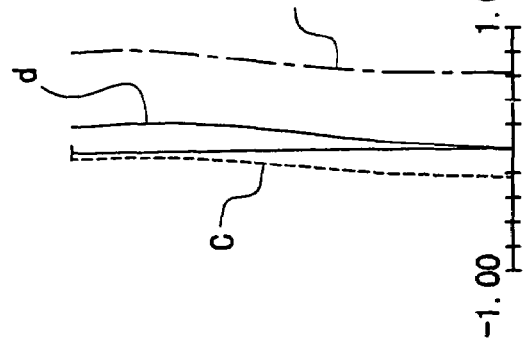

In the real image mode finder optical system of this embodiment, as shown in FIGS. 9A–9C, the objective optical system includes, in order from the object side, the first unit G1 with a negative refracting power, the second unit G2 with a positive refracting power, the third unit G3 with a negative refracting power, and the fourth unit G4 with a positive refracting power, and has a positive refracting power as a whole.

The fourth unit G4 is constructed with a positive lens L and the prism P1. The eyepiece optical system is constructed with a prism P and a positive lens E1 and has a positive refracting power as a whole.

The image erecting means includes the prism P1 and the prism P. In the real image mode finder optical system of the second embodiment, the intermediate image formed by the objective optical system is interposed between the prism P1 and the prism P, and the field frame, such as that shown in FIG. 4, is provided in the proximity of its imaging position.

The magnification of the finder is changed in the range from the wide angle position to the telephoto position by fixing the fourth unit G4 and by moving the first unit G1, the second unit G2, and the third unit G3 along the optical axis.

Each of the first unit G1 the second unit G2, and the third unit G3 is constructed with a single lens. The entrance surface and the exit surface of the prism P1 have finite curvatures. The entrance surface and the exit surface of the prism P also have finite curvatures.

The prism P1 and the prism P are provided with reflecting surfaces along the optical path so that the optical axis is bent to obtain an erect image. For example, the prism P1 is provided with three reflecting surfaces (for bending the optical axis twice in the Y-Z plane and once in the X-Z plane in this order from the object side) and the prism P is provided with one reflecting surface (for bending the optical axis in the X-Z plane) to erect the image. Also, the arrangement of the reflecting surfaces is based on that of a Porro prism. Angles made with the optical axis bent by the reflecting surfaces are such that, for example, the angle of the optical axis bent by one reflecting surface of the prism P1 is smaller than 90 degrees and the angles of the optical axis bent by the remaining two reflecting surfaces are larger than 90 degrees, while the angle of the optical axis bent by the reflecting surface of the prism P is smaller than 90 degrees. The reflecting surfaces making angles smaller than 90 degrees are coated with metal films, such as silver and aluminum. The reflecting surfaces of angles larger than 90 degrees utilize total reflection. However, the angles of the optical axis bent by the reflecting surfaces are not limited to the above description. For example, the angle of the optical axis bent by the most field-frame-side reflecting surface of the prism P1 may be made smaller than 90 degrees so that this reflecting surface is coated with a metal film. Moreover, the angle of the optical axis bent by the reflecting surface of the prism P may also be made larger than 90 degrees so that this reflecting surface utilizes total reflection.

The positive lens E1 is constructed so that diopter adjustment can be made in accordance with an observer's diopter.

Also, aberration characteristics in the second embodiment are shown in FIGS. 10A–10D, 11A–11D, and 12A–12D.

Subsequently, numerical data of optical members constituting the real image mode finder optical system according to the second embodiment are shown below.

Numerical data 2

|  | Wide-angle position | Middle position | Telephoto position |
|---|---|---|---|
| m | 0.685 | 1.176 | 2.016 |
| ω (°) | 26.680 | 15.434 | 8.985 |
| f (mm) | 10.290 | 17.649 | 30.256 |
| Pupil dia. (mm) | 4.000 | | |

$r_1 = 37.0457$
  $d_1 = 1.0000$   $n_{d1} = 1.58423$   $v_{d1} = 30.49$
$r_2 = 9.2320$ (aspherical)
  $d_2 = D2$ (variable)
$r_3 = 9.5256$ (aspherical)
  $d_3 = 4.4760$   $d_{23} = 1.49241$   $v_{d3} = 57.66$
$r_4 = -22.0049$
  $d_4 = D4$ (variable)
$r_5 = -10.2911$
  $d_5 = 0.7000$   $n_{d5} = 1.58423$   $v_{d5} = 30.49$
$r_6 = 9.8912$ (aspherical)
  $d_6 = D6$ (variable)
$r_7 = 36.5176$
  $d_7 = 3.5263$   $n_{d7} = 1.52542$   $v_{d7} = 55.78$
$r_8 = -11.2570$ (aspherical)
  $d_8 = 0.5000$
$r_9 = 17.5358$
  $d_9 = 29.0967$   $n_{d9} = 1.52542$   $v_{d9} = 55.78$
$r_{10} = -218.6484$
  $d_{10} = 2.7527$
$r_{11} = \infty$ (field frame)
  $d_{11} = 2.9177$
$r_{12} = 19.1732$ (aspherical)
  $d_{12} = 17.0445$   $n_{d12} = 1.52542$   $v_{d12} = 55.78$
$r_{13} = -20.5269$
  $d_{13} = 1.4765$
$r_{14} = 39.9369$ (aspherical)
  $d_{14} = 3.4455$   $n_{d14} = 1.52542$   $v_{d14} = 55.78$
$r_{15} = -20.1555$ (aspherical)
  $d_{15} = 15.7651$
$r_{16} = \infty$ (eyepoint)
Aspherical coefficients -continued Numerical data 2

Second surface
$K = -1.3017$
$A_4 = 4.40512 \times 10^{-5}$   $A_6 = 1.04845 \times 10^{-6}$   $A_8 = -4.86973 \times 10^{-9}$
Third surface
$K = -0.1847$
$A_4 = -1.74316 \times 10^{-4}$   $A_6 = -2.38197 \times 10^{-7}$   $A_8 = -6.24988 \times 10^{-9}$
Sixth surface
$K = -0.0683$
$A_4 = -4.82178 \times 10^{-4}$   $A_6 = 3.96724 \times 10^{-6}$   $A_8 = -3.64804 \times 10^{-8}$
Eighth surface
$K = 0.1808$
$A_4 = 9.81681 \times 10^{-5}$   $A_6 = 8.46115 \times 10^{-7}$   $A_8 = 8.50642 \times 10^{-9}$
Twelfth surface
$K = 0.0000$
$A_4 = -5.68528 \times 10^{-4}$   $A_6 = -1.76882 \times 10^{-7}$
Fourteenth surface
$K = 0.0000$
$A_4 = -5.49243 \times 10^{-5}$   $A_6 = 1.22082 \times 10^{-6}$
Fifteenth surface
$K = 0.0000$
$A_4 = -2.37429 \times 10^{-5}$   $A_6 = 1.03731 \times 10^{-6}$
Zoom data

Figure 13A:
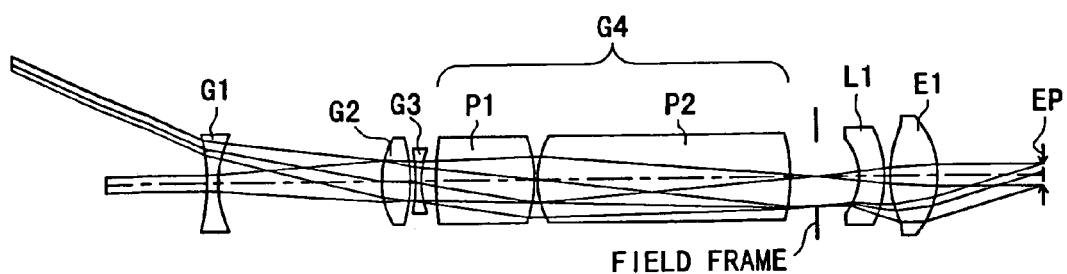
FIGS. 13A, 13B, and 13C are sectional views showing arrangements developed along the optical axis, at wide-angle, middle, and telephoto positions, respectively, of the real image mode finder optical system in a third embodiment.
Figure 13B:
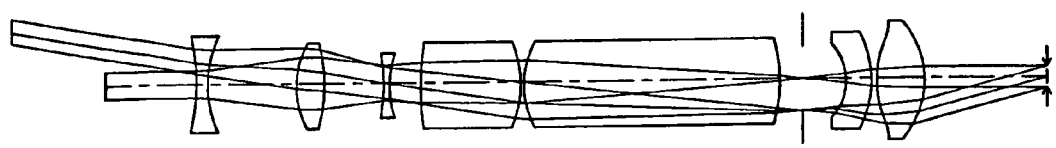
Figure 13C:
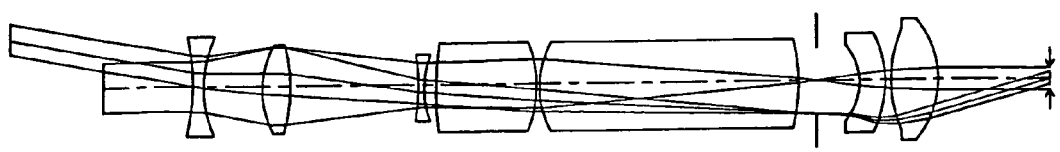
Figures 16C, 16D:
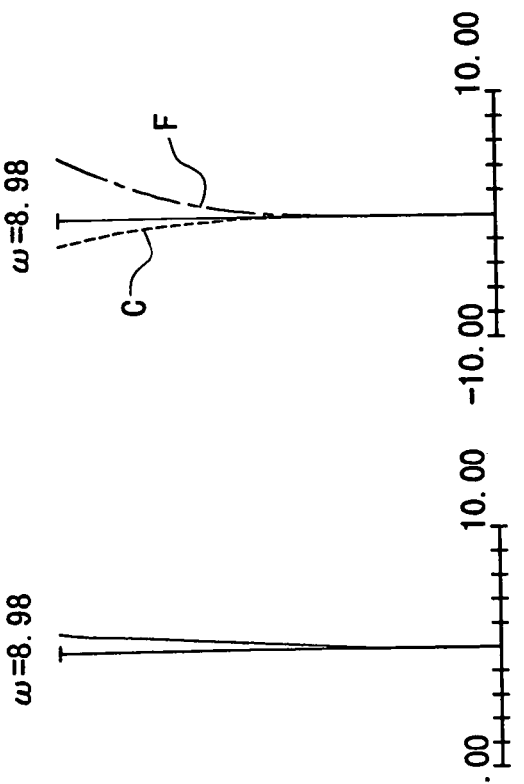
FIGS. 16A, 16B, 16C, and 16D are diagrams showing aberration characteristics at the telephoto position of the real image mode finder optical system in the third embodiment.
Figure 16B:
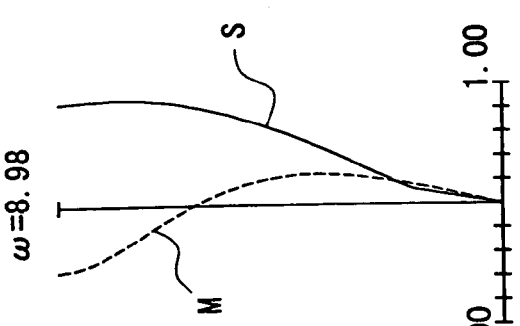
Figure 16A:
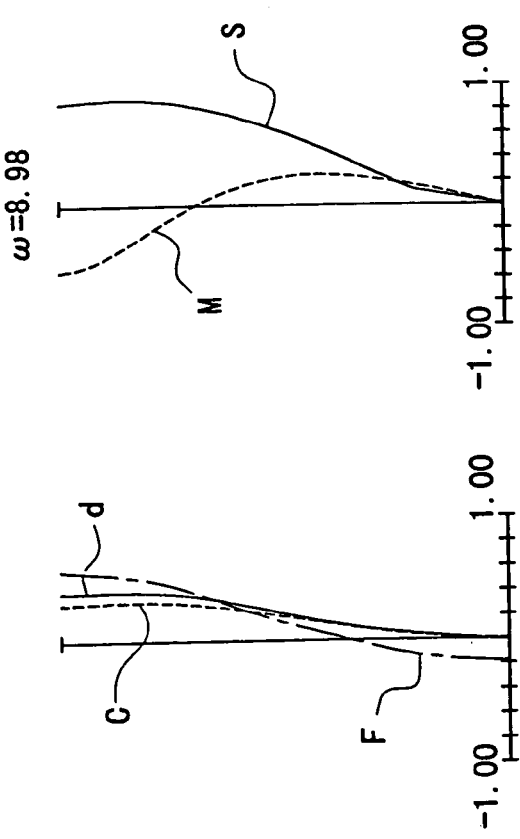

|  | Wide-angle position | Middle position | Telephoto position |
|---|---|---|---|
| D2 | 11.6070 | 8.0586 | 4.1006 |
| D4 | 1.1067 | 7.0086 | 13.2454 |
| D6 | 6.3793 | 4.0397 | 1.6737 | mh = 9.765 mm
Conditions (1), (7) mh/fe = 0.650
Conditions (2), (3) fe = 15.011 mm Third Embodiment In the real image mode finder optical system of this embodiment, as shown in FIGS. 13A–13C, the objective optical system includes, in order from the object side, the first unit G1 with a negative refracting power, the second unit G2 with a positive refracting power, the third unit G3 with a negative refracting power, and a fourth unit G4 with a positive refracting power, and has a positive refracting power as a whole.

The fourth unit G4 is constructed with two prisms P1 and P2. The eyepiece optical system is constructed with a negative lens L1 and the positive lens E1 and has a positive refracting power as a whole.

The image erecting means includes the prisms P1 and P2. In the real image mode finder optical system of the third embodiment, the intermediate image formed by the objective optical system is interposed between the prism P2 and the negative lens L1, and the field frame, such as that shown in FIG. 4, is placed in the proximity of its imaging position.

The magnification of the finder is changed in the range from the wide-angle position to the telephoto position by fixing the fourth unit G4 and by moving the first unit G1, the second unit G2, and the third unit G3 along the optical axis.

Each of the first unit G1, the second unit G2, and the third unit G3 is constructed with a single lens. The entrance surface and the exit surface of each of the prisms P1 and P2 have finite curvatures.

The prisms P1 and P2 are provided with reflecting surfaces along the optical path so that the optical axis is bent to obtain an erect image. For example, the prism P1 is provided with one reflecting surface (for bending the optical axis in the Y-Z plane) and the prism P2 is provided with three reflecting surfaces (for bending the optical axis once in the Y-Z plane and twice in the X-Z plane in this order from the object side) to erect the image. Also, the arrangement of the reflecting surfaces is based on that of a Porro prism. Angles made with the optical axis bent by the reflecting surfaces are such that, for example, the angle of the optical axis bent by the reflecting surface of the prism P1 is smaller than 90 degrees, while the angles of the optical axis bent by two reflecting surfaces of the prism P2 are larger than 90 degrees and the angle of the optical axis bent by the remaining one reflecting surface is smaller than 90 degrees. The reflecting surfaces making angles smaller than 90 degrees are coated with metal films, such as silver and aluminum. The reflecting surfaces of angles larger than 90 degrees utilize total reflection. The positive lens E1 is constructed so that diopter adjustment can be made in accordance with an observer's diopter.

Also, aberration characteristics in the third embodiment are shown in FIGS. 14A–14D, 15A–15D, and 16A–16D.

Subsequently, numerical data of optical members constituting the real image mode finder optical system according to the third embodiment are shown below.

Numerical data 3

|  | Wide-angle position | Middle position | Telephoto position |
|---|---|---|---|
| m | 0.692 | 1.181 | 2.018 |
| ω (°) | 26.656 | 15.374 | 8.976 |
| f (mm) | 10.375 | 17.709 | 30.248 |
| Pupil dia. (mm) | 4.000 | | |

$r_1 = -37.0118$
$d_1 = 1.6264$   $n_{d1} = 1.58423$   $v_{d1} = 30.49$
$r_2 = 15.0266$ (aspherical)
$d_2 = D2$ (variable)
$r_3 = 13.6624$ (aspherical)
$d_3 = 4.2776$   $n_{d3} = 1.49241$   $v_{d3} = 57.66$
$r_4 = -19.7350$
$d_4 = D4$ (variable)
$r_5 = -23.9768$
$d_5 = 0.6800$   $n_{d5} = 1.58423$   $v_{d5} = 30.49$
$r_6 = 15.4052$ (aspherical)
$d_6 = D6$ (variable)
$r_7 = 64.0979$
$d_7 = 14.4273$   $n_{d7} = 1.52542$   $v_{d7} = 55.78$
$r_8 = -16.0524$ (aspherical)
$d_8 = 0.5000$
$r_9 = 46.4363$
$d_9 = 39.5267$   $n_{d9} = 1.52542$   $v_{d9} = 55.78$
$r_{10} = -21.0120$
$d_{10} = 3.7943$
$r_{11} = \infty$ (field frame)
$d_{11} = 6.9095$
$r_{12} = -9.9877$ (aspherical)
$d_{12} = 3.6912$   $n_{d12} = 1.58423$   $v_{d12} = 30.49$
$r_{13} = -15.7572$
$d_{13} = 0.9421$
$r_{14} = 19.1293$ (aspherical)
$d_{14} = 7.8836$   $n_{d14} = 1.52542$   $v_{d14} = 55.78$
$r_{15} = -10.9574$ (aspherical)
$d_{15} = 15.7651$
$r_{16} = \infty$ (eyepoint)
Aspherical coefficients
Second surface $K = -1.3019$
$A_4 = -1.08535 \times 10^{-4}$   $A_6 = 1.48477 \times 10^{-6}$   $A_8 = -7.37060 \times 10^{-9}$ Numerical data 3

Third surface $K = -0.1784$
$A_4 = -1.38562 \times 10^{-4}$   $A_6 = 1.91486 \times 10^{-7}$   $A_8 = -9.59282 \times 10^{-10}$
Sixth surface $K = -0.0760$
$A_4 = -4.70450 \times 10^{-5}$   $A_6 = -2.11500 \times 10^{-6}$   $A_8 = 3.61544 \times 10^{-8}$
Eighth surface $K = 0.1930$
$A_4 = 4.06798 \times 10^{-5}$   $A_6 = -8.51164 \times 10^{-8}$   $A_8 = 3.41981 \times 10^{-9}$
Twelfth surface $K = 0.0000$
$A_4 = -4.97284 \times 10^{-4}$   $A_6 = -5.19125 \times 10^{-6}$
Fourteenth surface $K = 0.0000$
$A_4 = 1.11128 \times 10^{-4}$   $A_6 = -2.84749 \times 10^{-6}$
Fifteenth surface $K = 0.0000$
$A_4 = 1.70029 \times 10^{-4}$   $A_6 = -6.56818 \times 10^{-7}$
Zoom data

Figure 17A:
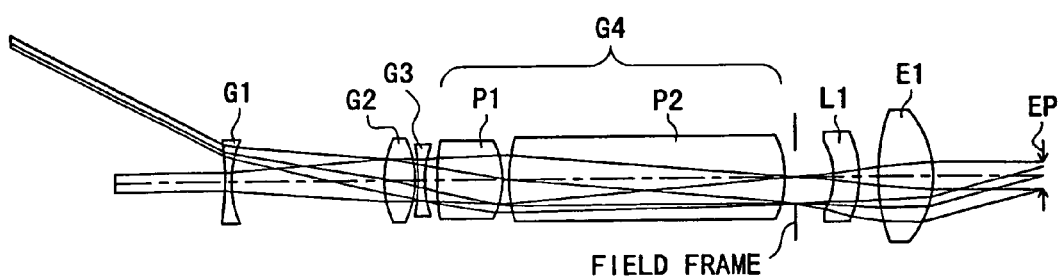
FIGS. 17A, 17B, and 17C are sectional views showing arrangements, developed along the optical axis, at wide-angle, middle, and telephoto positions, respectively, of the real image mode finder optical system in a fourth embodiment.
Figure 17B:
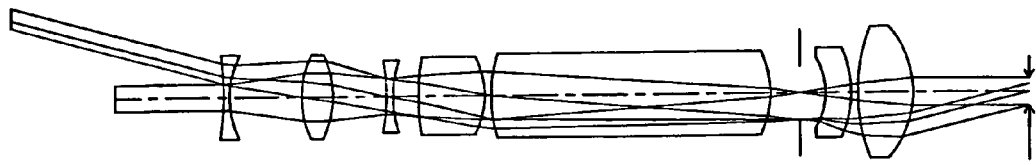
Figure 17C:
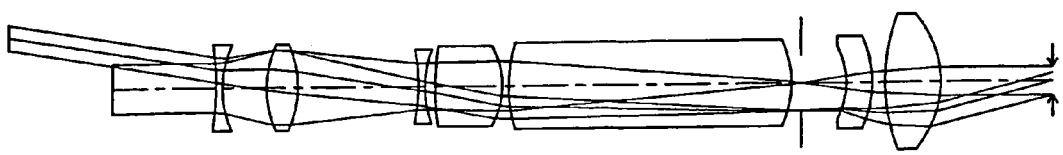

|  | Wide-angle position | Middle position | Telephoto position |
|---|---|---|---|
| D2 | 25.7084 | 12.8854 | 7.7602 |
| D4 | 1.0000 | 9.0863 | 19.8650 |
| D6 | 2.8644 | 5.0585 | 1.4948 | mh = 9.621 mm
Conditions (1), (7) mh/fe = 0.642
Conditions (2), (3) fe = 14.990 mm Fourth Embodiment In the real image mode finder optical system of this embodiment, as shown in FIGS. 17A–17C, the objective optical system includes, in order from the object side, the first unit G1 with a negative refracting power, the second unit G2 with a positive refracting power, the third unit G3 with a negative refracting power, and a fourth unit G4 with a positive refracting power, and has a positive refracting power as a whole.

The fourth unit G4 is constructed with two prisms P1 and P2. The eyepiece optical system is constructed with the negative lens L1 and the positive lens E1 and has a positive refracting power as a whole.

The image erecting means includes the prisms P1 and P2. In the real image mode finder optical system of the fourth embodiment, the intermediate image formed by the objective optical system is interposed between the prism P2 and the negative lens L1, and the field frame, such as that shown in FIG. 4, is placed in the proximity of its imaging position.

The magnification of the finder is changed in the range from the wide-angle position to the telephoto position by fixing the fourth unit G4 and by moving the first unit G1, the second unit G2, and the third unit G3 along the optical axis.

Each of the first unit G1, the second unit G2, and the third unit G3 is constructed with a single lens. The entrance surface and the exit surface of each of the prisms P1 and P2 have finite curvatures.

The prisms P1 and P2 are provided with reflecting surfaces along the optical path so that the optical axis is bent to obtain an erect image. For example, the prism P1 is provided with one reflecting surface (for bending the optical axis in the Y-Z plane) and the prism P2 is provided with three reflecting surfaces (for bending the optical axis once in the Y-Z plane and twice in the X-Z plane in this order from the object side) to erect the image. Also, the arrangement of the reflecting surfaces is based on that of a Porro prism. Angles made with the optical axis bent by the reflecting surfaces are such that, for example, the angle of the optical axis bent by the reflecting surface of the prism P1 is smaller than 90 degrees, while the angles of the optical axis bent by two reflecting surfaces of the prism P2 are larger than 90 degrees and the angle of the optical axis bent by the remaining one reflecting surface is smaller than 90 degrees. The reflecting surfaces making angles smaller than 90 degrees are coated with metal films, such as silver and aluminum. The reflecting surfaces of angles larger than 90 degrees utilize total reflection. The positive lens E1 is constructed so that diopter adjustment can be made in accordance with an observer's diopter.

Also, aberration characteristics in the fourth embodiment are shown in FIGS. 18A–18D, 19A–19D, and 20A–20D.

Subsequently, numerical data of optical members constituting the real image mode finder optical system according to the fourth embodiment are shown below.

Numerical data 4

|  | Wide-angle position | Middle position | Telephoto position |
|---|---|---|---|
| m | 0.574 | 0.980 | 1.680 |
| ω (°) | 26.946 | 15.541 | 9.003 |
| f (mm) | 8.612 | 14.706 | 25.218 |
| Pupil dia. (mm) | 4.000 | | |
| $r_1 = -27.7265$ | | | |
| $d_1 = 0.7033$ | | $n_{d1} = 1.58423$ | $v_{d1} = 30.49$ |
| $r_2 = 12.5528$ (aspherical) | | | |
| $d_2 = D2$ (variable) | | | |
| $r_3 = 11.3610$ (aspherical) | | | |
| $d_3 = 3.8444$ | | $n_{d3} = 1.49241$ | $v_{d3} = 57.66$ |
| $r_4 = = -15.8341$ | | | |
| $d_4 = D4$ (variable) | | | |
| $r_5 = 18.1098$ | | | |
| $d_5 = 0.7000$ | | $n_{d5} = 1.58423$ | $v_{d5} = 30.49$ |
| $r_6 = 11.6071$ (aspherical) | | | |
| $d_6 = D6$ (variable) | | | |
| $r_7 = 53.8289$ | | | |
| $d_7 = 12.8726$ | | $n_{d7} = 1.52542$ | $v_{d7} = 55.78$ |
| $r_8 = -14.5655$ (aspherical) | | | |
| $d_8 = 1.0000$ | | | |
| $r_9 = 23.4433$ | | | |
| $d_9 = 34.8807$ | | $n_{d9} = 1.52542$ | $v_{d9} = 55.78$ |
| $r_{10} = -28.7418$ | | | |
| $d_{10} = 1.4329$ | | | |
| $r_{11} = \infty$ (field frame) | | | |
| $d_{11} = 6.9526$ | | | |
| $r_{12} = -12.6182$ (aspherical) | | | |
| $d_{12} = 3.6221$ | | $n_{d12} = 1.58423$ | $v_{d12} = 30.49$ |
| $r_{13} = -15.2579$ | | | |
| $d_{13} = 31.1803$ | | | |
| $r_{14} = 24.0716$ (aspherical) | | | |
| $d_{14} = 8.3376$ | | $n_{d14} = 1.52542$ | $v_{d14} = 55.78$ |
| $r_{15} = -11.3348$ (aspherical) | | | |
| $d_{15} = 15.7651$ | | | |
| $r_{16} = \infty$ (eyepoint) | | | |

Aspherical coefficients
Second surface $K = -1.3022$
$A_4 = -2.00833 \times 10^{-4}$   $A_6 = 3.41784 \times 10^{-6}$   $A_8 = -1.63261 \times 10^{-8}$
Third surface $K = -0.1825$
$A_4 = -2.54261 \times 10^{-4}$   $A_6 = 5.60513 \times 10^{-7}$   $A_8 = -3.79136 \times 10^{-9}$ -continued Numerical data 4

Sixth surface $K = -0.0762$
$A_4 = -1.57743 \times 10^{-4}$   $A_6 = -3.09431 \times 10^{-6}$   $A_8 = 4.76542 \times 10^{-8}$
Eighth surface $K = 0.1928$
$A_4 = 4.63808 \times 10^{-5}$   $A_6 = -2.97595 \times 10^{-7}$   $A_8 = 8.60163 \times 10^{-9}$
Twelfth surface $K = 0.0000$
$A_4 = -6.08556 \times 10^{-4}$   $A_6 = -8.85765 \times 10^{-6}$
Fourteenth surface $K = 0.0000$
$A_4 = 1.52011 \times 10^{-4}$   $A_6 = -1.19503 \times 10^{-6}$
Fifteenth surface $K = 0.0000$
$A_4 = 1.06106 \times 10^{-4}$   $A_6 = 8.55846 \times 10^{-7}$
Zoom data

Figure 21A:
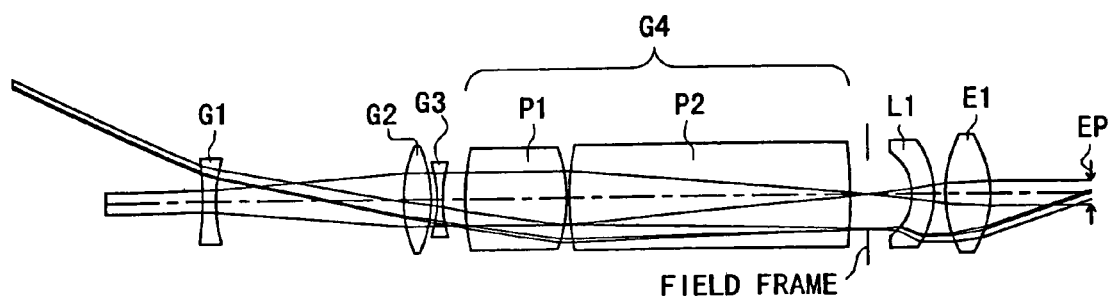
FIGS. 21A, 21B and 21C are sectional views showing arrangements, developed along the optical axis, at wide-angle, middle, and telephoto positions, respectively, of the real image mode finder optical system in a fifth embodiment.
Figure 21B:
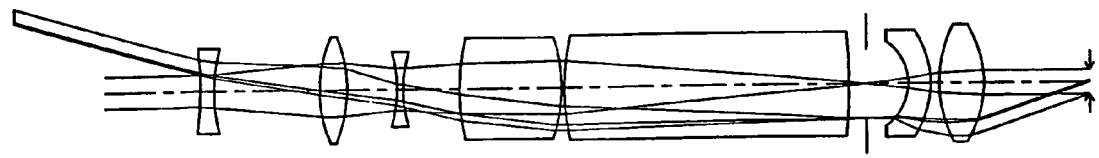
Figure 21C:
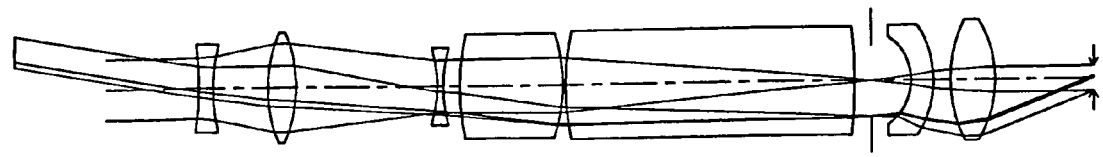
Figure 25A:
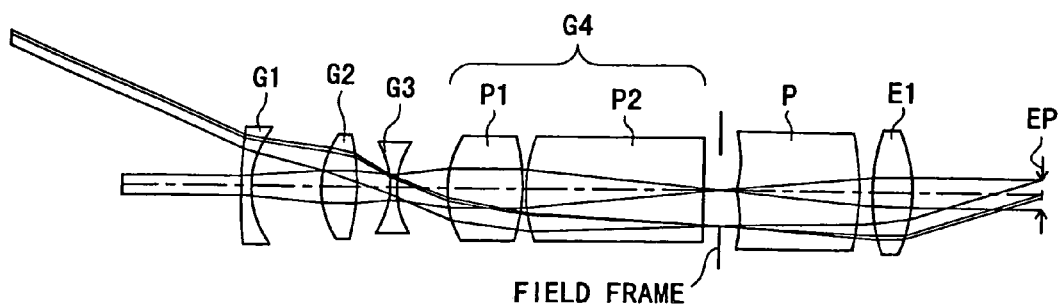
FIGS. 25A, 25B, 25C, and 25D are sectional views showing arrangements, developed along the optical axis, at wide-angle, middle, and telephoto positions and with respect to an eyepiece optical system, respectively, of the real image mode finder optical system in a sixth embodiment.
Figure 25B:
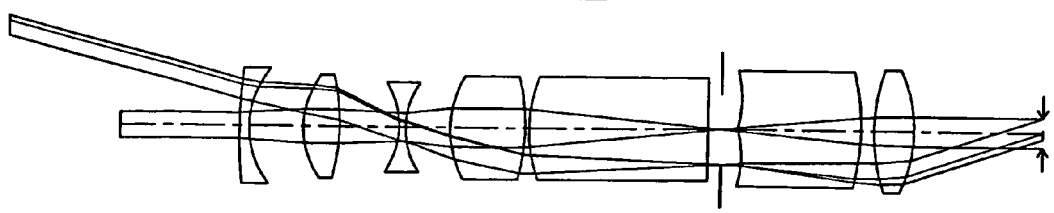
Figure 25C:
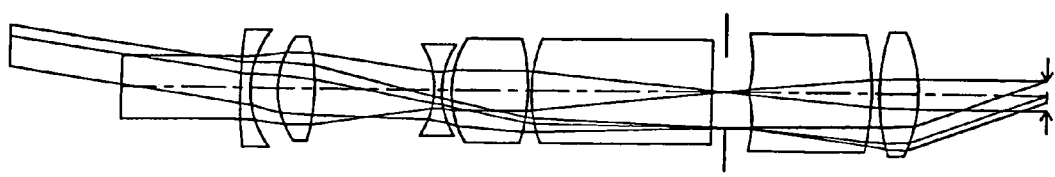
Figure 25D:
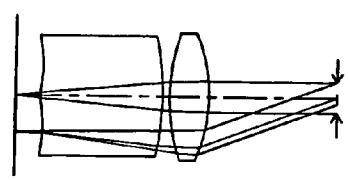
Figures 29A, 29B, 29C, 29D:
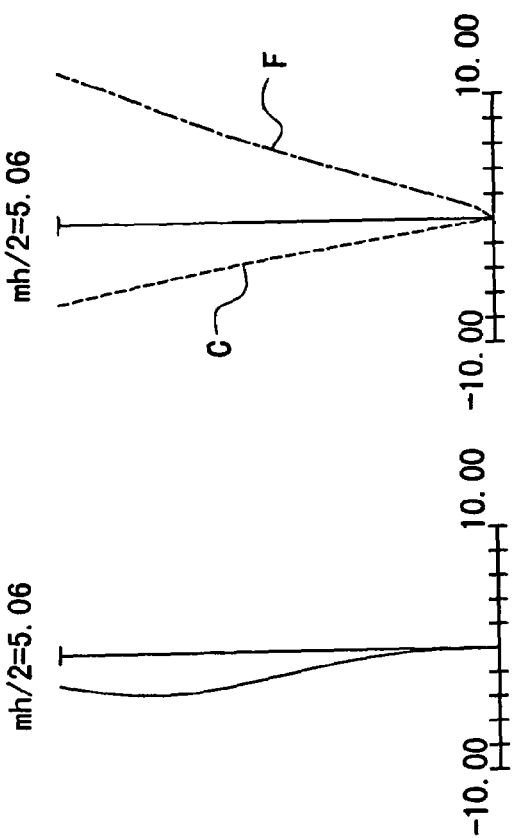
FIGS. 29A, 29B, 29C, and 29D are diagrams showing aberration characteristics of the eyepiece optical system of the real image mode finder optical system in the sixth embodiment.
Figure 30A:
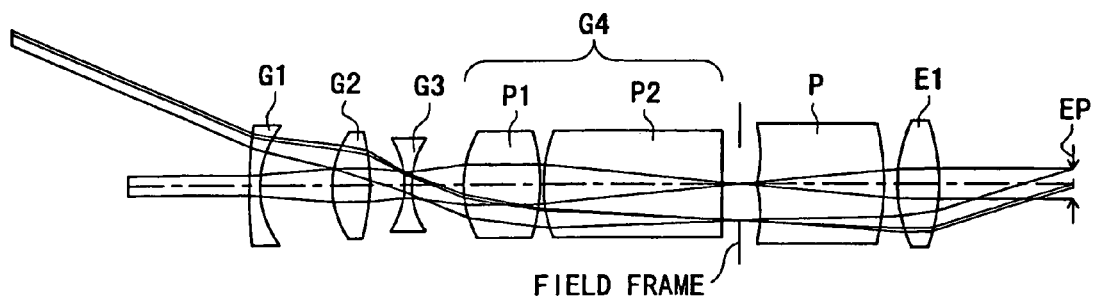
FIGS. 30A, 30B, 30C, and 30D are sectional views showing arrangements, developed along the optical axis, at wide-angle, middle, and telephoto positions and with respect to an eyepiece optical system, respectively, of the real image mode finder optical system in a seventh embodiment.
Figure 30B:
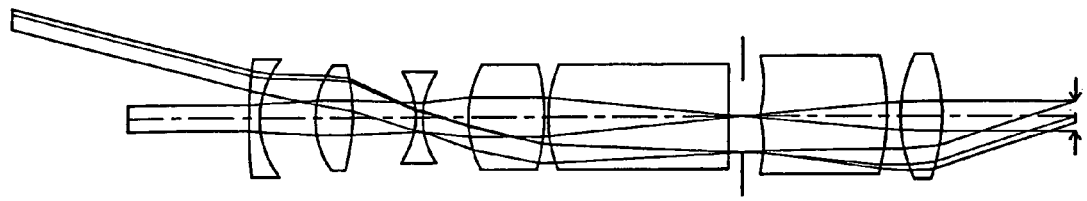
Figure 30C:
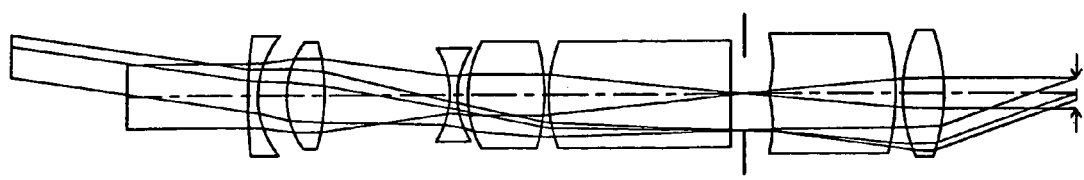
Figure 30D:
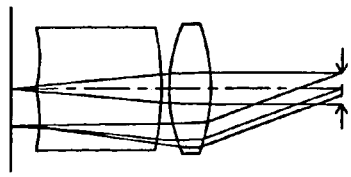
Figures 34A, 34B, 34C, 34D:
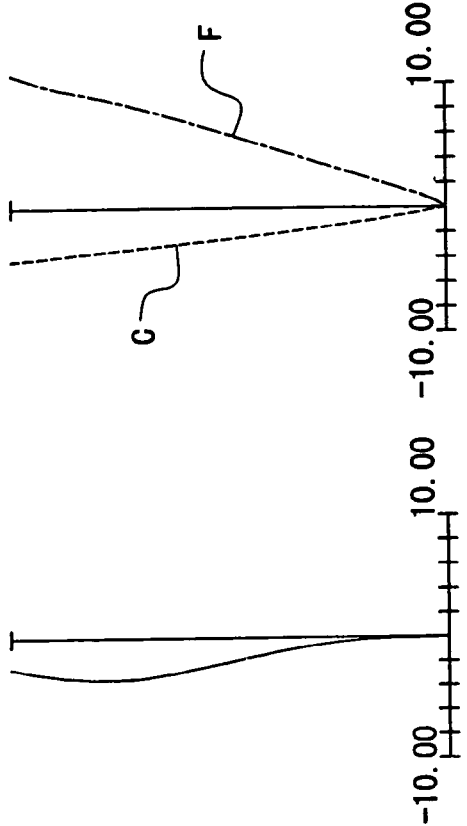
FIGS. 34A, 34B, 34C, and 34D are diagrams showing aberration characteristics of the eyepiece optical system of the real image mode finder optical system in the seventh embodiment.
Figure 35A:
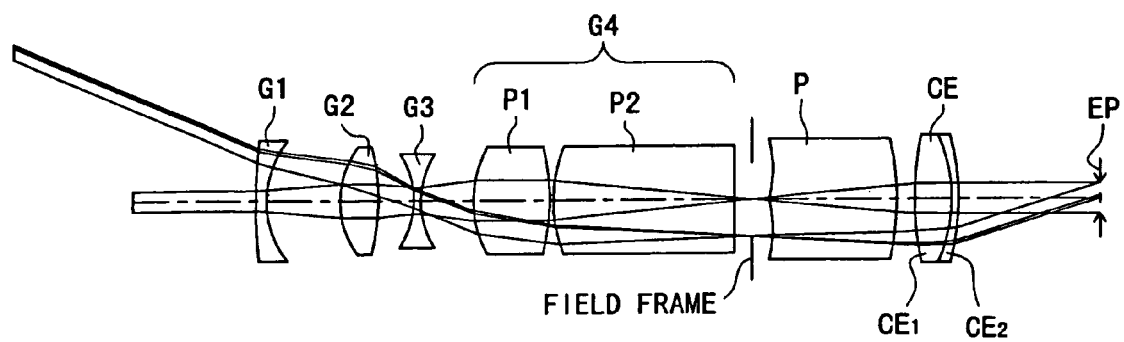
FIGS. 35A, 35B, 35C, and 35D are sectional views showing arrangements, developed along the optical axis, at wide-angle, middle, and telephoto positions and with respect to an eyepiece optical system, respectively, of the real image mode finder optical system in an eighth embodiment.
Figure 35B:
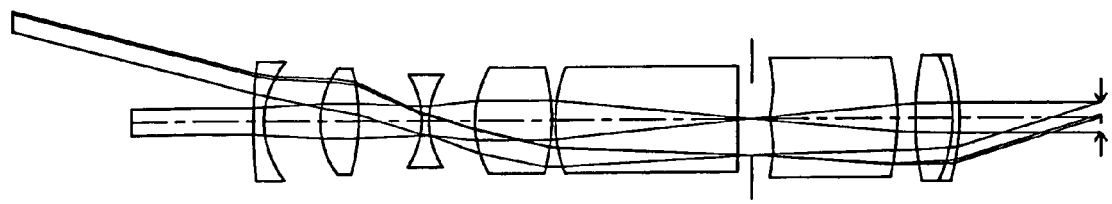
Figure 35C:
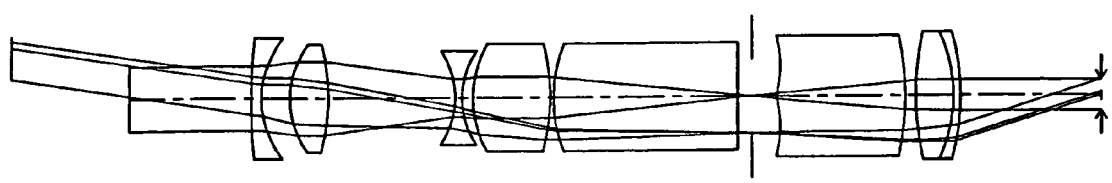
Figure 35D:
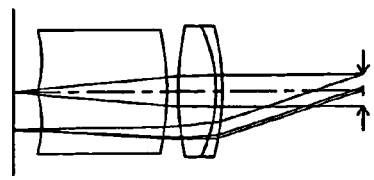
Figure 40A:
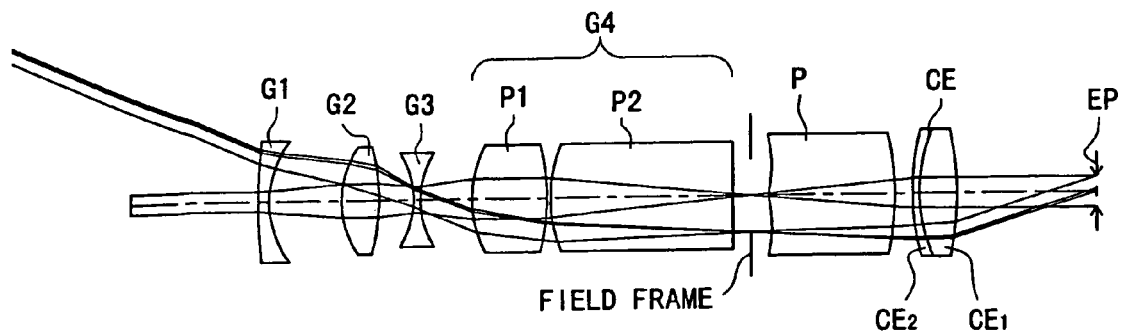
FIGS. 40A, 40B, 40C, and 40D are sectional views showing arrangements, developed along the optical axis, at wide-angle, middle, and telephoto positions and with respect to an eyepiece optical system, respectively, of the real image mode finder optical system in a ninth embodiment.
Figure 40B:
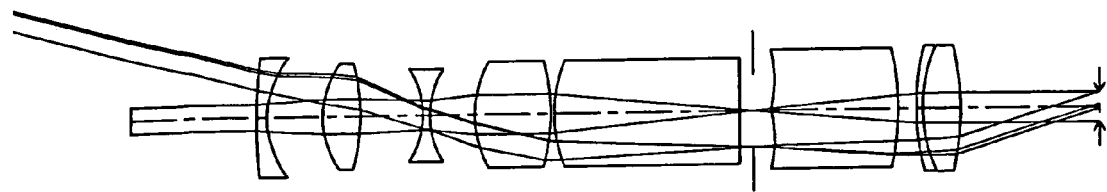
Figure 40C:
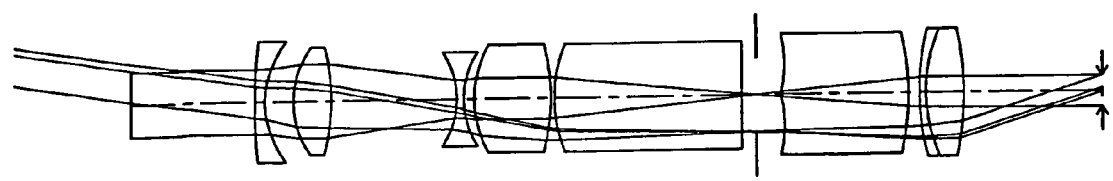
Figure 40D:
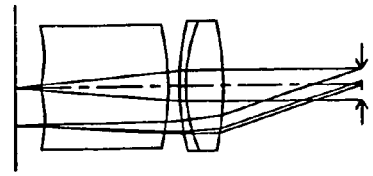
Figure 45A:
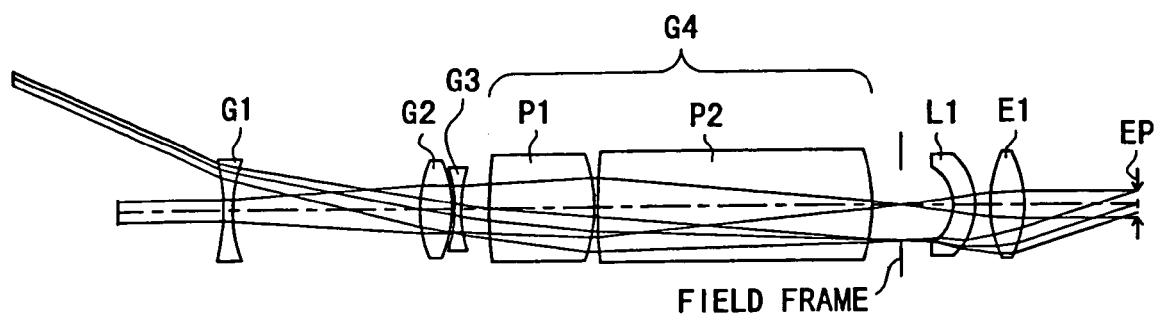
FIGS. 45A, 45B, 45C, and 45D are sectional views showing arrangements, developed along the optical axis, at wide-angle, middle, and telephoto positions and with respect to an eyepiece optical system, respectively, of the real image mode finder optical system in a tenth embodiment.
Figure 45B:
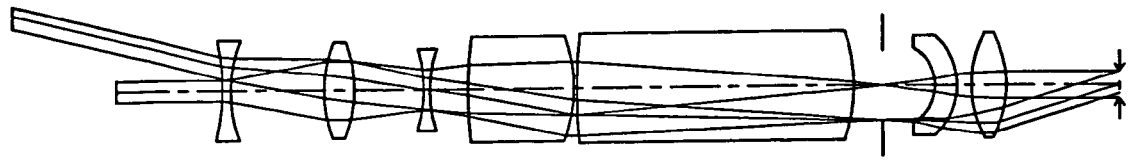
Figure 45C:
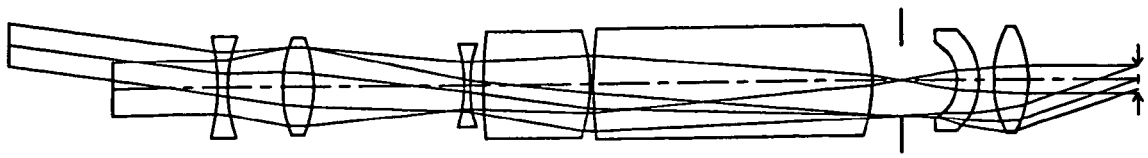
Figure 45D:
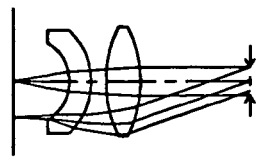
Figures 46A, 46B, 46C, 46D:
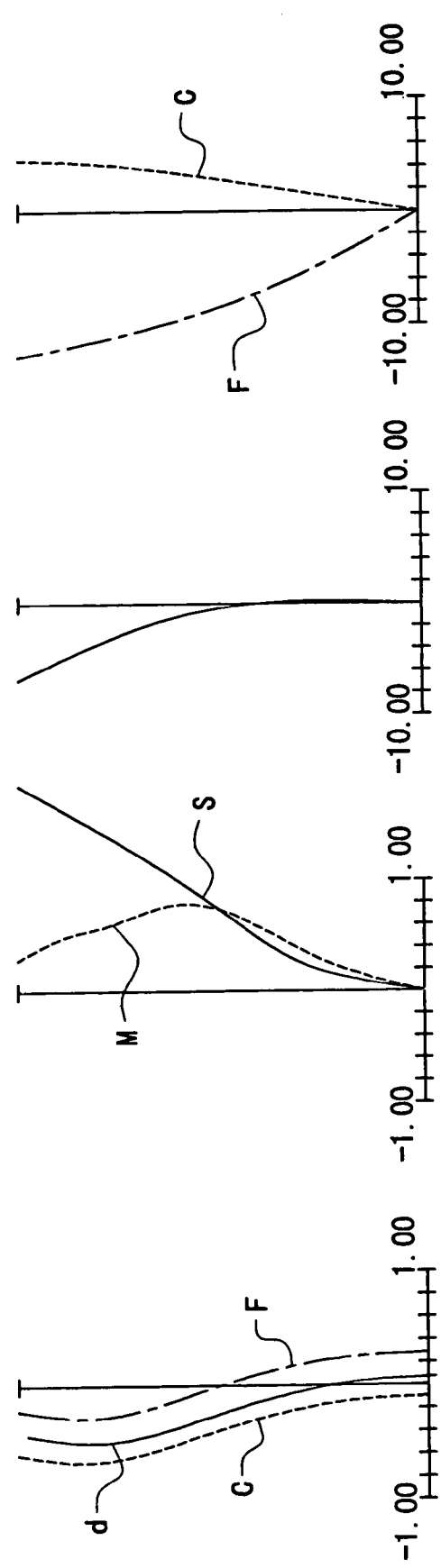
FIGS. 46A, 46B, 46C, and 46D are diagrams showing aberration characteristics at the wide-angle position of the real image mode finder optical system in the tenth embodiment.
Figure 50A:
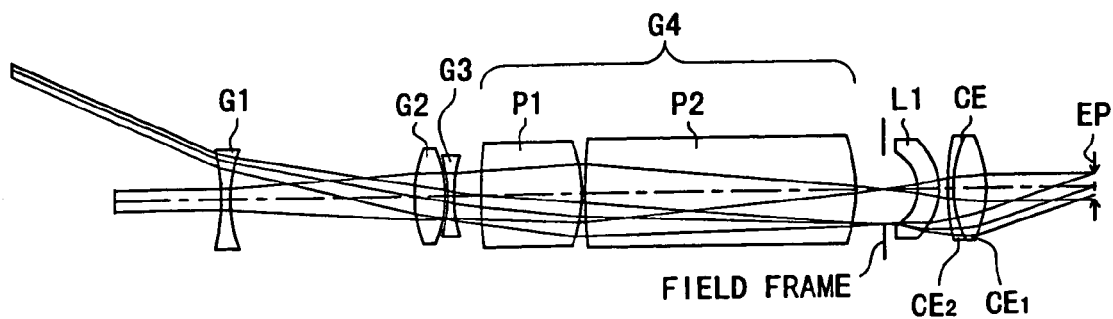
FIGS. 50A, 50B, 50C, and 50D are sectional views showing arrangements, developed along the optical axis, at wide-angle, middle, and telephoto positions and with respect to an eyepiece optical system, respectively, of the real image mode finder optical system in an eleventh embodiment.
Figure 50B:
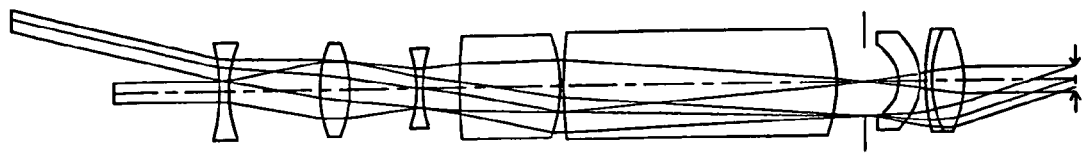
Figure 50C:
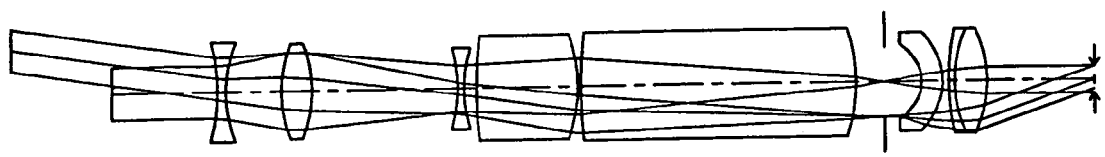
Figure 50D:
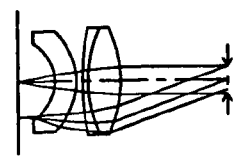

|  | Wide-angle position | Middle position | Telephoto position |
|---|---|---|---|
| D2 | 21.4497 | 10.4751 | 6.4304 |
| D4 | 1.0000 | 7.7777 | 16.8353 |
| D6 | 1.9906 | 3.8269 | 1.3800 | mh = 8.107 mm
Conditions (1), (7) mh/fe  = 0.540
Conditions (2), (3) fe  = 15.010 mm Fifth Embodiment In the real image mode finder optical system of this embodiment, as shown in FIGS. 21A–21C, the objective optical system includes, in order from the object side, the first unit G1 with a negative refracting power, the second unit G2 with a positive refracting power, the third unit G3 with a negative refracting power, and a fourth unit G4 with a positive refracting power, and has a positive refracting power as a whole.

The fourth unit G4 is constructed with two prisms P1 and P2. The eyepiece optical system is constructed with the negative lens L1 and the positive lens E1 and has a positive refracting power as a whole.

The image erecting means includes the prisms P1 and P2. In the real image mode finder optical system of the fifth embodiment, the intermediate image formed by the objective optical system is interposed between the prism P2 and the negative lens L1, and the field frame, such as that shown in FIG. 4, is placed in the proximity of its imaging position.

The magnification of the finder is changed in the range from the wide-angle position to the telephoto position by fixing the fourth unit G4 and by moving the first unit G1, the second unit G2, and the third unit G3 along the optical axis. Each of the first unit G1, the second unit G2, and the third unit G3 is constructed with a single lens. The entrance surface and the exit surface of each of the prisms P1 and P2 have finite curvatures.

The prisms P1 and P2 are provided with reflecting surfaces along the optical path so that the optical axis is bent to obtain an erect image. For example, the prism P1 is provided with one reflecting surface (for bending the optical axis in the Y-Z plane) and the prism P2 is provided with three reflecting surfaces (for bending the optical axis once in the Y-Z plane and twice in the X-Z plane in this order from the object side) to erect the image. Also, the arrangement of the reflecting surfaces is based on that of a Porro prism. Angles made with the optical axis bent by the reflecting surfaces are such that, for example, the angle of the optical axis bent by the reflecting surface of the prism P1 is smaller than 90 degrees, while the angles of the optical axis bent by two reflecting surfaces of the prism P2 are larger than 90 degrees and the angle of the optical axis bent by the remaining one reflecting surface is smaller than 90 degrees. The reflecting surfaces making angles smaller than 90 degrees are coated with metal films, such as silver and aluminum. The reflecting surfaces of angles larger than 90 degrees utilize total reflection. The positive lens E1 is constructed so that diopter adjustment can be made in accordance with an observer's diopter.

Also, aberration characteristics in the fifth embodiment are shown in FIGS. 22A–22D, 23A–23D, and 24A–24D.

Subsequently, numerical data of optical members constituting the real image mode finder optical system according to the fifth embodiment are shown below.

Numerical data 5

| | Wide-angle position | Middle position | Telephoto position |
|---|---|---|---|
| m | 0.873 | 1.293 | 2.418 |
| ω (°) | 24.751 | 16.220 | 8.611 |
| f (mm) | 13.110 | 19.409 | 36.290 |
| Pupil dia. (mm) | 4.000 | | |

$r_1 = -39.3543$
  $d_1 = 2.0000$   $n_{d1} = 1.58423$   $v_{d1} = 30.49$
$r_2 = 20.1886$ (aspherical)
  $d_2 = D2$ (variable)
$r_3 = 17.8228$ (aspherical)
  $d_3 = 4.5550$   $nd_3 = 1.49241$   $v_{d3} = 57.66$
$r_4 = -20.6969$
  $d_4 = D4$ (variable)
$r_5 = -26.5948$
  $d_5 = 0.9712$   $n_{d5} = 1.58423$   $v_{d5} = 30.49$
$r_6 = 21.3842$ (aspherical)
  $d_6 = D6$ (variable)
$r_7 = 49.7469$
  $d_7 = 16.0933$   $n_{d7} = 1.52542$   $v_{d7} = 55.78$
$r_8 = -23.8038$ (aspherical)
  $d_8 = 0.6446$
$r_9 = 38.3198$
  $d_9 = 43.7612$   $n_{d9} = 1.52542$   $v_{d9} = 55.78$
$r_{10} = -63.9202$
  $d_{10} = 2.7501$
$r_{11} = \infty$ (field frame)
  $d_{11} = 7.1509$
$r_{12} = -7.9810$ (aspherical)
  $d_{12} = 3.6432$   $n_{d12} = 1.58423$   $v_{d12} = 30.49$
$r_{13} = -11.3215$
  $d_{13} = 1.2765$
$r_{14} = 16.6904$ (aspherical)
  $d_{14} = 7.6344$   $n_{d14} = 1.52542$   $v_{d14} = 55.78$
$r_{15} = -13.2210$ (aspherical)
  $d_{15} = 15.7651$
$r_{16} = \infty$ (eyepoint)
Aspherical coefficients
Second surface $K = -1.3021$
$A_4 = -3.80325 \times 10^{-5}$   $A_6 = 5.97449 \times 10^{-7}$   $A_8 = -2.67271 \times 10^{-9}$
Third surface $K = -0.1774$
$A_4 = -7.61365 \times 10^{-5}$   $A_6 = 1.22273 \times 10^{-7}$   $A_8 = -3.41547 \times 10^{-10}$
Sixth surface $K = -0.0759$
$A_4 = -3.60399 \times 10^{-5}$   $A_6 = -1.18573 \times 10^{-7}$   $A_8 = 9.28811 \times 10^{-10}$ -continued Numerical data 5

Eighth surface $K = 0.1900$
$A_4 = 1.33964 \times 10^{-5}$   $A_6 = 5.39206 \times 10^{-8}$   $A_8 = -9.03386 \times 10^{-11}$
Twelfth surface $K = 0.0000$
$A_4 = -2.69230 \times 10^{-4}$   $A_6 = -2.03083 \times 10^{-6}$
Fourteenth surface $K = 0.0000$
$A_4 = 8.14903 \times 10^{-5}$   $A_6 = -1.34641 \times 10^{-6}$
Fifteenth surface $K = 0.0000$
$A_4 = 1.81061 \times 10^{-4}$   $A_6 = -6.24901 \times 10^{-7}$
Zoom data

| | Wide-angle position | Middle position | Telephoto position |
|---|---|---|---|
| D2 | 29.0804 | 15.7590 | 8.2552 |
| D4 | 1.0000 | 8.0891 | 22.1773 |
| D6 | 3.1755 | 8.1368 | 2.0110 | mh = 11.006 mm
Conditions (1), (7) mh/fe = 0.733
Conditions (2), (3) fe = 15.010 mm

Sixth Embodiment

The arrangement of this embodiment is similar to that of the first embodiment described with reference to FIGS. 1–4. FIGS. 25A–25D show the arrangement of the sixth embodiment. In this embodiment, low-dispersion glass is used for the positive lens E1 to suppress chromatic aberration of magnification produced in the eyepiece optical system.

Also, aberration characteristics in the sixth embodiment are shown in FIGS. 26A–26D, 27A–27D, 28A–28D, and 29A–29D.

Subsequently, numerical data of optical members constituting the real image mode finder optical system according to the sixth embodiment are shown below.

Numberical data 6

| | Wide-angle position | Middle position | Telephoto position |
|---|---|---|---|
| m | 0.743 | 1.016 | 2.072 |
| ω (°) | 23.854 | 17.511 | 8.739 |
| f (mm) | 11.156 | 15.252 | 31.104 |
| Pupil dia. (mm) | 4.000 | | |

$r_1 = 81.9112$
  $d_1 = 1.0000$   $n_{d1} = 1.58423$   $v_{d1} = 30.49$
$r_2 = 10.0742$ (aspherical)
  $d_2 = D2$ (variable)
$r_3 = 10.3535$ (aspherical)
  $d_3 = 4.3238$   $n_{d3} = 1.52542$   $v_{d3} = 55.78$
$r_4 = -20.9984$ (aspherical)
  $d_4 = D4$ (variable)
$r_5 = -10.0333$ (aspherical)
  $d_5 = 1.0000$   $n_{d5} = 1.58425$   $v_{d5} = 30.35$
$r_6 = 10.3333$ (aspherical)
  $d_6 = D6$ (variable)
$r_7 = 11.3130$
  $d_7 = 9.9000$   $n_{d7} = 1.52542$   $v_{d7} = 55.78$
$r_8 = -23.1581$ (aspherical)
  $d_8 = 0.5000$
$r_9 = 15.7417$ (aspherical)
  $d_9 = 22.5485$   $n_{d9} = 1.52542$   $v_{d9} = 55.78$ -continued Numberical data 6

$r_{10} = \infty$
$\quad d_{10} = 2.2615$
$r_{11} = \infty$ (field frame)
$\quad d_{11} = 2.5500$
$r_{12} = 15.2310$ (aspherical)
$\quad d_{12} = 15.5600 \quad n_{d12} = 1.52542 \quad \nu_{d12} = 55.78$
$r_{13} = -39.1300$
$\quad d_{13} = 1.7500$
$r_{14} = 24.5529$
$\quad d_{14} = 5.3200 \quad n_{d14} = 1.49700 \quad \nu_{d14} = 81.54$
$r_{15} = -15.8669$ (aspherical)
$\quad d_{15} = 17.0491$
$r_{16} = \infty$ (eyepoint)
Aspherical coefficients
Second surface $K = -1.2950$
$A_4 = 5.82582 \times 10^{-6} \quad A_6 = -2.91852 \times 10^{-7} \quad A_8 = 1.53866 \times 10^{-9}$
Third surface $K = -0.2618$
$A_4 = -8.99427 \times 10^{-5} \quad A_6 = -3.14079 \times 10^{-7} \quad A_8 = -8.23133 \times 10^{-9}$
Fourth surface $K = -0.0224$
$A_4 = 8.74333 \times 10^{-5} \quad A_6 = -3.77249 \times 10^{-7} \quad A_8 = -3.31925 \times 10^{-9}$
Fifth surface $K = 0.2138$
$A_4 = 6.11164 \times 10^{-4} \quad A_6 = -3.28266 \times 10^{-5} \quad A_8 = 7.55363 \times 10^{-7}$
Sixth surface $K = -0.0425$
$A_4 = 2.44411 \times 10^{-5} \quad A_6 = -2.80434 \times 10^{-5} \quad A_8 = 6.70880 \times 10^{-7}$
Eighth surface $K = 0.1564$
$A_4 = 2.36396 \times 10^{-4} \quad A_6 = -1.54507 \times 10^{-6} \quad A_8 = 3.28513 \times 10^{-8}$
Ninth surface $K = 0.0138$
$A_4 = 7.48388 \times 10^{-6} \quad A_6 -1.90449 \times 10^{-6}$
Twelfth surface $K = 0.0000$
$A_4 = -1.19998 \times 10^{-3} \quad A_6 = 1.07234 \times 10^{-5}$
Fifteenth surface $K = 0.0000$
$A_4 = 5.20019 \times 10^{-5} \quad A_6 = 1.50643 \times 10^{-7}$
Zoom data

| | Wide-angle position | Middle position | Telephoto position |
|---|---|---|---|
| D2 | 9.1623 | 7.1846 | 3.4243 |
| D4 | 4.9049 | 8.2975 | 16.2619 |
| D6 | 6.6190 | 5.2041 | 1.0000 | mh = 10.121 mm
Conditions (1), (7) mh/fe = 0.674
Condition (4) ν = 81.54
Conditions (2), (3) fe = 15.010 mm Seventh Embodiment In the real image mode finder optical system of this embodiment, as shown in FIGS. 30A–30D, the objective optical system includes, in order from the object side, a first unit G1 with a negative refracting power, a second unit G2 with a positive refracting power, a third unit G3 with a negative refracting power, and a fourth unit G4 with a positive refracting power, and has a positive refracting power as a whole.

The fourth unit G4 is constructed with two prisms P1 and P2. The eyepiece optical system is constructed with the prism P and the positive lens E1 and has a positive refracting power as a whole.

The image erecting means includes the prisms P1 and P2 and the prism P. In the real image mode finder optical system of the seventh embodiment, the intermediate image formed by the objective optical system is interposed between the prism P2 and the prism P, and the field frame, such as that shown in FIG. 4, is provided in the proximity of its imaging position.

The magnification of the finder is changed in the range from the wide-angle position to the telephoto position by fixing the first unit G1 and the fourth unit G4 and by moving the second unit G2 and the third unit G3 along the optical axis.

Each of the first unit G1, the second unit G2, and the third unit G3 is constructed with a single lens. The entrance surface and the exit surface of the prism P1 and the entrance surface of the prism P2 have finite curvatures, that is, are configured as lens surfaces. The entrance surface and the exit surface of the prism P also have finite curvatures.

The prisms P1 and P2 and the prism P, as in the first embodiment shown in FIGS. 1–3, are provided with the reflecting surfaces along the optical path so that the optical axis is bent to erect an image. For example, one reflecting surface provided in the prism P1 bends the optical axis in the Y-Z plane; two reflecting surfaces provided in the prism P2 bend the optical axis in the Y-Z plane and the X-Z plane in this order from the object side; and one reflecting surface provided in the prism P bends the optical axis in the X-Z plane. In this way, an erect image is obtained. Also, the arrangement of the reflecting surfaces is based on that of a Porro prism. Angles made with the optical axis bent by the reflecting surfaces are such that, for example, the angles of the optical axis bent by the reflecting surfaces of the prism P1 and the prism P are smaller than 90 degrees and the angles of the optical axis bent by the two reflecting surfaces of the prism P2 are larger than 90 degrees. The reflecting surfaces of the prism P1 and the prism P are coated with metal films, such as silver and aluminum. The two reflecting surfaces of the prism P2 utilize total reflection.

However, the ways of bending the optical axis through the prisms and the angles of the optical axis bent by the reflecting surfaces are not limited to the above description. For example, the angle of the optical axis bent by the most field-frame-side reflecting surface of the prism P2 may be made smaller than 90 degrees so that this reflecting surface is coated with a metal film. Moreover, the angle of the optical axis bent by the reflecting surface of the prism P may also be made larger than 90 degrees so that this reflecting surface utilizes total reflection.

The positive lens E1 is constructed so that diopter adjustment can be made in accordance with an observer's diopter.

Also, aberration characteristics in the seventh embodiment are shown in FIGS. 31A–31D, 32A–32D, 33A–33D, and 34A–34D.

Subsequently, numerical data of optical members constituting the real image mode finder optical system according to the seventh embodiment are shown below.

Numerical data 7

|  | Wide-angle position | Middle position | Telephoto position |
|---|---|---|---|
| m | 0.743 | 1.015 | 2.070 |
| ω (°) | 23.875 | 17.526 | 8.746 |
| f (mm) | 11.146 | 15.237 | 31.075 |
| Pupil dia. (mm) | 4.000 | | |

$r_1 = 81.9602$
　　$d_1 = 1.0000$　　$n_{d1} = 1.58423$　　$v_{d1} = 30.49$
$r_2 = 10.0611$ (aspherical)
　　$d_2 = D2$ (variable)
$r_3 = 10.3753$ (aspherical)
　　$d_3 = 4.3253$　　$n_{d3} = 1.52542$　　$v_{d3} = 55.78$
$r_4 = -20.8601$ (aspherical)
　　$d_4 = D4$ (variable)
$r_5 = -10.0315$ (aspherical)
　　$d_5 = 1.0000$　　$n_{d5} = 1.58425$　　$v_{d5} = 30.35$
$r_6 = 10.3315$ (aspherical)
　　$d_6 = D6$
$r_7 = 11.2984$
　　$d_7 = 9.9000$　　$n_{d7} = 1.52542$　　$v_{d7} = 55.78$
$r_8 = -23.0708$ (aspherical)
　　$d_8 = 0.5000$
$r_9 = 15.8095$ (aspherical)
　　$d_9 = 22.5530$　　$n_{d9} = 1.52542$　　$v_{d9} = 55.78$
$r_{10} = \infty$
　　$d_{10} = 2.2570$
$r_{11} = \infty$ (field frame)
　　$d_{11} = 2.5500$
$r_{12} = 15.4188$ (aspherical)
　　$d_{12} = 15.5600$　　$n_{d12} = 1.52542$　　$v_{d12} = 55.78$
$r_{13} = -37.3902$
　　$d_{13} = 1.7500$
$r_{14} = 20.4078$
　　$d_{14} = 5.3200$　　$n_{d14} = 1.43389$　　$v_{d14} = 95.15$
$r_{15} = -14.4726$ (aspherical)
　　$d_{15} = 17.0491$
$r_{16} = \infty$ (eyepoint)

Aspherical coefficients
Second surface $K = -1.2949$
$A_4 = 6.66017 \times 10^{-6}$　　$A_6 = -2.62591 \times 10^{-7}$　　$A_8 = 1.12121 \times 10^{-9}$ Third surface $K = -0.2625$
$A_4 = -7.97190 \times 10^{-5}$　　$A_6 = -6.29748 \times 10^{-7}$　　$A_8 = -1.17464 \times 10^{-9}$ Fourth surface $K = -0.0226$
$A_4 = 9.61346 \times 10^{-5}$　　$A_6 = -6.24988 \times 10^{-7}$　　$A_8 = -2.63996 \times 10^{-9}$ Fifth surface $K = 0.2132$
$A_4 = 6.22361 \times 10^{-4}$　　$A_6 = -3.35122 \times 10^{-5}$　　$A_8 = 7.43683 \times 10^{-7}$ Sixth surface $K = -0.0427$
$A_4 = 3.84712 \times 10^{-5}$　　$A_6 = -2.91300 \times 10^{-5}$　　$A_8 = 6.92795 \times 10^{-7}$ Eighth surface $K = 0.1561$
$A_4 = 2.24263 \times 10^{-4}$　　$A_6 = -1.03011 \times 10^{-6}$　　$A_8 = 3.32247 \times 10^{-8}$ Ninth surface $K = 0.0135$
$A_4 = -5.19982 \times 10^{-6}$　　$A_6 = -1.46612 \times 10^{-6}$ Twelfth surface $K = 0.0000$
$A_4 = -1.19998 \times 10^{-3}$　　$A_6 = 1.07234 \times 10^{-5}$ -continued Numerical data 7

Fifteenth surface $K = 0.0000$
$A_4 = 7.35154 \times 10^{-5}$　　$A_6 = 2.26014 \times 10^{-7}$ Zoom data

|  | Wide-angle position | Middle position | Telephoto position |
|---|---|---|---|
| D2 | 9.1683 | 7.1925 | 3.4339 |
| D4 | 4.8993 | 8.2891 | 16.2507 |
| D6 | 6.6171 | 5.2031 | 1.0000 | mh = 10.133 mm
Conditions (1), (7) mh/fe = 0.675
Condition (4) ν = 95.15
Conditions (2), (3) fe = 15.010 mm Eighth Embodiment In the real image mode finder optical system of this embodiment, as shown in FIGS. 35A–35D, the objective optical system includes, in order from the object side, a first unit G1 with a negative refracting power, a second unit G2 with a positive refracting power, a third unit G3 with a negative refracting power, and a fourth unit G4 with a positive refracting power, and has a positive refracting power as a whole.

The fourth unit G4 is constructed with two prisms P1 and P2. The eyepiece optical system is constructed, with a cemented lens component CE comprised of a positive lens element CE1 and a negative lens element CE2 and has a positive refracting power as a whole.

The image erecting means includes the prisms P1 and P2 and the prism P. In the real image mode finder optical system of the eighth embodiment, the intermediate image formed by the objective optical system is interposed between the prism P2 and the prism P, and the field frame, such as that shown in FIG. 4, is provided in the proximity of its imaging position.

The magnification of the finder is changed in the range from the wide-angle position to the telephoto position by fixing the first unit G1 and the fourth unit G4 and by moving the second unit G2 and the third unit G3 along the optical axis.

Each of the first unit G1, the second unit G2, and the third unit G3 is constructed with a single lens. The entrance surface and the exit surface of the prism P1 and the entrance surface of the prism P2 have finite curvatures. The entrance surface and the exit surface of the prism P also have finite curvatures.

The prisms P1 and P2 and the prism P are provided with the reflecting surfaces along the optical path so that the optical axis is bent to erect an image. For example, the prism P1 is provided with one reflecting surface (for bending the optical axis in the Y-Z plane), the prism P2 is provided with two reflecting surfaces (for bending the optical axis in the Y-Z plane and the X-Z plane), and the prism P is provided with one reflecting surface (for bending the optical axis in the X-Z plane) to erect the image. Also, the arrangement of the reflecting surfaces is based on that of a Porro prism. Angles made with the optical axis bent by the reflecting surfaces are such that, for example, the angles of the optical axis bent by the reflecting surfaces of the prism P1 and the prism P are smaller than 90 degrees and the angles of the optical axis bent by the two reflecting surfaces of the prism P2 are larger than 90 degrees. The reflecting surfaces of the prism P1 and the prism P are coated with metal films, such as silver and aluminum. The two reflecting surfaces of the prism P2 utilize total reflection.

However, the ways of bending the optical axis through the prisms and the angles of the optical axis bent by the reflecting surfaces are not limited to the above description. For example, the angle of the optical axis bent by the most field-frame-side reflecting surface of the prism P2 may be made smaller than 90 degrees so that this reflecting surface is coated with a metal film. Moreover, the angle of the optical axis bent by the reflecting surface of the prism P may also be made larger than 90 degrees so that this reflecting surface utilizes total reflection.

The cemented lens component CE is constructed so that diopter adjustment can be made in accordance with an observer's diopter.

In the eighth embodiment, the cemented lens component CE including, in order from the object side, the positive lens element and the negative lens element is used to suppress the chromatic aberration of magnification produced in the eyepiece optical system.

Also, aberration characteristics in the eighth embodiment are shown in FIGS. 36A–36D, 37A–37D, 38A–38D, and 39A–39D.

Subsequently, numerical data of optical members constituting the real image mode finder optical system according to the eighth embodiment are shown below.

Numerical data 8

|  | Wide-angle position | Middle position | Telephoto position |
|---|---|---|---|
| m | 0.743 | 1.020 | 2.076 |
| ω (°) | 23.954 | 17.549 | 8.727 |
| f (mm) | 11.160 | 15.304 | 31.158 |
| Pupil dia. (mm) | 4.000 | | |

$r_1 = 75.9203$
 $d_1 = 1.0000$    $n_{d1} = 1.58423$    $\nu_{d1} = 30.49$
$r_2 = 10.0850$ (aspherical)
 $d_2 = D2$ (variable)
$r_3 = 10.2485$ (aspherical)
 $d_3 = 4.2776$    $n_{d3} = 1.52542$    $\nu_{d3} = 55.78$
$r_4 = -21.9093$
 $d_4 = D4$ (variable)
$r_5 = -10.0501$ (aspherical)
 $d_5 = 1.0000$    $n_{d5} = 1.58425$    $\nu_{d5} = 30.35$
$r_6 = 10.3501$ (aspherical)
 $d_6 = D6$ (variable)
$r_7 = 11.5799$
 $d_7 = 9.9000$    $n_{d7} = 1.52542$    $\nu_{d7} = 55.78$
$r_8 = -21.8697$ (aspherical)
 $d_8 = 0.5000$
$r_9 = 15.8360$ (aspherical)
 $d_9 = 22.6385$    $n_{d9} = 1.52542$    $\nu_{d9} = 55.78$
$r_{10} = \infty$
 $d_{10} = 2.1715$
$r_{11} = \infty$ (field frame)
 $d_{11} = 2.5500$
$r_{12} = 18.8734$ (aspherical)
 $d_{12} = 15.5600$    $n_{d12} = 1.52542$    $\nu_{d12} = 55.78$
$r_{13} = -20.0934$
 $d_{13} = 1.7500$
$r_{14} = 36.0448$
 $d_{14} = 5.3393$    $n_{d14} = 1.52542$    $\nu_{d14} = 55.78$
$r_{15} = -13.2074$
 $d_{15} = 1.0000$    $n_{d15} = 1.58423$    $\nu_{d15} = 30.49$
$r_{16} = -18.5585$ (aspherical)
 $d_{16} = 17.0491$
$r_{17} = \infty$ (eyepoint)

Numerical data 8 -continued

Aspherical coefficients
Second surface $K = -1.2950$
$A_4 = -2.88906 \times 10^{-5}$   $A_6 = 1.81910 \times 10^{-7}$   $A_8 = -1.52765 \times 10^{-9}$
Third surface $K = -0.2463$
$A_4 = -1.12182 \times 10^{-4}$   $A_6 = -6.22353 \times 10^{-7}$   $A_8 = 2.82153 \times 10^{-9}$
Fourth surface $K = -0.0226$
$A_4 = 8.40588 \times 10^{-5}$   $A_6 = -7.72274 \times 10^{-7}$   $A_8 = 6.21797 \times 10^{-9}$
Fifth surface $K = 0.2122$
$A_4 = 1.04005 \times 10^{-3}$   $A_6 = -6.22976 \times 10^{-5}$   $A_8 = 1.48889 \times 10^{-6}$
Sixth surface $K = -0.0428$
$A_4 = 4.20510 \times 10^{-4}$   $A_6 = -5.35363 \times 10^{-5}$   $A_8 = 1.24406 \times 10^{-6}$
Eighth surface $K = 0.1561$
$A_4 = 2.78620 \times 10^{-4}$   $A_6 = -1.75114 \times 10^{-6}$   $A_8 = 1.84964 \times 10^{-8}$
Ninth surface $K = 0.0138$
$A_4 = 7.75842 \times 10^{-5}$   $A_6 = -2.54066 \times 10^{-6}$
Twelfth surface $K = 0.0000$
$A_4 = -1.19998 \times 10^{-3}$   $A_6 = 1.07234 \times 10^{-5}$
Sixteenth surface $K = 0.0000$
$A_4 = 1.54561 \times 10^{-5}$   $A_6 = 6.06156 \times 10^{-8}$ Zoom data

|  | Wide-angle position | Middle position | Telephoto position |
|---|---|---|---|
| D2 | 9.1388 | 7.1293 | 3.3607 |
| D4 | 4.9642 | 8.4021 | 16.3723 |
| D6 | 6.6307 | 5.2010 | 0.9994 | mh = 10.095 mm
Conditions (1), (7) mh/fe = 0.673
Conditions (2), (3) fe = 15.010 mm
Conditions (5), (6) νp − νn = 25.29

Ninth Embodiment

In the real image mode finder optical system of this embodiment, as shown in FIGS. 40A–40D, the objective optical system includes, in order from the object side, a first unit G1 with a negative refracting power, a second unit G2 with a positive refracting power, a third unit G3 with a negative refracting power, and a fourth unit G4 with a positive refracting power, and has a positive refracting power as a whole.

The fourth unit G4 is constructed with two prisms P1 and P2. The eyepiece optical system is constructed with the cemented lens component CE comprised of the positive lens element CE1 and the negative lens element CE2 and has a positive refracting power as a whole.

The image erecting means includes the prisms P1 and P2 and the prism P. In the real image mode finder optical system of the ninth embodiment, the intermediate image formed by the objective optical system is interposed between the prism P2 and the prism P, and the field frame, such as that shown in FIG. 4, is provided in the proximity of its imaging position.

The magnification of the finder is changed in the range from the wide-angle position to the telephoto position by fixing the first unit G1 and the fourth unit G4 and by moving the second unit G2 and the third unit G3 along the optical axis.

Each of the first unit G1, the second unit G2, and the third unit G3 is constructed with a single lens. The entrance surface and the exit surface of the prism P1 and the entrance surface of the prism P2 have finite curvatures. The entrance surface and the exit surface of the prism P also have finite curvatures.

The prisms P1 and P2 and the prism P are provided with the reflecting surfaces along the optical path so that the optical axis is bent to erect an image. For example, the prism P1 is provided with one reflecting surface (for bending the optical axis in the Y-Z plane), the prism P2 is provided with two reflecting surfaces (for bending the optical axis in the Y-Z plane and the X-Z plane), and the prism P is provided with one reflecting surface (for bending the optical axis in the X-Z plane) to erect the image. Also, the arrangement of the reflecting surfaces is based on that of a Porro prism. Angles made with the optical axis bent by the reflecting surfaces are such that, for example, the angles of the optical axis bent by the reflecting surfaces of the prism P1 and the prism P are smaller than 90 degrees and the angles of the optical axis bent by the two reflecting surfaces of the prism P2 are larger than 90 degrees. The reflecting surfaces of the prism P1 and the prism P are coated with metal films, such as silver and aluminum. The two reflecting surfaces of the prism P2 utilize total-reflection.

However, the ways of bending the optical axis through the prisms and the angles of the optical axis bent by the reflecting surfaces are not limited to the above description. For example, the angle of the optical axis bent by the most field-frame-side reflecting surface of the prism P2 may be made smaller than 90 degrees so that this reflecting surface is coated with a metal film. Moreover, the angle of the optical axis bent by the reflecting surface of the prism P may also be made larger than 90 degrees so that this reflecting surface utilizes total reflection.

The cemented lens component CE is constructed so that diopter adjustment can be made in accordance with an observer's diopter.

In the ninth embodiment, the cemented lens component CE including, in order from the object side, the positive lens element and the negative lens element is used to suppress the chromatic aberration of magnification produced in the eyepiece optical system.

Also, aberration characteristics in the ninth embodiment are shown in FIGS. 41A–41D, 42A–42D, 43A–43D, and 44A–44D.

Subsequently, numerical data of optical members constituting the real image mode finder optical system according to the ninth embodiment are shown below.

Numerical data 9

|  | Wide-angle position | Middle position | Telephoto position |
|---|---|---|---|
| m | 0.745 | 1.019 | 2.078 |
| ω (°) | 23.864 | 17.523 | 8.748 |
| f (mm) | 11.179 | 15.288 | 31.185 |
| Pupil dia. (mm) | 4.000 | | |

$r_1 = 83.1968$
 $d_1 = 1.0000$  $n_{d1} = 1.58423$  $v_{d1} = 30.49$

Numerical data 9 (-continued)

$r_2 = 10.0574$ (aspherical)
 $d_2 = D2$ (variable)
$r_3 = 10.4051$ (aspherical)
 $d_3 = 4.3247$  $n_{d3} = 1.52542$  $v_{d3} = 55.78$
$r_4 = -20.6708$ (aspherical)
 $d_4 = D4$ (variable)
$r_5 = -10.0283$ (aspherical)
 $d_5 = 1.0000$  $n_{d5} = 1.58425$  $v_{d5} = 30.35$
$r_6 = 10.3283$ (aspherical)
 $d_6 = D6$ (variable)
$r_7 = 11.0837$
 $d_7 = 9.9000$  $n_{d7} = 1.52542$  $v_{d7} = 55.78$
$r_8 = -23.2992$ (aspherical)
 $d_8 = 0.5000$
$r_9 = 16.1348$ (aspherical)
 $d_9 = 22.5851$  $n_{d9} = 1.52542$  $v_{d9} = 55.78$
$r_{10} = \infty$
 $d_{10} = 2.2249$
$r_{11} = \infty$ (field frame)
 $d_{11} = 2.5500$
$r_{12} = 15.1194$ (aspherical)
 $d_{12} = 15.5600$  $n_{d12} = 1.52542$  $v_{d12} = 55.78$
$r_{13} = -32.9857$
 $d_{13} = 1.7500$
$r_{14} = 22.3114$
 $d_{14} = 1.0000$  $n_{d14} = 1.58423$  $v_{d14} = 30.49$
$r_{15} = 13.0456$
 $d_{15} = 5.4129$  $n_{d15} = 1.52542$  $v_{d15} = 55.78$
$r_{16} = -18.6581$ (aspherical)
 $d_{16} = 17.0491$
$r_{17} = \infty$ (eyepiece)
Aspherical coefficients
Second surface $K = -1.2945$
$A_4 = 9.89743 \times 10^{-6}$  $A_6 = -4.30715 \times 10^{-7}$  $A_8 = 2.58833 \times 10^{-9}$
Third surface $K = -0.2627$
$A_4 = -6.69210 \times 10^{-5}$  $A_6 = -9.19006 \times 10^{-7}$  $A_8 = 6.64337 \times 10^{-10}$
Fourth surface $K = -0.0228$
$A_4 = 1.06273 \times 10^{-4}$  $A_6 = -8.28362 \times 10^{-7}$  $A_8 = 3.85729 \times 10^{-9}$
Fifth surface $K = 0.2133$
$A_4 = 6.06366 \times 10^{-4}$  $A_6 = -2.97302 \times 10^{-5}$  $A_8 = 5.98935 \times 10^{-7}$
Sixth surface $K = -0.0427$
$A_4 = 4.82034 \times 10^{-5}$  $A_6 = -2.89969 \times 10^{-5}$  $A_8 = 6.72146 \times 10^{-7}$
Eighth surface $K = 0.1560$
$A_4 = 2.50445 \times 10^{-4}$  $A_6 = -1.47471 \times 10^{-6}$  $A_8 = 4.11057 \times 10^{-8}$
Ninth surface $K = 0.0136$
$A_4 = 5.39717 \times 10^{-6}$  $A_6 = -1.68771 \times 10^{-6}$
Twelfth surface $K = 0.0000$
$A_4 = -1.19998 \times 10^{-3}$  $A_6 = 1.07234 \times 10^{-5}$
Sixteenth surface $K = 0.0000$
$A_4 = 3.44659 \times 10^{-5}$  $A_6 = 1.08095 \times 10^{-7}$ -continued Numerical data 9

Zoom data

|  | Wide-angle position | Middle position | Telephoto position |
|---|---|---|---|
| D2 | 9.1868 | 7.2088 | 3.4518 |
| D4 | 4.8856 | 8.2783 | 16.2383 |
| D6 | 6.6129 | 5.1982 | 0.9952 | mh = 10.217 mm
Conditions (1), (7) mh/fe = 0.681
Conditions (2), (3) fe = 15.006 mm
Conditions (5), (6) νp − νn = 25.29

Tenth Embodiment

In the real image mode finder optical system of this embodiment, as shown in FIGS. 45A–45D, the objective optical system includes, in order from the object side, the first unit G1 with a negative refracting power, the second unit G2 with a positive refracting power, the third unit G3 with a negative refracting power, and a fourth unit G4 with a positive refracting power, and has a positive refracting power as a whole.

The fourth unit G4 is constructed with two prisms P1 and P2. The eyepiece optical system is constructed with the negative lens L1 and the positive lens E1 and has a positive refracting power as a whole.

The image erecting means includes the prisms P1 and P2. In the real image mode finder optical system of the tenth embodiment, the intermediate image formed by the objective optical system is interposed between the prism P2 and the negative lens L1, and the field frame, such as that shown in FIG. 4, is placed in the proximity of its imaging position.

The magnification of the finder is changed in the range from the wide-angle position to the telephoto position by fixing the fourth unit G4 and by moving the first unit G1, the second unit G2, and the third unit G3 along the optical axis.

Each of the first unit G1, the second unit G2, and the third unit G3 is constructed with a single lens. The entrance surface and the exit surface of each of the prisms P1 and P2 have finite curvatures.

The prisms P1 and P2 are provided with reflecting surfaces along the optical path so that the optical axis is bent to obtain an erect image. For example, the prism P1 is provided with one reflecting surface (for bending the optical axis in the Y-Z plane) and the prism P2 is provided with three reflecting surfaces (for bending the optical axis once in the Y-Z plane and twice in the X-Z plane in this order from the object side) to erect the image. Also, the arrangement of the reflecting surfaces is based on that of a Porro prism. Angles made with the optical axis bent by the reflecting surfaces are such that, for example, the angle of the optical axis bent by the reflecting surface of the prism P1 is smaller than 90 degrees, while the angles of the optical axis bent by two reflecting surfaces of the prism P2 are larger than 90 degrees and the angle of the optical axis bent by the remaining one reflecting surface is smaller than 90 degrees. The reflecting surfaces making angles smaller than 90 degrees are coated with metal films, such as silver and aluminum. The reflecting surfaces of angles larger than 90 degrees utilize total reflection. The positive lens E1 is constructed so that diopter adjustment can be made in accordance with an observer's diopter.

In the tenth embodiment, low-dispersion glass is used for the positive lens E1 to suppress chromatic aberration of magnification produced in the eyepiece optical system.

Also, aberration characteristics in the tenth embodiment are shown in FIGS. 46A–46D, 47A–47D, 48A–48D, and 49A–49D.

Subsequently, numerical data of optical members constituting the real image mode finder optical system according to the tenth embodiment are shown below.

Numerical data 10

|  | Wide-angle position | Middle position | Telephoto position |
|---|---|---|---|
| m | 0.686 | 1.177 | 2.019 |
| ω (°) | 26.700 | 15.294 | 8.889 |
| f (mm) | 10.290 | 17.650 | 30.261 |
| Pupil dia. (mm) | 4.000 | | |

$r_1 = -35.4073$
  $d_1 = 1.3547$   $n_{d1} = 1.58423$   $\nu_{d1} = 30.49$
$r_2 = 15.7324$ (aspherical)
  $d_2 = D2$ (variable)
$r_3 = 14.1173$ (aspherical)
  $d_3 = 4.2036$   $n_{d3} = 1.49241$   $\nu_{d3} = 57.66$
$r_4 = -19.7136$
  $d_4 = D4$ (variable)
$r_5 = -21.3268$
  $d_5 = 1.0000$   $n_{d5} = 1.58423$   $\nu_{d5} = 30.49$
$r_6 = 15.4585$ (aspherical)
  $r_6 = D6$ (variable)
$r_7 = 47.9547$
  $d_7 = 14.7087$   $n_{d7} = 1.52542$   $\nu_{d7} = 55.78$
$r_8 -16.9222$ (aspherical)
  $d_8 = 0.5000$
$r_9 = 40.5011$
  $d_9 = 39.7256$   $n_{d9} 1.52542$   $\nu_{d9} = 55.78$
$r_{10} = -22.4670$
  $d_{10} = 4.0295$
$r_{11} = \infty$ field frame)
  $d_{11} = 7.6484$
$r_{12} = -6.8411$ (aspherical)
  $d_{12} = 3.0616$   $n_{d12} = 1.58423$   $\nu_{d12} = 30.49$
$r_{13} = -9.5101$
  $d_{13} = 1.9354$
$r_{14} = 16.4813$
  $d_{14} = 5.2395$   $n_{d14} = 1.49700$   $\nu_{d14} = 81.54$
$r_{15} = -12.4181$ (aspherical)
  $d_{15} = 15.7651$
$r_{16} = \infty$ (eyepoint)

Aspherical coefficients
Second surface $K = -1.3019$
$A_4 = -1.03082 \times 10^{-4}$   $A_6 = 1.18309 \times 10^{-6}$   $A_8 = -3.69689 \times 10^{-9}$
Third surface $K = -0.1784$
$A_4 = -1.31901 \times 10^{-4}$   $A_6 = 1.62576 \times 10^{-7}$   $A_8 = -5.25998 \times 10^{-10}$
Sixth surface $K = -0.0760$
$A_4 = -7.29856 \times 10^{-5}$   $A_6 = -1.57784 \times 10^{-6}$   $A_8 = 2.85950 \times 10^{-8}$
Eighth surface $K = 0.1940$
$A_4 = 3.47928 \times 10^{-5}$   $A_6 = 5.46298 \times 10^{-8}$   $A_8 = 1.40140 \times 10^{-9}$
Twelfth surface $K = 0.0000$
$A_4 = -2.29965 \times 10^{-4}$   $A_6 = -5.49255 \times 10^{-6}$
Fifteenth surface $K = 0.0000$
$A_4 = 1.23613 \times 10^{-4}$   $A_6 = 7.32239 \times 10^{-7}$ -continued Numerical data 10

Zoom data

| | Wide-angle position | Middle position | Telephoto position |
|---|---|---|---|
| D2 | 25.8585 | 12.8666 | 7.9000 |
| D4 | 1.0000 | 9.3310 | 20.3050 |
| D6 | 3.2733 | 5.0026 | 1.7063 | mh = 9.539 mm
Conditions (1), (7) mh/fe = 0.636
Condition (4) ν = 81.54
Conditions (2), (3) fe = 14.990 mm

Eleventh Embodiment

In the real image mode finder optical system of this embodiment, as shown in FIGS. 50A–50D, the objective optical system includes, in order from the object side, the first unit G1 with a negative refracting power, the second unit 62 with a positive refracting power, the third unit 63 with a negative refracting power, and a fourth unit 64 with a positive refracting power, and has a positive refracting power as a whole.

The fourth unit 64 is constructed with two prisms P1 and P2. The eyepiece optical system is constructed with the negative lens L1 and the cemented lens component CE comprised of the negative lens element CE2 and the positive lens element CE1, and has a positive refracting power as a whole.

The image erecting means includes the prisms P1 and P2. In the real image mode finder optical system of the eleventh embodiment, the intermediate image formed by the objective optical system is interposed between the prism P2 and the negative lens L1, and the field frame, such as that shown in FIG. 4, is placed in the proximity of its imaging position.

The magnification of the finder is changed in the range from the wide-angle position to the telephoto position by fixing the fourth unit 64 and by moving the first unit G1, the second unit G2, and the third unit G3 along the optical axis.

Each of the first unit G1, the second unit G2, and the third unit G3 is constructed with a single lens. The entrance surface and the exit surface of each of the prisms P1 and P2 have finite curvatures.

The prisms P1 and P2 are provided with reflecting surfaces along the optical path so that the optical axis is bent to obtain an erect image. For example, the prism P1 is provided with one reflecting surface (for bending the optical axis in the Y-Z plane) and the prism P2 is provided with three reflecting surfaces (for bending the optical axis once in the Y-Z plane and twice in the X-Z plane in this order from the object side) to erect the image. Also, the arrangement of the reflecting surfaces is based on that of a Porro prism. Angles made with the optical axis bent by the reflecting surfaces are such that, for example, the angle of the optical axis bent by the reflecting surface of the prism P1 is smaller than 90 degrees, while the angles of the optical axis bent by two reflecting surfaces of the prism P2 are larger than 90 degrees and the angle of the optical axis bent by the remaining one reflecting surface is smaller than 90 degrees. The reflecting surfaces making angles smaller than 90 degrees are coated with metal films, such as silver and aluminum. The reflecting surfaces of angles larger than 90 degrees utilize total reflection. The cemented lens component CE is constructed so that diopter adjustment can be made in accordance with an observer's diopter.

In the eleventh embodiment, the cemented lens component CE including, in order from the object side, the negative lens element and the positive lens element is used to suppress the chromatic aberration of magnification produced in the eyepiece optical system.

Also, aberration characteristics in the eleventh embodiment are shown in FIGS. 51A–51D, 52A–52D, 53A–53D, and 54–54D.

Subsequently, numerical data of optical members constituting the real image mode finder optical system according to the eleventh embodiment are shown below.

Numerical data 11

| | Wide-angle position | Middle position | Telephoto position |
|---|---|---|---|
| m | 0.685 | 1.175 | 2.016 |
| ω (°) | 26.509 | 15.216 | 8.803 |
| f (mm) | 10.289 | 17.629 | 30.259 |
| Pupil dia. (mm) | 4.000 | | |

$r_1 = -31.2936$
  $d_1 = 1.3442$    $n_{d1} = 1.58423$    $\nu_{d1} = 30.49$
$r_2 = 16.8814$ (aspherical)
  $d_2 = D2$ (variable)
$r_3 = 14.1167$ (aspherical)
  $d_3 = 4.5120$    $n_{d3} = 1.49241$    $\nu_{d3} = 57.66$
$r_4 = -20.4840$
  $d_4 = D4$ (variable)
$r_5 = -20.2406$
  $d_5 = 0.9963$    $n_{d5} = 1.58423$    $\nu_{d5} = 30.49$
$r_6 = 14.9676$ (aspherical)
  $d_6 = D6$ (variable)
$r_7 = 41.4899$
  $d_7 = 14.6927$    $n_{d7} = 1.52542$    $\nu_{d7} = 55.78$
$r_8 = -17.9428$ (aspherical)
  $d_8 = 0.5000$
$r_9 = 34.5533$
  $d_9 = 39.7402$    $n_{d9} = 1.52542$    $\nu_{d9} = 55.78$
$r_{10} = -28.4392$
  $d_{10} = 4.5510$
$r_{11} = \infty$ (field frame)
  $d_{11} = 7.9719$
$r_{12} = -9.6322$ (aspherical)
  $d_{12} = 3.1829$    $n_{d12} = 1.58423$    $\nu_{d12} = 30.49$
$r_{13} = -10.6815$
  $d_{13} = 1.6105$
$r_{14} = 19.4893$
  $d_{14} = 1.0000$    $n_{d14} = 1.58423$    $\nu_{d14} = 30.49$
$r_{15} = 13.6490$
  $d_{15} = 5.4672$    $n_{d15} = 1.49241$    $\nu_{d15} = 57.66$
$r_{16} = -12.4053$ (aspherical)
  $d_{16} = 15.7651$
$r_{17} = \infty$ (eyepoint)
Aspherical coefficients
Second surface $K = -1.3018$
$A_4 = -1.08269 \times 10^{-4}$    $A_6 = 9.30175 \times 10^{-7}$    $A_8 = -1.42679 \times 10^{-9}$
Third surface $K = -0.1791$
$A_4 = -1.31719 \times 10^{-4}$    $A_6 = 1.67274 \times 10^{-7}$    $A_8 = -6.28754 \times 10^{-10}$
Sixth surface $K = -0.0761$
$A_4 = -1.10385 \times 10^{-4}$    $A_6 = -3.75495 \times 10^{-7}$    $A_8 = 2.90075 \times 10^{-9}$
Eighth surface $K = 0.1945$
$A_4 = 3.40022 \times 10^{-5}$    $A_6 = -8.32444 \times 10^{-8}$    $A_8 = 2.90545 \times 10^{-9}$ -continued

Numerical data 11

Twelfth surface

K = 0.0000
$A_4 = -2.80853 \times 10^{-4}$  $A_6 = -6.97108 \times 10^{-6}$
Sixteenth surface K = 0.0000
$A_4 = 3.07353 \times 10^{-5}$  $A_6 = 9.18614 \times 10^{-7}$ Zoom data

| | Wide-angle position | Middle position | Telephoto position |
|---|---|---|---|
| D2 | 25.8073 | 13.2103 | 8.2556 |
| D4 | 0.9957 | 9.3832 | 20.5408 |
| D6 | 3.5101 | 4.5817 | 1.6440 | mh = 9.486 mm
Conditions (1), (7) mh/fe = 0.632
Conditions (2), (3) fe = 15.010 mm
Conditions (5), (6) $\upsilon p - \upsilon n$ = 27.17

Twelfth Embodiment

Figure 55A:
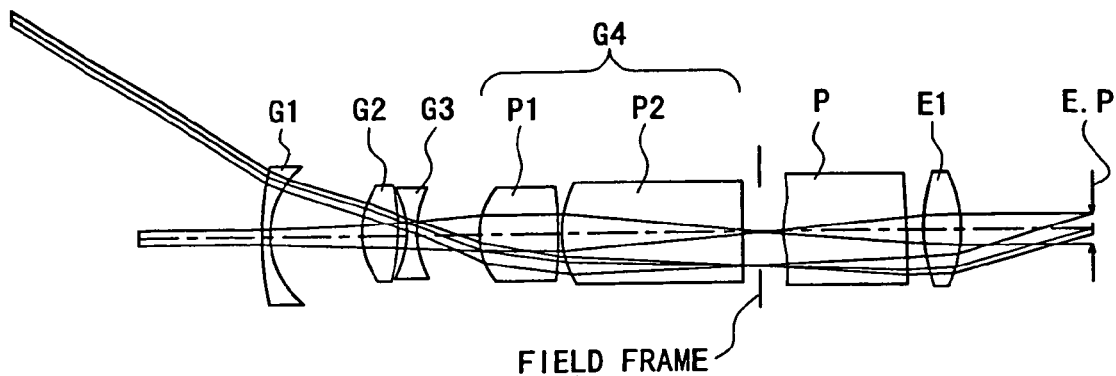
FIGS. 55A, 55B, and 55C are sectional views showing arrangements, developed along the optical axis, at wide-angle, middle, and telephoto positions, respectively, of the real image mode finder optical system in a twelfth embodiment.
Figure 55B:
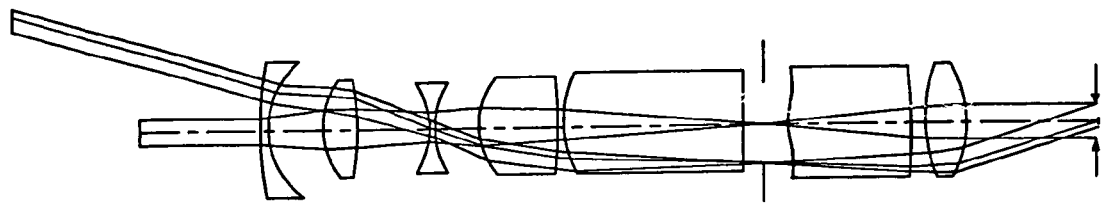
Figure 55C:
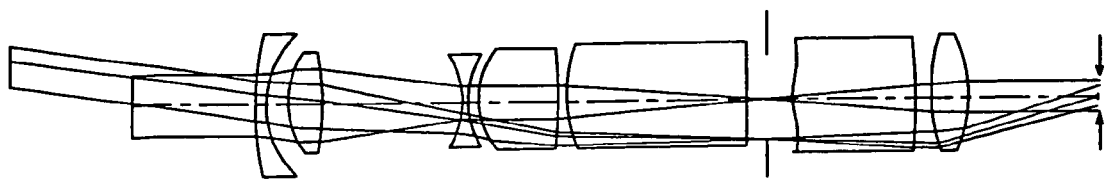

The real image mode finder optical system of this embodiment, as shown in FIGS. 55A–55C, has nearly the same arrangement as that of the first embodiment with the exception of lens data.

Subsequently, numerical data of optical members constituting the real image mode finder optical system according to the twelfth embodiment are shown below.

Numerical data 12

| | Wide-angle position | Middle position | Telephoto position |
|---|---|---|---|
| m | 0.530 | 1.007 | 2.050 |
| ω (°) | 33.694 | 17.618 | 8.796 |
| f (mm) | 8.482 | 16.100 | 32.782 |
| Pupil dia. (mm) | 4.000 | | |

$r_1$ = 52.6894
  $d_1$ = 1.0000  $n_{d1}$ = 1.58423  $\upsilon_{d1}$ = 30.49
$r_2$ = 9.9227 (aspherical)
  $d_2$ = D2 (variable)
$r_3$ = 10.2741 (aspherical)
  $d_3$ = 4.2589  $n_{d3}$ = 1.52542  $\upsilon_{d3}$ = 55.78
$r_4$ = −23.8681 (aspherical)
  $d_4$ = D4 (variable)
$r_5$ = −10.3480 (aspherical)
  $d_5$ = 1.0000  $n_{d5}$ = 1.58425  $\upsilon_{d5}$ = 30.35
$r_6$ = 10.6480 (aspherical)
  $d_6$ = D6 (variable)
$r_7$ = 11.1372
  $d_7$ = 9.9000  $n_{d7}$ = 1.52542  $\upsilon_{d7}$ = 55.78
$r_8$ = −26.1339 (aspherical)
  $d_8$ = 0.5000
$r_9$ = 15.5869 (aspherical)
  $d_9$ = 22.3572  $n_{d9}$ = 1.52542  $\upsilon_{d9}$ = 55.78
$r_{10}$ = ∞
  $d_{10}$ = 2.4528
$r_{11}$ = ∞ (field frame)
  $d_{11}$ = 3.0665
$r_{12}$ = 15.8132 (aspherical)
  $d_{12}$ = 15.9408  $n_{d12}$ = 1.52542  $\upsilon_{d12}$ = 55.78
$r_{13}$ = −75.7570
  $d_{13}$ = 2.0915
$r_{14}$ = 27.2996
  $d_{14}$ = 4.8098  $n_{d14}$ = 1.52542  $\upsilon_{d14}$ = 55.78

-continued

Numerical data 12

$r_{15}$ = −16.0615 (aspherical)
  $d_{15}$ = −16.8220
$r_{16}$ = ∞ (eyepoint)
Aspherical coefficients
Second surface K = −1.2951
$A_4 = 2.66909 \times 10^{-5}$  $A_6 = -2.25605 \times 10^{-7}$  $A_8 = 9.99104 \times 10^{-11}$
Third surface K = −0.2614
$A_4 = -8.86459 \times 10^{-5}$  $A_6 = -2.02523 \times 10^{-7}$  $A_8 = -5.25729 \times 10^{-9}$
Fourth surface K = −0.0224
$A_4 = 6.51575 \times 10^{-5}$  $A_6 = -1.53327 \times 10^{-7}$  $A_8 = -1.18392 \times 10^{-9}$
Fifth surface K = 0.2138
$A_4 = 4.33241 \times 10^{-4}$  $A_6 = -1.93785 \times 10^{-5}$  $A_8 = 4.02985 \times 10^{-7}$
Sixth surface K = −0.0427
$A_4 = 9.91769 \times 10^{-5}$  $A_6 = -1.51811 \times 10^{-5}$  $A_8 = 3.40669 \times 10^{-7}$
Eighth surface K = 0.1565
$A_4 = 2.28575 \times 10^{-4}$  $A_6 = -1.22359 \times 10^{-7}$  $A_8 = 3.27751 \times 10^{-8}$
Ninth surface K = 0.0140
$A_4 = 4.56644 \times 10^{-6}$  $A_6 = -9.81069 \times 10^{-7}$
Twelfth surface K = 0.0000
$A_4 = -7.24335 \times 10^{-4}$  $A_6 = 3.64409 \times 10^{-6}$
Fifteenth surface K = 0.0000
$A_4 = 4.99493 \times 10^{-5}$  $A_6 = 9.74998 \times 10^{-8}$ Zoom data

| | Wide-angle position | Middle position | Telephoto position |
|---|---|---|---|
| D2 | 11.4582 | 6.8773 | 3.0038 |
| D4 | 1.2808 | 8.5674 | 16.7674 |
| D6 | 8.0121 | 5.3064 | 0.9799 |
| mh = 10.692 mm | | | |
| f123 | −11.144 | −21.243 | −44.469 |
| m23 | 0.529 | 1.000 | 2.038 |
| m2 | | −1.000 | |
| m3 | | −1.000 | |
| Condition (9) MG45 | −0.763 | −0.765 | −0.767 |
| Conditions (1), (7) mh/fe = | 0.669 | | |
| Conditions (2), (3) fe = | 15.991 mm | | |
| Condition (8) φ(mh/2) = | −0.406970 (1/mm) | | |
| Condition (10) β3 = | −1.000 | | |
| Condition (11) SF2 = | −0.389 | | |
| Condition (12) f2/f3 = | −1.618 | | |
| Condition (13) fw/fFw = | −0.761 | | |
| Condition (14) fT/fFT = | −0.737 | | |
| Condition (15) mT/mW = | 3.865 | | |
| Condition (16) fw/fw123 = | −0.761 | | |
| Condition (17) fT/fT123 = | −0.737 | | |

Thirteenth Embodiment

Figure 56A:
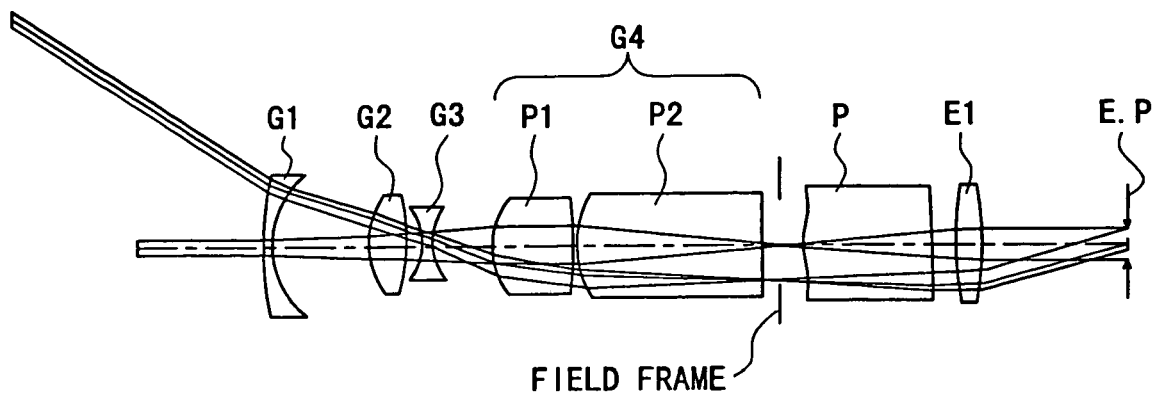
FIGS. 56A, 56B, and 56C are sectional views showing arrangements, developed along the optical axis, at wide-angle, middle, and telephoto positions, respectively, of the real image mode finder optical system in a thirteenth embodiment.
Figure 56B:
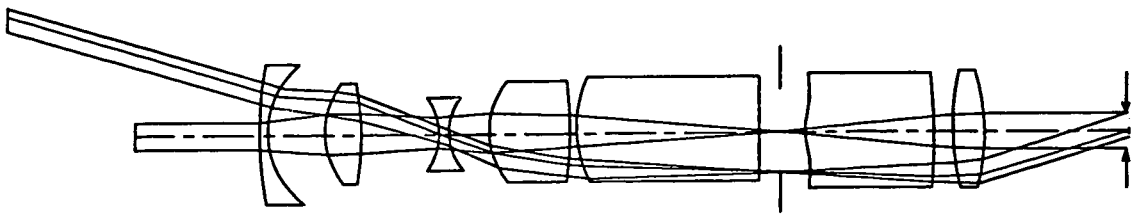
Figure 56C:
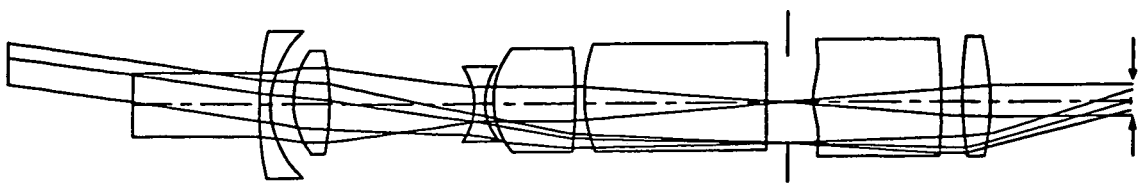

The real image mode finder optical system of this embodiment, as shown in FIGS. 56A–56C, has nearly the same arrangement as that of the first embodiment with the exception of lens data.

Subsequently, numerical data of optical members constituting the real image mode finder optical system according to the thirteenth embodiment are shown below.

Numerical data 13

|  | Wide-angle position | Middle position | Telephoto position |
|---|---|---|---|
| m | 0.533 | 1.007 | 2.050 |
| ω (°) | 33.897 | 17.661 | 8.803 |
| f (mm) | 7.468 | 14.111 | 28.722 |
| Pupil dia. (mm) | 4.000 | | |

$r_1 = 166.7316$
$\quad d_1 = 1.0000 \quad n_{d1} = 1.58423 \quad \nu_{d1} = 30.49$
$r_2 = 10.3218$ (aspherical)
$\quad d_2 = D2$ (variable)
$r_3 = 10.2841$ (aspherical)
$\quad d_3 = 4.3636 \quad n_{d3} = 1.52542 \quad \nu_{d3} = 55.78$
$r_4 = -19.9166$ (aspherical)
$\quad d_4 = D4$ (variable)
$r_5 = -9.8214$ (aspherical)
$\quad d_5 = 1.0000 \quad n_{d5} = 1.58425 \quad \nu_{d5} = 30.35$
$r_6 = 10.1214$ (aspherical)
$\quad d_6 = D6$ (variable)
$r_7 = 13.2873$
$\quad d_7 = 9.9000 \quad n_{d7} = 1.52542 \quad \nu_{d7} = 55.78$
$r_8 = -17.5762$ (aspherical)
$\quad d_8 = 0.5000$
$r_9 = 15.4406$ (aspherical)
$\quad d_9 = 22.6932 \quad n_{d9} = 1.52542 \quad \nu_{d9} = 55.78$
$r_{10} = \infty$
$\quad d_{10} = 2.1168$
$r_{11} = \infty$ (field frame)
$\quad d_{11} = 2.4325$
$r_{12} = 28.5591$ (aspherical)
$\quad d_{12} = 14.7924 \quad n_{d12} = 1.52542 \quad \nu_{d12} = 55.78$
$r_{13} = -24.5754$
$\quad d_{13} = 1.2620$
$r_{14} = 27.5003$
$\quad d_{14} = 4.1395 \quad n_{d14} = 1.52542 \quad \nu_{d14} = 55.78$
$r_{15} = -16.2956$ (aspherical)
$\quad d_{15} = 16.6524$
$r_{16} = \infty$ (eyepoint)

Aspherical coefficients
Second surface $K = -1.2951$
$A_4 = -9.85470 \times 10^{-6} \quad A_6 = -3.31289 \times 10^{-7} \quad A_8 = 3.00060 \times 10^{-9}$ Third surface $K = -0.2607$
$A_4 = -9.27092 \times 10^{-5} \quad A_6 = -8.01222 \times 10^{-7} \quad A_8 = 2.80942 \times 10^{-9}$ Fourth surface $K = -0.0224$
$A_4 = 1.02300 \times 10^{-4} \quad A_6 = 7.73167 \times 10^{-7} \quad A_8 = 5.82839 \times 10^{-9}$ Fifth surface $K = 0.2137$
$A_4 = 5.86855 \times 10^{-4} \quad A_6 = -2.95943 \times 10^{-5} \quad A_8 = 6.45936 \times 10^{-7}$ Sixth surface $K = -0.0425$
$A_4 = -2.30372 \times 10^{-5} \quad A_6 = -2.55725 \times 10^{-5} \quad A_8 = 6.22366 \times 10^{-7}$ Eighth surface $K = 0.1564$
$A_4 = 1.56106 \times 10^{-4} \quad A_6 = -7.63871 \times 10^{-8} \quad A_8 = 4.09536 \times 10^{-9}$ Ninth surface $K = 0.0137$
$A_4 = 9.52536 \times 10^{-7} \quad A_6 = -1.05084 \times 10^{-6}$ Twelfth surface $K = 0.0000$
$A_4 = -1.23450 \times 10^{-3} \quad A_6 = 1.00000 \times 10^{-5}$ Numerical data 13 -continued Fifteenth surface $K = 0.0000$
$A_4 = 3.90391 \times 10^{-5} \quad A_6 = 1.54761 \times 10^{-7}$ Zoom data

|  | Wide-angle position | Middle position | Telephoto position |
|---|---|---|---|
| D2 | 11.7540 | 7.4253 | 3.7541 |
| D4 | 1.2500 | 8.1247 | 15.8923 |
| D6 | 7.6424 | 5.0964 | 1.0000 | mh = 9.279 mm

| | | | |
|---|---|---|---|
| f123 | −10.011 | −18.982 | −39.511 |
| m23 | 0.531 | 1.000 | 2.036 |
| m2 | | −1.000 | |
| m3 | | | −1.000 |
| Condition (9) MG45 | −0.748 | −0.749 | −0.751 |

Conditions (1), (7) mh/fe = 0.662
Conditions (2), (3) fe = 14.010 mm
Condition (8) φ (mh/2) = −0.395473 (1/mm)
Condition (10) β3 = −1.000
Condition (11) SF2 = −0.319
Condition (12) f2/f3 = −1.622
Condition (13) fw/fFw = −0.746
Condition (14) fT/fFT = −0.727
Condition (15) mT/mW = 3.846
Condition (16) fw/fw123 = −0.746
Condition (17) fT/fT123 = −0.727

Fourteenth Embodiment

Figure 57A:
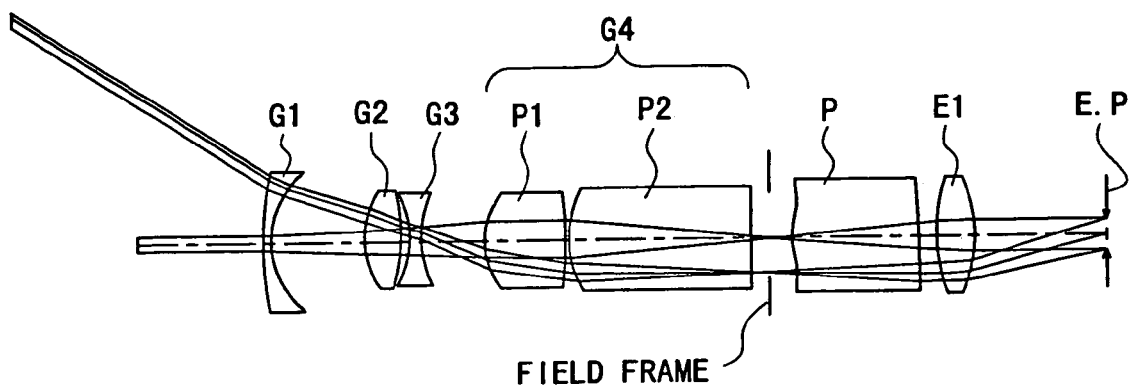
FIGS. 57A, 57B, and 57C are sectional views showing arrangements, developed along the optical axis, at wide-angle, middle, and telephoto positions, respectively, of the real image mode finder optical system in a fourteenth embodiment.
Figure 57B:
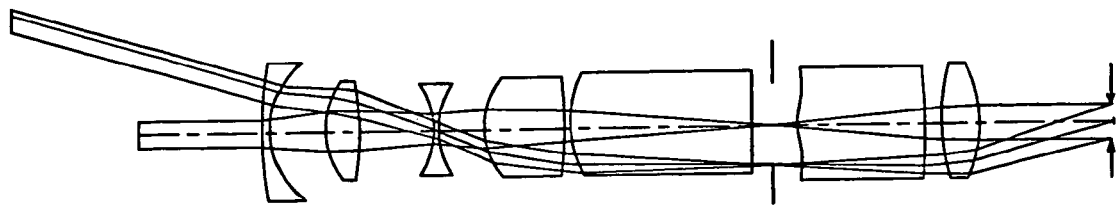
Figure 57C:
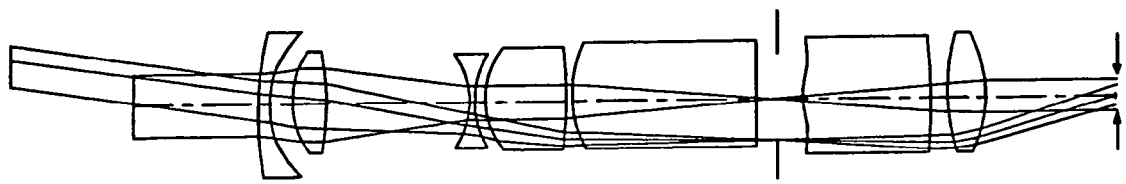

The real image mode finder optical system of this embodiment, as shown in FIGS. 57A–57C, has nearly the same arrangement as that of the first embodiment with the exception of lens data.

Subsequently, numerical data of optical members constituting the real image mode finder optical system according to the fourteenth embodiment are shown below.

Numerical data 14

|  | Wide-angle position | Middle position | Telephoto position |
|---|---|---|---|
| m | 0.530 | 1.011 | 2.054 |
| ω (°) | 33.791 | 17.591 | 8.810 |
| f (mm) | 7.962 | 15.170 | 30.830 |
| Pupil dia. (mm) | 4.000 | | |

$r_1 = 82.9717$
$\quad d_1 = 1.0000 \quad n_{d1} = 1.58425 \quad \nu_{d1} = 30.35$
$r_2 = 10.0913$ (aspherical)
$\quad d_2 = D2$ (variable)
$r_3 = 10.3969$ (aspherical)
$\quad d_3 = 4.2911 \quad n_{d3} = 1.52542 \quad \nu_{d3} = 55.78$
$r_4 = -21.6082$ (aspherical)
$\quad d_4 = D4$ (variable)
$r_5 = -11.4300$
$\quad d_5 = 1.0000 \quad n_{d5} = 1.58425 \quad \nu_{d5} = 30.35$
$r_6 = 9.3984$ (aspherical)
$\quad d_6 = D6$ (variable)
$r_7 = 11.1076$
$\quad d_7 = 9.9000 \quad n_{d7} = 1.52542 \quad \nu_{d7} = 55.78$
$r_8 = -24.3057$ (aspherical)
$\quad d_8 = 0.5000$
$r_9 = 15.7603$ (aspherical)
$\quad d_9 = 22.4265 \quad n_{d9} = 1.52542 \quad \nu_{d9} = 55.78$
$r_{10} = \infty$
$\quad d_{10} = 2.2691$
$r_{11} = \infty$ (field frame)
$\quad d_{11} = 2.5500$ -continued Numerical data 14

$r_{12} = 15.9134$ (aspherical)
  $d_{12} = 15.5881$    $n_{d12} = 1.52542$    $\nu_{d12} = 55.78$
$r_{13} = -39.1000$
  $d_{13} = 1.7582$
$r_{14} = 25.7997$ (aspherical)
  $d_{14} = 5.1865$    $n_{d14} = 1.52542$    $\nu_{d14} = 55.78$
$r_{15} = -16.7689$ (aspherical)
  $d_{15} = 16.8782$
$r_{16} = \infty$ (eyepoint)
Aspherical coefficients
Second surface $K = -1.2943$
$A_4 = -9.84819 \times 10^{-6}$  $A_6 = -2.39182 \times 10^{-8}$  $A_8 = 4.94427 \times 10^{-10}$
Third surface $K = -0.2438$
$A_4 = -1.13792 \times 10^{-4}$  $A_6 = -6.83279 \times 10^{-8}$  $A_8 = -6.63089 \times 10^{-9}$
Fourth surface $K = -0.0218$
$A_4 = 6.76356 \times 10^{-5}$  $A_6 = -1.19790 \times 10^{-7}$  $A_8 = -2.64472 \times 10^{-9}$
Sixth surface $K = -0.0422$
$A_4 = -5.28848 \times 10^{-4}$  $A_6 = 2.13243 \times 10^{-6}$  $A_8 = 1.98353 \times 10^{-8}$
Eighth surface $K = 0.1608$
$A_4 = 1.86541 \times 10^{-4}$  $A_6 = 1.81579 \times 10^{-7}$  $A_8 = 3.74182 \times 10^{-8}$
Ninth surface $K = 0.0115$
$A_4 = -3.79724 \times 10^{-5}$  $A_6 = -6.23075 \times 10^{-7}$
Twelfth surface $K = 0.0000$
$A_4 = -1.19998 \times 10^{-3}$  $A_6 = 1.07234 \times 10^{-5}$
Fourteenth surface $K = 0.0000$
$A_4 = 1.76029 \times 10^{-5}$  $A_6 = 3.42514 \times 10^{-7}$
Fifteenth surface $K = 0.0000$
$A_4 = 6.14363 \times 10^{-5}$  $A_6 = 4.37825 \times 10^{-7}$
Zoom data

|  | Wide-angle position | Middle position | Telephoto position |
|---|---|---|---|
| D2 | 12.0419 | 7.5075 | 3.7196 |
| D4 | 1.1332 | 8.3326 | 16.3538 |
| D6 | 7.8982 | 5.2332 | 1.0000 |
| mh = 10.098 mm | | | |
| f123 | −10.392 | −19.874 | −41.387 |
| m23 | 0.526 | 1.000 | 2.034 |
| m2 | | −1.000 | |
| m3 | | −1.000 | |
| Condition (9) MG45 | −0.768 | −0.770 | −0.772 |
| Conditions (1), (7) mh/fe | = 0.673 | | |
| Conditions (2), (3) fe | = 15.010 mm | | |
| Condition (8) φ (mh/2) | = −0.377550 (l/mm) | | |
| Condition (10) β3 | = −1.000 | | |
| Condition (11) SF2 | = −0.350 | | |
| Condition (12) f2/f3 | = −1.615 | | |
| Condition (13) fw/fFw | = −0.766 | | |
| Condition (14) fT/fFT | = −0.745 | | |
| Condition (15) mT/mW | = 3.872 | | |
| Condition (16) fw/fw123 | = −0.766 | | |
| Condition (17) fT/fT123 | = −0.745 | | |

Fifteenth Embodiment

Figure 58A:
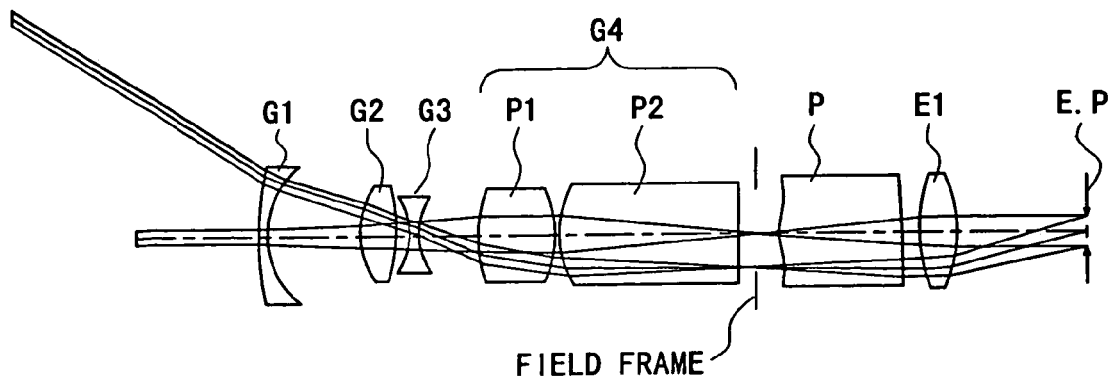
FIGS. 58A, 58B, and 58C are sectional views showing arrangements, developed along the optical axis, at wide-angle, middle, and telephoto positions, respectively, of the real image mode finder optical system in a fifteenth embodiment.
Figure 58B:
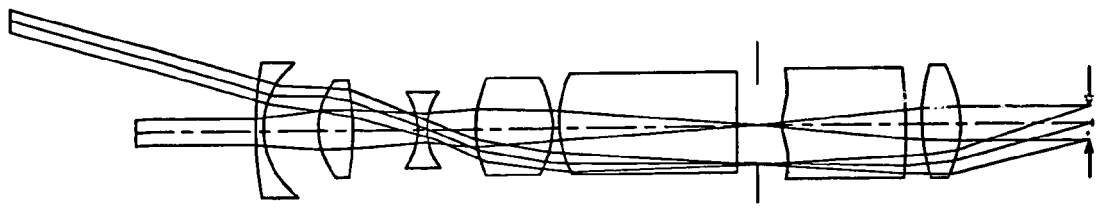
Figure 58C:
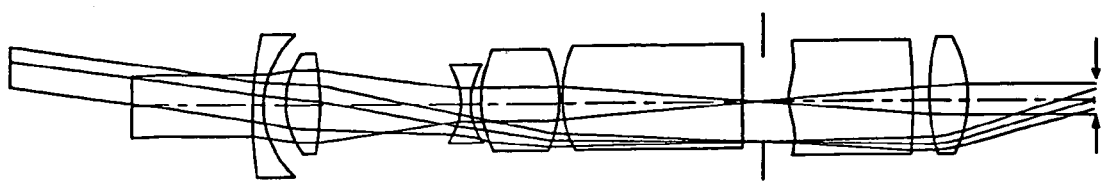

The real image mode finder optical system of this embodiment, as shown in FIGS. 58A–58C, has nearly the same arrangement as that of the first embodiment with the exception of lens data.

Subsequently, numerical data of optical members constituting the real image mode finder optical system according to the fifteenth embodiment are shown below.

Numerical data 15

|  | Wide-angle position | Middle position | Telephoto position |
|---|---|---|---|
| m | 0.429 | 0.813 | 1.663 |
| ω (°) | 33.665 | 17.724 | 8.889 |
| f (mm) | 7.384 | 13.997 | 28.641 |
| Pupil dia. (mm) | 4.000 | | |

$r_1 = 107.4567$
  $d_1 = 1.0000$    $n_{d1} = 1.58423$    $\nu_{d1} = 30.49$
$r_2 = 10.2589$ (aspherical)
  $d_2 = D2$ (variable)
$r_3 = 10.2029$ (aspherical)
  $d_3 = 4.4631$    $n_{d3} = 1.52542$    $\nu_{d3} = 55.78$
$r_4 = -20.4728$ (aspherical)
  $d_4 = D4$ (variable)
$r_5 = -9.3096$ (aspherical)
  $d_5 = 1.0000$    $n_{d5} = 1.58425$    $\nu_{d5} = 30.35$
$r_6 = 10.3604$ (aspherical)
  $d_6 = D6$ (variable)
$r_7 = 16.9815$
  $d_7 = 9.9000$    $n_{d7} = 1.52542$    $\nu_{d7} = 55.78$
$r_8 = -13.8071$ (aspherical)
  $d_8 = 0.5000$
$r_9 = 15.6162$ (aspherical)
  $d_9 = 22.4902$    $n_{d9} = 1.52542$    $\nu_{d9} = 55.78$
$r_{10} = \infty$
  $d_{10} = 2.3198$
$r_{11} = \infty$ (field frame)
  $d_{11} = 3.8080$
$r_{12} = 24.6624$ (aspherical)
  $d_{12} = 15.9445$    $n_{d12} = 1.52542$    $\nu_{d12} = 55.78$
$r_{13} = -144.7239$
  $d_{13} = 2.0644$
$r_{14} = 37.1434$
  $d_{14} = 4.1276$    $n_{d14} = 1.52542$    $\nu_{d14} = 55.78$
$r_{15} = -14.1033$ (aspherical)
  $d_{15} = 16.7947$
$r_{16} = \infty$ (eyepoint)
Aspherical coefficients
Second surface $K = -1.2993$
$A_4 = 5.71536 \times 10^{-5}$  $A_6 = -1.74731 \times 10^{-6}$  $A_8 = 9.48321 \times 10^{-9}$
Third surface $K = -0.2562$
$A_4 = -1.82646 \times 10^{-5}$  $A_6 = -1.79005 \times 10^{-6}$  $A_8 = 5.13165 \times 10^{-9}$
Fourth surface $K = -0.0200$
$A_4 = 1.47200 \times 10^{-4}$  $A_6 = -1.56976 \times 10^{-6}$  $A_8 = 1.27897 \times 10^{-8}$
Fifth surface $K = 0.2127$
$A_4 = 5.41270 \times 10^{-4}$  $A_6 = -3.32639 \times 10^{-5}$  $A_8 = 5.81147 \times 10^{-7}$
Sixth surface $K = -0.0433$
$A_4 = -1.09499 \times 10^{-4}$  $A_6 = -2.68424 \times 10^{-5}$  $A_8 = 6.74415 \times 10^{-7}$
Eighth surface $K = 0.1546$
$A_4 = 2.00697 \times 10^{-4}$  $A_6 = -1.61566 \times 10^{-6}$  $A_8 = -3.13569 \times 10^{-9}$ -continued Numerical data 15

Ninth surface

K = 0.0164
$A_4 = 6.95918 \times 10^{-5}$    $A_6 = -2.13186 \times 10^{-6}$
Twelfth surface K = 0.0000
$A_4 = -4.54314 \times 10^{-4}$    $A_6 = -3.43968 \times 10^{-6}$
Fifteenth surface K = 0.0000
$A_4 = 4.97954 \times 10^{-5}$    $A_6 = 1.10003 \times 10^{-7}$
Zoom data

|  | Wide-angle position | Middle position | Telephoto position |
|---|---|---|---|
| D2 | 11.2714 | 6.9682 | 3.2721 |
| D4 | 1.6105 | 8.4616 | 16.2351 |
| D6 | 7.6649 | 5.1170 | 1.0397 |
| mh = 9.349 mm | | | |
| f123 | −10.318 | −19.605 | −41.020 |
| m23 | 0.530 | 1.000 | 2.042 |
| m2 | | −1.000 | |
| m3 | | −1.000 | |
| Condition (9) MG45 | −0.717 | −0.720 | −0.722 |
| Conditions (1), (7) mh/fe | = 0.543 | | |
| Conditions (2), (3) fe | = 17.226 mm | | |
| Condition (8) φ (mh/2) | = −0.390191 (1/mm) | | |
| Condition (10) β3 | = −1.000 | | |
| Condition (11) SF2 | = −0.335 | | |
| Condition (12) f2/f3 | = −1.656 | | |
| Condition (13) fw/fFw | = −0.716 | | |
| Condition (14) fT/fFT | = −0.698 | | |
| Condition (15) mT/mW | = 3.879 | | |
| Condition (16) fw/fw123 | = −0.716 | | |
| Condition (17) fT/fT123 | = −0.698 | | |

Figure 59A:
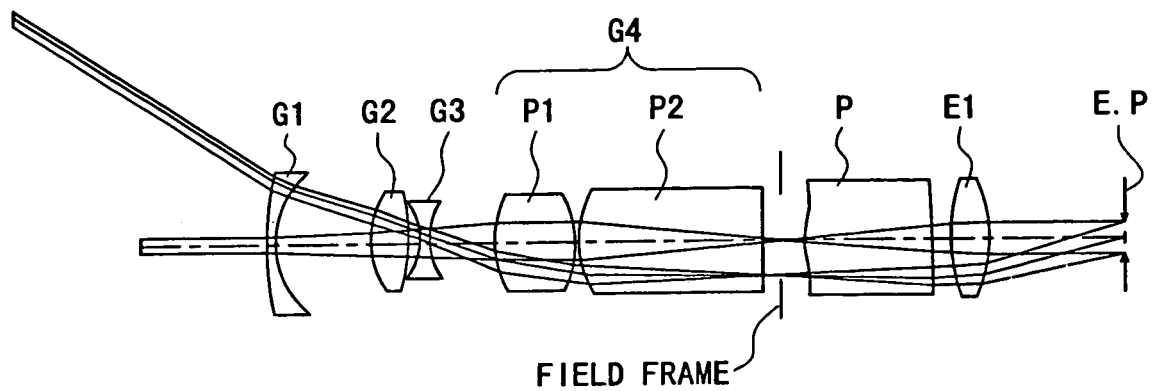
FIGS. 59A, 59B, and 59C are sectional views showing arrangements, developed along the optical axis, at wide-angle, middle, and telephoto positions, respectively, of the real image mode finder optical system in a sixteenth embodiment.
Figure 59B:
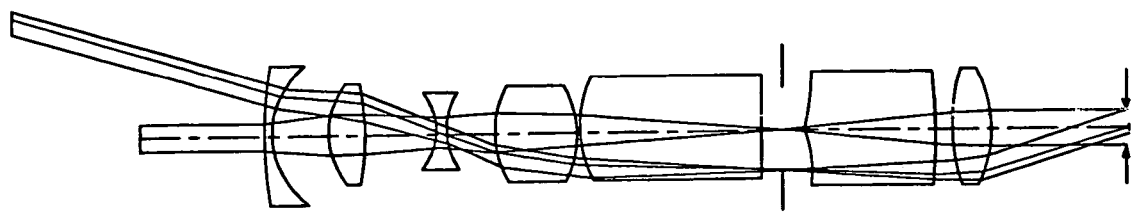
Figure 59C:
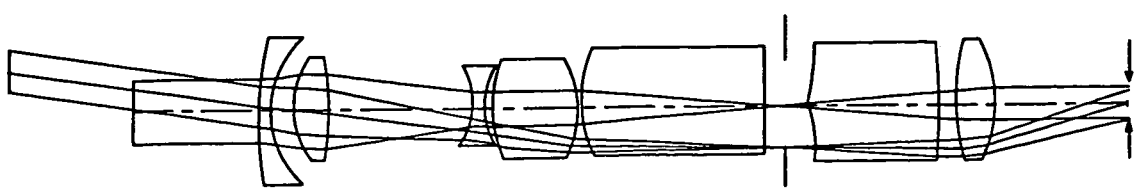

The real image mode finder optical system of this embodiment, as shown in FIGS. 59A–59C, has nearly the same arrangement as that of the first embodiment with the exception of lens data.

Subsequently, numerical data of optical members constituting the real image mode finder optical system according to the sixteenth embodiment are shown below.

Numerical data 16

|  | Wide-angle position | Middle position | Telephoto position |
|---|---|---|---|
| m | 0.429 | 0.809 | 2.024 |
| ω (°) | 33.860 | 17.674 | 7.199 |
| f (mm) | 7.439 | 14.047 | 35.124 |
| Pupil dia. (mm) | 4.000 | | |

$r_1 = 244.6491$
$\quad d_1 = 1.0000 \quad n_{d1} = 1.58423 \quad \nu_{d1} = 30.49$
$r_2 = 10.7182$ (aspherical)
$\quad d_2 = D2$ (variable)
$r_3 = 9.8239$ (aspherical)
$\quad d_3 = 4.5281 \quad n_{d3} = 1.52542 \quad \nu_{d3} = 55.78$
$r_4 = -19.6580$ (aspherical)
$\quad d_4 = D4$ (variable)
$r_5 = -9.4259$ (aspherical)
$\quad d_5 = 1.0000 \quad n_{d5} = 1.58425 \quad \nu_{d5} = 30.35$
$r_6 = 9.7259$ (aspherical)
$\quad d_6 = D6$ (variable)
$r_7 = 13.6837$
$\quad d_7 = 9.9000 \quad n_{d7} = 1.52542 \quad \nu_{d7} = 55.78$
$r_8 = -17.5090$ (aspherical)
$\quad d_8 = 0.5000$
$r_9 = 15.6690$ (aspherical)

-continued

Numerical data 16

$\quad d_9 = 22.4657 \quad n_{d9} = 1.52542 \quad \nu_{d9} = 55.78$
$r_{10} = \infty$
$\quad d_{10} = 2.3443$
$r_{11} = \infty$ (field frame)
$\quad d_{11} = 4.2463$
$r_{12} = 24.2774$ (aspherical)
$\quad d_{12} = 15.9476 \quad n_{d12} = 1.52542 \quad \nu_{d12} = 55.78$
$r_{13} = -225.2944$
$\quad d_{13} = 2.0463$
$r_{14} = 37.1333$
$\quad d_{14} = 3.6458 \quad n_{d14} = 1.52542 \quad \nu_{d14} = 55.78$
$r_{15} = -14.1787$ (aspherical)
$\quad d_{15} = 16.8295$
$r_{16} = \infty$ (eyepoint)
Aspherical coefficients
Second surface K = −1.3022
$A_4 = 1.94109 \times 10^{-5}$    $A_6 = -1.53742 \times 10^{-6}$    $A_8 = 9.18621 \times 10^{-9}$
Third surface K = −0.2549
$A_4 = -7.62311 \times 10^{-5}$    $A_6 = -2.11044 \times 10^{-6}$    $A_8 = 9.22506 \times 10^{-9}$
Fourth surface K = −0.0175
$A_4 = 1.18065 \times 10^{-4}$    $A_6 = -1.28525 \times 10^{-6}$    $A_8 = 1.15858 \times 10^{-8}$
Fifth surface K = 0.2594
$A_4 = 7.73262 \times 10^{-4}$    $A_6 = = -4.07569 \times 10^{-5}$    $A_8 = 6.35774 \times 10^{-7}$
Sixth surface K = −0.0434
$A_4 = 2.49683 \times 10^{-5}$    $A_6 = -3.63701 \times 10^{-5}$    $A_8 = 8.31505 \times 10^{-7}$
Eighth surface K = 0.1534
$A_4 = 1.67581 \times 10^{-4}$    $A_6 = -1.34210 \times 10^{-6}$    $A_8 = 5.76435 \times 10^{-9}$
Ninth surface K = 0.0177
$A_4 = 9.17386 \times 10^{-6}$    $A_6 = -1.80151 \times 10^{-6}$
Twelfth surface K = 0.0000
$A_4 = -3.02442 \times 10^{-4}$    $A_6 = -2.91068 \times 10^{-6}$
Fifteenth surface K = 0.0000
$A_4 = 5.38216 \times 10^{-5}$    $A_6 = 6.59977 \times 10^{-8}$
Zoom data

|  | Wide-angle position | Middle position | Telephoto position |
|---|---|---|---|
| D2 | 10.3532 | 6.2169 | 1.8288 |
| D4 | 1.2500 | 7.8558 | 17.6530 |
| D6 | 8.8787 | 6.4091 | 1.0000 |
| mh = 9.259 mm | | | |
| f123 | −10.214 | −19.332 | −50.207 |
| m23 | 0.532 | 1.000 | 2.500 |
| m2 | | −1.000 | |
| m3 | | −1.000 | |
| Condition (9) MG45 | −0.730 | −0.732 | −0.735 |
| Conditions (1), (7) mh/fe | = 0.534 | | |
| Conditions (2), (3) fe | = 17.354 mm | | |
| Condition (8) φ (mh/2) | = −0.263294 (1/mm) | | |
| Condition (10) β3 | = −1.000 | | |
| Condition (11) SF2 | = −0.334 | | |
| Condition (12) f2/f3 | = −1.638 | | |
| Condition (13) fw/fFw | = −0.728 | | |
| Condition (14) fT/fFT | = −0.700 | | |
| Condition (15) mT/mW | = 4.722 | | |
| Condition (16) fw/fw123 | = −0.728 | | |
| Condition (17) fT/fT123 | = −0.700 | | |

Seventeenth Embodiment

Figure 60A:
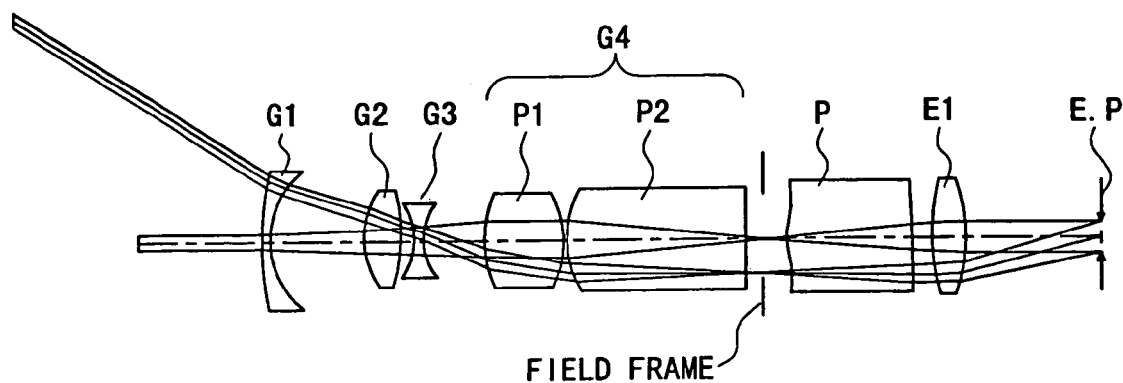
FIGS. 60A, 60B, and 60C are sectional views showing arrangements, developed along the optical axis, at wide-angle, middle, and telephoto positions, respectively, of the real image mode finder optical system in a seventeenth embodiment.
Figure 60B:
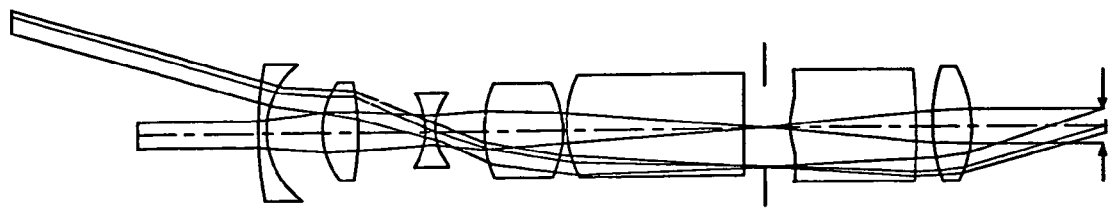
Figure 60C:
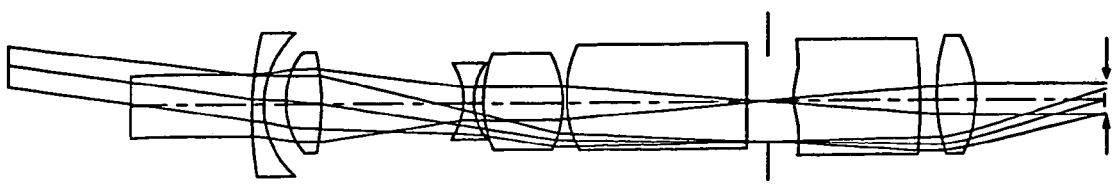

The real image mode finder optical system of this embodiment, as shown in FIGS. 60A–60C, has nearly the same arrangement as that of the first embodiment with the exception of lens data.

Subsequently, numerical data of optical members constituting the real image mode finder optical system according to the seventeenth embodiment are shown below.

Numerical data 17

|  | Wide-angle position | Middle position | Telephoto position |
|---|---|---|---|
| m | 0.427 | 0.806 | 2.149 |
| ω (°) | 34.100 | 17.683 | 6.723 |
| f (mm) | 7.358 | 13.901 | 37.053 |
| Pupil dia. (mm) | 4.000 | | |

$r_1 = -713.7698$
$\quad d_1 = 1.0000 \quad n_{d1} = 1.58423 \quad \nu_{d1} = 30.49$
$r_2 = 11.0797$ (aspherical)
$\quad d_2 = D2$ (variable)
$r_3 = 9.7135$ (aspherical)
$\quad d_3 = 4.6200 \quad n_{d3} = 1.52542 \quad \nu_{d3} = 55.78$
$r_4 = -18.4096$ (aspherical)
$\quad d_4 = D4$ (variable)
$r_5 = -9.1335$ (aspherical)
$\quad d_5 = 1.0000 \quad n_{d5} = 1.58425 \quad \nu_{d5} = 30.35$
$r_6 = 9.4327$ (aspherical)
$\quad d_6 = D6$ (variable)
$r_7 = 13.0353$
$\quad d_7 = 9.9000 \quad n_{d7} = 1.52542 \quad \nu_{d7} = 55.78$
$r_8 = -18.2574$ (aspherical)
$\quad d_8 = 0.5000$
$r_9 = 15.8017$ (aspherical)
$\quad d_9 = 22.4291 \quad n_{d9} = 1.52542 \quad \nu_{d9} = 55.78$
$r_{10} = \infty$
$\quad d_{10} = 2.3809$
$r_{11} = \infty$ (field frame)
$\quad d_{11} = 4.1914$
$r_{12} = 23.7178$ (aspherical)
$\quad d_{12} = 15.9419 \quad n_{d12} = 1.52542 \quad \nu_{d12} = 55.78$
$r_{13} = -188.7242$
$\quad d_{13} = 2.0225$
$r_{14} = 38.0414$
$\quad d_{14} = 3.6351 \quad n_{d14} = 1.52542 \quad \nu_{d14} = 55.78$
$r_{15} = -14.0922$ (aspherical)
$\quad d_{15} = 16.8589$
$r_{16} = \infty$ (eyepoint)

Aspherical coefficients
Second surface $K = -1.3025$
$A_4 = -3.21798 \times 10^{-5} \quad A_6 = -7.78889 \times 10^{-7} \quad A_8 = 5.08606 \times 10^{-9}$
Third surface $K = -0.2547$
$A_4 = -1.33313 \times 10^{-4} \quad A_6 = -1.48099 \times 10^{-6} \quad A_8 = 7.55992 \times 10^{-9}$
Fourth surface $K = -0.0172$
$A_4 = 1.11743 \times 10^{-4} \quad A_6 = -9.24392 \times 10^{-7} \quad A_8 = 9.33552 \times 10^{-9}$
Fifth surface $K = 0.2714$
$A_4 = 1.27697 \times 10^{-3} \quad A_6 = -8.18736 \times 10^{-5} \quad A_8 = 1.94631 \times 10^{-6}$
Sixth surface $K = -0.0432$
$A_4 = 3.65213 \times 10^{-4} \quad A_6 = -6.62961 \times 10^{-5} \quad A_8 = 1.63076 \times 10^{-6}$
Eighth surface $K = 0.1534$
$A_4 = 1.31305 \times 10^{-4} \quad A_6 = -7.77237 \times 10^{-7} \quad A_8 = 1.72405 \times 10^{-8}$

-continued

Numerical data 17

Ninth surface $K = 0.0176$
$A_4 = -4.34110 \times 10^{-5} \quad A_6 = -9.40302 \times 10^{-7}$
Twelfth surface $K = 0.0000$
$A_4 = -2.47396 \times 10^{-4} \quad A_6 = -3.97394 \times 10^{-6}$
Fifteenth surface $K = 0.0000$
$A_4 = 5.72418 \times 10^{-5} \quad A_6 = 3.57168 \times 10^{-8}$ Zoom data

|  | Wide-angle position | Middle position | Telephoto position |
|---|---|---|---|
| D2 | 10.0156 | 5.9870 | 1.4776 |
| D4 | 1.2500 | 7.6739 | 17.9124 |
| D6 | 9.1244 | 6.7292 | 1.0000 |
| mh = 9.156 mm | | | |
| f123 | −9.916 | −18.774 | −52.236 |
| m23 | 0.532 | 1.000 | 2.667 |
| m2 | | −1.000 | |
| m3 | | | −1.000 |
| Condition (9) MG45 | −0.744 | −0.746 | −0.748 |

Conditions (1), (7) mh/fe = 0.531
Conditions (2), (3) fe = 17.239 mm
Condition (8) φ (mh/2) = −0.251090 (1/mm)
Condition (10) β3 = −1.000
Condition (11) SF2 = −0.309
Condition (12) f2/f3 = −1.647
Condition (13) fw/fFw = −0.742
Condition (14) fT/fFT = −0.709
Condition (15) mT/mW = 5.035
Condition (16) fw/fw123 = −0.742
Condition (17) fT/fT123 = −0.709

Eighteenth Embodiment

Figure 61A:
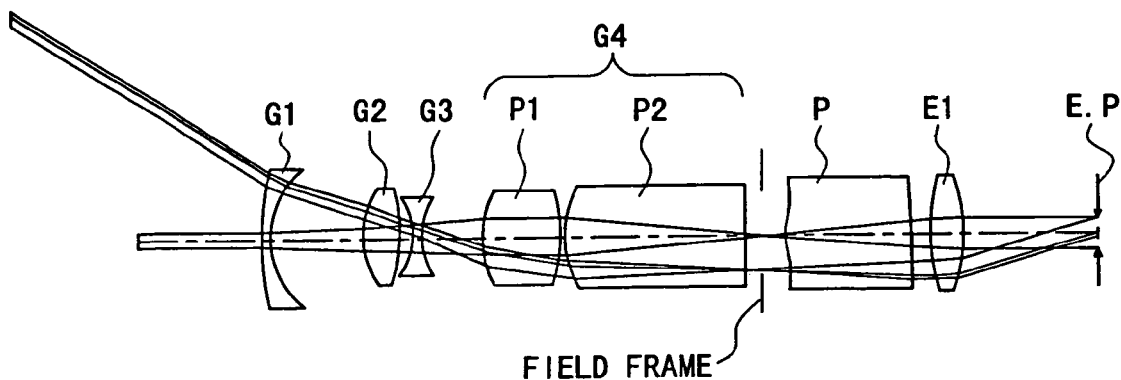
FIGS. 61A, 61B, and 61C are sectional views showing arrangements, developed along the optical axis, at wide-angle, middle, and telephoto positions, respectively, of the real image mode finder optical system in an eighteenth embodiment.
Figure 61B:
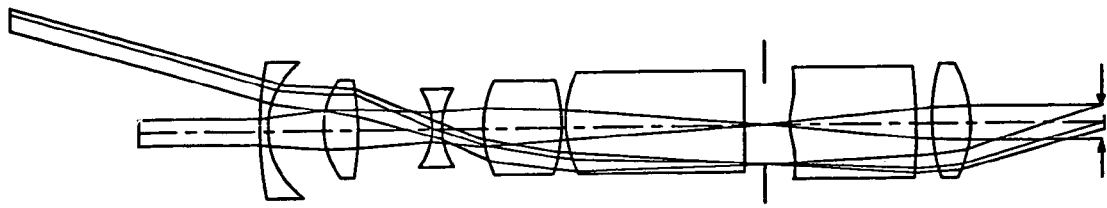
Figure 61C:
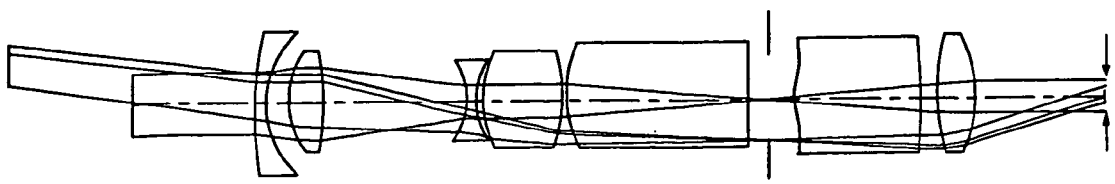

The real image mode finder optical system of this embodiment, as shown in FIGS. 61A–61C, has nearly the same arrangement as that of the first embodiment with the exception of lens data.

Subsequently, numerical data of optical members constituting the real image mode finder optical system according to the eighteenth embodiment are shown below.

Numerical data 18

|  | Wide-angle position | Middle position | Telephoto position |
|---|---|---|---|
| m | 0.435 | 0.824 | 1.691 |
| ω (°) | 33.426 | 17.596 | 8.847 |
| f (mm) | 7.656 | 14.498 | 29.743 |
| Pupil dia. (mm) | 4.000 | | |

$r_1 = 99.5495$
$\quad d_1 = 1.0000 \quad n_{d1} = 1.58423 \quad \nu_{d1} = 30.49$
$r_2 = 10.1706$ (aspherical)
$\quad d_2 = D2$ (variable)
$r_3 = 10.3729$ (aspherical)
$\quad d_3 = 4.4126 \quad n_{d3} = 1.52542 \quad \nu_{d3} = 55.78$
$r_4 = -19.6559$ (aspherical)
$\quad d_4 = D4$ (variable)
$r_5 = -9.5997$ (aspherical)
$\quad d_5 = 1.0000 \quad n_{d5} = 1.58425 \quad \nu_{d5} = 30.35$
$r_6 = 9.8997$ (aspherical)
$\quad d_6 = D6$ (variable)

-continued

Numerical data 18

$r_7 = 14.3933$
  $d_7 = 9.9000$      $n_{d7} = 1.52542$      $v_{d7} = 55.78$
$r_8 = -15.6309$ (aspherical)
  $d_8 = 0.5000$
$r_9 = 15.7116$ (aspherical)
  $d_9 = 22.4940$     $n_{d9} = 1.52542$      $v_{d9} = 55.78$
$r_{10} = \infty$
  $d_{10} = 2.3160$
$r_{11} = \infty$ (field frame)
  $d_{11} = 3.6826$
$r_{12} = 27.7932$ (aspherical)
  $d_{12} = 16.0681$   $n_{d12} = 1.52542$     $v_{d12} = 55.78$
$r_{13} = -173.7673$
  $d_{13} = 2.3552$
$r_{14} = 35.5235$
  $d_{14} = 4.0389$    $n_{d14} = 1.52542$     $v_{d14} = 55.78$
$r_{15} = -14.3073$ (aspherical)
  $d_{15} = 22.5403$
$r_{16} = \infty$ (eyepoint)
Aspherical coefficients
Second surface $K = -1.3005$
$A_4 = 6.14835 \times 10^{-5}$   $A_6 = -1.68311 \times 10^{-6}$   $A_8 = 8.77195 \times 10^{-9}$
Third surface $K = -0.2546$
$A_4 = -2.04009 \times 10^{-6}$   $A_6 = -1.97626 \times 10^{-6}$   $A_8 = 8.97003 \times 10^{-9}$
Fourth surface $K = -0.0188$
$A_4 = 1.56534 \times 10^{-4}$   $A_6 = -1.56324 \times 10^{-6}$   $A_8 = 1.26722 \times 10^{-8}$
Fifth surface $K = 0.2126$
$A_4 = 4.66912 \times 10^{-4}$   $A_6 = -3.86240 \times 10^{-5}$   $A_8 = 1.14314 \times 10^{-6}$
Sixth surface $K = -0.0436$
$A_4 = -2.20422 \times 10^{-4}$   $A_6 = -2.72889 \times 10^{-5}$   $A_8 = 8.43830 \times 10^{-7}$
Eighth surface $K = 0.1534$
$A_4 = 2.24324 \times 10^{-4}$   $A_6 = -3.90532 \times 10^{-6}$   $A_8 = 2.12435 \times 10^{-8}$
Ninth surface $K = 0.0178$
$A_4 = 4.50620 \times 10^{-5}$   $A_6 = -3.09867 \times 10{-6}$
Twelfth surface $K = 0.0000$
$A_4 = -7.56343 \times 10^{-4}$   $A_6 = 8.42941 \times 10^{-7}$
Fifteenth surface $K = 0.0000$
$A_4 = 3.82666 \times 10^{-5}$   $A_6 = 2.37037 \times 10^{-7}$
Zoom data

|     | Wide-angle position | Middle position | Telephoto position |
|-----|-----|-----|-----|
| D2  | 11.1798 | 6.8982 | 3.2011 |
| D4  | 1.7379 | 8.5495 | 16.3243 |
| D6  | 7.6797 | 5.1496 | 1.0719 |
| mh = 9.800 mm | | | |
| f123 | −10.319 | −19.589 | −41.128 |
| m23 | 0.530 | 1.000 | 2.048 |
| m2  |       | −1.000 |       |
| m3  |       | −1.000 |       |
| Condition (9) MG45 | −0.744 | −0.746 | −0.749 |

Conditions (1), (7) mh/fe = 0.557
Conditions (2), (3) fe   = 17.593 mm
Condition (8) φ (mh/2)   = −0.484313 (l/mm)
Condition (10) β3        = −1.000
Condition (11) SF2       = −0.309
Condition (12) f2/f3     = −1.663
Condition (13) fw/fFw    = −0.742

-continued

Numerical data 18

Condition (14) fT/fFT  = −0.723
Condition (15) mT/mW   = 3.885
Condition (16) fw/fw123 = −0.742
Condition (17) fT/fT123 = −0.723

Nineteenth Embodiment

Figure 62A:
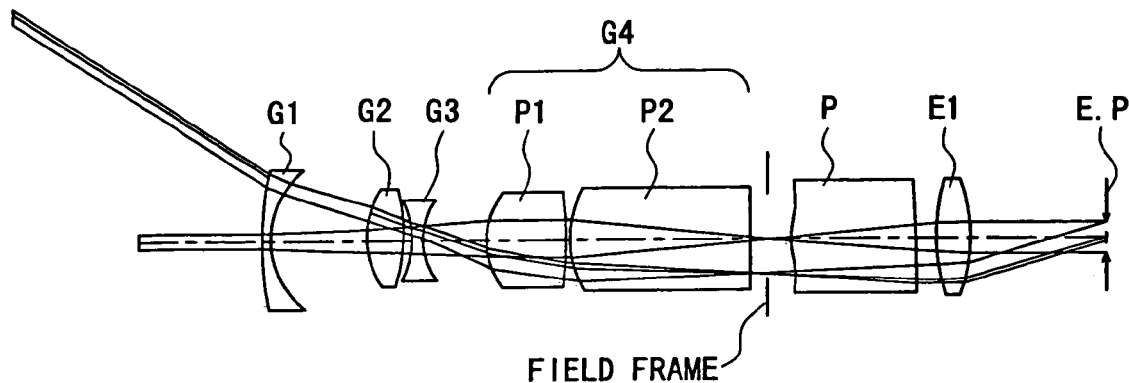
FIGS. 62A, 62B, and 62C are sectional views showing arrangements, developed along the optical axis, at wide-angle, middle, and telephoto-positions, respectively, of the real image mode finder optical system in a nineteenth embodiment.
Figure 62B:
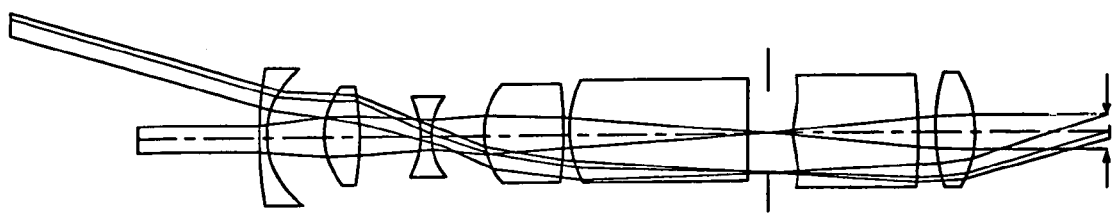
Figure 62C:
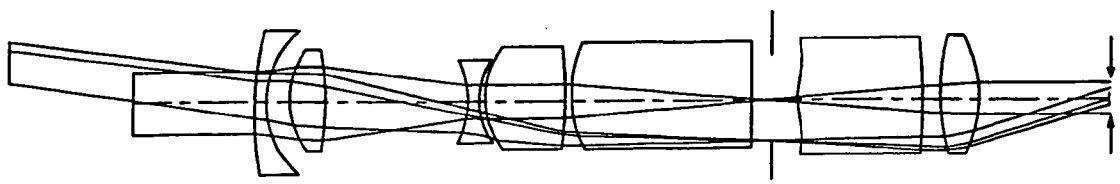

In the real image mode finder optical system of this embodiment, as shown in FIGS. 62A–62C, the objective optical system includes, in order from the object side, the first unit G1 with a negative refracting power, the second unit G2 with a positive refracting power, the third unit G3 with a negative refracting power, and the fourth unit G4 with a positive refracting power, and has a positive refracting power as a whole.

The fourth unit G4 is constructed with two prisms P1 and P2. The eyepiece optical system is constructed with the prism P and the positive lens E1 and has a positive refracting power as a whole.

The image erecting means includes the prisms P1 and P2 and the prism P. In the real image mode finder optical system of the nineteenth embodiment, the intermediate image formed by the objective optical system is interposed between the prism P2 and the prism P1 and the field frame, such as that shown in FIG. 4, is provided in the proximity of its imaging position.

The magnification of the finder is changed in the range from the wide-angle position to the telephoto position by fixing the fourth unit G4 and by moving the first unit 0G, the second unit G2, and the third unit G3 along the optical axis. In this case, the second unit G2 is simply moved toward the object side, and the third unit G3 toward the eyepiece side.

Each of the first unit G1, the second unit G2, and the third unit G3 is constructed with a single lens. The entrance surface and the exit surface of the prism P1 and the entrance surface of the prism P2 have curvatures. The entrance surface and the exit surface of the prism P also have curvatures.

The prisms P1 and P2 and the prism P are provided with the same reflecting surfaces as the reflecting surfaces P1$_1$, P2$_1$, P2$_2$, and P$_1$ in the first embodiment shown in FIGS. 1–3, along the optical path, so that the optical axis is bent to erect an image. For example, one reflecting surface provided in the prism P1 bends the optical axis in the Y-Z plane; two reflecting surfaces provided in the prism P2 bend the optical axis in the Y-Z plane and the X-Z plane in this order from the object side; and one reflecting surface provided in the prism P bends the optical axis in the X-Z plane. In this way, an erect image is obtained. Also, the arrangement of the reflecting surfaces is based on that of a Porro prism. Angles made with the optical axis bent by the reflecting surfaces are such that, for example, the angles of the optical axis bent by the reflecting surfaces of the prism P1 and the prism P are smaller than 90 degrees and the angles of the optical axis bent by the reflecting surfaces of the prism P2 are larger than 90 degrees. The reflecting surfaces of the prism P1 and the prism P are coated with metal films, such as silver and aluminum. The two-reflecting surfaces of the prism P2 utilize total reflection.

However, the ways of bending the optical axis through the prisms and the angles of the optical axis bent by the reflecting surfaces are not limited to the above description.

For example, the angle of the optical axis bent by the most field-frame-side reflecting surface of the prism P2 may be made smaller than 90 degrees so that this reflecting surface is coated with a metal film. Moreover, the angle of the optical axis bent by the reflecting surface of the prism P may also be made larger than 90 degrees so that this reflecting surface utilizes total reflection.

The positive lens E1 is constructed so that diopter adjustment can be made in accordance with an observer's diopter.

Subsequently, numerical data of optical members constituting the real image mode finder optical system according to the nineteenth embodiment are shown below.

Numerical data 19

| | Wide-angle position | Middle position | Telephoto position |
|---|---|---|---|
| m | 0.528 | 1.033 | 2.073 |
| ω (°) | 33.663 | 17.287 | 8.778 |
| f (mm) | 7.927 | 15.503 | 31.114 |
| Pupil dia. (mm) | 4.000 | | |

$r_1 = 38.8071$
  $d_1 = 1.0000$   $n_{d1} = 1.58423$   $\nu_{d1} = 30.49$
$r_2 = 8.9754$ (aspherical)
  $d_2 = D2$ (variable)
$r_3 = 9.9087$ (aspherical)
  $d_3 = 4.3628$   $n_{d3} = 1.52542$   $\nu_{d3} = 55.78$
$r_4 = -23.7155$ (aspherical)
  $d_4 = D4$ (variable)
$r_5 = -10.0428$ (aspherical)
  $d_5 = 1.0000$   $n_{d5} = 1.58425$   $\nu_{d5} = 30.35$
$r_6 = 10.3428$ (aspherical)
  $d_6 = D6$ (variable)
$r_7 = 11.5157$
  $d_7 = 9.9000$   $n_{d7} = 1.52542$   $\nu_{d7} = 55.78$
$r_8 = -22.7435$ (aspherical)
  $d_8 = 0.5000$
$r_9 = 15.4370$ (aspherical)
  $d_9 = 22.2718$   $n_{d9} = 1.52542$   $\nu_{d9} = 55.78$
$r_{10} = \infty$
  $d_{10} = 2.1155$
$r_{11} = \infty$ (field frame)
  $d_{11} = 2.3895$
$r_{12} = 18.2155$ (aspherical)
  $d_{12} = 15.5672$   $n_{d12}$ 1.52542   $\nu_{d12} = 55.78$
$r_{13} = -36.4337$
  $d_{13} = 1.8054$
$r_{14} = 26.1660$
  $d_{14} = 4.9762$   $n_{d14} = 1.53542$   $\nu_{d14} = 55.78$
$r_{15} = -16.4971$ (aspherical)
  $d_{15} = 16.9055$
$r_{16} = \infty$ (eyepoint)

Aspherical coefficients
Second surface $K = -1.2947$
$A_4 = 2.38204 \times 10^{-5}$   $A_6 = 4.87600 \times 10^{-7}$   $A_8 = -3.73584 \times 10^{-9}$
Third surface $K = -0.2620$
$A_4 = -1.35699 \times 10^{-4}$   $A_6 = 4.65011 \times 10^{-7}$   $A_8 = -1.87327 \times 10^{-8}$
Fourth surface $K = -0.0225$
$A_4 = 4.04582 \times 10^{-5}$   $A_6 = 7.12976 \times 10^{-8}$   $A_8 = -9.76450 \times 10^{-9}$
Fifth surface $K = 0.2139$
$A_4 = 6.19005 \times 10^{-4}$   $A_6 = -3.14679 \times 10^{-5}$   $A_8 = 7.58697 \times 10^{-7}$
Sixth surface $K = -0.0424$
$A_4 = 4.58626 \times 10^{-5}$   $A_6 = -2.40512 \times 10^{-5}$   $A_8 = 5.34729 \times 10^{-7}$
Eighth surface $K = 0.1566$
$A_4 = 2.05649 \times 10^{-4}$   $A_6 = 2.93949 \times 10^{-7}$   $A_8 = 2.68796 \times 10^{-8}$ -continued Numerical data 19

Ninth surface $K = 0.0143$
$A_4 = 7.12313 \times 10^{-6}$   $A_6 = -6.74794 \times 10^{-7}$
Twelfth surface $K = 0.0000$
$A_4 = -1.15138 \times 10^3$   $A_6 = 8.42829 \times 10^{-6}$
Fifteenth surface $K = 0.0000$
$A_4 = 4.56110 \times 10^{-5}$   $A_6 = 1.18793 \times 10^{-7}$ Zoom data

| | Wide-angle position | Middle position | Telephoto position |
|---|---|---|---|
| D2 | 11.7539 | 7.0573 | 3.4654 |
| D4 | 1.2500 | 8.5614 | 16.1337 |
| D6 | 8.1857 | 5.3729 | 1.0000 | mh = 10.076 mm

| | Wide-angle | Middle | Telephoto |
|---|---|---|---|
| f123 | -10.700 | -21.016 | -43.277 |
| m23 | 0.529 | 1.032 | 2.072 |
| m2 | | -1.000 | |
| m3 | | | -1.032 |
| Condition (9) MG45 | -0.743 | -0.744 | -0.746 |

Conditions (1), (7) mh/fe = 0.671
Conditions (2), (3) fe = 15.009 mm
Condition (8) φ (mh/2) = -0.451821 (l/mm)
Condition (10) β3 = -1.032
Condition (11) SF2 = -0.411
Condition (12) f2/f3 = -1.625
Condition (13) fw/fFw = -0.741
Condition (14) fT/fFT = -0.719
Condition (15) mT/mW = 3.925
Condition (16) fw/fw123 = -0.741
Condition (17) fT/fT123 = -0.719

Twentieth Embodiment

Figure 63A:
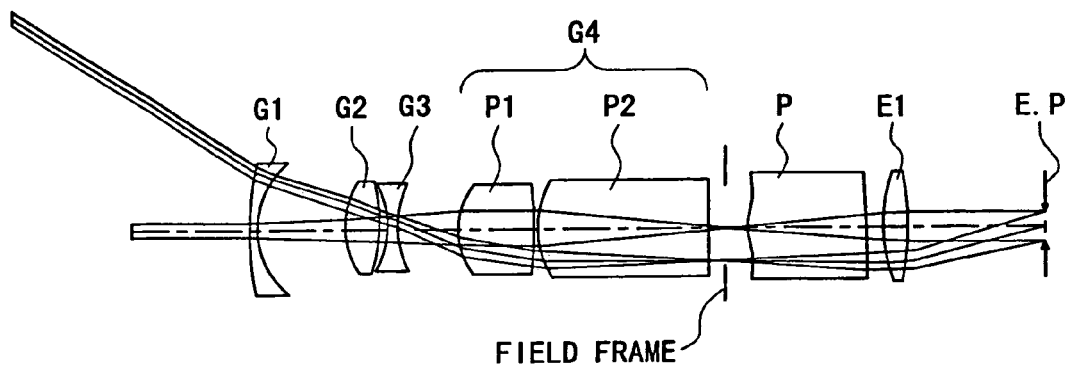
FIGS. 63A, 63B, and 63C are sectional views showing arrangements, developed along the optical axis, at wide-angle, middle, and telephoto positions, respectively, of the real image mode finder optical system in a twentieth embodiment.
Figure 63B:
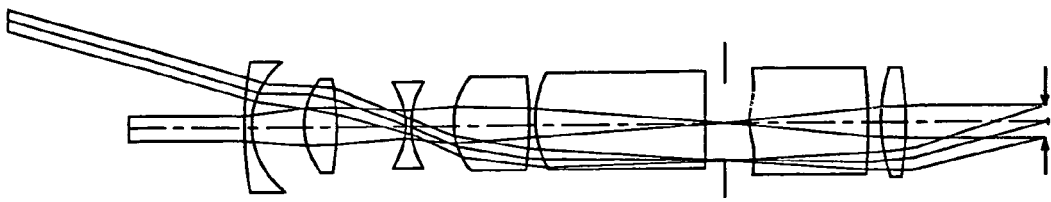
Figure 63C:
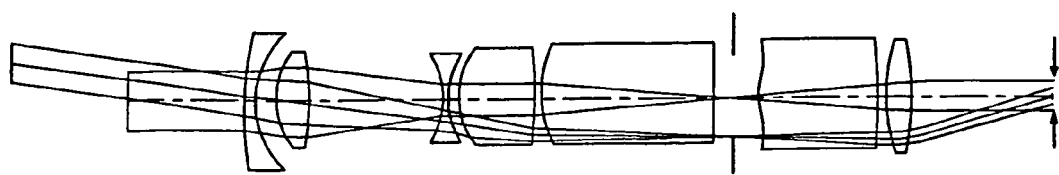

The real image mode finder optical system of this embodiment, as shown in FIGS. 63A–63C, has nearly the same arrangement as that of the nineteenth embodiment with the exception of lens data. A substantial difference with the nineteenth embodiment is that the exit surface of the prism P2 has a curvature in twentieth embodiment.

Subsequently, numerical data of optical members constituting the real image mode finder optical system according to the twentieth embodiment are shown below.

Numerical data 20

| | Wide-angle position | Middle position | Telephoto position |
|---|---|---|---|
| m | 0.557 | 1.038 | 2.023 |
| ω (°) | 32.360 | 17.517 | 9.010 |
| f (mm) | 8.356 | 15.584 | 30.363 |
| Pupil dia. (mm) | 4.000 | | |

$r_1 = 59.2465$
  $d_1 = 1.0000$   $n_{d1} = 1.58423$   $\nu_{d1} = 30.49$
$r_2 = 8.3310$ (aspherical)
  $d_2 = D2$ (variable)
$r_3 = 8.3856$ (aspherical)
  $d_3 = 4.1672$   $n_{d3} = 1.49241$   $\nu_{d3} = 57.66$
$r_4 = -17.8798$
  $d_4 = D4$ (variable)
$r_5 = -13.7008$
  $d_5 = 0.7000$   $n_{d5} = 1.58423$   $\nu_{d5} = 30.49$ -continued Numerical data 20

$r_6 = 8.6409$ (aspherical)
$d_6 = D6$ (variable)
$r_7 = 11.7739$
$d_7 = 9.8661$    $n_{d7} = 1.52542$    $v_{d7} = 55.78$
$r_8 = -29.5195$ (aspherical)
$d_8 = 1.0000$
$r_9 = 15.0708$
$d_9 = 22.3752$    $n_{d9} = 1.52542$    $v_{d9} = 55.78$
$r_{10} = -416.8001$
$d_{10} = 2.0410$
$r_{11} = \infty$ (field frame)
$d_{11} = 2.4340$
$r_{12} = 15.7244$ (aspherical)
$d_{12} = 18.3578$    $n_{d12} = 1.52542$    $v_{d12} = 55.78$
$r_{13} = -20.5538$
$d_{13} = 1.2739$
$r_{14} = 30.8079$ (aspherical)
$d_{14} = 3.4263$    $n_{d14} = 1.52542$    $v_{d14} = 55.78$
$r_{15} = -24.2754$ (aspherical)
$d_{15} = 15.7651$
$r_{16} = \infty$ (eyepoint)

Aspherical coefficients
Second surface $K = -1.3070$
$A_4 = -5.42129 \times 10^{-5}$    $A_6 = 2.66433 \times 10^{-6}$    $A_8 = -1.96586 \times 10^{-8}$ Third surface $K = -0.2445$
$A_4 = -3.33944 \times 10^{-4}$    $A_6 = 3.11379 \times 10^{-7}$    $A_8 = -1.64750 \times 10^{-8}$ Sixth surface $K = -0.0650$
$A_4 = -5.31385 \times 10^{-4}$    $A_6 = 4.99350 \times 10^{-6}$    $A_8 = -6.09994 \times 10^{-8}$ Eighth surface $K = 0.1673$
$A_4 = 2.10857 \times 10^{-4}$    $A_6 = 1.83918 \times 10^{-7}$    $A_8 = 3.12747 \times 10^{-8}$ Twelfth surface $K = 0.0000$
$A_4 = -1.45924 \times 10^{-3}$    $A_6 = 1.59291 \times 10^{-5}$ Fourteenth $K = 0.0000$
$A_4 = 7.03020 \times 10^{-5}$    $A_6 = 4.89240 \times 10^{-7}$ Fifteenth $K = 0.0000$
$A_4 = 8.28668 \times 10^{-5}$    $A_6 = 3.99233 \times 10^{-7}$ Zoom data

|  | Wide-angle position | Middle position | Telephoto position |
|---|---|---|---|
| D2 | 11.8115 | 7.0078 | 2.9081 |
| D4 | 1.0094 | 6.6799 | 14.3532 |
| D6 | 7.7860 | 4.6744 | 1.0000 |
| mh= 9.992 mm | | | |
| f123 | -12.274 | -23.044 | -46.120 |
| m23 | 0.734 | 1.370 | 2.676 |
| m2 |  | -1.000 | |
| m3 |  | -1.370 | |
| Condition (9) MG45 | -0.683 | -0.683 | -0.683 |

Conditions (1), (7) mh/fe    = 0.666
Conditions (2), (3) fe    = 15.010 mm
Condition (8) φ (mh/2)    = -0.322195 (1/mm)
Condition (10) β3    = -1.370
Condition (11) SF2    = -0.361
Condition (12) f2/f3    = -1.364
Condition (13) fw/fFw    = -0.681
Condition (14) fT/fFT    = -0.658
Condition (15) mT/mW    = 3.634
Condition (16) fw/fw123    = -0.681
Condition (17) fT/fT123    = -0.658

Twenty-First Embodiment

Figure 64A:
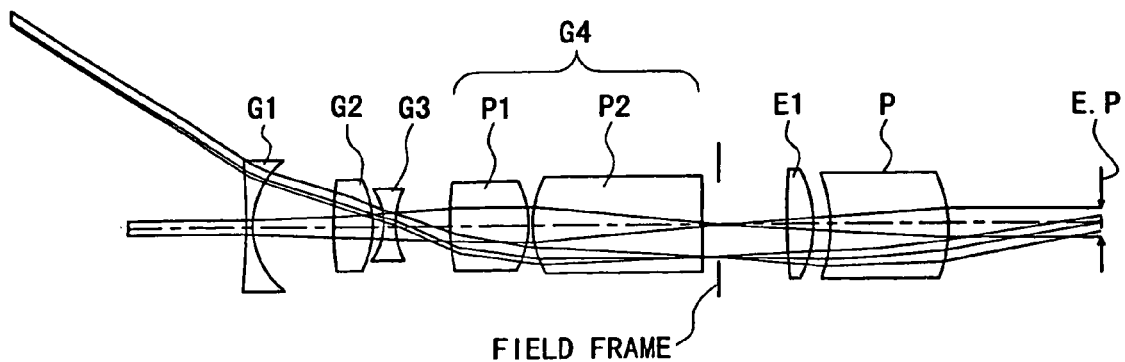
FIGS. 64A, 64B, and 64C are sectional views showing arrangements, developed along the optical axis, at wide-angle, middle, and telephoto positions, respectively, of the real image mode finder optical system in a twenty-first embodiment.
Figure 64B:
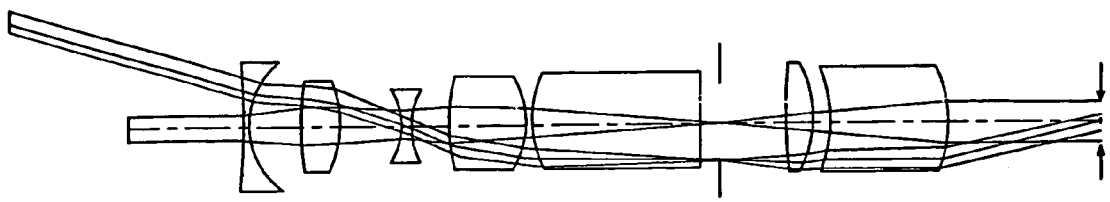
Figure 64C:
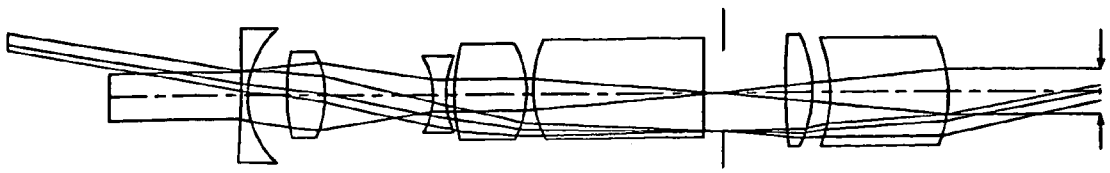

In the real image mode finder optical system of this embodiment, as shown in FIGS. 64A–64C, the objective optical system includes, in order from the object side, the first unit G1 with a negative refracting power, the second unit G2 with a positive refracting power, the third unit G3 with a negative refracting power, and the fourth unit G4 with a positive refracting power, and has a positive refracting power as a whole.

The fourth unit G4 is constructed with two prisms P1 and P2. The eyepiece optical system is constructed with the prism P and the positive lens E1 and has a positive refracting power as a whole.

The image erecting means includes the prisms P1 and P2 and the prism P. In the real image mode finder optical system of the twenty-first embodiment, the intermediate image formed by the objective optical system is interposed between the prism P2 and the positive lens E1, and the field frame, such as that shown in FIG. 4, is provided in the proximity of its imaging position.

The magnification of the finder is changed in the range from the wide-angle position to the telephoto position by fixing the first unit G1 and the fourth unit G4 and by simply moving the second unit G2 toward the object side and the third unit G3 toward the eyepiece side along the optical axis.

Each of the first unit G1, the second unit G2, and the third unit G3 is constructed with a single lens. The entrance surface and the exit surface of the prism P1 and the entrance surface of the prism P2 have curvatures. The entrance surface and the exit surface of the prism P also have curvatures.

Figure 65:
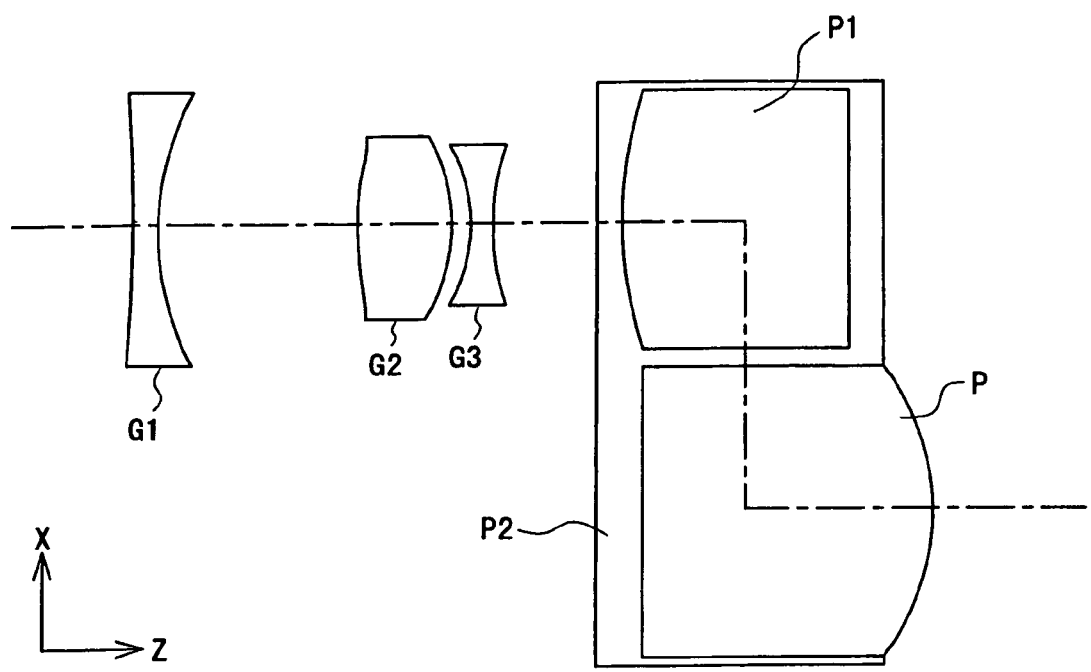
FIG. 65 is a plan view of the real image mode finder optical system in the twenty-first embodiment.
Figure 66:
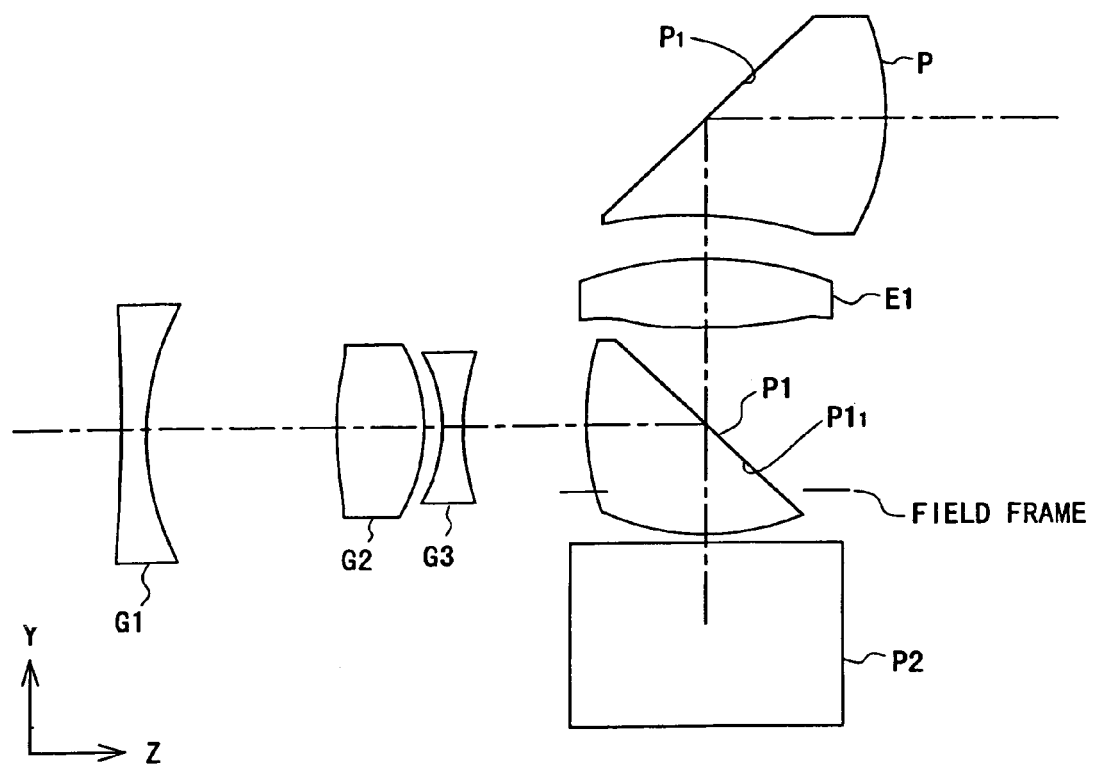
FIG. 66 is a side view of the real image mode finder optical system of FIG. 65.
Figure 67:
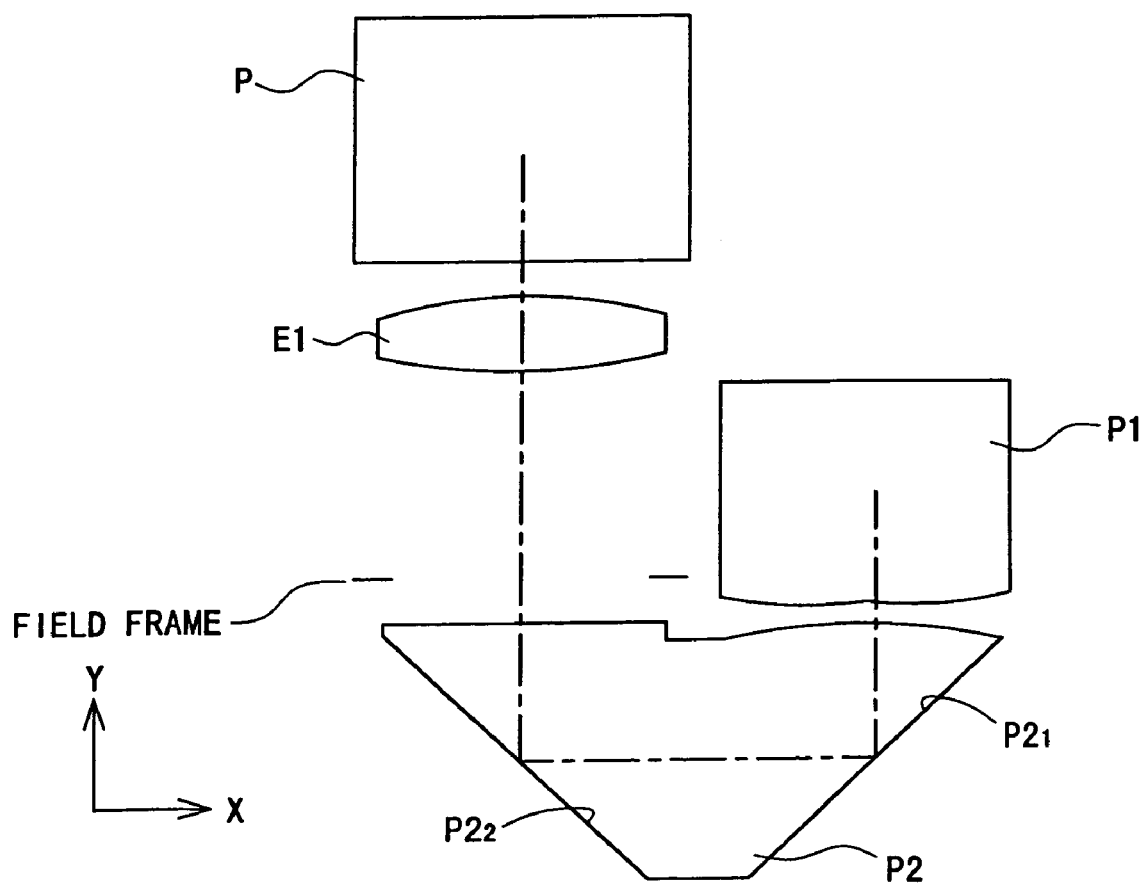
FIG. 67 is a rear view of the real image mode finder optical system of FIG. 65.

The prisms P1 and P2 and the prism P, as shown in FIGS. 65–67, are provided with reflecting surfaces $P_1$, $P2_1$, $P2_2$, and $P_1$ along the optical path so that the optical axis is bent to erect an image. Specifically, as shown in FIG. 66, the reflecting surface $P1_1$ provided in the prism P1 bends the optical axis in a Y-Z plane; as shown in FIG. 67, the two reflecting surfaces $P2_1$ and $P2_2$ provided in the prism P2 bend the optical axis twice in the X-Y plane in this order from the object side; and as shown in FIG. 66, the reflecting surface $P_1$ provided in the prism P bends the optical axis in the Y-Z plane. In this way, an erect image is obtained. Also, the arrangement of the reflecting surfaces is based on that of a Porro prism. Angles made with the optical axis bent by the reflecting surfaces are 90 degrees. The reflecting surfaces $P1_1$, $P2_1$, and $P2_2$ of the prism P1 and the prism P2 are coated with metal films, such as silver and aluminum. The reflecting surface $P_1$ of the prism P utilizes total reflection.

However, the ways of bending the optical axis through the prisms and the angles of the optical axis bent by the reflecting surfaces are not limited to the above description. For example, the angle of the optical axis bent by one reflecting surface of the prism P2 may be made smaller than 90 degrees so that this reflecting surface is coated with a metal film. Moreover, the angle of the optical axis bent by the other reflecting surface of the prism P2 may also be made larger than 90 degrees so that this reflecting surface utilizes total reflection.

The positive lens E1 is constructed so that diopter adjustment can be made in accordance with an observer's diopter.

Subsequently, numerical data of optical members constituting the real image mode finder optical system according to the twenty-first embodiment are shown below.

Numerical data 21

|  | Wide-angle position | Middle position | Telephoto position |
|---|---|---|---|
| m | 0.394 | 0.659 | 1.049 |
| ω (°) | 32.118 | 19.007 | 12.091 |
| f (mm) | 6.866 | 11.492 | 18.288 |

Pupil dia. (mm) 5.000
$r_1 = -59.3919$
  $d_1 = 1.0000$   $n_{d1} = 1.58423$   $\nu_{d1} = 30.49$
$r_2 = 10.3748\,8$ (aspherical)
  $d_2 = D2$ (variable)
$r_3 = 14.1522$ (aspherical)
  $d_3 = 3.7000$   $n_{d3} = 1.52542$   $\nu_{d3} = 55.78$
$r_4 = -9.2660$ (aspherical)
  $d_4 = D4$ (variable)
$r_5 = -7.5095$ (aspherical)
  $d_5 = 1.0000$   $n_{d5} = 1.58425$   $\nu_{d5} = 30.35$
$r_6 = 13.7636$
  $d_6 = D6$ (variable)
$r_7 = 20.3870$
  $d_7 = 10.0000$   $n_{d7} = 1.52542$   $\nu_{d7} = 55.78$
$r_8 = -13.4385$ (aspherical)
  $d_8 = 0.4000$
$r_9 = 12.4702$ (aspherical)
  $d_9 = 22.0000$   $n_{d9} = 1.52542$   $\nu_{d9} = 55.78$
$r_{10} = \infty$
  $d_{10} = 2.0000$
$r_{11} = \infty$ (field frame)
  $d_{11} = 7.9991$
$r_{12} = 18.8914$ (aspherical)
  $d_{12} = 3.1688$   $n_{d12} = 1.52542$   $\nu_{d12} = 55.78$
$r_{13} = -15.1681$
  $d_{13} = 2.0000$
$r_{14} = -13.4956$ (aspherical)
  $d_{14} = 12.2000$   $n_{d14} = 1.52542$   $\nu_{d14} = 55.78$
$r_{15} = -10.7971$ (aspherical)
  $d_{15} = 13.5000$
$r_{16} = \infty$ (eyepoint)

Aspherical coefficients
Second surface
$K = -1.8801$
$A_4 = 8.93195 \times 10^{-5}$   $A_6 = -1.59803 \times 10^{-5}$   $A_8 = 2.26734 \times 10^{-7}$ Third surface
$K = -26.0761$
$A_4 = 8.01991 \times 10^{-4}$   $A_6 = =1.09865 \times 10^{-4}$   $A_8 = 4.19307 \times 10^{-6}$
$A_{10} = -1.65929 \times 10^{-7}$ Fourth surface
$K = 0.7079$
$A_4 = 1.90150 \times 10^{-4}$   $A_6 = -3.87917 \times 10^{-5}$   $A_8 = 8.76025 \times 10^{-7}$
$A_{10} = -3.24756 \times 10^{-8}$ Fifth surface
$K = -0.4742$
$A_4 = 4.50016 \times 10^{-4}$   $A_6 = 4.48738 \times 10^{-5}$   $A_8 = -3.79556 \times 10^{-6}$ Eighth surface
$K = 0.8140$
$A_4 = -1.12430 \times 10^{-3}$   $A_6 = 5.37408 \times 10^{-5}$   $A_8 = -1.01121 \times 10^{-6}$ Ninth surface
$K = -2.4434$
$A_4 = -1.05938 \times 10^{-3}$   $A_6 = 4.60167 \times 10^{-5}$   $A_8 = -8.38383 \times 10^{-7}$ Twelfth surface
$K = 0.0000$
$A_4 = 4.97477 \times 10^{-4}$   $A_6 = -3.14535 \times 10^{-5}$   $A_8 = -3.04078 \times 10^{-8}$ Fourteenth surface
$K = 0.0000$
$A_4 = -8.27827 \times 10^{-4}$   $A_6 = 5.41341 \times 10^{-5}$   $A_8 = -6.06561 \times 10^{-7}$ Fifteenth surface
$K = 0.0000$
$A_4 = -4.89807 \times 10^{-6}$   $A_6 = 7.07749 \times 10^{-6}$   $A_8 = -9.70475 \times 10^{-8}$ Zoom data

Numerical data 21

|  |  | Wide-angle position | Middle position | Telephoto position |
|---|---|---|---|---|
| D2 |  | 8.2666 | 5.9354 | 3.4477 |
| D4 |  | 0.8000 | 5.6220 | 10.2589 |
| D6 |  | 5.3399 | 2.8492 | 0.7000 | mh = 8.240 mm
| f123 |  | −9.787 | −16.419 | −26.311 |
| m23 |  | 0.651 | 1.088 | 1.729 |
| m2 |  |  | −1.000 |  |
| m3 |  |  | −1.088 |  |
| Condition (9) | MG45 | −0.703 | −0.704 | −0.705 |
| Conditions (1), (7) | mh/fe | = 0.473 |  |  |
| Conditions (2), (3) | fe | = 17.434 mm |  |  |
| Condition (10) | β3 | = −1.088 |  |  |
| Condition (11) | SF2 | = 0.209 |  |  |
| Condition (12) | f2/f3 | = −1.379 |  |  |
| Condition (13) | fw/fFw | = −0.702 |  |  |
| Condition (14) | fT/fFT | = −0.695 |  |  |
| Condition (15) | mT/mW | = 2.663 |  |  |
| Condition (16) | fw/fw123 | = −0.702 |  |  |
| Condition (17) | fT/fT123 | = −0.695 |  |  |

Twenty-Second Embodiment

Figure 68A:
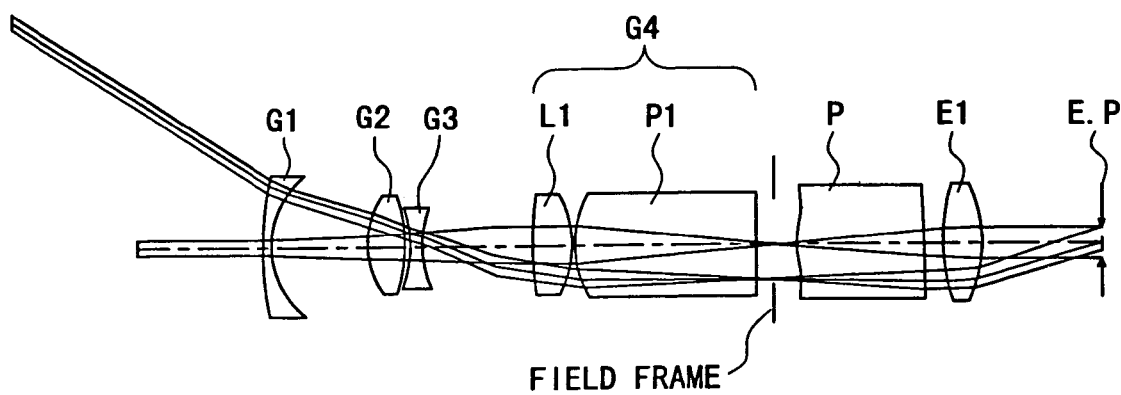
FIGS. 68A, 68B, and 68C are sectional views showing arrangements, developed along the optical axis, at wide-angle, middle, and telephoto positions, respectively, of the real image mode finder optical system in a twenty-second embodiment.
Figure 68B:
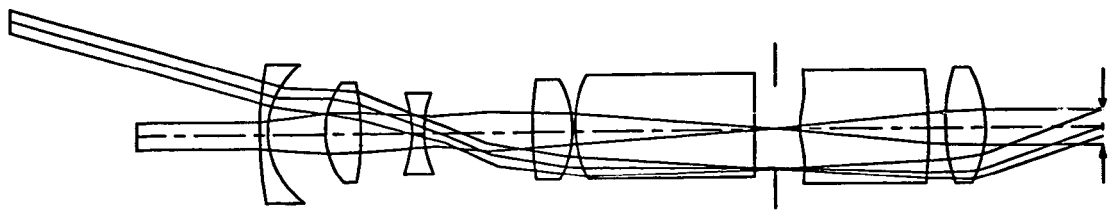
Figure 68C:
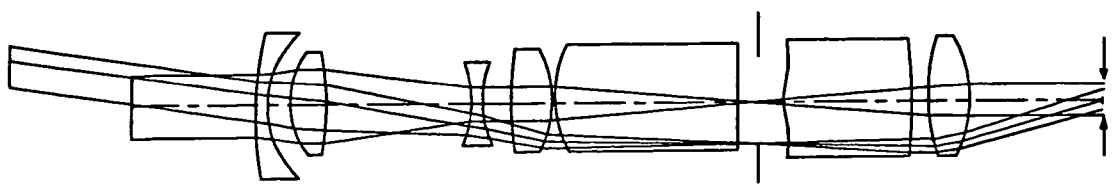

In the real image mode finder optical system of this embodiment, as shown in FIGS. 68A–68C, the objective optical system includes, in order from the object side, the first unit G1 with a negative refracting power, the second unit G2 with a positive refracting power, the third unit G3 with a negative refracting power, and the fourth unit G4 with a positive refracting power, and has a positive refracting power as a whole.

The fourth unit G4 is constructed with the positive lens L1 and the prism P1. The eyepiece optical system is constructed with the prism P and the positive lens E1 and has a positive refracting power as a whole.

The image erecting means includes the prism P1 and the prism P. In the real image mode finder optical system of the second embodiment, the intermediate image formed by the objective optical system is interposed between the prism P1 and the prism P, and the field frame, such as that shown in FIG. 4, is provided in the proximity of its imaging position.

The magnification of the finder is changed in the range from the wide-angle position to the telephoto position by fixing the first unit G1 and the fourth unit G4 and by simply moving the second unit G2 toward the object side and the third unit G3 toward the eyepiece side along the optical axis.

Each of the first unit G1, the second unit G2, and the third unit G3 is constructed with a single lens. The entrance surface of the prism P1 has a curvature. The entrance surface and the exit surface of the prism P also have curvatures. The prism P1 and the prism P are provided with reflecting surfaces along the optical path so that the optical axis is bent to obtain an erect image. For example, the prism P1 is provided with three reflecting surfaces for bending the optical axis twice in the Y-Z plane and once in the X-Z plane in this order from the object side, and the prism P is provided with one reflecting surface for bending the optical axis in the X-Z plane to erect the image. Also, the arrangement of the reflecting surfaces is based on that of a Porro prism. Angles made with the optical axis bent by the reflecting surfaces are such that, for example, the angle of the optical axis bent by one reflecting surface of the prism P1 is smaller than 90 degrees and the angles of the optical axis bent by the remaining two reflecting surfaces are larger than 90 degrees, while the angle of the optical axis bent by the reflecting surface of the prism P is smaller than 90 degrees. The reflecting surfaces making angles smaller than 90 degrees are coated with metal films, such as silver and aluminum. The reflecting surfaces of angles larger than 90 degrees utilize total reflection.

However, the angles of the optical axis bent by the reflecting surfaces are not limited to the above description. For example, the angle of the optical axis bent by the most field-frame-side reflecting surface of the prism P1 may be made smaller than 90 degrees so that this reflecting surface is coated with a metal film. Moreover, the angle of the optical axis bent by the reflecting surface of the prism P may also be made larger than 90 degrees so that this reflecting surface utilizes total reflection.

The positive lens E1 is constructed so that diopter adjustment can be made in accordance with an observer's diopter.

Subsequently, numerical data of optical members constituting the real image mode finder optical system according to the twenty-second embodiment are shown below.

Numerical data 22

| | Wide-angle position | Middle position | Telephoto position |
|---|---|---|---|
| m | 0.710 | 1.045 | 2.031 |
| ω (°) | 26.166 | 17.592 | 9.011 |
| f (mm) | 10.647 | 15.663 | 30.438 |
| Pupil dia. (mm) 4.000 | | | |

$r_1 = 94.9717$
  $d_1 = 0.9721$  $n_{d1} = 1.58423$  $\upsilon_{d1} = 30.49$
$r_2 = 9.3965$ (aspherical)
  $d_2 = D2$ (variable)
$r_3 = 9.8091$ (aspherical)
  $d_3 = 4.2874$  $n_{d3} = 1.52542$  $\upsilon_{d3} = 55.78$
$r_4 = -25.4274$ (aspherical)
  $d_4 = D4$ (variable)
$r_5 = -16.9121$
  $d_5 = 1.0000$  $n_{d5} = 1.58423$  $\upsilon_{d5} = 30.49$
$r_6 = 15.2040$ (aspherical)
  $d_6 = D6$ (variable)
$r_7 = 40.9744$
  $d_7 = 3.5824$  $n_{d7} = 1.52542$  $\upsilon_{d7} = 55.78$
$r_8 = -14.7461$ (aspherical)
  $d_8 = 0.5000$
$r_9 = 21.4998$ (aspherical)
  $d_9 = 28.4133$  $n_{d9} = 1.52542$  $\upsilon_{d9} = 55.78$
$r_{10} = \infty$
  $d_{10} = 1.8195$
$r_{11} = \infty$ (field frame)
  $d_{11} = 2.3065$
$r_{12} = 15.5002$ (aspherical)
  $d_{12} = 15.7893$  $n_{d12} = 1.52542$  $\upsilon_{d12} = 55.78$
$r_{13} = -35.0088$
  $d_{13} = 1.9666$
$r_{14} = 27.5692$ (aspherical)
  $d_{14} = 5.0860$  $n_{d14} = 1.52542$  $\upsilon_{d14} = 55.78$
$r_{15} = -16.2713$ (aspherical)
  $d_{15} = 16.9035$
$r_{16} = \infty$ (eyepoint)

Aspherical coefficients
Second surface $K = -1.2960$
$A_4 = 2.42034 \times 10^{-5}$  $A_6 = -4.03294 \times 10^{-7}$  $A_8 = -3.85761 \times 10^{-10}$
Third surface $K = -0.2523$
$A_4 = -1.40079 \times 10^{-4}$  $A_6 = 9.09631 \times 10^{-8}$  $A_8 = -7.25698 \times 10^{-9}$ -continued Numerical data 22

| | Wide-angle position | Middle position | Telephoto position |
|---|---|---|---|

Fourth surface $K = -0.0226$
$A_4 = 2.34829 \times 10^{-5}$  $A_6 = 6.60458 \times 10^{-7}$  $A_8 = -6.09388 \times 10^{-9}$
Sixth surface $K = -0.0504$
$A_4 = -1.07083 \times 10^{-4}$  $A_6 = 1.32744 \times 10^{-6}$  $A_8 = -4.22406 \times 10^{-9}$
Eighth surface $K = 0.1637$
$A_4 = 5.89020 \times 10^{-5}$  $A_6 = 2.51165 \times 10^{-7}$  $A_8 = 1.03528 \times 10^{-8}$
Ninth surface $K = 0.0039$
$A_4 = -3.04882 \times 10^{-6}$  $A_6 = 4.78283 \times 10^{-7}$
Twelfth surface $K = 0.0000$
$A_4 = -1.19998 \times 10^{-3}$  $A_6 = 1.07234 \times 10^{-5}$
Fourteenth surface $K = 0.0000$
$A_4 = 3.35581 \times 10^{-5}$  $A_6 = -1.60128 \times 10^{-7}$
Fifteenth surface $K = 0.0000$
$A_4 = 7.31972 \times 10^{-5}$  $A_6 = 9.93972 \times 10^{-9}$ Zoom data

| | | Wide-angle | Middle | Telephoto |
|---|---|---|---|---|
| D2 | | 8.3076 | 6.0828 | 3.0961 |
| D4 | | 1.1490 | 6.5799 | 16.8299 |
| D6 | | 11.9688 | 8.7628 | 1.4995 |
| mh = 9.844 mm | | | | |
| f123 | | −21.628 | −32.011 | −64.323 |
| m23 | | 1.204 | 1.771 | 3.458 |
| m2 | | | −1.328 | |
| m3 | | | −1.333 | |
| Condition (9) | MG45 | −0.495 | −0.495 | −0.495 |
| Conditions (1), (7) | mh/fe | = 0.657 | | |
| Conditions (2), (3) | fe | = 14.990 mm | | |
| Condition (11) | SF2 | = −0.443 | | |
| Condition (12) | F2/f3 | = −1.038 | | |
| Condition (13) | fw/fFw | = −0.492 | | |
| Condition (14) | fT/fFT | = −0.473 | | |
| Condition (15) | mT/mW | = 2.859 | | |
| Condition (16) | fw/fw123 | = −0.492 | | |
| Condition (17) | fT/fT123 | = −0.473 | | |

Twenty-Third Embodiment

Figure 69A:
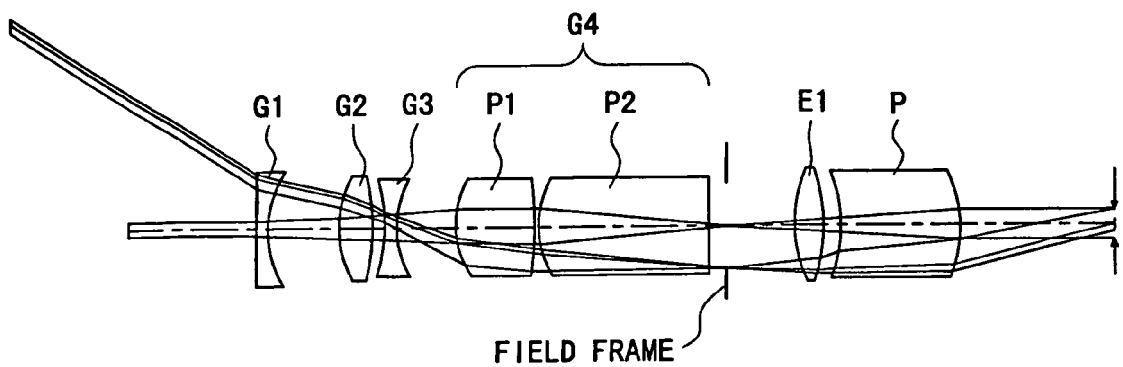
FIGS. 69A, 69B, and 69C are sectional views showing arrangements, developed along the optical axis, at wide-angle, middle, and telephoto positions, respectively, of the real image mode finder optical system in a twenty-third embodiment.
Figure 69B:
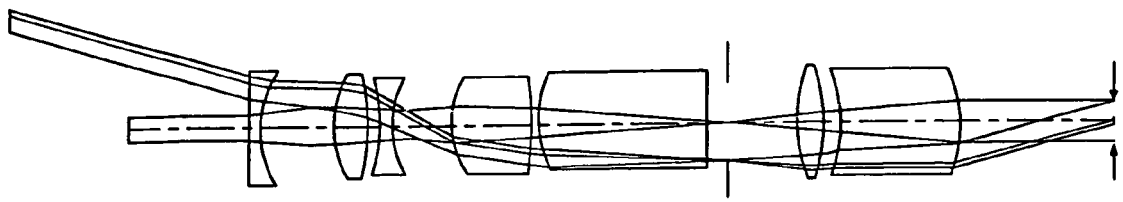
Figure 69C:
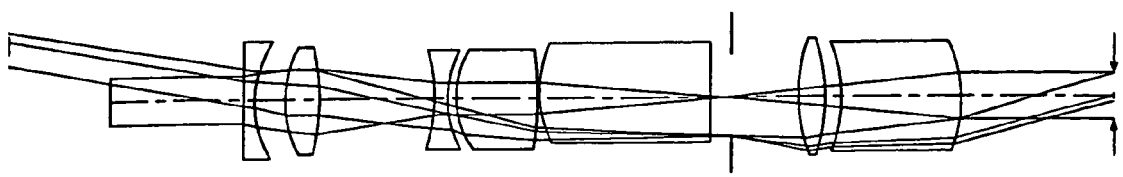

The real image mode finder optical system of this embodiment, as shown in FIGS. 69A–69C, has nearly the same arrangement as that of the twenty-first embodiment with the exception of lens data.

Subsequently, numerical data of optical members constituting the real image mode finder optical system according to the twenty-third embodiment are shown below.

Numerical data 23

| | Wide-angle position | Middle position | Telephoto position |
|---|---|---|---|
| m | 0.574 | 0.905 | 1.568 |
| ω (°) | 24.652 | 15.498 | 8.841 |
| f (mm) | 10.617 | 16.725 | 28.996 |
| Pupil dia. (mm) 4.000 | | | |

-continued

Numerical data 23

|  | Wide-angle position | Middle position | Telephoto position |
|---|---|---|---|
| $r_1 = -920.9537$ | | | |
| $d_1 = 1.0000$  $n_{d1} = 1.58423$  $\upsilon_{d1} = 30.49$ | | | |
| $r_2 = 9.9330$ (aspherical) | | | |
| $d_2 = D2$ (variable) | | | |
| $r_3 = 9.6882$ (aspherical) | | | |
| $d_3 = 4.1510$  $n_{d3} = 1.52542$  $\upsilon_{d3} = 55.78$ | | | |
| $r_4 = -23.0106$ (aspherical) | | | |
| $d_4 = D4$ (variable) | | | |
| $r_5 = -14.4812$ (aspherical) | | | |
| $d_5 = 1.0000$  $n_{d5} = 1.58425$  $\upsilon_{d5} = 30.35$ | | | |
| $r_6 = 14.7812$ (aspherical) | | | |
| $d_6 = D6$ (variable) | | | |
| $r_7 = 11.6881$ | | | |
| $d_7 = 10.4000$  $n_{d7} = 1.52542$  $\upsilon_{d7} = 55.78$ | | | |
| $r_8 = -44.1162$ (aspherical) | | | |
| $d_8 = 0.5000$ | | | |
| $r_9 = 19.0394$ (aspherical) | | | |
| $d_9 = 21.0918$  $n_{d9} = 1.52542$  $\upsilon_{d9} = 55.78$ | | | |
| $r_{10} = \infty$ | | | |
| $d_{10} = 2.9577$ | | | |
| $r_{11} = \infty$ (field frame) | | | |
| $d_{11} = 8.6051$ | | | |
| $r_{12} = 18.8914$ (aspherical) | | | |
| $d_{12} = 3.0466$  $n_{d12} = 1.52542$  $\upsilon_{d12} = 55.78$ | | | |
| $r_{13} = -19.3762$ | | | |
| $d_{13} = 2.5000$ | | | |
| $r_{14} = 22.1615$ (aspherical) | | | |
| $d_{14} = 14.0000$  $n_{d14} = 1.52542$  $\upsilon_{d14} = 55.78$ | | | |
| $r_{15} = -13.1330$ (aspherical) | | | |
| $d_{15} = 16.9541$ | | | |
| $r_{16} = \infty$ (eyepoint) | | | |

Aspherical coefficients
Second surface $K = -1.2958$
$A_4 = -1.37883 \times 10^{-4}$  $A_6 = 3.49813 \times 10^{-6}$  $A_8 = -2.85996 \times 10^{-8}$ Third surface $K = -0.2610$
$A_4 = -2.84178 \times 10^{-4}$  $A_6 = 2.18425 \times 10^{-6}$  $A_8 = 1.89724 \times 10^{-8}$ Fourth surface $K = -0.0222$
$A_4 = -3.94404 \times 10^{-5}$  $A_6 = 2.36146 \times 10^{-6}$  $A_8 = 1.07129 \times 10^{-8}$ Fifth surface $K = 0.2136$
$A_4 = 7.49839 \times 10^{-4}$  $A_6 = -3.41182 \times 10^{-5}$  $A_8 = 9.01815 \times 10^{-7}$ Sixth surface $K = -0.0419$
$A_4 = 6.33920 \times 10^{-4}$  $A_6 = -3.96052 \times 10^{-5}$  $A_8 = 1.13002 \times 10^{-6}$ Eighth surface $K = 0.1567$
$A_4 = 1.02994 \times 10^{-4}$  $A_6 = 3.46598 \times 10^{-6}$  $A_8 = 6.31270 \times 10^{-9}$ Ninth surface $K = 0.0129$
$A_4 = -6.13561 \times 10^{-5}$  $A_6 = 1.96098 \times 10^{-6}$ Twelfth surface $K = 0.0000$
$A_4 = -1.14754 \times 10^{-4}$  $A_6 = 2.96268 \times 10^{-6}$  $A_8 = -4.33585 \times 10^{-8}$ Fourteenth surface $K = 0.0000$
$A_4 = -1.44350 \times 10^{-4}$  $A_6 = -3.21946 \times 10^{-6}$  $A_8 = 6.14512 \times 10^{-8}$ Fifteenth surface $K = 0.0000$
$A_4 = -7.32422 \times 10^{-6}$  $A_6 = 5.88495 \times 10^{-7}$  $A_8 = -9.09150 \times 10^{-10}$ Zoom data

|  | Wide-angle position | Middle position | Telephoto position |
|---|---|---|---|
| D2 | 8.4479 | 5.9380 | 3.5969 |
| D4 | 2.3409 | 8.3613 | 16.2888 |
| D6 | 10.0702 | 6.5597 | 0.9733 |
| mh = 9.332 mm | | | |
| f123 | −20.012 | −31.646 | −56.048 |
| m23 | 1.168 | 1.864 | 3.229 |
| m2 | | −1.365 | |
| m3 | | −1.365 | |
| Condition (9) | MG45 | −0.533 | −0.535 | −0.537 |
| Conditions (1), (7) | mh/fe | = 0.505 | | |
| Conditions (2), (3) | fe | = 18.490 mm | | |
| Condition (11) | SF2 | = −0.407 | | |
| Condition (12) | F2/f3 | = −1.097 | | |
| Condition (13) | fw/fFw | = −0.530 | | |
| Condition (14) | fT/fFT | = −0.517 | | |
| Condition (15) | mT/mW | = 2.731 | | |
| Condition (16) | fw/fw123 | = −0.530 | | |
| Condition (17) | fT/fT123 | = −0.517 | | |

Twenty-Fourth Embodment

Figure 70A:
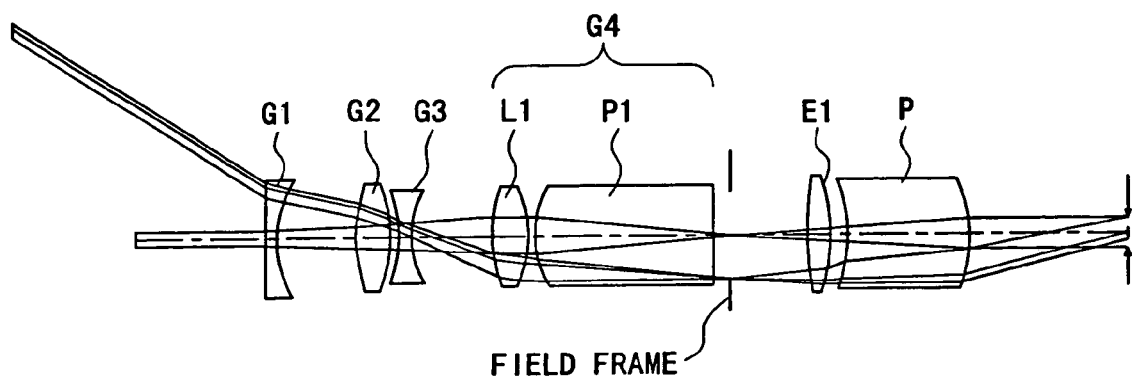
FIGS. 70A, 70B, and 70C are sectional views showing arrangements, developed along the optical axis, at wide-angle, middle, and telephoto positions, respectively, of the real image mode finder optical system in a twenty-fourth embodiment.
Figure 70B:
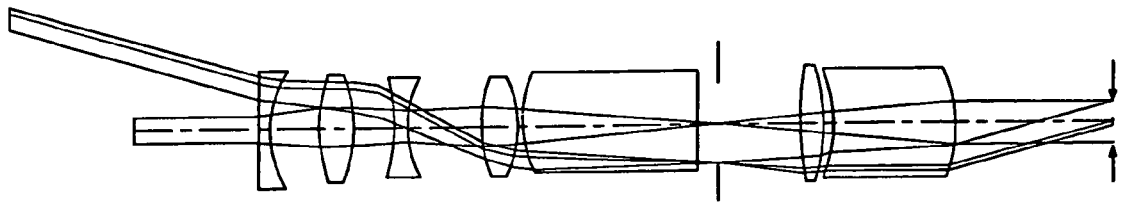
Figure 70C:
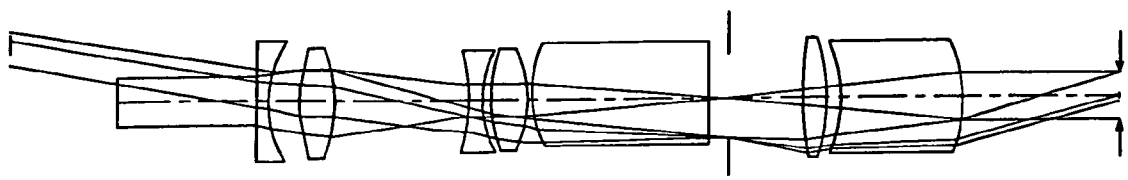

In the real image mode finder optical system of this embodiment, as shown in FIGS. 70A–70C, the objective optical system includes, in order from the object side, the first unit G6 with a negative refracting power, the second unit G2 with a positive refracting power, the third unit G3 with a negative refracting power, and the fourth unit G4 with a positive refracting power, and has a positive refracting power as a whole.

The fourth unit G4 is constructed with the positive lens L1 and the prism P1. The eyepiece optical system is constructed with the positive lens E1 and the prism P and has a positive refracting power as a whole.

The image erecting means includes the prism P1 and the prism P. In the real image mode finder optical system of the twenty-fourth embodiment, the intermediate image formed by the objective optical system is interposed between the prism P1 and the positive lens E1, and the field frame, such as that shown in FIG. 4, is provided in the proximity of its imaging position.

The magnification of the finder is changed in the range from the wide-angle position to the telephoto position by fixing the first unit G1 and the fourth unit G4 and by simply moving the second unit G2 toward the object side and the third unit G3 toward the eyepiece side along the optical axis.

Each of the first unit G1, the second unit G2, and the third unit G3 is constructed with a single lens. The entrance surface of the prism P1 has a curvature. The entrance surface and the exit surface of the prism P also have curvatures.

The prism P1 and the prism P are provided with reflecting surfaces along the optical path so that the optical axis is bent to obtain an erect image. For example, the prism P1 is provided with three reflecting surfaces for bending the optical axis once in the Y-Z plane and twice in the X-Y plane in this order from the object side, and the prism P is provided with one reflecting surface for bending the optical axis in the Y-Z plane to erect the image. Also, the arrangement of the reflecting surfaces is based on that of a Porro prism. Angles made with the optical axis bent by the reflecting surfaces are such that, for example, the angles of the optical axis bent by the reflecting surfaces of the prism P1 are smaller than 90 degrees. The three reflecting surfaces of the prism P1 are coated with metal films, such as silver and aluminum. The reflecting surface of the prism P utilizes total reflection.

However, the ways of bending the optical axis through the prisms and the angles of the optical axis bent by the reflecting surfaces are not limited to the above description. For example, the angle of the optical axis bent by the most field-frame-side reflecting surface of the prism P1 may be made smaller than 90 degrees so that this reflecting surface is coated with a metal film. Moreover, the angle of the optical axis bent by the second reflecting surface, from the field frame side, of the prism P1 may also be made larger than 90 degrees so that this reflecting surface utilizes total reflection.

The positive lens E1 is constructed so that diopter adjustment can be made in accordance with an observer's diopter.

Subsequently, numerical data of optical members constituting the real image mode finder optical system according to the twenty-fourth embodiment are shown below.

Numerical data 24

|  | Wide-angle position | Middle position | Telephoto position |
|---|---|---|---|
| m | 0.457 | 0.775 | 1.602 |
| ω (°) | 30.208 | 17.858 | 8.701 |
| f (mm) | 8.505 | 14.412 | 29.797 |

Pupil dia. (mm) 4.000
$r_1 = 75.2465$
  $d_1 = 1.0000$    $n_{d1} = 1.58423$    $v_{d1} = 30.49$
$r_2 = 8.8816$ (aspherical)
  $d_2 = D2$ (variable)
$r_3 = 10.2728$ (aspherical)
  $d_3 = 4.1473$    $n_{d3} = 1.52542$    $v_{d3} = 55.78$
$r_4 = -18.0037$ (aspherical)
  $d_4 = D4$ (variable)
$r_5 = -10.0864$ (aspherical)
  $d_5 = 1.0000$    $n_{d5} = 1.58425$    $v_{d5} = 30.35$
$r_6 = 10.3864$ (aspherical)
  $d_6 = D6$ (variable)
$r_7 = 19.6921$
  $d_7 = 4.3014$    $n_{d7} = 1.52542$    $v_{d7} = 55.78$
$r_8 = -13.1461$ (aspherical)
  $d_8 = 0.5000$
$r_9 = 21.4624$ (aspherical)
  $d_9 = 27.5577$    $n_{d9} = 1.52542$    $v_{d9} = 55.78$
$r_{10} = \infty$
  $d_{10} = 2.1330$
$r_{11} = \infty$ (field frame)
  $d_{11} = 8.3794$
$r_{12} = 18.8914$ (aspherical)
  $d_{12} = 3.1249$    $n_{d12} = 1.52542$    $v_{d12} = 55.78$
$r_{13} = -18.8429$
  $d_{13} = 2.5000$
$r_{14} = -19.8984$ (aspherical)
  $d_{14} = 14.0000$    $n_{d14} = 1.52542$    $v_{d14} = 55.78$
$r_{15} = -12.6982$ (aspherical)
  $d_{15} = 16.9541$
$r_{16} = \infty$ (eyepoint)

Aspherical coefficients
Second surface $K = -1.2958$
$A_4 = 3.44925 \times 10^{-6}$    $A_6 = 4.20426 \times 10^{-7}$    $A_8 = -7.66223 \times 10^{-9}$
Third surface $K = -0.2616$
$A_4 = -2.70426 \times 10^{-4}$    $A_6 = 1.77644 \times 10^{-6}$    $A_8 = -2.00847 \times 10^{-7}$
Fourth surface $K = -0.0223$
$A_4 = -7.38297 \times 10^{-5}$    $A_6 = 6.70806 \times 10^{-7}$    $A_8 = -1.54652 \times 10^{-7}$ -continued Numerical data 24

Fifth surface $K = 0.2135$
$A_4 = 3.49998 \times 10^{-4}$    $A_6 = -1.71207 \times 10^{-5}$    $A_8 = 3.68862 \times 10^{-7}$
Sixth surface $K = -0.0430$
$A_4 = -1.78394 \times 10^{-4}$    $A_6 = -7.98576 \times 10^{-6}$    $A_8 = 1.76981 \times 10^{-7}$
Eighth surface $K = 0.1579$
$A_4 = 4.99038 \times 10^{-6}$    $A_6 = 8.82927 \times 10^{-7}$    $A_8 = 1.18585 \times 10^{-8}$
Ninth surface $K = 0.0120$
$A_4 = -1.28730 \times 10^{-4}$    $A_6 = 5.21275 \times 10^{-7}$
Twelfth surface $K = 0.0000$
$A_4 = -2.49634 \times 10^{-4}$    $A_6 = 1.72455 \times 10^{-7}$    $A_8 = 2.31794 \times 10^{-9}$
Fourteenth surface $K = 0.0000$
$A_4 = 8.06332 \times 10^{-6}$    $A_6 = 4.07603 \times 10^{-7}$    $A_8 = -1.41628 \times 10^{-8}$
Fifteenth surface $K = 0.0000$
$A_4 = 3.96776 \times 10^{-5}$    $A_6 = 5.11111 \times 10^{-8}$    $A_8 = -1.38979 \times 10^{-10}$ Zoom data

|  |  | Wide-angle | Middle | Telephoto |
|---|---|---|---|---|
| D2 |  | 11.4348 | 8.0329 | 4.3575 |
| D4 |  | 1.2500 | 6.8862 | 14.8224 |
| D6 |  | 8.1779 | 5.9436 | 1.6828 |
| mh = 9.391 mm |
| f123 |  | -10.255 | -17.402 | -36.720 |
| m23 |  | 0.592 | 1.000 | 2.070 |
| m2 |  |  | -1.000 |  |
| m3 |  |  | -1.000 |  |
| Condition (9) | MG45 | -0.831 | -0.834 | -0.837 |
| Conditions (1), (7) | mh/fe | = 0.505 |
| Conditions (2), (3) | fe | = 18.603 mm |
| Condition (8) | φ(mh/2) | = -0.118345 (1/mm) |
| Condition (10) | β3 | = -1.000 |
| Condition (11) | SF2 | = -0.273 |
| Condition (12) | F2/f3 | = -1.524 |
| Condition (13) | fw/fFw | = -0.829 |
| Condition (14) | fT/fFT | = -0.811 |
| Condition (15) | mT/mW | = 3.503 |
| Condition (16) | fw/fw123 | = -0.829 |
| Condition (17) | fT/fT123 | = -0.811 |

The real image mode finder optical system according to the present invention constructed as mentoned above can be used in any of various photographing apparatuses, such as compact cameras, for example, 35 mm film cameras and APS film cameras; digital cameras using electronic image sensors, for example, CCDs and CMOS sensors; and video movies. A specific application example of this finder optical system will be described below.

Figure 71:
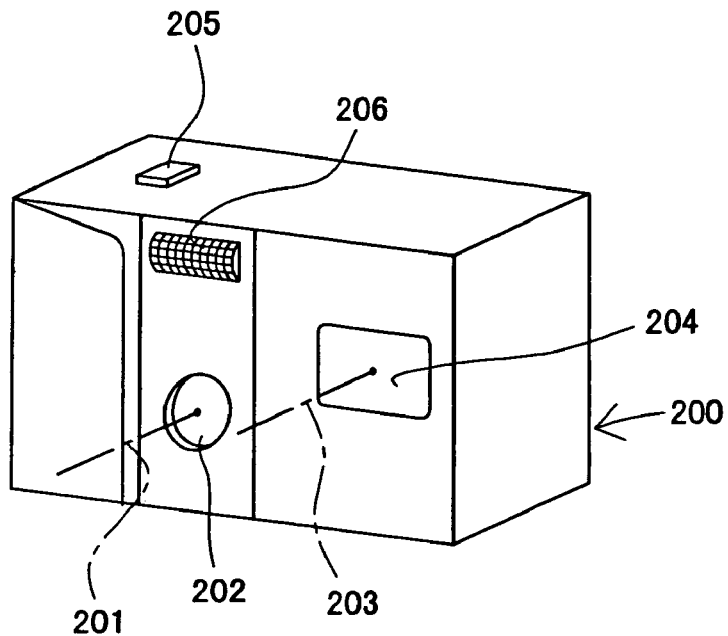
FIG. 71 is a front perspective view showing the appearance of an electronic camera in an embodiment of a photographing apparatus using the real image mode finder optical system of the present invention.
Figure 72:
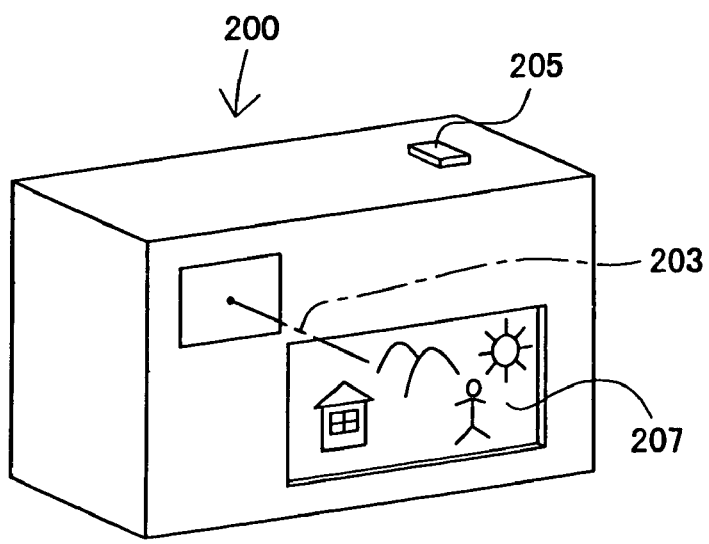
FIG. 72 is a rear perspective view of the electronic camera of FIG. 71.
Figure 73:
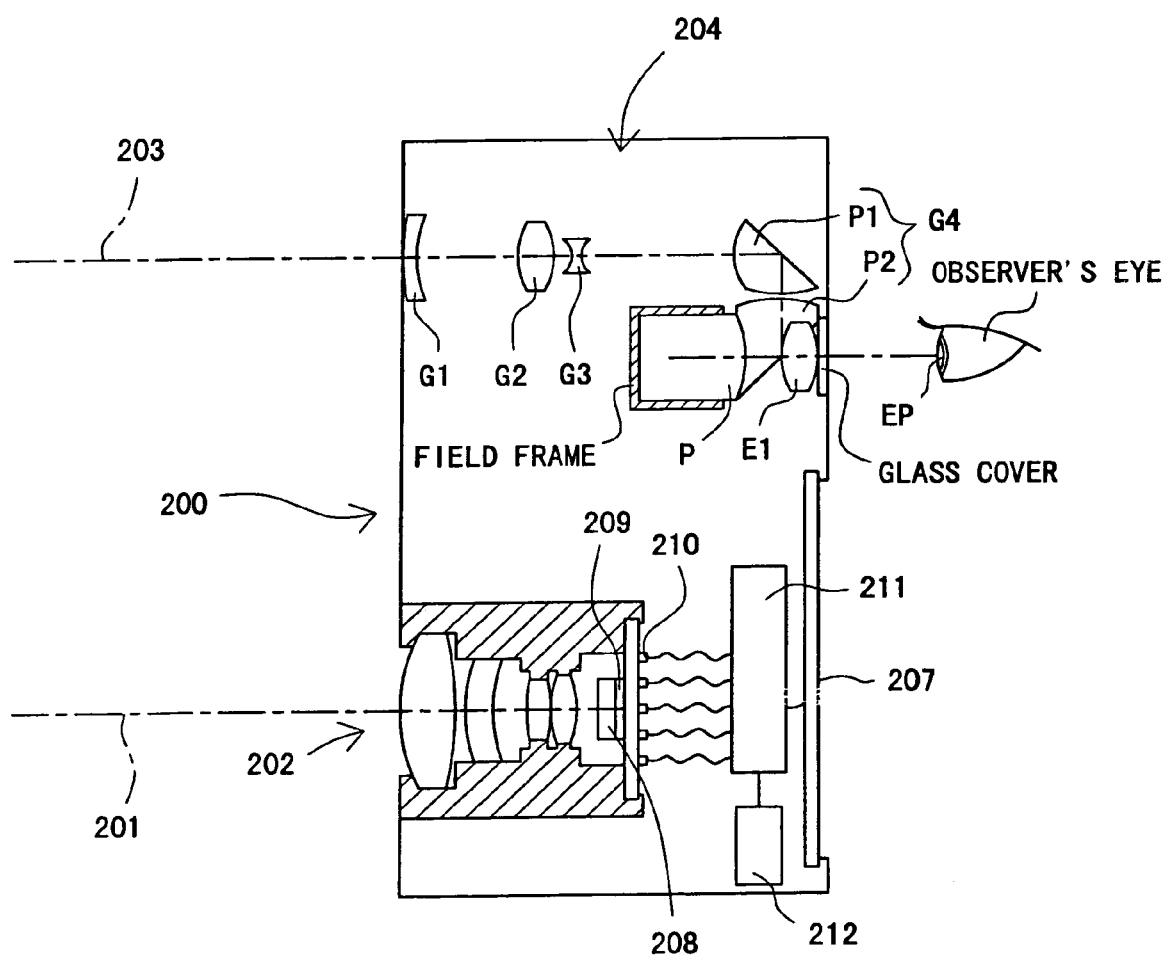
FIG. 73 is a sectional view showing the structure of the electronic camera of FIG. 71.

FIGS. 71–73 show an example of an electromic camera incorporating the real image mode finder optical system of the present invention.

As shown in FIGS. 71–73, an electronic camera 200 includes a photographing optical system 202 having a photpgraphing optical path 201, a finder optical system 204 of the present invention having a finder optical path 203, a release button 205, a stroboscopic lamp 206, and a liquid crystal display monitor 207. When the release button 205 provided on the upper surface of the electronic camera 200 is pushd, photographing is performed through the photographing optical system 202 in association with the release button 205. An object image formed by the photographing optical system 202 falls on an image senser chip 209, such as a CCD, through various filters 208, such as an IR (infrared) cutoff filter and a low-pass filter.

The object image received by the image sensor chip 209 is displayed, as an electronic image, on the liquid crystal display monitor 207 provided on the back surface of the electronic camera 200 through a processing means 211 electrically connected with terminals 210. The processing means 211 controls a recording means 212 for recording the object image received by the image sensor chip 209 as electronic information. The recording means 212 is electrocally connected with the processing means 211. Also, the recording means 212 may be replaced with a device for writing the record in a recording medium, such as a floppy disk, a smart medium, or memory card.

Where the photographing optical system 202 is constructed as a zoom lens, the finder optical system 204 having the finder optical path 203 may use the real image mode finder optical system of any of the above embodiments. Where the photographing optical system 202 is a single focus optical system, the objective optical system in the finder optical system 204 may be replaced with a single focus objective optical system in which a photographing area can be observed.

For the image erecting means, any means which is capable of erecting an image, not to speak of the Porro prism, is satisfactory. For example, when a roof reflecting surface is used as the image erecting means so that the objective optical system includes the roof reflecting surface and one planar reflecting surface and the eyepiece optical system includes one planar reflecting surface, compactness of the entire camera can be achieved. The reflecting surfaces are not limited to planar surfaces and may be configured as curved surfaces.

Even when a photographing film is used instead of the image sensor chip 209, a compact film camera with an excellent view can be obtained.

Figure 74A:
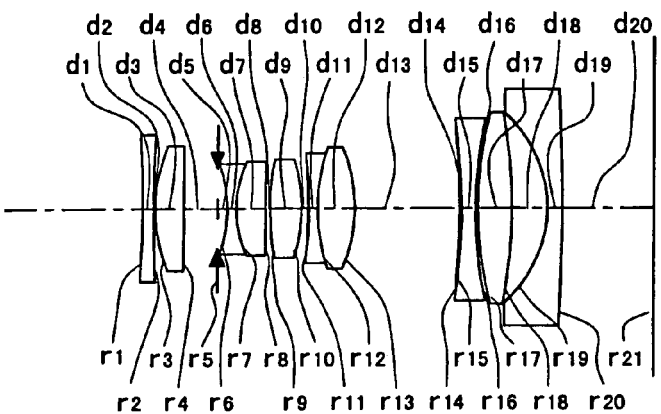
FIGS. 74A, 74, and 74C are sectional views showing arrangements, developed along the optical axis, at wide-angle, middle, and telephoto positions, respectively, of a photographing zoom lens used in a compact camera for a 35 mm film (the maximum image height of 21.6 mm).
Figure 74B:
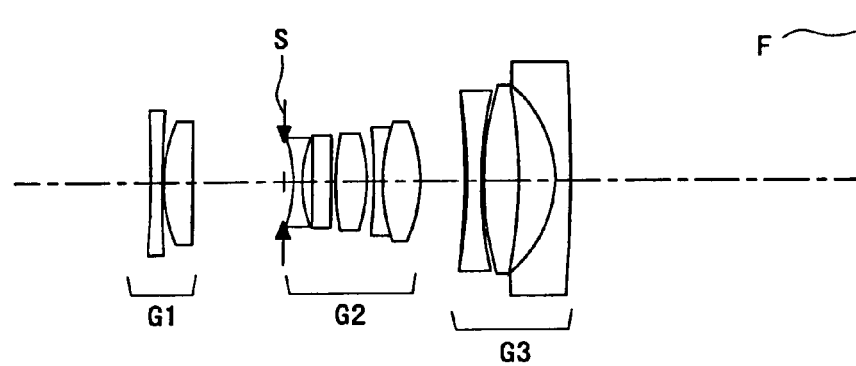
Figure 74C:
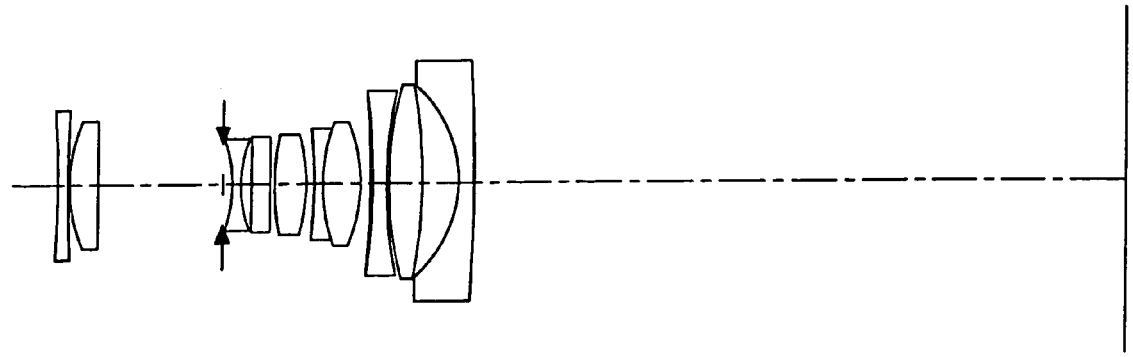

FIGS. 74A–74C show a specific example of a photographing zoom lens used in a compact camera for a 35 mm film (the maximum image height of 21.6 mm).

The photographing zoom lens includes, in order from the object side, the first unit G1 with a positive refracting power; the second unit G2 with a negative refracting power, having an aperture stop S which is variable in aperture diameter, at the most object-side position; and the third unit G3 with a negative refracting power. When the magnification of the finder is changed in the range from the wide-angle position to the telephoto position, a space between the first unit and the second unit is continuously widened, and a space between the second unit and the third unit is contunuously narrowed, so that the first unit and the third unit are integrally constructed and the first unit, the second unit, and the third unit are continuously moved toward the object side, thereby forming the object image on a film surface.

Subsequently, numerical data of optical members constituting the photographing zoom lens are shown below. In the numerical data, f represents the focal length of the photographing zoom lens, ω represents a half angle of view, Fno represents an F-number, and bf represents a back focal distance. Other symbols are the same as those used in the numerical data of the embodiments.

Numerical data (photographing zoom lens)

| | Wide-angle position | Middle position | Telephoto position |
|---|---|---|---|
| f(mm) | 29.31 | 72.87 | 135.00 |
| ω (°) | 28.3 | 16.1 | 9.0 |
| Fno | 4.1 | 6.8 | 11.5 |
| bf (mm) | 9.47732 | 31.48343 | 71.3185 |

$r_1 = -180.6198$
　$d_1 = 1.2001$　　$n_{d1} = 1.76182$　　$\nu_{d1} = 26.52$
$r_2 = 180.6198$
　$d_2 = 0.2286$
$r_3 = 21.6168$
　$d_3 = 3.1212$　　$n_{d3} = 1.49700$　　$\nu_{d3} = 81.54$
$r_4 = -380.8986$
　$d_4 = D4$ (variable)
$r_5 = \infty$ (stop)
　$d_5 = 1.0000$
$r_6 = -16.3795$
　$d_6 = 1.0004$　　$n_{d6} = 1.77250$　　$\nu_{d6} = 49.60$
$r_7 = 12.8963$
　$d_7 = 3.1001$　　$n_{d7} = 1.72825$　　$\nu_{d7} = 28.46$
$r_8 = -134.5936$
　$d_8 = 0.4702$
$r_9 = 31.9527$
　$d_9 = 3.3010$　　$n_{d9} = 1.56016$　　$\nu_{d9} = 60.30$
$r_{10} = -24.8940$ (aspherical)
　$d_{10} = 0.7899$
$r_{11} = -80.7304$
　$d_{11} = 1.0020$　　$n_{d11} = 1.80518$　　$\nu_{d11} = 25.43$
$r_{12} = 21.6465$
　$d_{12} = 4.0740$　　$n_{d12} = 1.69680$　　$\nu_{d12} = 55.53$
$r_{13} = -17.2293$
　$d_{13} = D13$ (variable)
$r_{14} = -48.1099$ (aspherical)
　$d_{14} = 0.2501$　　$n_{d14} = 1.52288$　　$\nu_{d14} = 52.50$
$r_{15} = -65.5251$
　$d_{15} = 1.3535$　　$n_{d15} = 1.80610$　　$\nu_{d15} = 40.95$
$r_{16} = 47.5056$
　$d_{16} = 0.2911$
$r_{17} = 41.0817$
　$d_{17} = 3.5899$　　$n_{d17} = 1.80518$　　$\nu_{d17} = 25.43$
$r_{18} = -76.4471$
　$d_{18} = 3.8912$
$r_{19} = -14.7089$
　$d_{19} = 1.6801$　　$n_{d19} = 1.69680$　　$\nu_{d19} = 55.53$
$r_{20} = -488.7372$
　$d_{20} = D20$ (variable)
$r_{21} = \infty$ (film surface)
Aspherical coefficients
Tenth surface $K = 1.5373$
$A_4 = 8.3473 \times 10^{-5}$　　$A_6 = 5.1702 \times 10^{-7}$　　$A_8 = -1.3021 \times 10^{-8}$
$A_{10} = 1.5962 \times 10^{-10}$
Fourteenth surface $K = -18.4065$
$A_4 = 2.4223 \times 10^{-5}$　　$A_6 = 1.3956 \times 10^{-7}$　　$A_8 = -1.8237 \times 10^{-10}$
$A_{10} = 3.9911 \times 10^{-12}$
Zoom data
When an infinite object point is focused:

| | | | |
|---|---|---|---|
| D4 | 3.6815 | 10.0332 | 14.0700 |
| D13 | 11.5705 | 5.2188 | 1.1820 |
| D20 | 9.4773 | 31.4834 | 71.3185 |

When the object point distance is 0.6 m:

| | | | |
|---|---|---|---|
| D4 | 2.3504 | 8.3489 | 11.9918 |
| D13 | 12.9016 | 6.9031 | 3.2602 |
| D20 | 9.4773 | 31.4834 | 71.3185 |

What is claimed is:
1. A real image mode finder optical system comprising, in order from an object side:
an objective optical system with a positive refracting power;

a field frame located in the proximity of an imaging position of the objective optical system; and an eyepiece optical system with a positive refracting power, wherein the real image mode finder optical system includes an image erecting device, wherein the objective optical system is capable of having a focal length shorter than a focal length of the eyepiece optical system, and wherein the eyepiece optical system includes, in order from the object side, a prism unit with a positive refracting power and a lens unit with a positive refracting power a most field-frame-side surface of the prism unit with a positive refracting power having a positive refracting power and being configured as an aspherical surface with a negative refracting power on a periphery thereof.

2. A real image mode finder optical system according to claim 1, wherein the objective optical system has at least two lens units, the focal length of the objective optical system is variable, and when the magnification is changed, the at least two lens units are moved along different paths.

3. A real image mode finder optical system according to claim 1, wherein the objective optical system comprises, in order from the object side, a first unit with a negative refracting power, a second unit with a positive refracting power, a third unit with a negative refracting power, and a fourth unit with a positive refracting power so that a magnification of the finder optical system is changed, ranging from a wide-angle position to a telephoto position, by simply moving the second unit toward the object side and the third unit toward the eyepiece optical system to satisfy the following condition:

$$0.52 < mh/fe < 1$$

where mh is a maximum width of the field frame and fe is a focal length of the eyepiece optical system.

4. A real image mode finder optical system according to claim 3, wherein the prism unit with a positive refracting power has a positive refracting power on an optical axis thereof.

5. A photographing apparatus comprising a real image-mode finder optical system according to claim 1.

6. A finder optical system comprising an eyepiece optical system with a positive refracting power, the eyepiece optical system comprising an optical unit with a positive refracting power and a lens unit with a positive refracting power, wherein, in the eyepiece optical system, a refracting surface that is positioned most distant from an eyepoint has a positive refracting power and is configured as an aspherical surface with a negative refracting power on a periphery thereof.

7. A finder optical system according to claim 6, wherein the optical unit is a prism unit.

8. A finder optical system according to claim 6, further comprising a field frame positioned more distant from the eyepoint than the aspherical surface is, wherein the aspherical surface satisfies the following condition:

$$-0.7(1/mm) < \phi(mh/2) < \phi(1/mm)$$

where mh is a maximum width of the field frame, and $\phi(mh/2)$ is a refracting power, at a height mn/2 in a direction normal to the optical axis, of the aspherical surface.

9. A finder optical system according to claim 8, further comprising an objective optical system that forms an image in a proximity of the field frame.

10. A photographing apparatus comprising a finder optical system according to claim 6.

* * * * *